(12) United States Patent
Kohno

(10) Patent No.: US 7,263,188 B2
(45) Date of Patent: Aug. 28, 2007

(54) DATA DELIVERY SYSTEM, SERVER APPARATUS, REPRODUCING APPARATUS, DATA DELIVERY METHOD, DATA PLAYBACK METHOD, STORAGE MEDIUM, CONTROL, SIGNAL, AND TRANSMISSION DATA SIGNAL

(75) Inventor: Fumio Kohno, Kanagawa (JP)

(73) Assignee: Sony Corporation, Tokyo (JP)

( * ) Notice: Subject to any disclaimer, the term of this patent is extended or adjusted under 35 U.S.C. 154(b) by 828 days.

(21) Appl. No.: 09/973,336

(22) Filed: Oct. 9, 2001

(65) Prior Publication Data

US 2002/0057799 A1 May 16, 2002

(30) Foreign Application Priority Data

Oct. 10, 2000 (JP) ............... 2000-314436

(51) Int. Cl.
*H04N 7/167* (2006.01)
*H04L 9/00* (2006.01)

(52) U.S. Cl. ............ 380/231; 713/171; 713/185; 713/189; 713/193; 726/26; 705/57

(58) Field of Classification Search ........ 713/193; 380/201, 231; 726/26; 705/57
See application file for complete search history.

(56) References Cited

U.S. PATENT DOCUMENTS

| | | | | |
|---|---|---|---|---|
| 2,656,409 | A | * 10/1953 | Morris et al. | 380/242 |
| 3,470,309 | A | * 9/1969 | Nyberg | 725/151 |
| 4,696,034 | A | * 9/1987 | Wiedemer | 380/230 |
| 5,247,575 | A | * 9/1993 | Sprague et al. | 705/53 |
| 5,661,799 | A | * 8/1997 | Nagel et al. | 705/52 |
| 5,699,370 | A | 12/1997 | Kaniwa et al. | |
| 6,104,813 | A | 8/2000 | McRae | |

(Continued)

FOREIGN PATENT DOCUMENTS

EP 1 001 624 5/2000

(Continued)

OTHER PUBLICATIONS

Anonymous: "IT Security Session 6 Cryptography" Internet Article, [Online] Oct. 1997, XP002389933 Retrieved from the Internet: URL:http://www.nao.org.uk/intosai/edp/itsec6.pdf> [retrieved on Jul. 11, 2006].

*Primary Examiner*—Gilberto Barron, Jr.
*Assistant Examiner*—Samson Lemma
(74) *Attorney, Agent, or Firm*—Frommer Lawrence & Haug LLP; William S. Frommer; Thomas F. Presson

(57) ABSTRACT

A data delivery system has a capability of effectively and reliably protecting copyright of the data. A video source of a movie or the like is delivered in the form of encrypted data from a server apparatus to a playback apparatus. A decryption key used to decrypt the encrypted data is stored on a storage medium such as a memory card, and the storage medium is sent from the server apparatus to the playback apparatus in parallel with the delivery of the encrypted data. After completion of the playing of the movie by the playback apparatus in a movie theater, the storage medium is returned to the server apparatus. The server apparatus examines information stored on the storage medium to check whether the video source delivered in the form of data has been properly used in an authorized manner.

106 Claims, 59 Drawing Sheets

U.S. PATENT DOCUMENTS

| | | | |
|---|---|---|---|
| 6,611,812 B2* | 8/2003 | Hurtado et al. | 705/26 |
| 6,804,453 B1* | 10/2004 | Sasamoto et al. | 386/94 |
| 6,847,950 B1* | 1/2005 | Kamibayashi et al. | 705/57 |
| 6,850,619 B1* | 2/2005 | Hirai | 380/203 |
| 2001/0042043 A1* | 11/2001 | Shear et al. | 705/51 |
| 2002/0156742 A1* | 10/2002 | Ogino et al. | 705/57 |
| 2003/0206635 A1* | 11/2003 | Morley et al. | 380/269 |
| 2005/0071272 A1* | 3/2005 | Yoshioka et al. | 705/51 |

FOREIGN PATENT DOCUMENTS

| | | |
|---|---|---|
| EP | 1 005 040 | 5/2000 |
| WO | WO 00 58962 | 10/2000 |

* cited by examiner

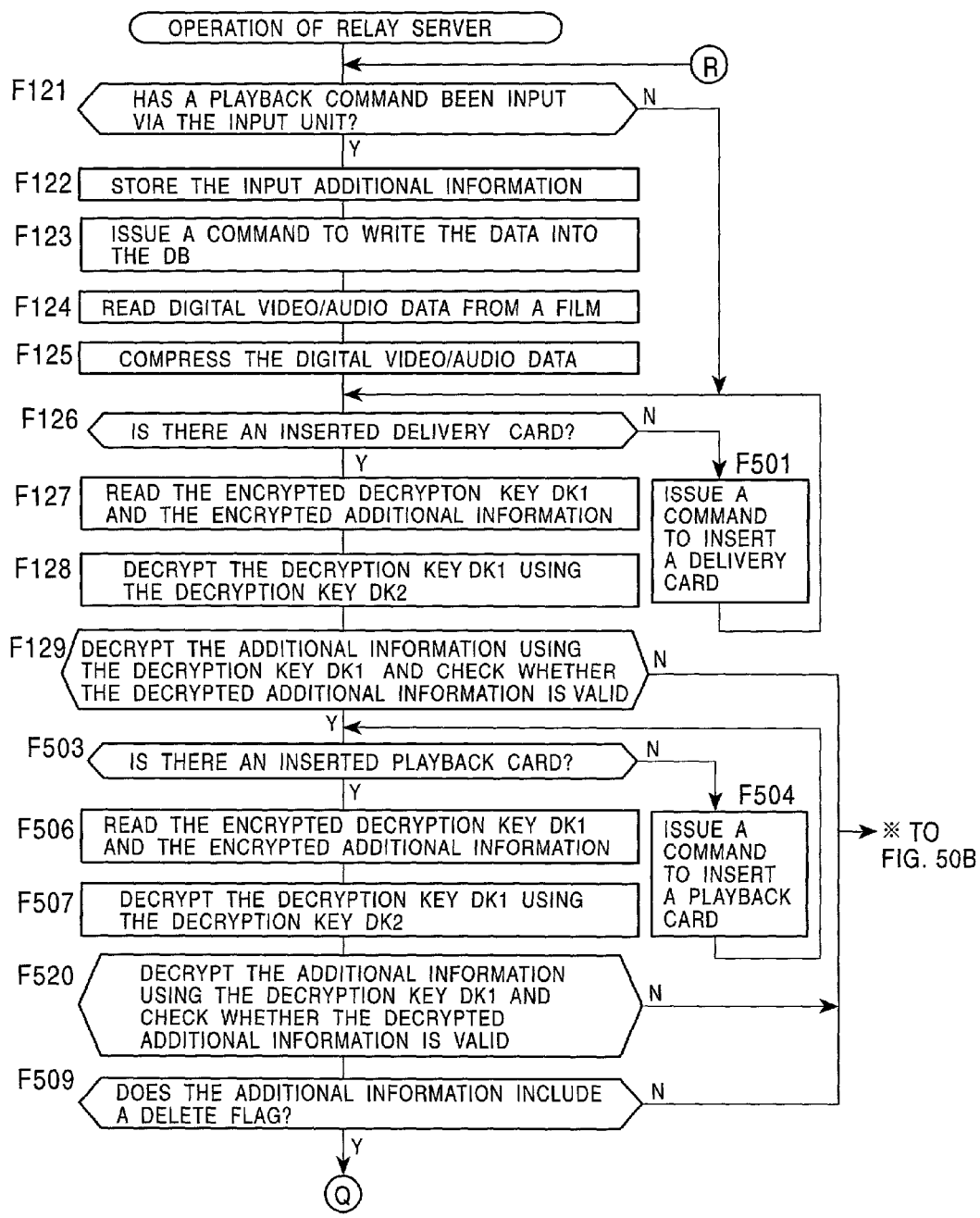

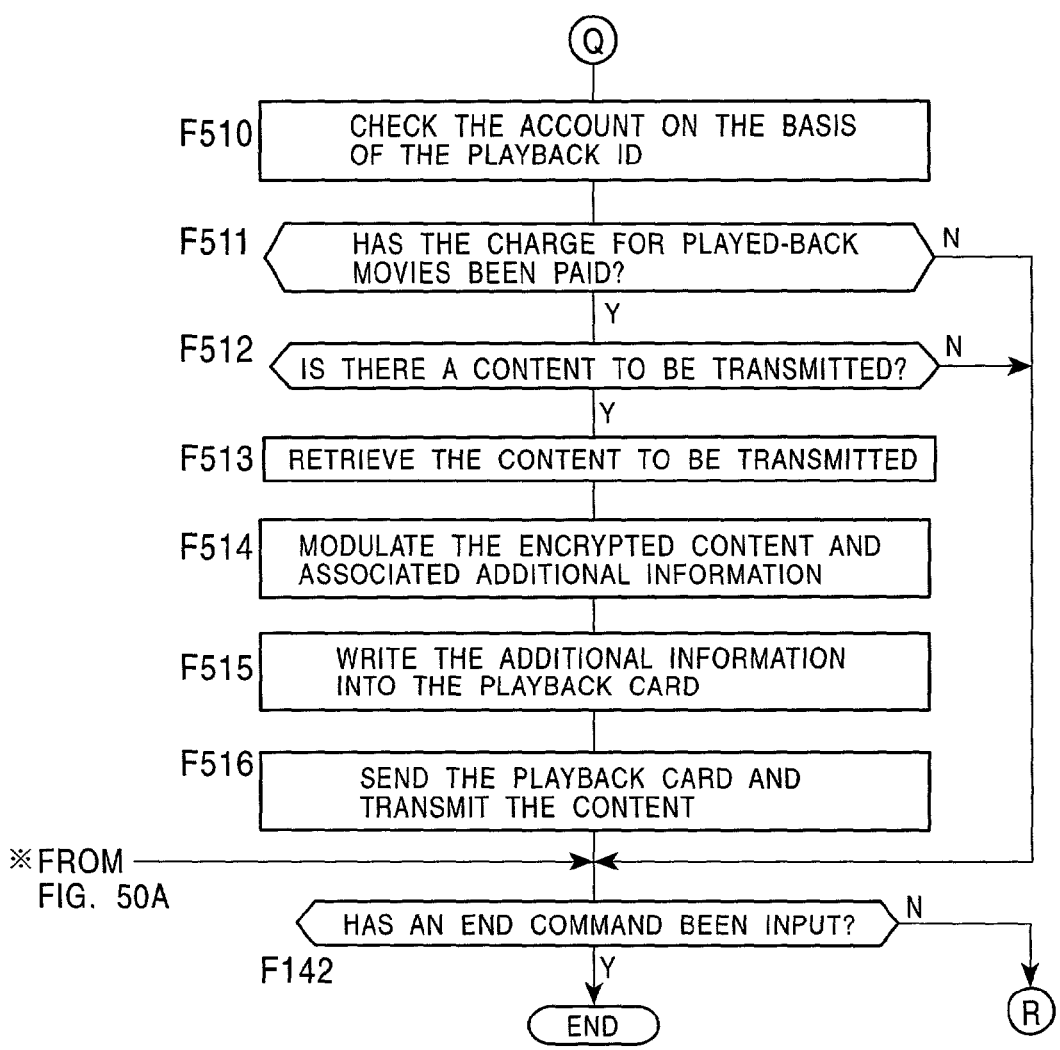

DATA DELIVERY SYSTEM, SERVER APPARATUS, REPRODUCING APPARATUS, DATA DELIVERY METHOD, DATA PLAYBACK METHOD, STORAGE MEDIUM, CONTROL, SIGNAL, AND TRANSMISSION DATA SIGNAL

BACKGROUND OF THE INVENTION

1. Field of the Invention

The present invention relates to a data delivery system, and more particularly, to a data delivery system suitable for use, for example, by a movie distribution company to deliver movie data to a movie theater via a relay server.

2. Description of the Related Art

In recent years, a practical technique has been developed for transmitting a video source (video content data), for example, on a video-on-demand basis. This makes it possible to supply various types of video sources without having to use a film or a video cassette tape.

A conventional movie distribution system is described below with reference to FIG. 56.

Usually, a movie produced by a movie production company 500 is distributed, via movie distribution companies 501a, 501b, 501c, and so on, to movie theaters 502a, 502b, 502c, 502d, and so on under contract.

After shooting a movie, a movie producer edits a negative master film by cutting and connecting the film. After completion of the editing, an edited positive film is produced from the edited negative master film. The movie production company 500 produces a negative master film from which films to be distributed will be produced.

From this edited negative master film, a desired number of edited positive films are produced and delivered (transported) to movie distribution companies 501a, 501b, and so on.

Each of movie distribution companies 501a, 501b, and so on produces a large number of negative films from a delivered positive film. The produced negative films are delivered (transported) from the movie distribution companies 501a, 501b, and so on to movie theaters 502a, 502b, and so on in accordance with a contract. The movie theaters 502a, 502b, and so on show the movie using distributed films.

If the playing period predetermined in accordance with the contract between the respective movie theaters 502a, 502b, and so on and a movie production company 500 or a movie distribution company 501 has expired, the negative films are returned to the movie distribution company 501a from movie theaters 502a, 502b, . . . , and so on.

The movie distribution companies 502a, 502b, and so on dispose the negative films returned from the movie theaters thereby preventing the films from being used in an unauthorized manner.

Alternatively, the movie production company 500 collects all movie films from the movie distribution companies 502a, 502b, and so on to prevent unauthorized use of the films.

In the conventional movie distribution system, distribution of a large number of films among movie production companies 500, movie distribution companies 501, and movie theaters 502 and production of a large number of films to be supplied to movie theaters 502 need very high cost and very long time.

In view of the advance in the technology of data delivery system, it will be advantageous to deliver a movie not via a film but via electronic data. This can reduce the delivery cost and the delivery time.

However, to realize a movie distribution system by means of electronic data, the following problems should be resolved.

It is required to protect the copyright of movie content data. To meet this requirement, it is needed to surely prevent distributed content data from being copied in an unauthorized manner. In particular, this requirement becomes very important when a video source is transmitted in the form of electronic data which can be more easily copied than a film.

For example, there is a possibility that content data is stolen from a middle of a transmission line via which the content data is transmitted.

Unlike movie films, content data is not corporeal. This can cause content data to be easily copied at a movie theater site without permission. This means that it is impossible to completely prevent an unauthorized copy of content data by means of withdrawing, unlike films.

A possible technique of preventing distributed video contents from being copied without permission is to encrypt video content data. However, in this case, it is required to transmit key data used by movie distribution companies 501 or movie theaters 502 to decrypt the encrypted video content data. When a decryption key data is transmitted in a similar manner to content data, if the key data is hacked together with the video content data during transmission process, an unauthorized copy can be made.

SUMMARY OF THE INVENTION

In view of the above, it is an object of the present invention to provide a system in which movies can be distributed by means of transmission of electronic data without danger of being copied in an unauthorized manner, and distributed video sources can be properly managed.

It is another object of the present invention to provide a server apparatus, a reproducing apparatus, and an information storage medium suitable for use in such a system.

It is still another object of the present invention to provide a program storage medium including a processing program stored thereon for controlling the server apparatus or the reproducing apparatus.

It is still another object of the present invention to provide a control signal for controlling the server apparatus or the reproducing apparatus. According to an aspect of the present invention, there is provided a data delivery system comprising: encrypting means for encrypting data and outputting the resultant encrypted data; transmitting means for transmitting the encrypted data; recording means for recording, on a storage medium, a key used to decrypt the encrypted data; receiving means for receiving the encrypted data transmitted by the transmitting means; reading means for reading the key stored on the storage medium; decrypting means for decrypting the encrypted data received by the receiving means, using the key read by the reading means; reproducing means for reproducing the data decrypted by the decrypting means; control means for controlling the reproduction of the data performed by the reproducing means in accordance with information stored on the storage medium; and judgment means for detecting unauthorized use of the data, on the basis of information stored on the storage medium.

In this data delivery system, preferably, the recording means records an allowed reproduction period during which data corresponding to the key stored on the storage medium is allowed to be reproduced, and the judgment means detects unauthorized use of the data, on the basis of the allowed reproduction period recorded on the storage medium.

The data delivery system may further comprise settling means for performing settlement corresponding to data reproduced by the reproducing means; and settlement information recording means for recording settlement information on the storage medium in response to the settlement, wherein the judgment means detects unauthorized use of the data, on the basis of the settlement information stored on the storage medium.

The data delivery system may further comprise storage means for storing the received encrypted data; and delete flag recording means for, when the encrypted data stored in the storage means is deleted, recording a delete flag on the storage medium, wherein the judgment means detects unauthorized use of the data by judging whether the delete flag is recorded on the storage medium.

In the data delivery system, the recording means may record an allowed reproduction period during which data corresponding to the key stored on the storage medium is allowed to be reproduced, and the control means may enable or disable the reproducing means to reproduce the data, in accordance with the allowed reproduction period recorded on the storage means.

In the data delivery system, the recording means may record a number-of-times value indicating the number of times data corresponding to the key stored on the storage medium is allowed to be reproduced, and the control means may enable or disable the reproducing means to reproduce the data in accordance with the number-of-times value recorded on the storage medium.

The data delivery system may further comprise embedding means for embedding an electronic watermark indicating the allowance of reproduction into the data, wherein the control means reduces the number-of-times value each time the reproducing means reproduces the data, and the control means rewrites the electronic watermark embedded in the data so as to indicate inhibition of reproduction when the number-of-times value becomes equal to zero.

The data delivery system may further comprise transfer means capable of transferring the encrypted data received by the receiving means to another electronic apparatus; detecting means for detecting a transfer operation performed by the transfer means; and ID recording means for, when the detecting means detects a transfer operation, recording an ID corresponding to the transfer means on the storage medium.

The data delivery system may further comprise a mounting part for mounting the storage medium therein: memory means on which information recorded on the storage medium is stored when the storage medium is mounted in the mounting part; and rewriting means for rewriting the information recorded on the storage medium, wherein the control means controls the reproduction of the data performed by the reproducing means in accordance with the information stored in the memory means.

The data delivery system may further comprise rewriting means capable of rewriting the allowed reproduction period during which the data corresponding to the key stored on the storage medium is allowed to be reproduced, so as to extend the allowed reproduction period.

The data delivery system may further comprise updating means for updating the information recorded on the storage medium if the judgment means determines, from the information recorded on the storage medium, that the use of the data is valid.

Herein, the recording means may record, on the storage medium, an identifier of the data, an allowed reproduction period assigned to the data, and a key used to decrypt the data, and the updating means may update the information recorded on the storage medium, if the judgment means determines, from the information recorded on the storage medium, that the use of the data is valid.

The data delivery system may further comprise settling means for performing settlement in accordance with the number-of-times value recorded on the storage medium by the recording means, the number-of-times value indicating the number of times the data is allowed to be reproduced.

The data delivery system may further comprise counter means for counting the number of times the data is reproduced by the reproducing means; and settlement means for performing settlement in accordance with a count value output by the counter means.

The data delivery system may further comprise payment amount recording means for recording payment amount information on the storage medium in response to paying a fee; and payment amount updating means for updating the payment amount information recorded on the storage medium in such a manner as to reduce the payment amount in accordance with the information recorded on the storage medium by the recording means.

According to another aspect of the present invention, there is provided a server apparatus for delivering data to a reproducing apparatus, comprising: encrypting means for encrypting data and outputting the resultant encrypted data; transmitting means for transmitting the encrypted data to the reproducing apparatus; recording means for recording, on a storage medium, a key used to decrypt the encrypted data; and judgment means for detecting unauthorized use of the data transmitted from the transmitting means, on the basis of information stored on the storage medium returned from the reproduction apparatus.

In this server apparatus, preferably, the recording means records an allowed reproduction period during which data corresponding to the key stored on the storage medium is allowed to be reproduced.

In this server apparatus, preferably, the judgment means detects unauthorized use of the data, on the basis of the allowed reproduction period recorded on the storage medium.

The judgment means may detect unauthorized use of the data, on the basis of the settlement information recorded on the storage medium by the reproducing apparatus.

The judgment means may detect unauthorized use of the data by judging whether a delete flag, which indicates that the data transmitted from the transmitting means has been deleted, is recorded on a storage medium returned from the reproducing apparatus.

The recording means may record a number-of-times value indicating the number of times data corresponding to the key stored on the storage medium is allowed to be reproduced.

The server apparatus may further comprise embedding means for embedding an electronic watermark indicating the allowance of reproduction into the data.

Herein, the judgment means may detect unauthorized use of the data by judging whether information indicating that the data transmitted from the transmitting means has been transferred is recorded on a storage medium returned from the reproducing apparatus.

The server apparatus may further comprise rewriting means capable of rewriting the allowed reproduction period during which the data corresponding to the key stored on the storage medium is allowed to be reproduced, so as to extend the allowed reproduction period.

The server apparatus may further comprise updating means for updating the information recorded on the storage medium if the judgment means determines, from the information recorded on the storage medium, that the use of the data is valid.

Herein, the recording means may record, on the storage medium, an identifier of the data, an allowed reproduction period assigned to the data, and a key used to decrypt the data, and the updating means may update the information recorded on the storage medium, if the judgment means determines, from the information recorded on the storage medium, that the use of the data is valid.

The server apparatus may further comprise, payment amount updating means for, when payment amount information is recorded on the storage medium in response to payment of a fee performed by the reproducing apparatus, updating the payment amount information recorded on the storage medium in such a manner as to reduce the payment amount in accordance with the information recorded on the storage medium by the recording means.

According to still another aspect of the present invention, there is provided a reproducing apparatus to which encrypted data is transmitted from a predetermined server apparatus and to which a storage medium including a key stored thereon for use in decrypting the encrypted data is sent, the reproducing apparatus comprising: receiving means for receiving the encrypted data transmitted from the predetermined server apparatus; reading means for reading the key stored on the storage medium; decrypting means for decrypting the encrypted data received by the receiving means, using the key read by the reading means; reproducing means for reproducing the data decrypted by the decrypting means; and control means for controlling the reproduction of the data performed by the reproducing means in accordance with information stored on the storage medium.

In this reproducing apparatus, preferably, the recording means records an allowed reproduction period during which data corresponding to the key stored on the storage medium is allowed to be reproduced, and the control means enables or disables the reproducing means to reproduce the data, in accordance with the allowed reproduction period recorded on the storage means.

The reproducing apparatus may further comprise settling means for performing settlement corresponding to data reproduced by the reproducing means; and settlement information recording means for recording settlement information on the storage medium in response to the settlement.

The reproducing apparatus may further comprise storage means for storing the received encrypted data; and delete flag recording means for, when the encrypted data stored in the storage means is deleted, recording a delete flag on the storage medium.

Herein, a number-of-times value, indicating the number of times data corresponding to the key stored on the storage medium is allowed to be reproduced, may be stored on the storage medium, and the control means may enable or disable the reproducing means to reproduce the data in accordance with the number-of-times value recorded on the storage medium.

The data received by the receiving means may include an electronic watermark embedded in the data, the watermark indicating that the data is permitted to be reproduced, and the control means may reduce the number-of-times value each time the reproducing means reproduces the data, and the control means rewrites the electronic watermark embedded in the data so as to indicate inhibition of reproduction when the number-of-times value becomes equal to zero.

The reproducing apparatus may further comprise transfer means capable of transferring the encrypted data received by the receiving means to another electronic apparatus; detecting means for detecting a transfer operation performed by the transfer means; and ID recording means for, when the detecting means detects a transfer operation, recording an ID corresponding to the transfer means on the storage medium.

The reproducing apparatus may further comprise a mounting part for mounting the storage medium therein: memory means on which information recorded on the storage medium is stored when the storage medium is mounted in the mounting part; and rewriting means for rewriting the information recorded on the storage medium, wherein the control means controls the reproduction of the data performed by the reproducing means in accordance with the information stored in the memory means.

The reproducing apparatus may further comprise rewriting means capable of rewriting the allowed reproduction period during which the data corresponding to the key stored on the storage medium is allowed to be reproduced, so as to extend the allowed reproduction period.

The reproducing apparatus may further comprising settling means for performing settlement in accordance with the number-of-times value recorded on the storage medium, the number-of-times value indicating the number of times the data is allowed to be reproduced.

The reproducing apparatus may further comprise counter means for counting the number of times the data is reproduced by the reproducing means; and settlement means for performing settlement in accordance with a count value output by the counter means.

The reproducing apparatus may further comprise payment amount recording means for recording payment amount information on the storage medium in response to paying a fee.

According to still another aspect of the present invention, there is provided a data delivery method comprising: an encrypting step for encrypting data and outputting the resultant encrypted data; a transmitting step for transmitting the encrypted data; a recording step for recording, on a storage medium, a key used to decrypt the encrypted data; a receiving step for receiving the encrypted data transmitted in the transmitting step; a reading step for reading the key stored on the storage medium; a decrypting step for decrypting the encrypted data received in the receiving step, using the key read in the reading step; a reproducing step for reproducing the data decrypted in the decrypting step; a control step for controlling the reproduction of the data performed in the reproducing step, in accordance with information stored on the storage medium; and a judgment step for detecting unauthorized use of the data, on the basis of information stored on the storage medium.

In this data delivery method, preferably, the recording step records an allowed reproduction period during which data corresponding to the key stored on the storage medium is allowed to be reproduced, and the judgment step detects unauthorized use of the data, on the basis of the allowed reproduction period recorded on the storage medium.

The data delivery method may further comprise a settling step for performing settlement corresponding to data reproduced in the reproducing step; and a settlement information recording step for recording settlement information on the storage medium in response to the settlement, wherein the judgment step detects unauthorized use of the data, on the basis of the settlement information stored on the storage medium.

The data delivery method may further comprise a storing step for storing the received encrypted data in storage means; and a delete flag recording step for, when the encrypted data stored in the storage means is deleted, recording a delete flag on the storage medium, wherein the judgment step detects unauthorized use of the data by judging whether the delete flag is recorded on the storage medium.

In this data delivery method, the recording step may record an allowed reproduction period during which data corresponding to the key stored on the storage medium is allowed to be reproduced, and the control step may enable or disable the reproduction of the data in the reproducing step, in accordance with the allowed reproduction period recorded on the storage medium.

The recording step may record a number-of-times value indicating the number of times data corresponding to the key stored on the storage medium is allowed to be reproduced, and the control means may enable or disable the reproduction of the data in the reproducing step in accordance with the number-of-times value recorded on the storage medium.

The data delivery method may further comprise an embedding step for embedding an electronic watermark indicating the allowance of reproduction into the data, wherein the control step reduces the number-of-times value each time the reproducing step reproduces the data, and the control step rewrites the electronic watermark embedded in the data so as to indicate inhibition of reproduction when the number-of-times value becomes equal to zero.

The data delivery method may further comprise a transfer step in which the encrypted data received in the receiving step may be transferred by transfer means to another electronic apparatus; a detecting step for detecting transferring, in the transfer step, of the encrypted data received in the receiving step to another electronic apparatus; and an ID recording step for, when the detecting step detects transferring of the encrypted data, recording an ID corresponding to the transfer means on the storage medium.

The data delivery method may further comprise a mounting step for mounting the storage medium into a mounting part; a memorizing step for storing, into memory means, information recorded on the storage medium when the storage medium is mounted in the mounting part; and a rewriting step for rewriting the information recorded on the storage medium, wherein the control step controls the reproduction of the data performed in the reproducing step in accordance with the information stored in the memory means.

The data delivery method may further comprise a rewriting step in which the allowed reproduction period, during which the data corresponding to the key stored on the storage medium is allowed to be reproduced, may be rewritten so as to extend the allowed reproduction period.

The data delivery method may further comprise an updating step for updating the information recorded on the storage medium if the judgment step determines, from the information recorded on the storage medium, that the use of the data is valid.

Herein, the recording step may record, on the storage medium, an identifier of the data, an allowed reproduction period assigned to the data, and a key used to decrypt the data, and the updating step may update the information recorded on the storage medium, if the judgment step determines, from the information recorded on the storage medium, that the use of the data is valid.

The data delivery method may further comprise a settling step for performing settlement in accordance with the number-of-times value recorded on the storage medium in the recording step, the number-of-times value indicating the number of times the data is allowed to be reproduced.

The data delivery method may further comprise a counting step for counting the number of times the data is reproduced in the reproducing step; and a settlement step for performing settlement in accordance with a count value counted in the counting step.

The data delivery method may further comprise a payment amount recording step for recording payment amount information on the storage medium in response to paying a fee; and a payment amount updating step for updating the payment amount information recorded on the storage medium in such a manner as to reduce the payment amount in accordance with the information recorded on the storage medium in the recording step.

According to still another aspect of the present invention, there is provided a method of controlling a server apparatus so as to deliver data from the server apparatus to a reproducing apparatus, comprising: an encrypting step for encrypting data and outputting the resultant encrypted data; a transmitting step for transmitting the encrypted data to the reproducing apparatus; a recording step for recording, on a storage medium, a key used to decrypt the encrypted data; and a judgment step for detecting unauthorized use of the data transmitted in the transmitting step, on the basis of information stored on the storage medium returned from the reproduction apparatus.

In this method of controlling the server apparatus, preferably, the recording step records an allowed reproduction period during which data corresponding to the key stored on the storage medium is allowed to be reproduced.

In the method of controlling the server apparatus, preferably, the judgment step detects unauthorized use of the data, on the basis of the allowed reproduction period recorded on the storage medium.

In this method of controlling the server apparatus, the judgment step may detect unauthorized use of the data, on the basis of the settlement information recorded on the storage medium by the reproducing apparatus.

The judgment step may detect unauthorized use of the data by judging whether a delete flag, which indicates that the data transmitted in the transmitting step has been deleted, is recorded on a storage medium returned from the reproducing apparatus.

The recording step may record a number-of-times value indicating the number of times data corresponding to the key stored on the storage medium is allowed to be reproduced.

The method of controlling the server apparatus may further comprise an embedding step for embedding an electronic watermark indicating the allowance of reproduction into the data.

Herein, the judgment step may detect unauthorized use of the data by judging whether information indicating that the data transmitted in the transmitting step has been transferred is recorded on a storage medium returned from the reproducing apparatus.

The method of controlling the server apparatus may further comprise a rewriting step in which the allowed reproduction period, during which the data corresponding to the key stored on the storage medium is allowed to be reproduced, may be rewritten so as to extend the allowed reproduction period.

The method of controlling the server apparatus may further comprise an updating step for updating the information recorded on the storage medium if the judgment step determines, from the information recorded on the storage medium, that the use of the data is valid.

Herein, the recording step may record, on the storage medium, an identifier of the data, an allowed reproduction period assigned to the data, and a key used to decrypt the data, and the updating step may update the information recorded on the storage medium, if the judgment step determines, from the information recorded on the storage medium, that the use of the data is valid.

The method of controlling the server apparatus may further comprise a payment amount updating step for, when payment amount information is recorded on the storage medium in response to payment of a fee performed by the reproducing apparatus, updating the payment amount information recorded on the storage medium in such a manner as to reduce the payment amount in accordance with the information recorded on the storage medium in the recording step.

According to still another aspect of the present invention, there is provided a method of controlling a reproducing apparatus to which encrypted data is transmitted from a predetermined server apparatus and to which a storage medium including a key stored thereon for use in decrypting the encrypted data is sent, the method comprising: a receiving step for receiving the encrypted data transmitted from the predetermined server apparatus; a reading step for reading the key stored on the storage medium; a decrypting step for decrypting the encrypted data received in the receiving step, using the key read in the reading step; a reproducing step for reproducing the data decrypted in the decrypting step; and a control step for controlling the reproduction of the data performed in the reproducing step in accordance with information stored on the storage medium.

In this method of controlling the reproducing apparatus, preferably, the recording step records an allowed reproduction period during which data corresponding to the key stored on the storage medium is allowed to be reproduced, and the control step enables or disables the reproduction of the data in the reproducing step, in accordance with the allowed reproduction period recorded on the storage means.

The method of controlling the reproducing apparatus may further comprise a settling step for performing settlement corresponding to data reproduced in the reproducing step; and a settlement information recording step for recording settlement information on the storage medium in response to the settlement.

The method of controlling the reproducing apparatus may further comprise a storing step for storing the received encrypted data into storage means; and a delete flag recording step for, when the encrypted data stored in the storage means is deleted, recording a delete flag on the storage medium.

Herein, a number-of-times value, indicating the number of times data corresponding to the key stored on the storage medium is allowed to be reproduced, may be stored on the storage medium, and the control step may enable or disable the reproduction of the data in the reproducing step, in accordance with the number-of-times value recorded on the storage medium.

The data received in the receiving step may include an electronic watermark embedded in the data, the watermark indicating that the data is permitted to be reproduced, and the control step may reduce the number-of-times value each time the reproducing step reproduces the data, and the control step may rewrite the electronic watermark embedded in the data so as to indicate inhibition of reproduction when the number-of-times value becomes equal to zero.

The method of controlling the reproducing apparatus may further comprise a transfer step in which the encrypted data received in the receiving step may be transferred by transfer means to another electronic apparatus; a detecting step for detecting transferring, in the transfer step, of the encrypted data received in the receiving step to another electronic apparatus; and an ID recording step for, when the detecting step detects transferring of the encrypted data, recording an ID corresponding to the transfer means on the storage medium.

The method of controlling the reproducing apparatus may further comprise a mounting step for mounting the storage medium into a mounting part; a memorizing step for storing, into memory means, information recorded on the storage medium when the storage medium is mounted in the mounting part; and a rewriting step for rewriting the information recorded on the storage medium, wherein the control step controls the reproduction of the data performed in the reproducing step in accordance with the information stored in the memory means.

The method of controlling the reproducing apparatus may further comprise a rewriting step in which the allowed reproduction period, during which the data corresponding to the key stored on the storage medium is allowed to be reproduced, may be rewritten so as to extend the allowed reproduction period.

The method of controlling the reproducing apparatus may further comprise a settling step for performing settlement in accordance with the number-of-times value recorded on the storage medium, the number-of-times value indicating the number of times the data is allowed to be reproduced.

The method of controlling the reproducing apparatus may further comprise a counting step for counting the number of times the data is reproduced in the reproducing step; and a settlement step for performing settlement in accordance with a count value counted in the counting step.

The method of controlling the reproducing apparatus may further comprise a payment amount recording step for recording payment amount information on the storage medium in response to paying a fee.

According to still another aspect of the present invention, there is provided a program storage medium including a processing program, stored thereon, for controlling a server apparatus to perform a process of delivering data from the server apparatus to a reproducing apparatus, the process comprising: an encrypting step for encrypting data and outputting the resultant encrypted data; a transmitting step for transmitting the encrypted data to the reproducing apparatus; a recording step for recording, on an information storage medium, a key used to decrypt the encrypted data; and a judgment step for detecting unauthorized use of the data transmitted in the transmitting step, on the basis of information stored on the information storage medium returned from the reproduction apparatus.

In this program storage medium, preferably, the recording step records an allowed reproduction period during which data corresponding to the key stored on the information storage medium is allowed to be reproduced.

In this program storage medium, preferably, the judgment step detects unauthorized use of the data, on the basis of the allowed reproduction period recorded on the information storage medium.

The judgment step may detect unauthorized use of the data, on the basis of the settlement information recorded on the information storage medium by the reproducing apparatus.

The judgment step may detect unauthorized use of the data by judging whether a delete flag, which indicates that the data transmitted in the transmitting step has been deleted, is recorded on an information storage medium returned from the reproducing apparatus.

The recording step may record a number-of-times value indicating the number of times data corresponding to the key stored on the information storage medium is allowed to be reproduced.

In the program storage medium, the process may further comprise an embedding step for embedding an electronic watermark indicating the allowance of reproduction into the data.

The judgment step may detect unauthorized use of the data by judging whether information indicating that the data transmitted in the transmitting step has been transferred is recorded on an information storage medium returned from the reproducing apparatus.

In the program storage medium, the process may further comprise a rewriting step in which the allowed reproduction period, during which the data corresponding to the key stored on the storage medium is allowed to be reproduced, may be rewritten so as to extend the allowed reproduction period.

In the program storage medium, the process may further comprise an updating step for updating the information recorded on the storage medium if the judgment step determines, from the information recorded on the storage medium, that the use of the data is valid.

The recording step may record, on the information storage medium, an identifier of the data, an allowed reproduction period assigned to the data, and a key used to decrypt the data, and the updating step may update the information recorded on the information storage medium, if the judgment step determines, from the information recorded on the information storage medium, that the use of the data is valid.

In the program storage medium, the process may further comprise a payment amount updating step for, when payment amount information is recorded on the information storage medium in response to payment of a fee performed by the reproducing apparatus, updating the payment amount information recorded on the information storage medium in such a manner as to reduce the payment amount in accordance with the information recorded on the information storage medium in the recording step.

According to still another aspect of the present invention, there is provided a program storage medium including a processing program, stored thereon, for controlling a reproducing apparatus, to which encrypted data is transmitted from a predetermined server apparatus and to which an information storage medium including a key stored thereon for use in decrypting the encrypted data is sent, so as to perform a process comprising a receiving step for receiving the encrypted data transmitted from the predetermined server apparatus; a reading step for reading the key stored on the information storage medium; a decrypting step for decrypting the encrypted data received in the receiving step, using the key read in the reading step; a reproducing step for reproducing the data decrypted in the decrypting step; and a control step for controlling the reproduction of the data performed in the reproducing step in accordance with information stored on the information storage medium.

Preferably, the recording step records an allowed reproduction period during which data corresponding to the key stored on the information storage medium is allowed to be reproduced, and the control step enables or disables the reproduction of the data in the reproducing step, in accordance with the allowed reproduction period recorded on the information storage means.

In the program storage medium, the process may further comprise a settling step for performing settlement corresponding to data reproduced in the reproducing step, and a settlement information recording step for recording settlement information on the information storage medium in response to the settlement.

In the program storage medium, the process may further comprise a storing step for storing the received encrypted data into storage means; and a delete flag recording step for, when the encrypted data stored in the storage means is deleted, recording a delete flag on the information storage medium.

A program storage medium according to claim 91, wherein the process further comprises a number-of-times value, indicating the number of times data corresponding to the key stored on the information storage medium is allowed to be reproduced, is stored on the information storage medium; and the control step enables or disables the reproduction of the data in the reproducing step, in accordance with the number-of-times value recorded on the information storage medium.

Herein, data received in the receiving step may include an electronic watermark embedded in the data, the watermark indicating that the data is permitted to be reproduced, and the control step may reduce the number-of-times value each time the reproducing step reproduces the data, and the control step may rewrite the electronic watermark embedded in the data so as to indicate inhibition of reproduction when the number-of-times value becomes equal to zero.

In the program storage medium, the process may further comprise a transfer step in which the encrypted data received in the receiving step may be transferred by transfer means to another electronic apparatus; a detecting step for detecting transferring, in the transfer step, of the encrypted data received in the receiving step to another electronic apparatus; and an ID recording step for, when the detecting step detects transferring of the encrypted data, recording an ID corresponding to the transfer means on the information storage medium.

In the program storage medium, the process may further comprise a mounting step for mounting the information storage medium into a mounting part; a memorizing step for storing, into memory means, information recorded on the information storage medium when the information storage medium is mounted in the mounting part; and a rewriting step for rewriting the information recorded on the information storage medium, wherein the control step controls the reproduction of the data performed in the reproducing step in accordance with the information stored in the memory means.

In the program storage medium, the process may further comprise a rewriting step in which the allowed reproduction period, during which the data corresponding to the key stored on the information storage medium is allowed to be reproduced, may be rewritten so as to extend the allowed reproduction period.

In the program storage medium, the process may further comprise a settling step for performing settlement in accordance with the number-of-times value recorded on the information storage medium, the number-of-times value indicating the number of times the data is allowed to be reproduced.

In the program storage medium, the process may further comprise a counting step for counting the number of times the data is reproduced in the reproducing step; and a settlement step for performing settlement in accordance with a count value counted in the counting step.

In the program storage medium, the process may further comprise a payment amount recording step for recording payment amount information on the information storage medium in response to paying a fee.

According to still another aspect of the present invention, there is provided a control signal for controlling a server apparatus to perform a process of delivering data from the server apparatus to a reproducing apparatus, the process comprising: an encrypting step for encrypting data and outputting the resultant encrypted data; a transmitting step for transmitting the encrypted data to the reproducing apparatus; a recording step for recording, on an information storage medium, a key used to decrypt the encrypted data; and a judgment step for detecting unauthorized use of the data transmitted in the transmitting step, on the basis of information stored on the information storage medium returned from the reproduction apparatus.

Preferably, the recording step records an allowed reproduction period during which data corresponding to the key stored on the information storage medium is allowed to be reproduced.

Preferably, the judgment step detects unauthorized use of the data, on the basis of the allowed reproduction period recorded on the information storage medium.

The judgment step may detect unauthorized use of the data, on the basis of the settlement information recorded on the information storage medium by the reproducing apparatus.

The judgment step may detect unauthorized use of the data by judging whether a delete flag, which indicates that the data transmitted in the transmitting step has been deleted, is recorded on an information storage medium returned from the reproducing apparatus.

The recording step may record a number-of-times value indicating the number of times data corresponding to the key stored on the information storage medium is allowed to be reproduced.

In this control signal, the process may further comprise an embedding step for embedding an electronic watermark indicating the allowance of reproduction into the data.

Herein, the judgment step may detect unauthorized use of the data by judging whether information indicating that the data transmitted in the transmitting step has been transferred is recorded on an information storage medium returned from the reproducing apparatus.

In the control signal, the process may further comprise a rewriting step in which the allowed reproduction period, during which the data corresponding to the key stored on the storage medium is allowed to be reproduced, may be rewritten so as to extend the allowed reproduction period.

In the control signal, the process may further comprise an updating step for updating the information recorded on the storage medium if the judgment step determines, from the information recorded on the storage medium, that the use of the data is valid.

Herein, the recording step may record, on the information storage medium, an identifier of the data, an allowed reproduction period assigned to the data, and a key used to decrypt the data, and the updating step updates the information recorded on the information storage medium, if the judgment step determines, from the information recorded on the information storage medium, that the use of the data is valid.

In the control signal, the process may further comprises a payment amount updating step for, when payment amount information is recorded on the information storage medium in response to payment of a fee performed by the reproducing apparatus, updating the payment amount information recorded on the information storage medium in such a manner as to reduce the payment amount in accordance with the information recorded on the information storage medium in the recording step.

According to still another aspect of the present invention, there is provided a control signal for controlling a reproducing apparatus, to which encrypted data is transmitted from a predetermined server apparatus and to which an information storage medium including a key stored thereon for use in decrypting the encrypted data is sent, so as to perform a process comprising a receiving step for receiving the encrypted data transmitted from the predetermined server apparatus; a reading step for reading the key stored on the information storage medium; a decrypting step for decrypting the encrypted data received in the receiving step, using the key read in the reading step; a reproducing step for reproducing the data decrypted in the decrypting step; and a control step for controlling the reproduction of the data performed in the reproducing step in accordance with information stored on the information storage medium.

Preferably, the recording step records an allowed reproduction period during which data corresponding to the key stored on the information storage medium is allowed to be reproduced, and the control step enables or disables the reproduction of the data in the reproducing step, in accordance with the allowed reproduction period recorded on the information storage means.

In this control signal, the process may further comprise a settling step for performing settlement corresponding to data reproduced in the reproducing step; and a settlement information recording step for recording settlement information on the information storage medium in response to the settlement.

In the control signal, the process may further comprise a storing step for storing the received encrypted data into storage means; and a delete flag recording step for, when the encrypted data stored in the storage means is deleted, recording a delete flag on the information storage medium.

In the control signal, the process may further comprise a number-of-times value, indicating the number of times data corresponding to the key stored on the information storage medium is allowed to be reproduced, is stored on the information storage medium; and the control step enables or disables the reproduction of the data in the reproducing step, in accordance with the number-of-times value recorded on the information storage medium.

Herein, data received in the receiving step may include an electronic watermark embedded in the data, the watermark indicating that the data is permitted to be reproduced, and the control step may reduce the number-of-times value each time the reproducing step reproduces the data, and the control step may rewrite the electronic watermark embedded in the data so as to indicate inhibition of reproduction when the number-of-times value becomes equal to zero.

In the control signal, the process may further comprise a transfer step in which the encrypted data received in the receiving step may be transferred by transfer means to another electronic apparatus; a detecting step for detecting transferring, in the transfer step, of the encrypted data received in the receiving step to another electronic apparatus; and an ID recording step for, when the detecting step detects transferring of the encrypted data, recording an ID corresponding to the transfer means on the information storage medium.

In the control signal, the process may further comprise a mounting step for mounting the information storage medium into a mounting part; a memorizing step for storing, into memory means, information recorded on the information storage medium when the information storage medium is mounted in the mounting part; and a rewriting step for rewriting the information recorded on the information storage medium, wherein the control step controls the reproduction of the data performed in the reproducing step in accordance with the information stored in the memory means.

In the control signal, the process may further comprise a rewriting step in which the allowed reproduction period, during which the data corresponding to the key stored on the information storage medium is allowed to be reproduced, may be rewritten so as to extend the allowed reproduction period.

In the control signal, the process may further comprise a settling step for performing settlement in accordance with the number-of-times value recorded on the information storage medium, the number-of-times value indicating the number of times the data is allowed to be reproduced.

In the control signal, the process may further comprise a counting step for counting the number of times the data is reproduced in the reproducing step; and a settlement step for performing settlement in accordance with a count value counted in the counting step.

In the control signal, the process may further comprise a payment amount recording step for recording payment amount information on the information storage medium in response to paying a fee.

According to still another aspect of the present invention, there is provided a data delivery method comprising: an encrypting step for encrypting data and outputting the resultant encrypted data; a transmitting step for transmitting the encrypted data; a recording step for recording, on a storage medium, a key used to decrypt the encrypted data; a receiving step for receiving the encrypted data transmitted from the predetermined server apparatus; a reading step for reading the key stored on the storage medium; a decrypting step for decrypting the encrypted data received in the receiving step, using the key read in the reading step; a controlling step for enabling or disabling reproduction of the data decrypted in the decrypting step, in accordance with the information recorded on the storage medium; a reproducing step for reproducing the decrypted data, in accordance with the control in the controlling step; and a judging step for detecting unauthorized use of the data, on the basis of information stored on the storage medium.

According to still another aspect of the present invention, there is provided a method of delivering data to a reproducing apparatus, comprising: an encrypting step for encrypting data and outputting the resultant encrypted data; a transmitting step for transmitting the encrypted data; a recording step for recording, on a storage medium, a key used to decrypt the encrypted data; and a judging step for detecting unauthorized use of the data, on the basis of information stored on a storage medium returned from the reproducing apparatus.

According to still another aspect of the present invention, there is provided a method of reproducing data by a reproducing apparatus to which encrypted data is transmitted from a predetermined server apparatus and to which a storage medium including a key stored thereon for use in decrypting the encrypted data is sent, the method comprising: a receiving step for receiving the encrypted data transmitted from the predetermined server apparatus; a reading step for reading the key stored on the storage medium; a decrypting step for decrypting the encrypted data received in the receiving step, using the key read in the reading step; a controlling step for enabling or disabling reproduction of the data decrypted in the decrypting step, in accordance with the information recorded on the storage medium; and a reproducing step for reproducing the decrypted data, in accordance with the control in the controlling step.

According to still another aspect of the present invention, there is provided a storage medium including a processing program, stored thereon, for controlling a server apparatus to execute a data delivery process for delivering data to a reproducing apparatus, the processing program comprising: an encrypting step for encrypting data and outputting the resultant encrypted data; a transmitting step for transmitting the encrypted data; a recording step for recording, on a storage medium, a key used to decrypt the encrypted data; and a judging step for detecting unauthorized use of the data, on the basis of information stored on a storage medium returned from the reproducing apparatus.

According to still another aspect of the present invention, there is provided a program storage medium including a processing program, stored thereon, for controlling a reproducing apparatus to which encrypted data is transmitted from a predetermined server apparatus and to which an information storage medium including a key stored thereon for use in decrypting the encrypted data is sent, the processing program serving to control the reproducing apparatus to perform a process of reproducing the data, the process comprising: a receiving step for receiving the encrypted data transmitted from the predetermined server apparatus; a reading step for reading the key stored on the information storage medium; a decrypting step for decrypting the encrypted data received in the receiving step, using the key read in the reading step; a controlling step for enabling or disabling reproduction of the data decrypted in the decrypting step, in accordance with the information recorded on the information storage medium; and a reproducing step for reproducing the decrypted data, in accordance with the control in the controlling step.

According to still another aspect of the present invention, there is provided a storage medium which is delivered between a server apparatus and a reproducing apparatus in a data delivery system for delivering encrypted data from the server apparatus to the reproducing apparatus, wherein at least information indicating an identifier of the data, a key used to decrypt the data, and a reproduction condition of the data is stored on the storage medium.

In this storage medium, preferably, the information indicating the reproduction condition is information indicating a period during which the data is allowed to be reproduced.

The information indicating the reproduction condition may be information indicating the number of times the data is allowed to be reproduced.

Settlement information may be stored on the storage medium in response to settlement associated with the data reproduced by the reproducing apparatus.

A delete flag may be stored on the storage medium in response to deleting data from the reproducing apparatus.

Information indicating that the data is transferred or output from the reproducing apparatus may be stored on the storage medium.

Payment amount information may be stored on the storage medium in response to payment of a fee performed by the reproducing apparatus.

According to still another aspect of the present invention, there is provided a control signal for controlling a server apparatus to perform a process of delivering data to a reproducing apparatus, the process comprising an encrypting step for encrypting data and outputting the resultant encrypted data; a transmitting step for transmitting the encrypted data; a recording step for recording, on a storage medium, a key used to decrypt the encrypted data; and a judging step for detecting unauthorized use of the data, on the basis of information stored on a storage medium returned from the reproducing apparatus.

According to still another aspect of the present invention, there is provided a control signal for controlling a reproducing apparatus to which encrypted data is transmitted from a predetermined server apparatus and to which a storage medium including a key stored thereon for use in decrypting the encrypted data is sent, the control signal serving to control the reproducing apparatus to perform a process of reproducing the data, the process comprising: a receiving step for receiving the encrypted data transmitted from the predetermined server apparatus; a reading step for reading the key stored on the storage medium; a decrypting step for decrypting the encrypted data received in the receiving step, using the key read in the reading step; a controlling step for enabling or disabling reproduction of the data decrypted in the decrypting step, in accordance with the information recorded on the storage medium; and a reproducing step for reproducing the decrypted data, in accordance with the control in the controlling step.

According to still another aspect of the present invention, there is provided a transmission data signal which is transmitted between a server apparatus and a reproducing apparatus in a data delivery system for delivering encrypted data from the server apparatus to the reproducing apparatus, wherein the transmission data signal includes at least information indicating an identifier of the data, a key used to decrypt the data, and a reproduction condition of the data.

In this transmission data signal, preferably, the information indicating the reproduction condition includes information indicating a period during which the data is allowed to be reproduced.

The information indicating the reproduction condition may include information indicating the number of times the data is allowed to be reproduced.

The information may include settlement information created in response to settlement associated with the data reproduced by the reproducing apparatus.

The information may include a delete flag created in response to deleting the data from the reproducing apparatus.

The information may include information generated in response to outputting or transferring the data from the reproducing apparatus, so as to indicate that the data has been output or transferred.

The information may include payment amount information created in response to payment of a fee performed by the reproducing apparatus.

BRIEF DESCRIPTION OF THE DRAWINGS

FIGS. 50A and 50B are flow charts illustrating a process performed by the relay server according to the tenth embodiment of the present invention;

DESCRIPTION OF THE PREFERRED EMBODIMENTS

The present invention is described in further detail below with reference to preferable embodiments. First, the system configuration which is common for all embodiments is described. Thereafter, first to eleventh embodiments are described. Finally, specific examples of implementations of the embodiments are described.

The respective embodiments will be described regarding the following items:

[A(*)] Outline
[B(*)] Configuration of Server
[C(*)] Configuration of Card
[D(*)] Configuration of Relay Server
[E(*)] Configuration of Playback Apparatus
[F(*)] Process Performed by Server
[G(*)] Process Performed by Relay Server
[H(*)] Process Performed by Playback Apparatus
[I(*)] Advantages.

Herein, (*) denotes the embodiment number. More specifically, the first to eleventh embodiments are denoted by embodiment numbers (1) to (11).

In the respective embodiments, similar configurations or similar processes will not be described in a duplicated fashion, unless necessary.

System Configuration

In each embodiment of a movie delivery system, a movie production company 500, movie delivery companies 501, and movie theaters 502 are connected to one another, or at least movie delivery companies 501 and movie theaters 502 are connected to one another, via a communication network such that data can be transmitted among them.

Figure 1:
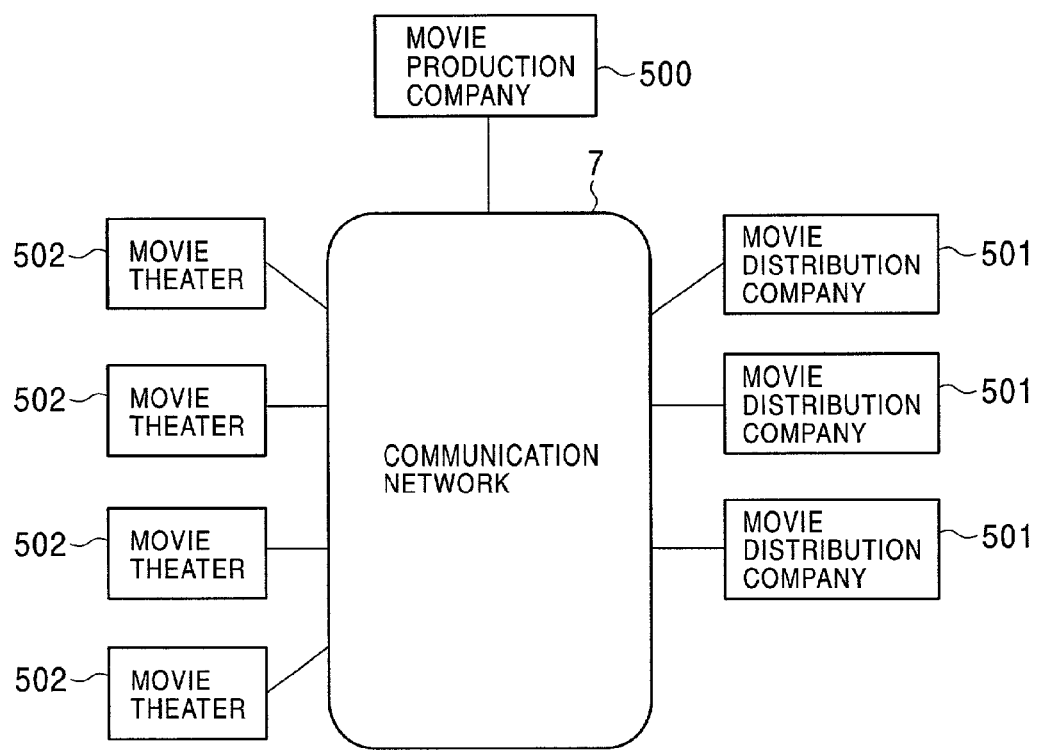
FIG. 1 is a schematic diagram of a movie distribution system according to an embodiment of the present invention.

For example, as shown in FIG. 1, a movie production company 500, movie distribution companies 501, and movie theaters 502 are connected to one another via a transmission line 7 serving as a communication network such that data can be transmitted among them.

A movie is distributed to respective movie theaters 502 not via a film but in the form of content data. The content data is encrypted before being distributed.

In each movie theater, the distributed movie is projected on a screen using not a film projector but a content data player. Although it may be possible to project a movie on a screen in a movie theater 502 after converting content data into the form of a film, each embodiment described below is assumed to use a content data player to project a movie on a screen.

The content data of a movie or the like includes video data and audio data. The audio data may be of multi-channel data including, for example, 2, 3, 4, or greater number of channels. Furthermore, in order to use the content data in many countries, the content data may include multi-language information.

The transmission line 7 serving as the communication network may be a public communication network in a wire or wireless form. A private communication line may also be employed as the transmission line 7 for connection between a movie distribution company 501 and a movie theater 502.

For example, the Internet, a satellite communication network, an optical fiber network, or other various types communication lines can be used.

In each embodiment, in addition to distribution of movie content data among the movie production company 500, distribution companies 501, and movie theaters 502, a storage medium is distributed separately from the movie content data. On the storage medium, as will be described in detail later, information about a condition under which a movie is to be played, information used to mange distribution, and key data (also referred to simply as a key) used to decrypt encrypted content data are stored.

For example, a card medium may be employed as the storage medium and distributed (transported) as a delivery card from the movie production company 500 to movie distribution companies 501 and further to movie theaters 502.

Alternatively, after distributing a storage medium in the form of a delivery card from the movie production company to the distribution companies 501, a storage medium serving as a playback card may be delivered from the movie distribution companies 501 to the movie theaters 502.

As for the storage medium, various types of media such as a card medium, a disk medium, or a tape medium can be employed. In the embodiments described below, a card medium is employed by way of example.

Various types of card media are available. They include a plastic card, a magnetic card, an IC card, and an optical card. In the embodiments described below, an IC card is employed by way of example.

IC cards are classified into two types: a contact type in which metal terminals are exposed to the outside of a card; and a non-contact type in which data is transmitted via an electromagnetic wave. Each type of IC cards can be further classified into sub types. Herein, in each embodiment of the present invention, a contact-type memory card is employed.

Note that the present invention is not limited to the contact-type memory card, but any type of storage medium can also be employed.

In the case of contact-type IC cards, they are preferably capable of transmitting data at a frequency equal to or higher than 3.57 MHz and at a data transmission rate equal to or higher than 9.6 Kbps.

The configurations and the operations of the server in the movie production company 500, the relay server in the movie distribution company 501, and the playback apparatus in the movie theater 502 are described below for each embodiment. Note that in the present invention, the server and the relay sever are not necessarily required to be disposed in a separate fashion. For example, the movie production company 500 may distribute a movie directly to movie theaters 502. In this case, the server of the movie production company 500 also has functions of the relay server of the relay server of the movie distribution company 501.

The present invention is not limited to a movie distribution system but may also be applied to other various systems in which data which needs high security is transmitted and also to various systems in which management of transmitted data is needed.

First Embodiment

[A(1)] Outline

A first embodiment of a movie distribution system is described below. First, the outline of this movie distribution system is described with reference to FIG. 2.

Figure 2:
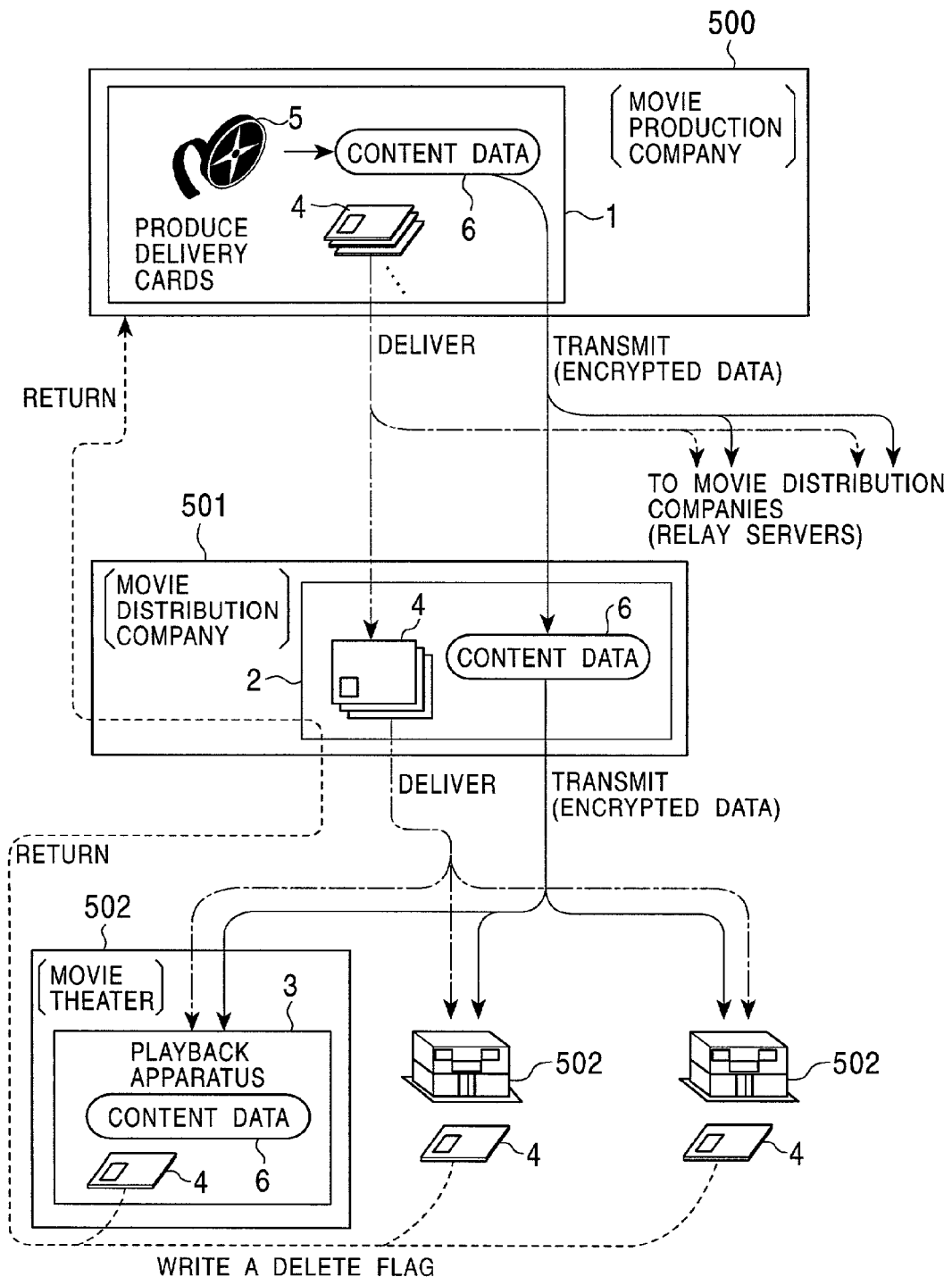
FIG. 2 is a schematic diagram illustrating a movie distribution system according to a first embodiment of the present invention.

FIG. 2 illustrates flows of content data 5 and storage medium (delivery card 4) transmitted or transported among a server 1 installed in a movie production company 500, relay server 2 installed in a movie distribution company 501, and a playback apparatus 3 installed in a movie theater 502.

The server 1 converts a movie film 5, which has been edited after being shot, into the form of content data 6 so as to be able to be transmitted via a transmission line 7 to movie distribution companies 501 (which are, for example, located in various countries and have a contract with the movie production company 500).

In addition to the content data 6, the server 1 also produces delivery cards 4 to be distributed to the movie distribution companies 501. In this production process, the server 1 produces as many delivery cards 5 as there are movie theaters 502 to which delivery cards 5 will be finally distributed. Information, called additional information, associated with the content data 6 is stored in each delivery card 4, as will be described in detail later.

The server 1 encrypts the content data 1 and the associated additional information and transmits them to relay servers 2 of the respective movie distribution companies 501. Furthermore, the server 1 also sends the required number of delivery cards 4 in which the additional information is stored to the respective movie distribution companies 501.

In each movie distribution company 501, the relay server 2 receives the transmitted content data 6 and the associated additional information and also receives the delivery card 4.

The relay server 2 performs a necessary process upon the content data 6 and the information stored on the delivery card 4.

The relay server 2 then transmits the encrypted content data 6 and the additional information to each theater movie 502 and also sends one delivery card 4 in which the additional information is stored to each movie theater 502.

The playback apparatus 3 in each movie theater 502 receives the content data 6 and the associated additional information. The playback apparatus 3 reads the information stored on the delivery card 4. Using a key read from the delivery card 4, the playback apparatus 3 decrypts the encrypted content data and additional information, and plays back the content data in accordance with the additional information read from the delivery card 4.

In each movie theater 502, when the predetermined playing period has expired, the content data 6 stored in the playback apparatus 3 is deleted. Furthermore, a delete flag in the delivery card 4 is set to indicate that the content data 6 has been deleted.

Thereafter, the delivery cards 4 are returned to the movie distribution companies 501. The delivery cards 4 are then returned to the movie production company 500. on the basis of the information stored on the returned delivery cards 4, the server 1 checks whether the distributed content data 6 has been used adequately. More specifically, for example, the server 1 checks whether the movie was played only during the allowed period according to the contract and whether the content data 6 has been correctly deleted after the expiration of the playing period.

[B(1)] Configuration of Server

The configuration of the server 1 is described below with reference to FIG. 3.

The server 1 includes a film scanner 1A, a distribution managing unit 1B, a copyright managing unit 1C, a return managing unit 1D, a card controller 1E, and a movie database 16.

The film scanner 1A converts a movie film 5 into the form of data which can be transmitted. To this end, the film scanner 1A includes a digital video reading unit 18 for scanning an image formed on the film 5 and converting it into digital video data, and the film scanner 1A also includes a digital audio reading unit 17 for converting a sound track signal recorded on the film 5 into an audio signal and outputting the resultant signal.

The digital video data and the digital audio data read from the movie film 5 are supplied to a compression coder 19 and converted into content data in a predetermined format. More specifically, the compression coder 19 converts the input digital video data and digital audio data into compressed content data, for example, according to the MPEG standard. Note that there is no particular restriction on the format of the content data. Another format other than the MPEG format, such as the AVI format or the Window Media Technology format, may also be employed.

The advantage obtained by compressing the data is that the amount of data to be transmitted can be reduced. However, the content data is not necessarily required to be compressed, as long as the content data can be used to play back a movie.

The content data generated by the compression coder 19 is stored in the movie database 16.

That is, in the server 1, a movie to be distributed is converted, by the film scanner 1A and the compression coder 19, into the form of content data and is stored in the movie database 16. This makes it possible to transmit the content data to movie distribution companies at a desired later time.

The distribution managing unit 1B controls and manages the distributing operation performed by the server 1. To this end, the distribution managing unit 1B includes an input unit 11, a storage unit 12, a distribution controller 13, a database controller 14, a modulator 30, and a transmission unit 31.

The input unit 11 is used by a human operator of the server 1 to input information concerning a distribution condition according to a distribution contract made between a movie distribution company 501 and a movie theater 502 and additional information which will be described later. The input unit 11 is also used by the human operator to input a command indicating an operation to be performed by the server 1.

For example, the information input via the input unit 11 as the additional information associated with one movie content includes a content ID uniquely assigned to the movie content, a destination identifier ID1 serving as an identifier of a movie distribution company 501 (relay server 1) to which the movie content is to be transmitted, a destination identifier ID2 serving as an identifier of a movie theater 502 (playback apparatus 3) to which the movie content is to be transmitted, and schedule information indicating a playing period during which the movie content is to be played back in the movie theater 502.

The information input via the input unit 11 is stored in the storage unit 12.

The distribution controller 13 controls various parts so that the content data is distributed in an adequate fashion in accordance with an operation command input via the input unit 11 and also in accordance with the information such as the schedule information stored in the storage unit 12.

The database controller 14 controls the operation of the film scanner 1A and the operation of the movie database 16. For example, when information associated with a movie, such as a content ID, a destination identifier ID1, a destination identifier ID2, and schedule information, is input via the input unit 11, the database controller 14 controls the film scanner 1A so as to convert the movie indicated by the content ID into content data and then controls the movie database 16 so as to stores the resultant content data. Note that the content ID, the destination identifier ID1, the destination identifier ID2, the schedule information, associated with each movie, are stored, in advance, in the storage unit 12 or on another storage medium so that when a movie recorded on a film 5 is converted into the form of content data, the content ID of that movie can be selected automatically or in accordance with a selection command input via the input unit 11.

Furthermore, in the above operation, the database controller 14 also controls the operation such that the information such as the content ID which is retained in the storage unit 12 after being input via the input unit 11 (or which is selected from the stored data) is stored as the additional information associated with the content data into the movie database 16.

Still furthermore, in response to a command issued by the distribution controller 13, the database controller 14 controls the operation such that content data and associated additional data are read or rewritten from or to the movie database 16 or such that content data and associated additional data are transmitted to the modulator 30.

The modulator 30 modulates the content data read from the movie database 16, by means of, for example, PSK modulation so as to convert the content data into a form which can be transmitted. After being modulated by the modulator 30, the modulated content data is transmitted from the transmission unit 31 over the transmission line 7 to the relay server 2 of each movie distribution company 501.

In the above distribution process, the content data read from the movie database 16 is encrypted by an encryption unit 22 of the copyright managing unit 10 and the resultant encrypted content data is again stored into the movie database 16. A specified encrypted content data is read from the movie database 16 and transmitted from the transmitting unit 31. When content data is distributed, an encrypted content ID, an encrypted destination identifier ID1, an encrypted destination identifier ID2, and encrypted schedule information corresponding to the encrypted content data are added as additional information (encrypted additional information) to the encrypted content data, and they are transmitted together.

The copyright managing unit 1C maintains security of copyright by encrypting the content data and associated additional data.

The copyright managing unit IC includes a key generators 23 and 24 and encryption units 22 and 25.

The key generator 23 generates an encryption key AK1 for use in encryption of the content data and associated additional data and also generates a decryption key DK1 for use in decryption of data encrypted using the encryption key AK1. The encryption key AK1 is supplied to the encryption unit 22, and the decryption key DK1 is supplied to the encryption unit 25.

When the encryption unit 22 receives the content data and the associated additional information which are read from the movie database 16 under the control of the distribution controller 13 and the database controller 14, the encryption unit 22 encrypts the received content data and additional information, using the encryption key AK1.

The encrypted content data and additional information are returned to the movie database 16 and stored therein as data for use of distribution. The encrypted additional information is also supplied to the card controller 1E.

The key generator 24 generates an encryption key AK2 used to encrypt an encryption key AK1 and also generates a decryption key DK2 used to decrypt data encrypted using the encryption key AK2. The encryption key AK2 is supplied to the encryption unit 24, and the decryption key DK2 is supplied to the schedule managing unit 26 in the return managing unit 1D.

When the encryption unit 24 receives the decryption key DK1 generated by the key generator 23, the encryption unit 24 encrypts the received decryption key DK1 using the encryption key AK2. The resultant encrypted decryption key DK1 is supplied to the card controller 1E.

The card controller 1E serves to read and write data from or to the delivery card 4. To this end, the card controller 1E includes a card read/write controller 20 and a card interface 21.

Under the control of the card read/write controller 20, the card interface 21 gets access to an inserted delivery card to read or write data such as additional information from or to the delivery card 4.

Furthermore, the card controller 1E produces a delivery card 4, which is to be delivered to the distribution company 501 separately from the transmission of the content data thereto, by writing, into a new blank card 4, the additional information encrypted using the encryption key AK1 and the decryption key DK1 encrypted using the encryption key AK2. The card controller 1E also reads the additional information stored in a delivery card 4 returned from the movie theater 502 or the distribution company 501.

The return managing unit 1D serves to examine the additional information stored on a returned delivery card 4 to check whether the content data has been used in an authorized manner (in the playing-back operation at the movie theater 502) and check whether there is any problem. To this end, the return managing unit 1D includes a schedule managing unit 26, a decryption unit 27, a judgment unit 28, and an output unit 29.

The schedule managing unit 26 checks and manages the additional information associated with each content data stored in the storage unit 12, and also manages, together with the content 1D, the decryption key DK2 which is generated by the key generator 24 in correspondence with the content data and the associated additional information.

When the additional information is read from the delivery card 4, the decryption unit 27 decrypts the encrypted decryption key DK1 stored in the delivery card 4, using the decryption key DK2 managed by the schedule managing unit 26. Using the decryption key DK1 decrypted by the decryption unit 27, it is possible to decrypt the encrypted additional information stored in the delivery card 4.

When a returned delivery card 4 is inserted in the card controller 1E and information stored thereon is read, the judgment unit 28 judges whether the corresponding content data has been correctly used in an authorized fashion by comparing the additional information read from the delivery card 4 with the additional information stored in the managing unit 26; checking the content of the additional information itself; or examining the payment status of the movie theater 502 by checking the account of the movie theater 502 via communication with the bank center 550.

The output unit 29 serves to output the result of the judgment made by the judgment unit 28 concerning the management status or unauthorized use. For example, a monitor device or a printer may be employed as the output unit 29. The output unit 29 may output an invoice, a demand letter, a warning message or the like.

[C(1)] Configuration of Card

Figure 4:
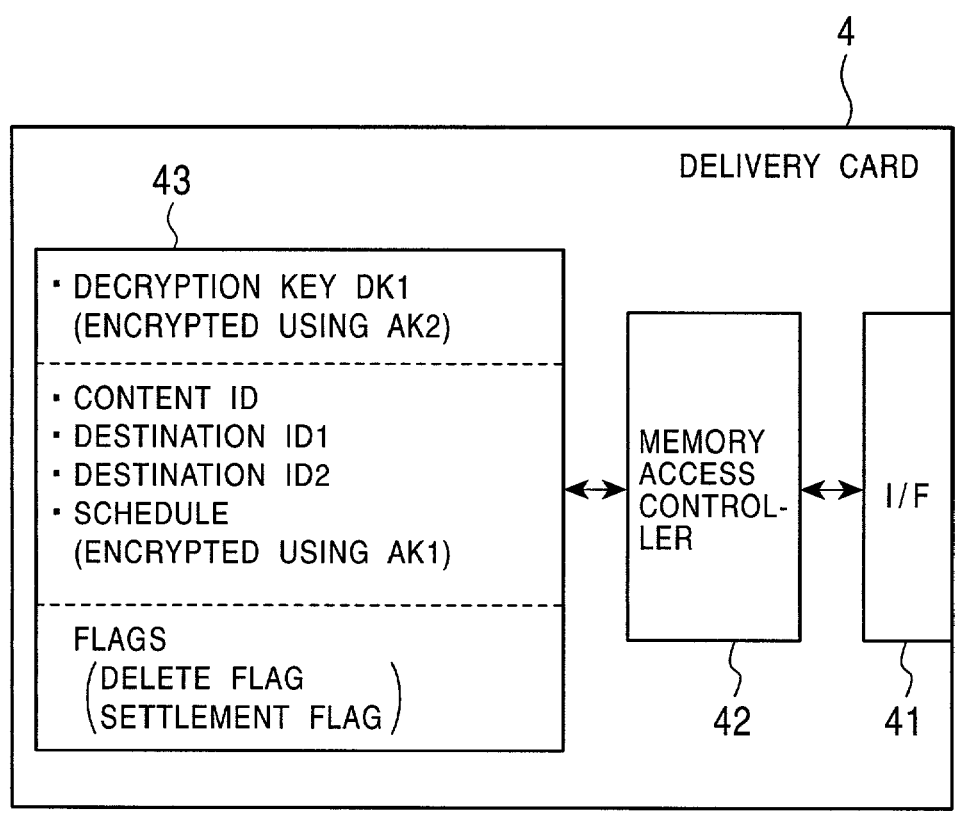
FIG. 4 is a block diagram illustrating a delivery card according to the first embodiment of the present invention.

When a contact-type IC card is employed as the delivery card 4, the delivery card 4 may be configured, for example, as shown in FIG. 4. The delivery card 4 may be connected to the card interface 21 of the server 1 to write/read information. To write/read information, the delivery card 4 may also be connected to the relay server 2 or the playback apparatus 3, which will be described later.

The delivery card 4 includes an interface 41, a memory access controller 42, and a memory 43.

The interface 41 is connected to the card interface 21 of the server 1 or the card interface 111 or 211 of the relay server 2 or the playback apparatus 3 which will be described later so that various kinds of information and control signals can be transferred. More specifically, for example, the interface 41 transmits information to be recorded as additional information and handles, adjusts or provides the operation clock, the access control signal, and the supply voltage.

The memory access controller 42 gets access to the memory 43 to read or write data from or to the memory 43 in response to a request (control signal) issued from a device to which the delivery card 4 is connected.

The memory 43 is formed of, for example, a memory device such as a flash memory.

Various kinds of information are stored in the memory 43 as shown in the figure. More specifically, the memory 43 stores the decryption key DK1 encrypted using the encryption key AK2 and also stores the additional information, such as the content ID, the destination identifier ID1, the destination identifier ID2, and the schedule information, encrypted using the encryption key AK1.

Various kinds of flags are also stored in the memory 43 during the operation of the relay server 2 or the playback apparatus 3. For example, when the content data distributed to the playback apparatus 3 is deleted after expiration of the playing period, the delete flag (deletion-from-playback-apparatus flag) is written. On the other hand, when the content data distributed to the relay server 2 is deleted, the delete flag (deletion-from-relay-server flag) is written.

When settlement is performed by the playback apparatus 3, a settlement completion flag is written.

The deletion-from-playback-apparatus flag is represented by two bits stored in a particular area of the memory 43. For example, "10" indicates that the data has not yet been deleted, and "11" indicates that the data has been deleted. When the delivery card 4 is inserted into the playback apparatus 4 for the first time, the playback apparatus 3 writes "10" in the deletion-from-playback-apparatus flag. Thereafter, if the content data is deleted by the playback apparatus 3, the deletion-from-playback-apparatus flag is changed to "11". Before the delivery card 4 is inserted into the playback apparatus 3 after being received, the playback apparatus flag has a value of "00". In the present description, "there is no deletion-from-playback-apparatus flag" or a similar expression is used to describe that "00", is stored in the storage area assigned to the deletion-from-playback-apparatus flag.

Similarly, the deletion-from-relay-server flag may take a value as follows. When the delivery card 4 is inserted into the relay server 2 for the first time, the flag is set so as to have a value of "10". When the content data is deleted from the relay server 2, the value of the flag is changed to "11".

[D(1)] Configuration of Relay Server

Figure 5:
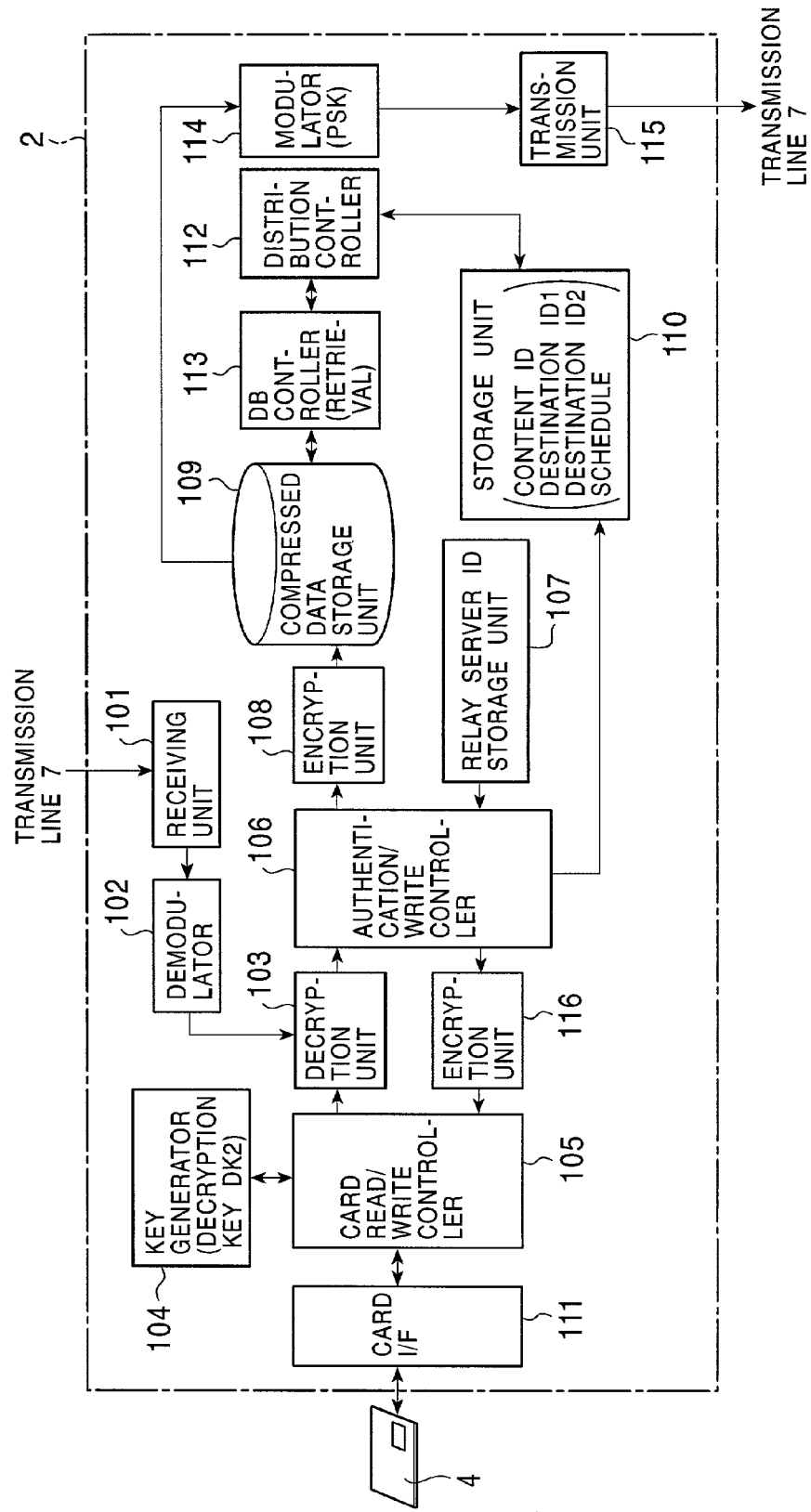
FIG. 5 is a block diagram illustrating a relay server according to the first embodiment of the present invention.

FIG. 5 illustrates a configuration of the relay server 2.

A receiving unit 101 serves to receive data transmitted via the transmission line 7. More specifically, in this example, the receiving unit 101 receives the content data transmitted by the server 1.

A demodulator 102 demodulates the data received by the receiving unit 101. Because the received data is PSK-modulated data, the demodulation is performed by means of PSK demodulation. As a result of the demodulation, the encrypted content data and the encrypted additional information transmitted from the server 1 are obtained.

Under the control of the card read/write controller 105, the card interface 111 gets access to an inserted delivery card 4 to read or write data such as additional information from or to the delivery card 4.

More specifically, for example, the card interface 111 gets access to a delivery card 4 delivered from the server 1 or a delivery card 4 returned from a movie theater 502 and reads or writes additional information, a decryption key, and various flags.

A decryption unit 103 decrypts encrypted data such as the encrypted content data or the encrypted additional information obtained via the demodulation performed by the demodulator 102 or the encrypted additional information or flag read from the delivery card 4 via the card read/write controller 105.

The decryption key DK1 is necessary to decrypt the content data and additional information encrypted using the encryption key AK1. The decryption key DK1 can be obtained by reading it from the delivery card 4. However, because the decryption key DK1 read from the delivery card 4 has a form encrypted using the encryption key AK2, a decryption key DK2 is necessary to decrypt the decryption key DK1.

A key generator 104 serves to generate the decryption key DK2. The key generator 104 generates the same decryption key DK2 as that generated by the key generator 24 of the server 1. In the above encryption, a symmetric key encryption technique may be employed. In this case, during a predetermined period, both the key generator 24 of the server 1 and the key generator 104 of the relay server 2 generate the same decryption key DK2. Alternatively, a public key encryption technique may be employed.

In this movie distribution system, the scheme of generating keys is determined so that the decryption key DK1 corresponding to the decryption key DK2 can be identified.

The decryption unit 103 can obtain the decryption key DK1 using the decryption key DK2 which is generated by the key generator 104 and supplied to the decryption unit 103 via the card read/write controller 105. That is, it becomes possible to decrypt the encrypted decryption key DK1 read from the delivery card 4. Obtaining the decryption key DK1 then makes it possible to decrypt the encrypted content data and the encrypted additional information which have been demodulated by the demodulator 102 and makes it possible to decrypt the encrypted additional information and flags which are read from the delivery card 4 via the card read/write controller 105.

The authentication/write controller 106 performs various processes including authentication and judgment concerning the obtained additional information. Furthermore, the authentication/write controller 106 controls the writing of the content data or the additional information, depending upon the results of the authentication and the judgment in accordance with the control program.

The content data and associated additional information, which have been demodulated and decrypted after being received from the server 1, are encrypted by the encryption unit 108 under the control of the authentication/write controller 106 and stored into the compressed data storage unit 109. Thus, the compressed data storage unit 109 serves to store the content data and associated additional information which have been converted into an encrypted form so as to be able to be transmitted to the movie theaters 502.

As for the compressed data storage unit 109, for example, a built-in hard disk may be employed. Alternatively, a removable storage medium such as a removable hard disk, optical disk, magneto-optical disk, semiconductor memory, or magnetic tape (video tape) may also be employed.

As for additional information which is demodulated and decrypted after being received and as for additional information which is decrypted after being read from the delivery card 4, the authentication/write controller 106 controls the process such that the additional information is stored in the storage unit 110 without being encrypted.

Depending upon the authentication result concerning the additional information read from the delivery card 4, additional information and various flags are set and encrypted by the encryption unit 116 under the control of the authentication/write controller 106. The resultant data is written into the delivery card 4 via the card read/write controller 105 and the card interface 111.

A relay server ID uniquely assigned to the relay server 2 is stored in the relay server ID storage unit 107. The authentication/write controller 106 also judges whether the destination identifier ID1 described in the additional information is consistent with the relay server ID.

In encryption performed by the encryption units 108 and 116, the encryption key AK1 is used. To this end, although not shown in the figure, there is provided a key generator for generating the same encryption key AK1 as that generated by the key generator 23 of the server 1. Alternatively, the encryption key AK1 may be generated on the basis of the decryption key DK1 such that the encryption key AK1 corresponds to the decryption key DK1.

In the case the delivery card 4 is a card returned from the playback apparatus 3, the content ID in the additional information stored in the delivery card 4 has been converted by the playback apparatus 3 into a non-encrypted form, although the other data of the additional information is maintained in the encrypted form. This makes it possible for the relay server 2 to recognize the content ID of the returned delivery card without having to use the decryption key DK2.

When the decryption key DK1 read from the delivery card 4 received from the server 1 is decrypted using the decryption key DK2 generated by the key generator 104 and then the additional information is decrypted using the decryption key DK1, the authentication/write controller 106 stores the decryption key DK2, in correspondence with the associated content ID, into an internal memory so that they can be used later to decrypt the encrypted additional information and flags read from the returned delivery card 4. This makes it possible to determine the decryption key DK2 on the basis of the unencrypted content ID, when the delivery card 4 is returned from the movie theater 502. Thus, it becomes possible to decrypt the decryption key DK1 and further decrypt other encrypted additional information and flags using the obtained decryption DK1.

In the relay server 2, when the card information is rewritten to add a flag or the like to a returned delivery card 4, the content ID is not encrypted so that when the delivery card 4 is returned to the server 1, the server 1 can read the content ID of the returned delivery card 4 without having to use the decryption key.

The distribution controller 112 controls the operation of transmitting content data and associated additional information to a playback apparatus 3 of a movie theater 502.

The database controller 113 controls the operation of writing and reading data into or from the compressed data storage unit 109.

From data, such as schedule information, of the additional information stored in the storage unit 110, the distribution controller 112 detects content data and date/time at which that content data should be transmitted. If content data is detected which should be transmitted at the present time, the distribution controller 112 requests the database controller 113 to retrieve the content data to be transmitted. The obtained encrypted content data and associated additional information are supplied to the modulator 114.

The modulator 114 modulates the content data and the additional information read from the compressed data storage unit 109, by means of, for example, PSK modulation so as to convert the data into a form which can be transmitted. After being modulated by the modulator 114, the modulated content data is transmitted from the transmission unit 115 via the transmission line 7 to the playback apparatus 3 of each movie theater 502.

[E(1)] Configuration of Playback Apparatus

Figure 6:
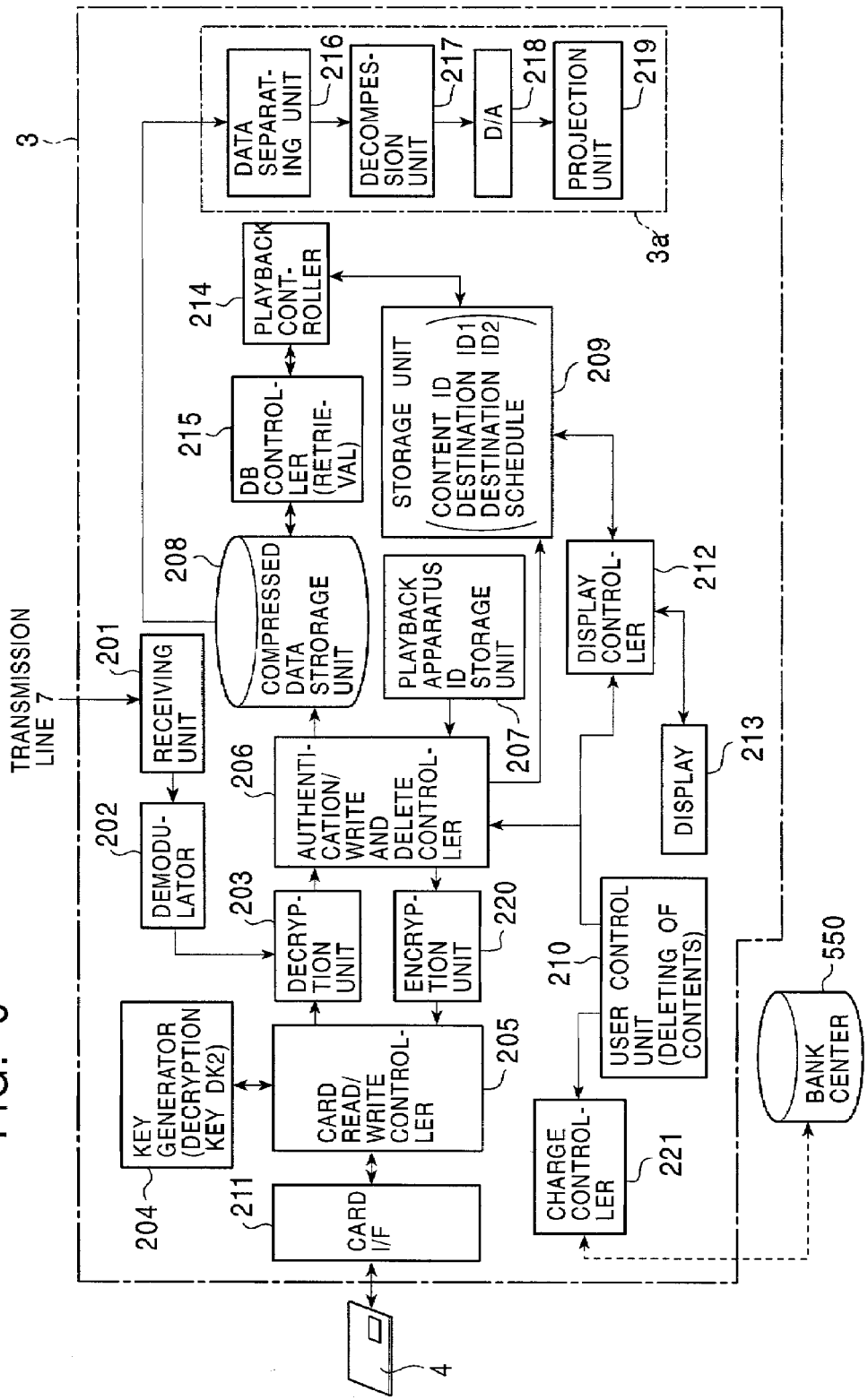
FIG. 6 is a block diagram illustrating a playback apparatus according to the first embodiment of the present invention.

FIG. 6 illustrates the structure of the playback apparatus 3.

A receiving unit 201 serves to receive data transmitted via a transmission line 7. More specifically, the receiving unit 201 receives content data and associated additional information transmitted from the relay server 2.

A demodulator 202 demodulates the data received via the receiving unit 201. Because the received data is PSK-modulated data, the demodulation is performed by means of PSK demodulation. Thus, via the demodulation process described above, the encrypted content data and associated additional information transmitted from the relay server 2 are obtained.

Under the control of the card read/write controller 205, the card interface 211 gets access to an inserted delivery card 4 to read or write data such as additional information from or to the delivery card.

More specifically, the card interface 211 gets access to the delivery card 4 returned from the relay server 2 to read the additional information and the decryption key and also writes the additional information including a deletion-from-playback-apparatus flag or a settlement completion flag which has been set to a particular value.

A decryption unit 203 decrypts encrypted data such as the encrypted content data and the encrypted additional information obtained via the demodulation performed by the demodulator 202 or decrypts the encrypted additional information or flag read from the delivery card 4 via the card read/write controller 205.

Also in this case, as in the process performed by the relay server 2, the decryption key DK1 is necessary to decrypt the content data and additional information encrypted using the encryption key AK1. The decryption key DK1 can be obtained by reading it from the delivery card 4. However, because the decryption key DK1 read from the delivery card 4 has a form encrypted using the encryption key AK2, a decryption key DK2 is necessary to decrypt the decryption key DK1.

For the above reason, a key generator 204 generates the decryption key DK2. The key generator 204, like the key generator 104 of the relay server 2, generates the decryption key DK2 identical to that generated by the key generator 24 of the server 1. In the above encryption, a symmetric key encryption technique may be employed. In this case, during a predetermined period, both the key generator 24 and the key generator 104 generate the same decryption key DK2. Alternatively, a public key encryption technique may be employed.

The decryption unit 203 can obtain the decryption key DK1 using the decryption key DK2 which is generated by the key generator 204 and which is supplied to the decryption unit 203 via the card read/write controller 205. That is, the decryption unit 203 can obtain the decryption key DK1 by decrypting the encrypted key DK1 read from the delivery card 4. Obtaining the decryption key DK1 makes it possible to decrypt the encrypted content data and the encrypted additional information which have been demodulated by the demodulator 202 and makes it possible to decrypt the encrypted additional information which is read from the delivery card 4 via the card read/write controller 205.

The authentication/write controller 206 performs various processes including authentication of the obtained additional information. The authentication/write controller 206 also judges whether the additional information read from the delivery card 4 is consistent with the additional information obtained via the transmission. Furthermore, the authentication/write/delete controller 206 controls the writing of the content data or the additional information, depending upon the results of the authentication and the judgment in accordance with the control program.

More specifically, for the content data and the associated additional information which have been demodulated and decrypted after being received from the relay server 2, the authentication/write/delete controller 206 writes them into the compressed data storage unit 208. The compressed data storage unit 208 serves to store content data and associated additional information which have been converted into a decrypted form so as to be capable of being played back by the playback apparatus 3.

Alternatively, the content data may be stored in the form of encrypted data in the compressed storage unit 208. In this case, the content data is decrypted when it is played back.

The additional information which has been demodulated and decrypted after being received via transmission and the additional information which has been decrypted after being read from the delivery card 4 are stored in the storage unit 209 under the control of the authentication/write/delete controller 206.

As for the compressed data storage unit 208, for example, a built-in hard disk may be employed. Alternatively, a removable storage medium such as a removable hard disk, optical disk, magneto-optical disk, semiconductor memory, or magnetic tape (video tape) may also be employed. Employing a removable storage medium allows a human operator to manage content data in units of media. Furthermore, the content data can be easily played back simply by inserting the storage medium. In this case, desired content data can be easily and correctly selected without having to perform retrieval, unlike the case in which a large-capacity hard disk is employed.

In the case where a flag such as the deletion-from-playback-apparatus flag or the settlement completion flag is stored in the delivery card 4, the authentication/write/delete controller 206 re-determines the value of the flag. The resultant flag is encrypted by the encryption unit 220 together with the other data of the additional information and written into the delivery card 4 via the card read/write controller 205 and the card interface 211.

When the information written in the delivery card 4 is re-written in the above-described process, the content ID is not encrypted so that when the delivery card 4 is returned to the relay server 2, the relay server 2 can recognize the content ID of the returned delivery card without having to use the decryption key.

A playback apparatus ID uniquely assigned to the playback apparatus 3 is stored in a playback apparatus ID storage unit 207. The authentication/write/delete controller 206 also judges whether the destination identifier ID2 described in the additional information is consistent with the playback apparatus ID.

In encryption performed by the encryption unit 220, the encryption key AK1 is used. To this end, although not shown in the figure, there is provided a key generator for generating an encryption key AK1 identical to that generated by the key generator 23 of the server 1. Alternatively, the encryption key AK1 may be generated on the basis of the decryption key DK1 such that the encryption key AK1 corresponds to the decryption key DK1.

A playback controller 214 controls the operation performed by the playback apparatus 3 to play back content data.

The database controller 215 controls the operation of writing and reading data into or from the compressed data storage unit 208.

In accordance with the additional information such as schedule information stored in the storage unit 209 and in response to a command issued from the user control unit 210, the playback controller 214 detects a content to be played back, a playing period during which the content is allowed to be played back, and a time at which playback is to be started. When content data is played back, the playback controller 214 retrieves, via the database controller 215, the content data to be played back. The retrieved content data is supplied to a digital projector 3a.

The digital projector 3a is a part in the playback apparatus which actually plays back the content data and which includes a data separating unit 216, a decompression unit 217, a D/A converter 218, and a projection unit 219.

The data separating unit 216 separates the content data supplied from the compressed data storage unit 208 into video data and audio data.

The decompression unit 217 decodes the video data and the audio data so as to decompress them.

The decompressed video data and audio data are then converted by the D/A converter into an analog video signal and an analog audio signal and reproduced by the playback unit 219. The playback unit 219 not only serves as a video projector for forming a projected image but also serves to output an audio sound thereby playing a movie.

The user control unit 210 is used by a human operator to issue various commands or data to the playback apparatus 3. Under the control of the display controller 212, the display unit 213 displays formation such as the additional information stored in the storage unit 209 so that the human operator can read the information. The display unit 213 also displays an operation guide or various menus.

The user control unit 210 is used to issue various commands such as a command to play back content data stored in the compressed data storage unit 208, a command to delete content data whose playing period has expired, a command to end a process, or a command to pay a fee.

When a command to delete content data is issued, the playback controller 214 commands the database controller 215 to delete the specified content data from the compressed data storage unit 208.

A charge controller 221 performs a payment process in response to a pay command issued from the user control unit 210. For example, the charge controller 221 communicates with the bank center 550 and sends money into an account of the movie distribution company 501 or the movie production company 500 thereby paying a fee to the movie distribution company 501 or the movie production company 500 in accordance with the a contract.

[F(1)] Process Performed by Server

The process performed by the server 1 is described below with reference to a flow chart shown in FIG. 7.

In step F1, it is determined whether a human operator of the server 1 has input, via the input unit 11, a content ID, a destination identifier ID1, a destination identifier ID2, and schedule information associated with a movie content. If yes, the process proceeds to step F2. However, if it is determined in step F1 that no information has been input, the process jumps to step F7.

As described earlier, the content ID is an identifier uniquely assigned to a movie content. The destination identifier ID1 is a relay server ID of a relay server 2, and the destination identifier ID2 is a playback apparatus ID of a playback apparatus 3 of a movie theater 502 to which movie content is finally supplied.

The schedule information has a value such as "2000.01.01-2000.04.30" indicating a playing period during which the movie is permitted to be played by the movie theater 502 in accordance with a contract.

In step F2, the information input via the input unit 11, that is, the additional information, is stored in the storage unit 12.

Thereafter, in step F3, the distribution controller 13 transmits a content data write command to the film scanner 1A and the movie database 16 via the database controller 14.

In step F4, in response to the content data write command, the digital audio reader 17 of the film scanner 1A reads digital audio data from the film 5, and the digital video data reader 18 reads digital video data from the film 5. The resultant digital audio data and digital video data are transmitted to the compression encoder 19.

In step F5, the compression encoder 19 compresses the digital audio data and the digital video data according to, for example, the MPEG standard thereby producing content data in the MPEG format. The resultant compressed content data is supplied to the movie database 16.

Herein, the digital audio data includes 8-channel data, and also includes a copy inhibition flag to prevent the digital audio data from being digitally copied. Copy control information may be embedded in the form of a digital watermark in the digital audio data.

In step F6, the compressed content data is stored in the movie database 16 together with the associated additional information such as the content ID stored in the storage unit 12. Thereafter, the process proceeds to step F7.

The process has been described above which is performed when additional information such as a content ID is input via the input unit 11.

When the above-described process started in response to the information input by the human operator is completed, or when no information is input by the human operator, the process proceeds to step F7 in which the card read/write controller 20 judges, via the card interface 21, whether a delivery card 4 is inserted.

An inserted delivery card 4 is detected, the process proceeds to step F8. However, it is determined that no delivery card is inserted, the process jumps to step F24.

In step F7 described above, authentication of the human operator may be performed to confirm that the human operator is an authorized operator of the delivery card 4. Authentication may be performed by asking the operator to input his/her personal ID and/or password, and verifying the input data. To this end, an ID and/or a password corresponding to the operator may be stored in the delivery card 4 or the storage unit 12.

Preferably, the delivery card 4 shown in FIG. 4 is constructed such that the additional information stored in the storage unit 12 cannot be transferred into the delivery card 4 unless the authentication of the user is successfully passed.

Similar authentication may be performed in other embodiments which will be described later, or may be performed when a process associated with the delivery card 4 is performed in the relay server 2 or the playback apparatus 3.

In the case where the delivery card 4 is inserted, the card read/write controller 20 reads, in step F8, the information stored in the delivery card 4 to determine whether the delivery card 4 is a new card. Herein, the "new card" refers to a blank card in which no information such as additional information or a decryption key DK1 has not yet been written and which is inserted to produce a delivery card 4 which will be sent to a relay server 2 in parallel with transmission of content data.

If the inserted delivery card 4 is one which has been returned from a movie distribution company 501 (or a movie theater 502), it is determined that the delivery card 4 is not a new card.

If the inserted delivery card 4 is determined as a new card, the process proceeds to step F9. However, in the case where the inserted delivery card 4 is determined as a returned card, the process jumps to step F18.

In the case where the process has proceeded to step F9 as a result of the determination that the delivery card 4 is a new card, the distribution controller 13 determines whether it is time to send the delivery card.

For example, if schedule information associated with a content data is given as "2000.01.01-2000.04.30", it is determined that the card should be delivered after 1999.12.01. That is, taking into account the time needed to transmit the content and the time needed to deliver the delivery card 4, a sufficiently early date with respect to the date at which the movie is to be started to be played is determined as the card delivery date. In the case where it is determined that it is time to send the card, the process proceeds to step F10. However, if it is determined that it is not time to send the card, the process jumps to step F24.

In the case where the process has proceeded to step F10 as a result of the decision that it is time to send the card, the database controller 14 retrieves, from the movie database 16, content data corresponding to the content ID which has been determined as being required to be sent, in accordance with the schedule information.

Then in step F11, the additional information associated with the content ID and stored in the storage unit 12 is transferred to the encryption unit 22. Furthermore, the compressed content data corresponding to the content ID, retrieved from the movie database 16, is transmitted to the encryption unit 22.

Thereafter, in step F12, the encryption unit 22 encrypts the received compressed content data and associated additional information, using the encryption key AK1 generated by the key generator 23.

In step F13, the content data and additional information encrypted using the encryption key AK1 are stored in the movie database 16.

In step F14, the additional information encrypted using the encryption key AK1 is supplied to the card read/write controller 20 and written, via the card interface 21, into the inserted new card.

In step F15, the encryption unit 25 encrypts, using the encryption key AK2 generated by the key generator 24, the decryption key DK1 generated by the encryption unit 23. In step F16, the decryption key F16 encrypted using the encryption key AK2 is supplied to the card read/write controller 20 and is written, via the card interface 21, into the inserted new card.

In the process described above, the encrypted decryption key DK1 and the encrypted additional information are written in the inserted new card, thereby producing a delivery card 4 such as that shown in FIG. 4 to be delivered to a relay server 2 or a playback apparatus 3. In the example shown in FIG. 4, various flags are stored in the delivery card 4. Note that these flags are written by the relay server 2 or the playback apparatus 3, as described earlier.

After producing the delivery card 4, the process proceeds to step F17. In step F17, the schedule managing unit 26 stores the decryption key DK2 together with the additional information stored in the storage unit 12.

In the present embodiment, as described above, the server 1 produces the delivery card 4 by writing the additional information and the decryption key into a new card. Alternatively, the delivery card 4 may be produced by the relay server 2. In this case, steps F8 to F16 in FIG. 7 are performed by the relay server 2.

In the case where the card read/write controller 20 determines in step F8 that the inserted card is not a new card, that is, if the inserted card is determined as a delivery card 4 which has been returned from the relay server 2 or the playback apparatus 3 and which includes already-written additional information, the process proceeds to step F18.

In step F18, the card read/write controller 20 reads, from the delivery card 4, the encrypted decryption key DK1, the encrypted additional information, and the content ID which is not encrypted when the delivery card 4 is returned.

In step F19, the decryption key DK2 corresponding to the content ID read in step F18 is read from the schedule managing unit 26, and the decryption unit 27 decrypts, using the decryption key DK2, the encrypted decryption key DK1 read from the delivery card 4.

In step F20, using the decrypted decryption key DK1, the decryption unit 27 decrypts the additional information and the flags read from the delivery card 4.

Thereafter, in step F21, the judgment unit 28 judges whether the date/time, the delete flag, the settlement amount and other information are valid, on the basis of the decrypted additional information and flags. More specifically, for example, the judgment is made by comparing the additional information read from the delivery card 4 with the additional information stored in the schedule managing unit 26. The judgment of the settlement amount is made by asking the bank center 550 connected to the server 1 about the status of an account having a corresponding account number. In the case where the value of the deletion-from-playback-apparatus flag is defined such that "11" indicates that the data has been deleted, checking of the deletion-from-playback-apparatus flag is performed by determining whether its value is equal to "11". If the value of the deletion-from-playback-apparatus flag is equal to "10", it is determined that the content data has not been deleted adequately by the playback apparatus 3. The deletion-from-relay-server flag is also judged in a similar manner.

If the answer to the judgment is affirmative, the process proceeds to step F22. In step F22, an invoice is output from the output unit 29. On the other hand, in the case where unauthorized use or any trouble is detected, the process proceeds to step F23. In step F23, a demand letter, a warning message, or a confirmation request message is output from the output unit 29 to the corresponding destination identifier ID2. The output unit 29 may print the invoice or the demand letter on a sheet.

Although in the present embodiment, the invoice or the demand letter is printed on a sheet and the printed sheet is sent by mail, the invoice or the demand letter may be described in the form of electronic data and may be directly transmitted from the distribution controller 13 to the corresponding playback apparatus 3.

In the case the judgment reveals that a necessary amount of money has not been transferred to the account, the distribution controller 13 may transmit a program to the playback apparatus 3 thereby disabling the playback apparatus 3 and may remotely control the operation of the playback apparatus 3 thereafter.

Thus, the process associated with the inserted delivery card 4 is performed in steps F7 to F23 in the above-described manner.

In the present embodiment, the judgment concerning the returned delivery card 4 is performed by the server 1. Alternatively, the relay server 2 may perform the judgment concerning the returned delivery card 4. In this case, step F8 and steps F18 to F23 are performed by the card read/write controller 105 and the authentication/write controller 106 of the relay server 2.

In the present embodiment, in addition to the outputting of the invoice or the demand letter, the card read/write controller 20 may delete all data stored in the inserted delivery card 4 so as to invalidate the delivery card 4.

After completing the above-described process in response to insertion of a card, or when no inserted card is detected, or when it is determined that it is not time to send the delivery card 4, the process proceeds to step F24. In step F24, the distribution controller 13 determines whether it is time to transmit a content ID stored in the storage unit 12.

If it is determined that there is a content data to be transmitted at the present time, the process proceeds to step F25. In the case where there is no such content data, the process jumps to step F28.

The time at which content data is transmitted is determined such that the time is a predetermined period earlier than the day when the content data is started to be played. For example, the content data may be transmitted at the same time as the delivery card. Alternatively, because transmission of content data can be performed in a short time compared with sending of a card, content data may be transmitted one week before the day when the content data is started to be played.

In the case where there is content data to be transmitted at the present time, the database controller 14 retrieves the content data corresponding to the content ID which should be transmitted at the present time.

Thereafter, in step F26, the retrieved content data and the associated additional information which have been already encrypted are transferred to the modulator 30. The modulator 30 performs PSK modulation upon the received data.

In step F27, the transmitting unit 31 transmits the encrypted content and additional information modulated in the previous step.

Thus, the content data is transmitted to the relay server 2.

Then in step F28, the controller such as the distribution controller 13 determines whether an end command has been issued by a human operator. If an end command has not been issued, the flow returns to step F1 to repeat the above-described process. If an end command is detected, the process is ended.

[G(1)] Process Performed by Relay Server

The process performed by the relay sever 2 is described below with reference to a flow chart shown in FIG. 8.

First, in step F31, it is determined whether the receiving unit 101 has received the encrypted content data and associated information from the server 1. If no, the process jumps to step F36. If yes, the process proceeds to step F32.

In the case where the process proceeds to step F32 as a result of determination that the encrypted content and additional information have been received, the demodulator 102 demodulates the received encrypted content and additional information.

Thereafter, in step F33, the decryption unit 103 reads, via the card read/write controller 105, the decryption key DK2 generated by the key generator 104. Using this decryption key DK2, the decryption unit 103 decrypts the decryption key DK1 which has been received and demodulated.

Furthermore, using the decrypted decryption key DK1, the decryption unit 103 decrypts the content data and the additional information.

In the next step F34, the authentication/write controller 106 determines whether the destination identifier ID1 described in the additional information is consistent with the ID of the relay server 2 stored in the relay server ID storage unit 107. If they are not consistent with each other, it is determined that the received data is not content data addressed to the relay server 2, and thus the process jumps to step F36.

In the case where the destination identifier ID1 and the relay server ID are consistent with each other, it is determined that the received data is addressed to the relay server 2, and thus the process proceeds to step F35. In step F35, the encryption unit 108 determines the encryption key AK1 corresponding to the decryption key DK1. Using this encryption key AK1, the encryption unit 108 re-encrypts the compressed content data and the associated additional data which have been received and demodulated. The resultant data is stored in the compressed data storage unit 109 so that it can be transmitted later to the playback apparatus 3.

The additional information is also stored in the storage unit 110 without being encrypted.

The received data is processed in steps F32 to F35 in the above-described manner.

In the present embodiment, the re-encryption is performed using the encryption key AK1 corresponding to the decryption key DK1. However, there is a greater risk that data is stolen when the data is transmitted from the relay server 2 to the playback apparatus 3 than when the data is transmitted from the server 1 to the relay server 2. In view of the above, the encryption unit 108 may perform re-encryption using a higher-graded encryption key than the encryption key AK1. For example, an encryption key having a greater number of bits may be employed.

When the receiving process described above is completed, or when no data is received, the process proceeds to step F36. In step F36, the card read/write controller 105 determines whether a delivery card 4 is inserted in the card interface 111.

If it is determined that a delivery card 4 is inserted, the process proceeds to step F37. However, when no inserted card is detected, the process jumps to step F41.

In the case where the process has proceeded to step F37 as a result of determination that a delivery card 4 is inserted, the card read/write controller 105 reads the encrypted decryption key DK1 and additional information from the delivery card 4. In steps F38 and F39, the encrypted decryption key DK1 and additional information are decrypted. More specifically, the decryption unit 103 decrypts the decryption key DK1, by using the decryption key DK2 generated by the key generator 104, and further decrypts the additional information by using the decrypted decryption key DK1.

In the case where the delivery card 4 has been inserted for the first time, the storage area for the deletion-from-relay-server flag has a value of "00". In this case, "10" is written as the deletion-from-relay-server flag so as to indicate that the content data associated with this delivery card 4 is stored in the relay server 2 and also indicate that the delivery card 4 has been inserted in the relay server 2 at least once.

Thereafter, in step F40, the authentication/write controller 106 determines whether the information read from the delivery card 4 includes a deletion-from-playback-apparatus flag.

In the case where there is no deletion-from-playback-apparatus flag (that is, in the case where the storage area for the deletion-from-playback-apparatus flag has a value of "00"), the delivery card 4 is determined as having been sent from the server 1. In the case where there is a deletion-from-playback-apparatus flag (that is, in the case where the storage area for the deletion-from-playback-apparatus flag has a value of "10" or "11"), the delivery card 4 is determined as having been returned from the playback apparatus 3.

In the case where the inserted delivery card 4 is one sent from the server 1, the process proceeds to step F41. In step F41, the distribution controller 112 determines whether the content IDs stored in the storage unit 110 include one which corresponds to content data which should be transmitted at the present time.

If such a content ID is detected, the process proceeds to step F42. However, such a content ID is not detected, the process jumps to step F49.

In the case where a content ID is detected which corresponds to content data which should be transmitted at the present time, the process proceeds to step F42. In step F42, under the control of the distribution controller 112, the database controller 113 retrieves the content data to be transmitted from the compressed data storage unit 109.

Thereafter, in step F43, the retrieved encrypted content data and associated additional information are modulated by the modulator 114 and transmitted, in the next step F44, from the transmitting unit 115 to the playback apparatus 3.

Thus, the content data and the additional information are transmitted to the playback apparatus 3 of each movie theater 502.

In the case where it is determined in step F40 that the deletion-from-playback-apparatus flag stored in the inserted delivery card 4 has a value of "10" or "11", the delivery card 4 is determined to be one which has been returned after the expiration of the playing period during which the corresponding content data was permitted to be played back by the playback apparatus 3.

Thereafter, in step F45, the authentication/write controller 106 starts to delete the compressed content data corresponding to that delivery card 4 from the compressed data storage unit 109. That is, the content data, which was transmitted to the playback apparatus 3 in the past and the playing period of which has expired, is deleted from the relay server 2. Normally, this content data has already been deleted from the playback apparatus 3, and thus the deletion-from-playback-apparatus flag has a value of "11".

In step F46, the authentication/write controller 106 determines whether the deleting process has been properly performed. If yes, the process proceeds to step F47. However, if the deleting process has been ended abnormally, the process jumps to step F49.

In the case where the process proceeds to step F47 after normal completion of deleting the content data, the encryption unit 116 re-encrypts, under the control of the authentication/write controller 106, the deletion-from-relay-server flag having a value of "11" indicating that the content data has been deleted, as well as the associated additional information, using the encryption key AK1. In step F48, the card read/write controller 105 writes the re-encrypted data into the inserted delivery card 4 via the card interface 111. Thus, the flag and the additional information written in the returned delivery card 4 is rewritten.

As described earlier, it is required that the server 1 can read the content ID from the returned delivery card 4 without having to use the decryption key. To this end, in the process performed in steps F47 and F48, the content ID is not encrypted while the other data of the additional information is encrypted.

Figure 7:
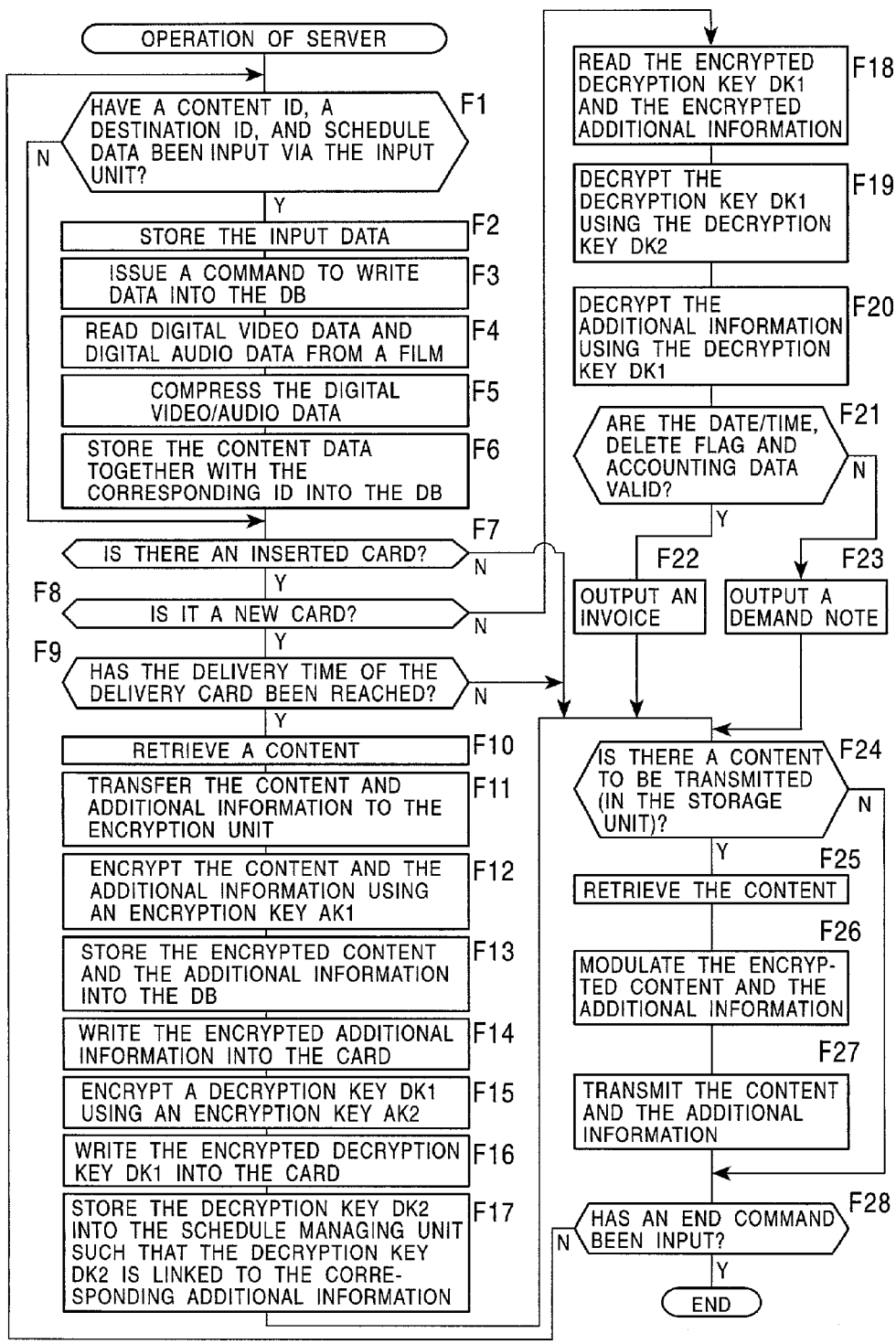
FIG. 7 is a flow chart illustrating a process performed by the server according to the first embodiment of the present invention.

After completion of the rewriting, the delivery card 4 is sent to the server 1 and subjected to the above-described process in steps F18 to F23 in FIG. 7.

In step F49, a controller such as the authentication/write controller 106 determines whether an end command has been issued by a human operator. If the end command is detected, the process is ended. However, if the end command is not detected, the flow returns to step F31 to repeat the above-described process.

[H(1)] Process Performed by Playback Apparatus

Figure 9:
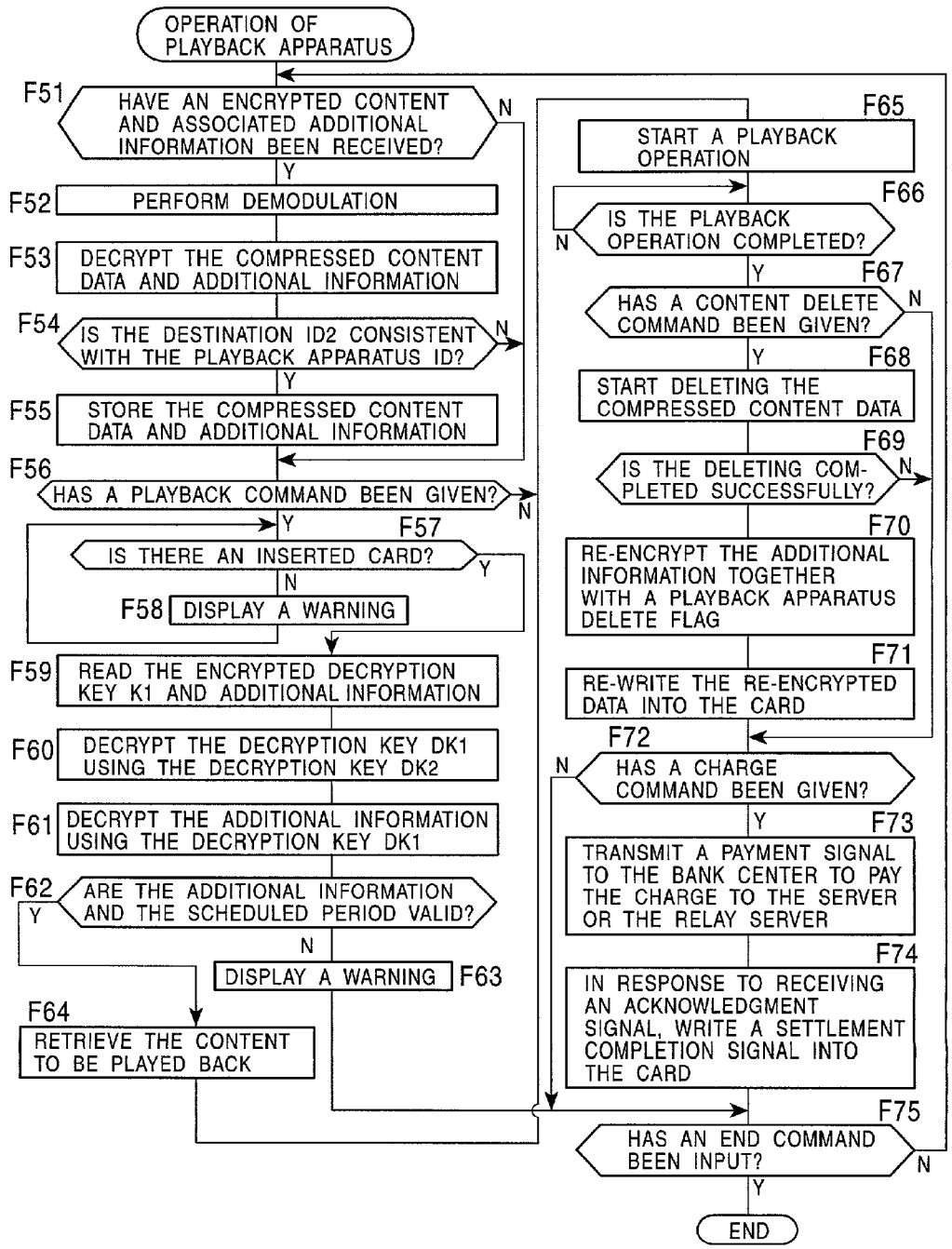
FIG. 9 is a flow chart illustrating a process performed by the playback apparatus according to the first embodiment of the present invention.

The process performed by the playback apparatus 3 described below with reference to a flow chart shown in FIG. 9.

First, in step F51, it is determined whether an encrypted content data and associated additional information transmitted from the relay server 2 have been received by the receiving unit 201. If content data and associated additional information have been received, the process proceeds to step F52. However, when no data has been received, the process jumps to step F56.

In the case where the process proceeds to step F52 after receiving the data, the demodulator 202 demodulates the received encrypted content data and associated additional information.

Thereafter in step F53, the decryption unit 203 reads, via the card read/write controller 205, the decryption key DK2 generated by the key generator 204 and decrypts the received and demodulated decryption key DK1 using the decryption key DK2.

Furthermore, using the decrypted decryption key DK1, the decryption unit 103 decrypts the content data and the additional information.

Thereafter, in step F54, the authentication/write/delete controller 206 determines whether the destination identifier ID2 described in the additional information is consistent with the playback apparatus ID stored in the playback apparatus ID storage unit 207. If they are not consistent with each other, it is determined that the received data is not addressed to the playback apparatus 3, and the process jumps to step F56.

On the other hand, in the case where the destination identifier ID2 is consistent with the playback apparatus ID and thus the received data is addressed to the playback apparatus 3, the process proceeds to step F55. In step F55, the compressed content data and the associated additional information, which have been received, demodulated and decrypted, are stored as playback data in the compressed data storage unit 208 such that the content data and the additional information are related to each other.

The additional information is also stored in the storage unit 209.

The received data is processed in steps F52 to F55 in the above-described manner.

In step F56, it is determined whether a playback command has been issued by a human operator via the user control unit 210. If yes, the process proceeds to step F57.

In step F57, the card read/write controller 205 determines, via the card interface 211, whether a delivery card 4 is inserted. If no inserted card is detected, the process proceeds to step F58. In step F58, detection information indicating that no inserted delivery card is detected is applied to the authentication/write/delete controller 206 via the decryption unit 203. In response, the authentication/write/delete controller 206 controls the display controller 212 to display a warning on the display unit 213. Thereafter, the process returns to step F57. Thus, in the playback process, the human operator is requested to insert the delivery card 4.

In the case where it is determined in step F57 that a delivery card 4 is inserted, the process proceeds to step F59. In step F59, the card read/write controller 205 reads the encrypted decryption key DK1 and additional information from the delivery card 4.

In step F60, the decryption key DK1 is decrypted using the decryption key DK2 generated by the key generator 204. In step F61, the additional information is decrypted using the decryption key DK1.

In the case where the delivery card 4 is one which has been inserted for the first time, the storage area for the deletion-from-playback-apparatus flag has a value of "00". In this case, "10" is written into the deletion-from-playback-apparatus flag so as to indicate that the content data associated with this delivery card 4 is stored in the playback apparatus 3 and also indicate that the delivery card 4 has been inserted in the playback apparatus 3 at least once.

In step F62, the authentication/write/delete controller 206 determines whether the additional information stored in the storage unit 209 after being received, demodulated and decrypted is consistent with the additional information decrypted after being read from the delivery card 4. If they are consistent with each other, it is further determined whether the present time is within the playing period indicated by the schedule information described in the additional information.

If it is determined that the present time is within the playing period, the process proceeds to step F64. However, if inconsistency regarding the additional information is detected, or if the present time is not within the playing period although the consistency is obtained, the content data is not allowed to be played back in accordance with the contract, and thus the process proceeds to step F63. In step F63, as in step F58, a warning is displayed on the display 213. The process then proceeds to step F75.

In the case where the process has proceeded to step F64 as a result of determination that the additional information is valid and the present time is within the playing period, the database controller 215 retrieves, under the control of the playback controller 214, the content data to be played back, from the compressed data storage unit 208.

Then in step F65, the playback controller 214 issues a command to play back the compressed content data stored in the compressed data storage unit 208 via the database controller 215. The compressed content data is read from the compressed data storage unit 208 and transmitted to the data separating unit 216. The data separating unit 216 separates the received content data into audio and video data. The audio and video data are decompressed by the decompressing unit 217 and then converted by the D/A converter 218 into analog form. Finally, the playback unit 219 generates a sound/voice and an image in accordance with the analog audio and video data.

In step F66, the playback controller 214 monitors whether the playing-back operation is completed. If the playing-back of the content data of the movie is completed, the process proceeds to step F67.

As described above, when a human operator issues a playback command, the process from step F56 to step F66 is performed by the playback apparatus 3 to play a movie one time.

In the case where the playback command from the user control unit 210 is not detected is step F56, or in the case where completion of the playing-back operation is detected in step F66, the process proceeds to step F67. In step F67, it is determined whether a content delete command has been issued from the user control unit 210. If the content delete command is detected, the process proceeds to step F68. However, the content delete command is not detected, the process jumps to step F72.

The content data is deleted, in response to a demand issued by the movie production company 500 or the movie distribution company 501, from the compressed data storage unit 208 after the end of the allowed playing period thereby protecting the copyright of the content data.

That is, when the playing period of a movie content has expired, the operator of the playback apparatus 3 has to delete the movie content at an arbitrary time (within a predetermined period) after the end of the allowed playing period in response to the content delete command detected in step F67.

In the case where the process has proceeded to step F68 in response to detecting the content delete command, compressed content data corresponding to a content ID specified by the operator is started to be deleted from the compressed data storage unit 208, under the control of the authentication/write/delete controller 206.

In step F69, the authentication/write/delete controller 206 monitors whether the specified content data has been deleted successfully. If the deleting has been completed successfully, the process proceeds to step F70. However, the deleting is not completed successfully, the process jumps to step F72.

When the process has proceeded to step F70 after the content data has been deleted successfully, the encryption unit 220 re-encrypts, under the control of the authentication/write/delete controller 206, the deletion-from-playback-apparatus flag, now having a value of "11" which indicates that the content data has been deleted, together with the corresponding additional information, using the encryption key AK1. In step F71, the re-encrypted data is written into the inserted delivery card 4 via the card read/write controller 205 and the card interface 211. Thus, the flag and the additional information are rewritten into the delivery card 4 which will be returned later.

As described earlier, it is required that when the delivery card 4 is returned to the relay server 2, the relay server 2 can read the content ID from the delivery card 4 without having to use the decryption key. For this purpose, of various data described in the additional information, the content ID is not encrypted in steps F70 and F71.

Writing the playback apparatus flag so as to have a value of "11" allows the relay server 2 or the server 1 to recognize that the playback apparatus 3 has adequately deleted the content data.

The movie theater 502 has to pay a predetermined fee to the movie distribution company 501 or the movie production company 500 in accordance with the delivery contract.

To this end, at an arbitrary time, the operator of the playback apparatus 3 performs an operation to pay the fee.

In step F72, the charge controller 221 determines whether a pay command has been issued from the user control unit 210. If the pay command is detected, the process proceeds to step F73. However, if the pay command is not detected, the process jumps to step F75.

When the process has proceeded to step F73 in response to the pay command, the charge controller 221 transmits a pay request message to the bank center 550 to request the bank center 550 to pay the fee to the relay server 2 or the server 1. In response to the pay request message, the bank center 550 transfers a specified amount of money to the account of the relay server 2 or the server 1. Thus, the fee has been paid from the movie theater 502 to the relay server 2 or the server 1.

After transmitting the pay request message, the charge controller 221 waits for a response message from the bank center 522. If a response message arrives, the charge controller 221 determines whether the payment has been properly performed. If it is determined that the payment has been properly performed, the charge controller 221 informs the authentication/write/delete controller 206 that the payment has been properly performed.

In response to the completion of the payment, the authentication/write/delete controller 206 sets the settlement completion flag and writes it into inserted delivery card 4 via the card read/write controller 205 and the card interface 211 after encrypting it via the encryption unit 220.

As described above, when the content data has been deleted or when the payment has been performed, the deletion-from-playback-apparatus flag or the settlement completion flag is written into the delivery card 4 in steps F67 to F74.

The delivery card 4 into which the flags have been written is sent to the relay server 2 and subjected to the above-described process in step F45 to step F48.

In step F75, a controller such as the authentication/write/delete controller 206 determines whether an end command has been issued from the user control unit 210. If the end command is detected, the process is ended. However, if the end command is not detected, the flow returns to step F51 to repeat the above-described process.

[I(1)] Advantages

The configuration and the operation according to the first embodiment of the invention have the following advantages.

(1) Because a movie image source is supplied not in the form of a film but in the form of content data, a reduction in delivery cost and an improvement in delivery efficiency are achieved.

Because the content data is transmitted in accordance with the schedule information, the transmission can be easily managed and controlled.

(2) Because the content data is transmitted after being encrypted, high security is ensured and the copyright is protected.

(3) The decryption key DK1 used in decrypting the encrypted content data and associated additional information is not transmitted together with the content data, but it is supplied via a delivery card 4 which is sent separately from the content data.

The decryption key DK1 is written in the delivery card 4 after being encrypted using the encryption key AK2.

This secures the copyright in a more reliable fashion.

(4) The playback apparatus 3 cannot deal with the received content data and the associated additional information unless the delivery card 4 is inserted.

More specifically, the content data cannot be played back unless the delivery card 4 is inserted. Furthermore, to play back the content data, the additional information described in the delivery card 4 is needed to be valid, and the content data is allowed to be played back only during a playing period indicated by the schedule information.

This ensures that the content data can be played back only by an authorized playback apparatus and only during an authorized period. That is, the playback apparatus 3 cannot use the content data in an unauthorized fashion.

(5) After expiration of the playing period, only the delivery card 4 is returned, and the content data stored in the playback apparatus 3 or the relay server 2 is deleted.

This allows a reduction in cost compared with the conventional system which needs high cost to collect films.

(6) When the content data is deleted from the playback apparatus 3 or the relay server 2, a delete flag having a value of "11" is written into the delivery card 4. If the content data is not deleted, the delete flag has a value of "10". Thus, it is possible to determine whether the content data has been deleted from the playback apparatus 3 or the relay server 2 by checking whether the value of the delete flag is equal to "11" or "10". This makes it possible to easily manage and control the distributed content data so as to prevent the content data from being used in an unauthorized manner.

(7) When the payment operation has been performed by the playback apparatus 3, the settlement completion flag is written in the delivery card 4. The server 1 can determine whether the playback apparatus 3 (movie theater 502) has correctly made payment by checking the value of the settlement completion flag written in the delivery card 4 returned to the server 1. This ensures that charging and payment are easily performed and managed in the movie distribution system.

(8) By checking the validity of the destination identifier ID1 or ID2, it is possible to transmit the content data only to an authorized relay server 2 or an authorized playback apparatus 3.

In other words, it is possible for the movie production company 500 to easily control the distribution of the content data so that the content data is supplied only to specified playback apparatuses 3 or movie theaters 502 but not to undesirable playback apparatuses 3 or movie theaters 502.

Second Embodiment

[A(2)] Outline

The outline of a movie distribution system according to a second embodiment of the present invention is described below with reference to FIG. 10.

Figure 10:
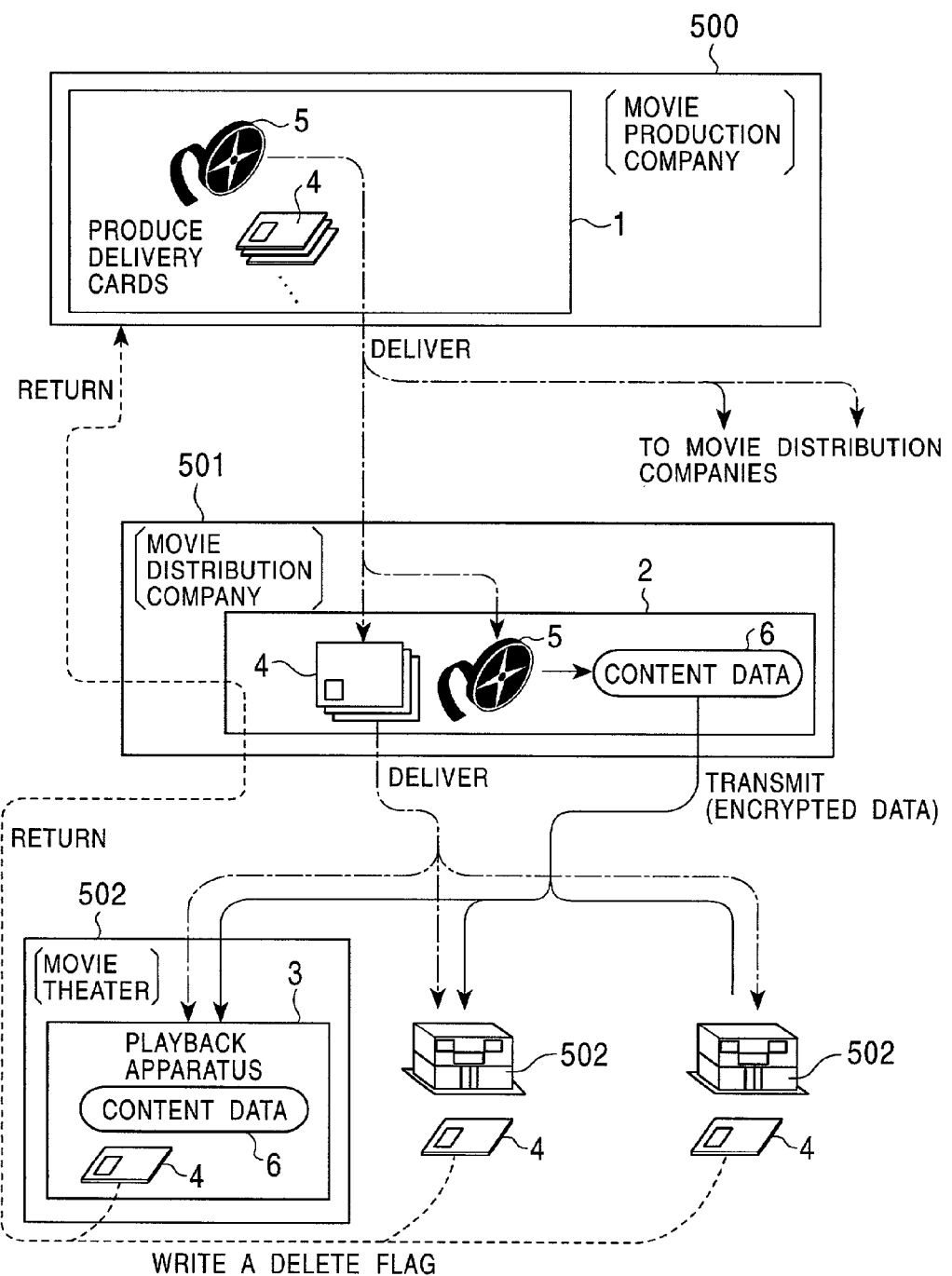
FIG. 10 is a schematic diagram illustrating a movie distribution system according to a second embodiment of the present invention.

FIG. 10 is a diagram similar to FIG. 2 and illustrates flows of content data 6 and storage medium (delivery card 4) transmitted or transported among a server 1 installed in a movie production company 500, relay server 2 installed in a movie distribution company 501, and a playback apparatus 3 installed in a movie theater 502.

In this second embodiment, the server 1 does not distribute content data by means of transmission but the server 1 delivers a movie film 5, which has been edited after being shot, to the respective movie distribution companies 501.

As in the first embodiment, the server 1 produces as many delivery cards 4 as required, and the server 1 sends the delivery cards 4 to the respective movie distribution companies 501 in parallel with or together with the films 5.

In each movie distribution company 501, a relay server 2 receives a film 5 and a delivery card 4 sent from the server 1. The movie recorded on the film 5 is converted into the form of content data 6 so that it can be transmitted.

The relay server 2 then transmits the encrypted content data 6 and additional information to each theater movie 502 and also sends one distribution card 4 to each movie theater 502.

The playback apparatus 3 in each movie theater 502 receives the content data 6 and the associated additional information. The playback apparatus 3 also reads various kinds of information such as the additional information stored on the received distribution card 4. Using a key read from the delivery card 4, the playback apparatus 3 decrypts the encrypted content data and additional information, and plays back the content data 6 in accordance with the additional information read from the delivery card 4 and the additional information received via electronic transmission.

In each movie theater 502, when the predetermined playing period has expired, the content data 6 stored in the playback apparatus 3 is deleted. Furthermore, a delete flag in the delivery card 4 is set to "11" so as to indicate that the content data 6 has been deleted.

Thereafter, the delivery cards 4 are returned to the movie distribution companies 501. The delivery cards 4 are then returned to the movie production company 500.

On the basis of the information stored on the collected delivery cards 4, the server 1 checks whether the distributed content data 6 has been used adequately. More specifically, for example, the server 1 checks whether the movie was played only during the period allowed by the contract and whether the content data 6 has been correctly deleted after the expiration of the playing period.

[B(2)] Configuration of Server

The configuration of the server 1 is described below with reference to FIG. 11.

Figure 11:
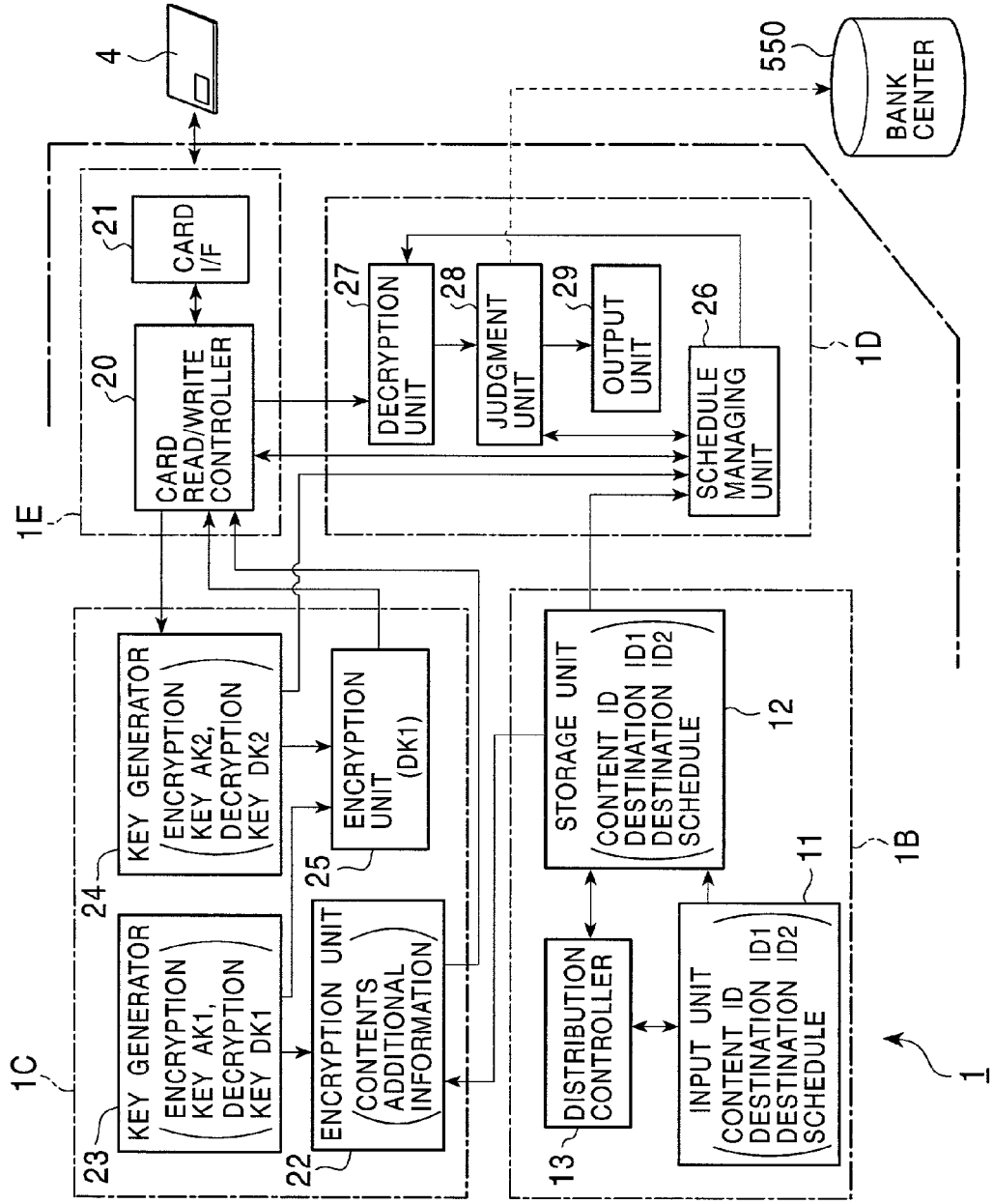
FIG. 11 is a block diagram illustrating a server according to the second embodiment of the present invention.

As shown in FIG. 11, the server 1 includes, as in the first embodiment (FIG. 3), a distribution managing unit 1B, a copyright managing unit 1C, a return managing unit 1D, and a card controller 1E.

Figure 3:
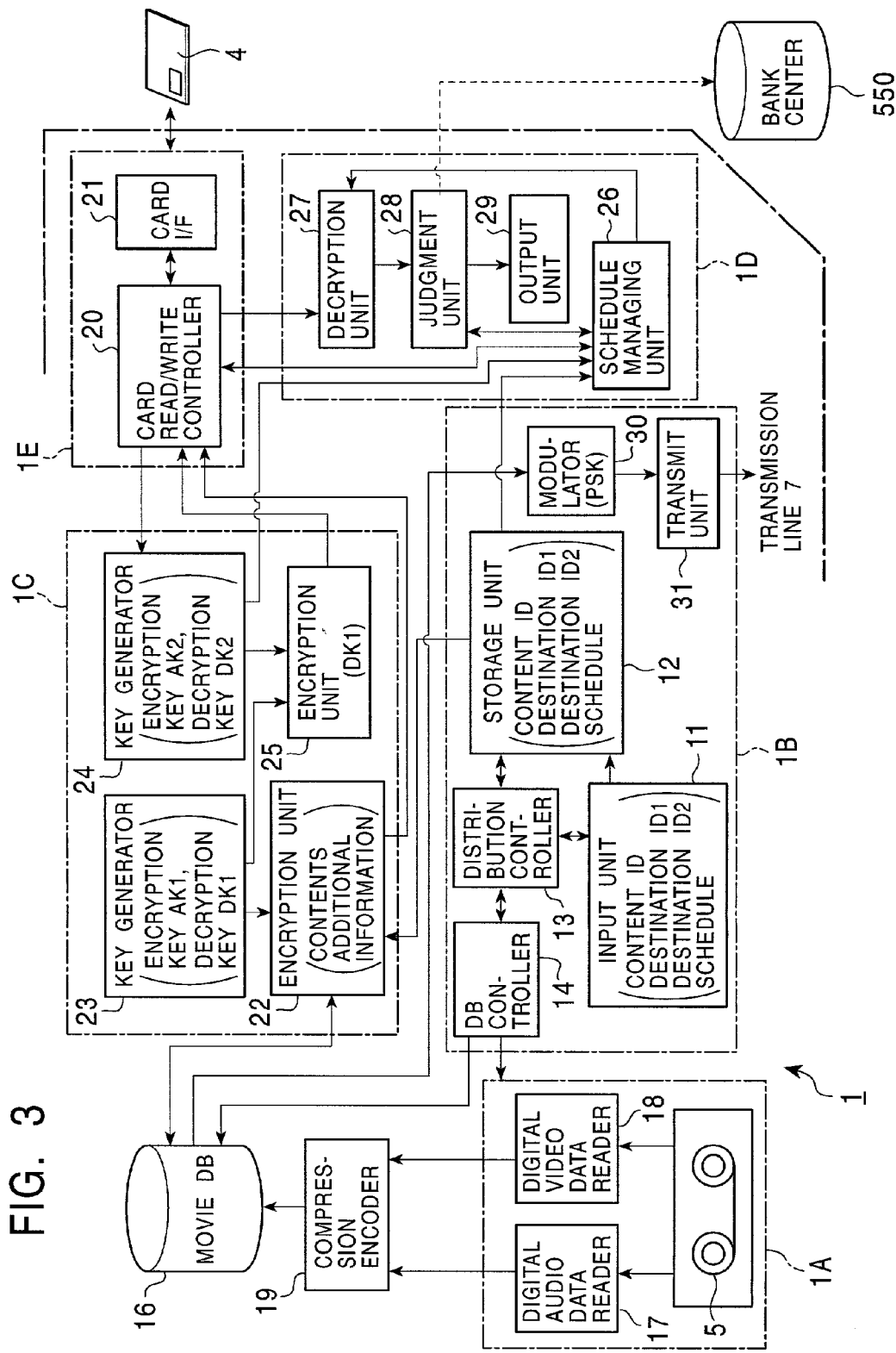
FIG. 3 is a block diagram illustrating a server according to the first embodiment of the present invention.

However, in this second embodiment, the server 1 does not include the film scanner 1A, the compression coder 19, and the movie database 16 which are included in the server 1 shown in FIG. 3, because the server 1 sends a movie source in the form of a film 5 to the relay servers 2.

For the same reason, the distribution managing unit 1B does not include the modulator 30, the transmitting unit 31, and the database controller 14 shown in FIG. 3.

Because the server 1 deals with the movie source in the form of film 5, an encryption unit 22 of the copyright managing unit 1C decrypts only additional information. That is, additional information stored in a storage unit 12 is supplied to the encryption unit 22 under the control of the distribution controller 13, and the encryption unit 22 encrypts the received additional information.

The encrypted additional information is written into a delivery card 4 under the control of the card controller 1E.

The other parts shown in FIG. 11 are similar to those of the first embodiment, and thus they are not described herein in further detail.

[C(2)] Configuration of Card

The delivery card 4 is constructed in a similar manner to that shown in FIG. 4. The delivery card 4 is produced by the server 1 by writing additional information and other information into the memory 43 provided in the delivery card 4. The information written in the delivery card 4 includes, as shown in FIG. 4, a decryption key DK1 encrypted using an encryption key AK2 and additional information such as a content ID, destination identifiers ID1 and ID2, and schedule information.

[D(2)] Configuration of Relay Server

Figure 12:
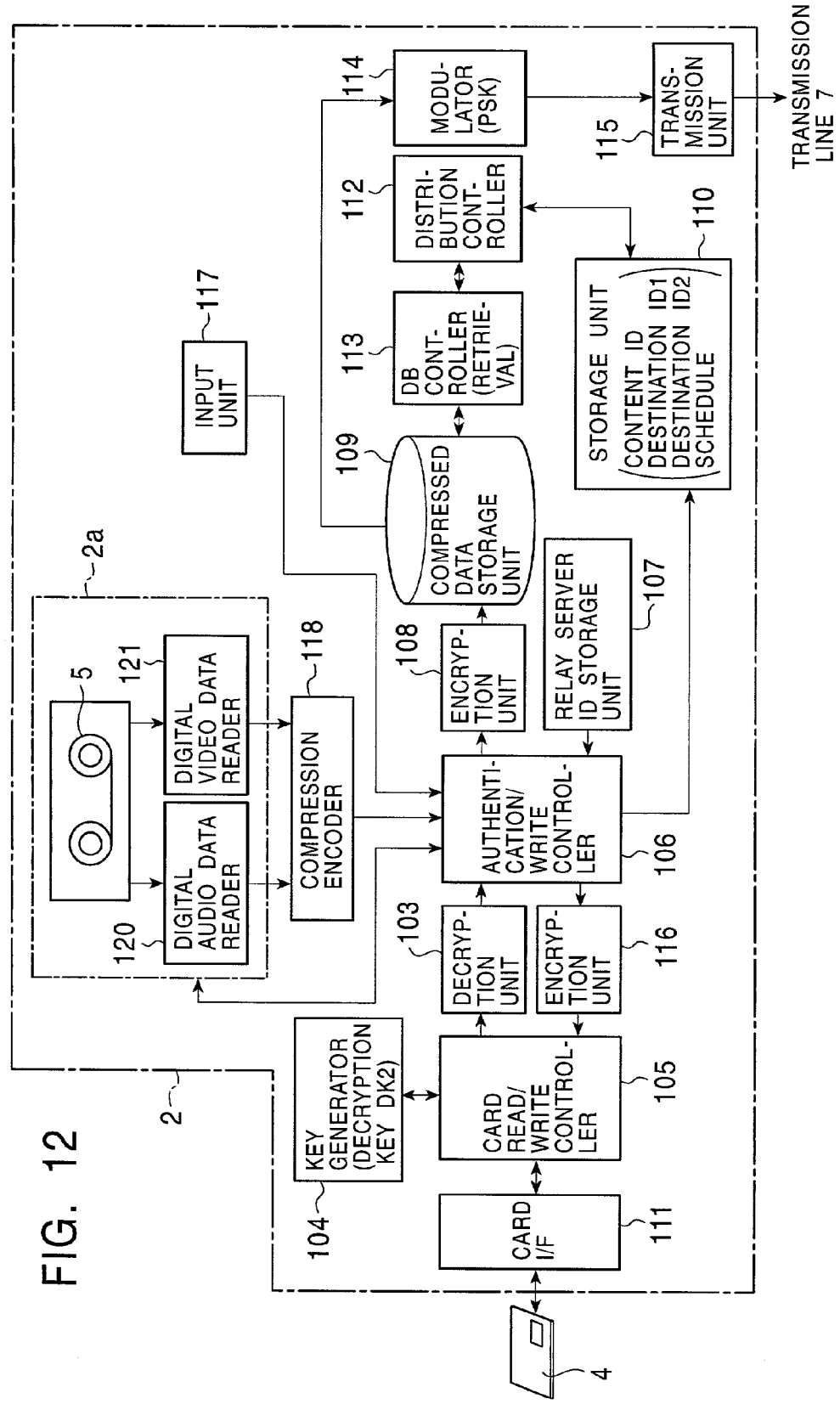
FIG. 12 is a block diagram illustrating a relay server according to the second embodiment of the present invention.

FIG. 12 illustrates a configuration of the relay server 2.

In this second embodiment, as described earlier with reference to FIG. 10, the relay server 2 converts the movie recorded on the film 5 into the content data 6.

For the above purpose, the relay server 2 includes, in addition to those shown in FIG. 5, a film scanner 2a, a compression coder 118, and an input unit 117, as shown in FIG. 12.

The other parts and their operations are similar to those described earlier with reference to FIG. 5. However, it is not needed to receive content data from the server 1, and thus the relay server 2 does not include the receiving unit 101 and demodulator 102 shown in FIG. 5 (a receiving unit and a demodulator may be provided to achieve a capability of transmitting and receiving general data via the transmission line 7, but they are not necessary to receive content data).

The film scanner 2a converts a movie film 5 received from the server 1 into the form of data so as to be able to be transmitted. To this end, the film scanner 2a includes a digital video reading unit 121 for scanning an image formed on the film 5 and converting it into digital video data and also includes a digital audio reading unit 120 for converting a sound track signal recorded on the film 5 into an audio signal and outputting the resultant signal.

The digital video data and the digital audio data read from the movie film 5 are supplied to a compression coder 118 and converted into content data in a predetermined format. More specifically, the compression coder 118 converts the input digital video data and digital audio data into compressed content data, for example, according to the MPEG standard. Note that there is no particular restriction on the format of the content data, and formats other than the MPEG format, such as the AVI format or the Window Media Technology format, may also be employed.

The advantage obtained by compressing the data is that the amount of data to be transmitted can be reduced.

However, the content data is not necessarily required to be compressed, as long as the content data can be used to play back a movie.

The content data generated by the compression coder 118 is supplied to the authentication/write controller 106 and written into the compressed data storage unit 109 under the control of the authentication/write controller 106. Thus, the content data generated from the film 5 is stored in the relay server 2.

The input unit 117 is used by a human operator to input a scan command to control the film scanner 2a and to input a command to input additional information.

Additional information which is input via the input unit 117 when the film is scanned is stored in the storage unit 110 under the control of the authentication/write controller 106.

When the delivery card 4 corresponding to the film 5 is received from the server 1 and inserted into the relay sever 2, the write/write controller 106 checks whether the additional information stored in the delivery card 4 is consistent with the additional information stored in the storage unit 110. If they are consistent with each other, the generated content data is stored together with the additional information, as information for use of distribution, into the compressed data storage unit 109.

More specifically, in the above process, the content data and the associated additional information stored in the compressed data storage unit 109 are encrypted by the encryption unit 108 and rewritten into the compressed data storage unit 109 under the control of the authentication/write controller 106. That is, the encrypted content data and associated additional information are stored in the compressed data storage unit 109 so that they can be distributed to the movie theaters 502.

In the above encryption process performed by the encryption unit 108, the encryption key AK1 is used. To this end, as in the first embodiment, there is provided a key generator for generating the same encryption key AK1 as that generated by the key generator 23 of the server 1, although the key generator is not shown in the figure. Alternatively, the encrypted decryption key DK1 is read from the delivery card 4 and decrypted using the decryption key DK2, and then the encryption key AK1 is generated from the decryption key DK1.

[E(2)] Configuration of Playback Apparatus

The playback apparatus 3 according to the second embodiment has a similar configuration to the playback apparatus 3 according to the first embodiment (FIG. 6).

[F(2)] Process Performed by Server

The process performed by the server 1 is described below with reference to a flow chart shown in FIG. 13.

In step F101, it is determined whether a human operator of the server 1 has input, via the input unit 11, a content ID, a destination identifier ID1, a destination identifier ID2, and schedule information associated with a movie content. If yes, the process proceeds to step F102. However, if it is determined in step F101 that no information has been input, the process jumps to step F103.

In step F102, the information input via the input unit 11, that is, the additional information, is stored in the storage unit 12.

When the above process in step F102 started in response to the command input by the operator is completed, or when no operation is performed by the operator, the card read/write controller 20 determines in step F103 whether the delivery card 4 is inserted via the card interface 21.

If it is determined that the delivery card 4 is inserted, the process proceeds to step F104. However, no inserted delivery card is detected, the process jumps to step F119.

When the process has proceeded to step F104 as a result of determination that the delivery card 4 is inserted, the card read/write controller 20 reads the information stored in the delivery card 4 and determines whether the inserted delivery card 4 is a new card. Herein, the "new card" refers to a blank card in which no information such as additional information or a decryption key DK1 has not yet been written and which is inserted to produce a delivery card 4 to be sent to a relay server 2.

In the case where the inserted delivery card 4 is one which has been returned from a movie distribution company 501 (or a movie theater 502), it is determined that the delivery card 4 is not a new card.

If the inserted delivery card 4 is determined as a new card, the process proceeds to step F105. However, the inserted delivery card 4 is determined as a returned card, the process jumps to step F113.

In the case where the process has proceeded to step F9 as a result of the determination that the delivery card 4 is a new card, the distribution controller 13 determines whether it is time to send the delivery card.

More specifically, it is determined whether it is time to send the delivery card on the basis of the schedule information associated with the content data stored in the storage unit 12. If it is determined that it is time to send the delivery card 4, the process proceeds to step F106. However, if it is determined that it is not time to send the delivery card 4, the process jumps to step F119.

In the case where the process has proceeded to step F106 after determining that it is time to send the delivery card 4, the additional information including the schedule information is transferred to the encryption unit 22.

In the next step F107, the encryption unit 22 encrypts the received additional information using the encryption key AKI generated by the key generator 23.

In step F108, the additional information encrypted using the encryption key AK1 is stored. The encrypted additional information may be stored in the storage unit 12, or may be stored in an internal memory of the encryption unit 22 if the encryption unit 22 has the internal memory. Alternatively, the encrypted additional information may be stored in a storage unit such as a hard disk.

In step F109, the additional information encrypted using the encryption key AK1 is supplied to the card read/write controller 20 and written into the inserted new card via the card interface 21.

In step F110, using the encryption key AK2 generated by the key generator 24, the encryption unit 25 encrypts the decryption key DK1 generated by the encryption unit 23. In step F111, the decryption key DK1 encrypted using the encryption key AK2 is supplied to the card read/write controller 20 and written into the inserted new card via the card interface 21.

Thus, in the above process, the encrypted decryption key DK1 and the encrypted additional information have been written into the inserted new card thereby producing a delivery card 4 such as that shown in FIG. 4, which will be sent to a relay server 2 or a playback apparatus 3.

If the production of the delivery card 4 is completed, the process proceeds to step F112. In step F112, the schedule managing unit 26 stores the decryption key DK2 together with the additional information stored in the storage unit 12.

Although in the present embodiment, the delivery card 4 is produced by the server 1 by writing the additional information and the decryption key into a new card, the delivery card 4 may be produced by the relay server 2. In this case, the process from step F106 to step F112 shown in FIG. 13 is performed by the relay server 2.

In the case where the card read/write controller 20 determines in step F104 that the inserted card is not a new card, that is, in the case where the inserted card is a delivery card 4 which has been returned from the relay server 2 or the playback apparatus 3 and in which additional information has already been stored, the process jumps to step F113.

In step F113, the card read/write controller 20 reads, from the delivery card, the encrypted decryption key DK1, the encrypted additional information, and the content ID which was stored in an unencrypted form when the delivery card 4 was returned.

In step F114, the decryption key DK2 corresponding to the content ID read from the delivery card 4 is read from the schedule managing unit 26, and the decryption unit 27 decrypts the encrypted decryption key DK1 read from the delivery card 4.

In step F115, using the decrypted decryption key DK1, the decryption unit 27 decrypts the additional information and the flags read from the delivery card 4.

In the next step F116, the judgment unit 28 judges whether the date/time, the delete flag, and the settlement amount are valid, on the basis of the decrypted additional information and the flag. For example, the judgment is performed by comparing the additional information read from the delivery card 4 with the additional information stored in the schedule managing unit 26. The judgment of the settlement amount is made by asking the bank center 550 connected to the server 1 about the status of an account having a corresponding account number.

In the case where the judgment indicates that the information is valid, the process proceeds to step F117. In step F117, an invoice is output by the output unit 29. On the other hand, if the information is determined to be invalid or if some problem is detected, the process proceeds to step F118. In step F118, a demand letter, a warning message, or a confirmation request message is output from the output unit 29 to the corresponding destination identifier ID2. The output unit 29 may print the invoice or the demand letter on a sheet.

In the present embodiment, the invoice or the demand note is printed on a sheet and the printed sheet is sent by mail. Alternatively, the server 1 may have a capability of transmitting data via the transmission line 7 whereby the invoice or the demand letter may be described in the form of electronic data and may be directly transmitted from the distribution controller 13 to the corresponding playback apparatus 3.

In the case the judgment reveals that a necessary amount of money has not been transferred to the account, a program may be transmitted to the playback apparatus 3 thereby disabling the playback apparatus 3 and the operation of the playback apparatus 3 may be remotely controlled thereafter.

Thus, the process associated with the inserted delivery card 4 is performed in steps F103 to F118 in the above-described manner.

In the present embodiment, the judgment concerning the returned delivery card 4 is performed by the server 1. Alternatively, the relay server 2 may perform the judgment concerning the returned delivery card 4. In this case, step F104 and steps F113 to F118 are performed by the card read/write controller 105 and the authentication/write controller 106 of the relay server 2.

In the present embodiment, in addition to the outputting of the invoice or the demand letter, the card read/write controller 20 may delete all data stored in the inserted delivery card 4 so as to invalidate the delivery card 4.

In step F119, the controller such as the distribution controller 13 determines whether an end command has been issued by a human operator. If an end command has not been issued, the flow returns to step F1 to repeat the above-described process. If an end command is detected, the process is ended.

[G(2)] Process Performed by Relay Server

Figure 14:
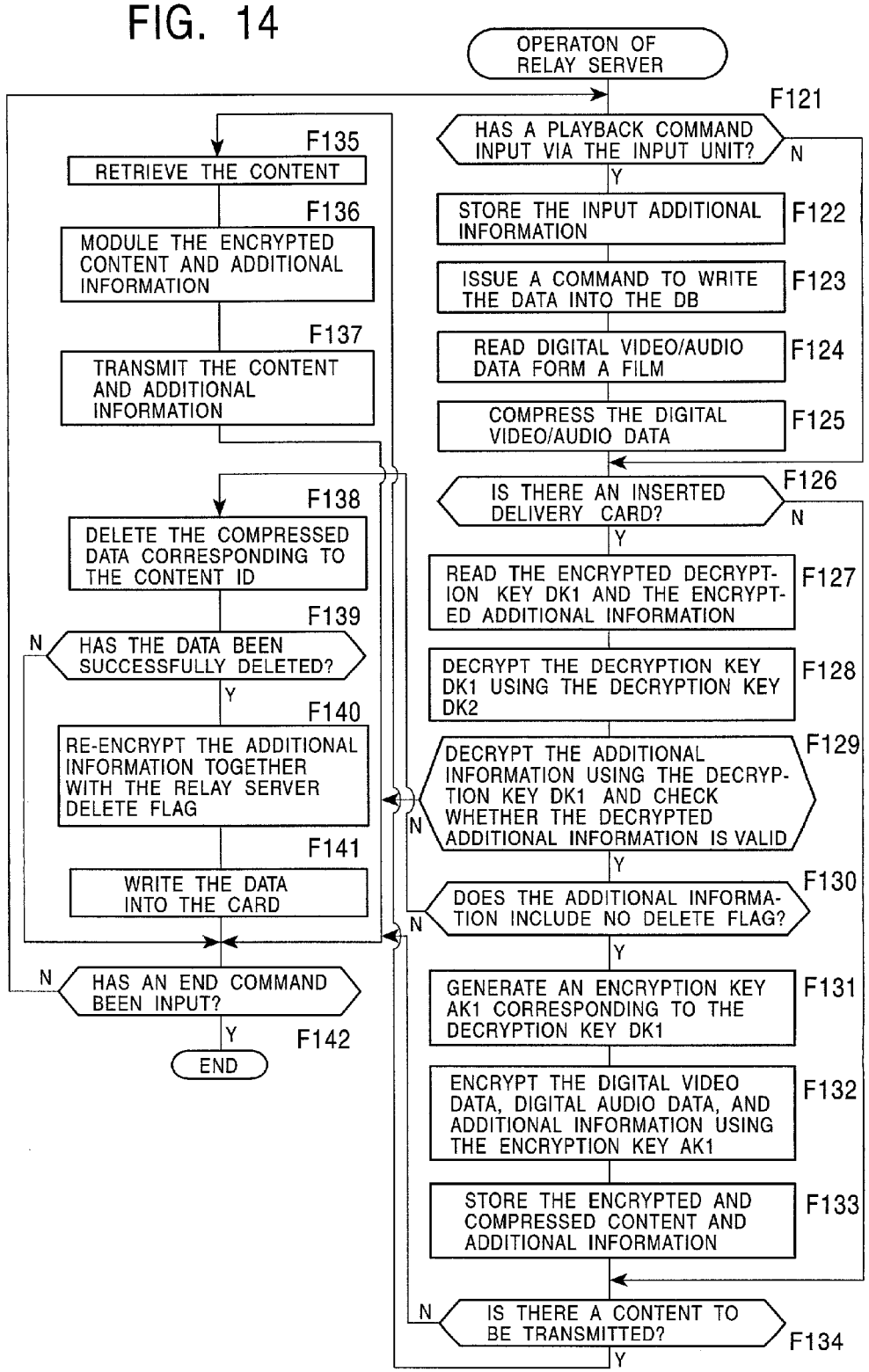
FIG. 14 is a flow chart illustrating a process performed by the relay server according to the second embodiment of the present invention.

The process performed by the relay sever 2 is described below with reference to a flow chart shown in FIG. 14.

In step F121, it is determined whether a playback command has been issued by a human operator of the relay server 1 via the input unit 117. Herein, the playback command refers to a command to play back the film 5 mounted on the film scanner 2a in order to generate content data of a movie source. In this process, the operator also inputs additional information concerning the film 5 via the input unit 117.

If the playback command to play back the film 5 which has been mounted on the film scanner 2a after being received from the server 1 is detected, and if the content ID, the destination identifier ID2, and the schedule information associated with the movie content have been input, the process proceeds to step F122. If the command or the data is not input, the process jumps to step F126.

As described earlier, the content ID is an identifier uniquely assigned to a movie content. The destination identifier ID2 corresponds to the playback apparatus ID of the playback apparatus 3 of the movie theater 502 to which the content data will be finally sent. On the other hand, the destination identifier ID1 is an identifier of the relay server 2 itself. Because the destination identifier ID1 is stored in the relay server ID storage unit 107, it is not required to input it via the input unit 117.

The schedule information has a value such as "2000.01.01-2000.04.30" indicating a playing period during which the movie is permitted to be played by the movie theater 502 in accordance with a contract.

In step F122, the various kinds of data of the additional information input via the input unit 117 are encrypted by the encryption unit 108 and stored into the compressed data storage unit 109, under the control of the authentication/write controller 106.

In the next step F123, the authentication/write controller 106 issues a command to write the content data into the compressed data storage unit 109 and then starts the operation of the film scanner 2a.

In response, in step F124, the digital audio reader 120 of the film scanner 2a reads digital audio data from the film 5 and the digital video reader 121 reads digital video data therefrom. The obtained digital audio and video data are transmitted to the compression coder 118.

In step F125, the compression encoder 118 compresses the digital audio data and the digital video data according to, for example, the MPEG standard thereby producing content data in the MPEG format.

The compressed content data generated by the compression coder 118 is written into the compressed data storage unit 109 under the control of the authentication/write controller 106. Note that at this stage the compressed content data stored in the compressed data storage unit 109 has not yet been encrypted by the encryption unit 108.

The additional information input via the input unit 117 in step F121 is stored in the storage unit 110.

As described above, by performing the above-described process after receiving the film 5 from the server, the content data is generated from the from 5.

When the above process is completed, or when no file playback command is not detected, the process goes to step F126. In step F126, the card read/write controller 105 determines whether a delivery card 4 is inserted in the card interface 111.

If it is determined that an inserted delivery card 4 is detected, the process proceeds to step F127. However, when no inserted card is detected, the process jumps to step F134.

In the case where the process has proceeded to step F127 after determining that an inserted delivery card 4 is detected, the card read/write controller 105 read the encrypted decryption key DK1 and the encrypted additional information from the delivery card 4. In step F128, the decryption key DK1 is decrypted. More specifically, the decryption unit 103 decrypts the decryption key DK1 using the decryption key DK2 generated by the key generator 104.

In step F129, using the decrypted decryption key DK1, the decryption unit 103 decrypts the additional information. Thereafter, using for example the content ID as a retrieval key, the authentication/write controller 106 retrieves additional information stored in the storage unit 110 to judge whether there is stored additional information which is identical to the additional information read from the delivery card 4.

If identical additional information is not found, it is determined that the currently inserted delivery card 4 is not one associated with content data existing at this point of time in the compressed data storage unit 109, that is, it is determined that the delivery card 4 is not one associated with content data which is to be transmitted or was transmitted in the past to the movie theaters 502. In this case, the process proceeds to step F142 without doing anything.

In the case where identical addition information is found, the process proceeds to step F130. In step F130, the authentication/write controller 106 judges whether the information read from the delivery card 4 includes a deletion-from-playback-apparatus flag.

If there is no deletion-from-playback-apparatus flag (if the deletion-from-playback-apparatus flag="00"), it is determined that the delivery card 4 is one received from the server 1. In the case where a playback apparatus flag is found (if the deletion-from-playback-apparatus flag="10" or "11"), it is determined that the delivery card 4 is one returned from the playback apparatus 3.

In the case where the inserted delivery card 4 is one sent from the server 1, the process proceeds to step F131. In step F131, an encryption key AK1 corresponding to the decryption key DK1 is produced from the decrypted decryption key DK1.

In step F132, using the encryption key AKI, the encryption unit 108 encrypts the content data and the additional information, under the control of the authentication/write controller 106. Then in step F133, the resultant encrypted content data and additional information are stored in the compressed data storage unit 109.

That is, the unencrypted content data, which has been stored in the compressed data storage unit 109 after being produced from the film 5, is encrypted using the encryption key AKI and is stored as content data for distribution in the compressed data storage unit 109. Similarly, the unencrypted additional information stored in the storage unit 110 is encrypted and stored in the compressed data storage unit 109 such that the it is linked to the corresponding encrypted content data.

Thus, the content data and the associated additional information to be transmitted to the movie theaters 502 are stored in the encrypted form in the compressed data storage unit 109.

In step F134, the distribution controller 112 determines whether the content IDS stored in the storage unit 110 include one which should be transmitted at the present time.

If such a content ID is detected, the process proceeds to step F135. However, such a content ID is not detected, the process jumps to step F142.

In the case where a content ID is detected which corresponds to content data which should be transmitted at the present time, the process proceeds to step F135. In step F135, the database controller 113 retrieves, under the control of the distribution controller 112, the content data to be transmitted from the compressed data stored unit 109.

In step F136, the retrieved encrypted content and associated additional information are modulated by the modulator 114 and transmitted, in the next step F137, from the transmitting unit 115 to the playback apparatus 3.

Thus, the content data and the additional information are distributed to the playback apparatus 3 of each movie theater 502.

In the case where it is determined in step F130 that the inserted delivery card 4 includes a deletion-from-playback-apparatus flag written therein, the delivery card 4 is determined as one which has been returned after the expiration of the playing period during which the corresponding content data was permitted to be played back by the playback apparatus 3.

In step F138, the authentication/write controller 106 starts to delete the compressed content data corresponding to that delivery card 4 from the compressed data storage unit 109. That is, the content data, which was transmitted to the playback apparatus 3 in the past and the playing period of which has expired (and which has been deleted from the playback apparatus 3) is deleted also from the relay server 2.

In step F139, the write/write controller 106 determines whether the deleting process has been properly performed. If the deleting has been completed successfully, the process proceeds to step F140. However, the deleting has been ended abnormally, the process jumps to step F142.

In the case where the process has proceeded to step F140 after normal completion of deleting the content data, the encryption unit 116 re-encrypts, under the control of the authentication/write controller 106, the deletion-from-relay-server flag having a value of "11" indicating the completion of deleting the content data as well as the associated additional information, using the encryption key AK1. In step F141, the re-encrypted data is written into the inserted delivery card 4 via the card read/write controller 105 and the card interface 111. Thus, the flag and the additional information written in the returned delivery card 4 are rewritten.

As described earlier with reference to the first embodiment, it is required that when the delivery card 4 is returned to the server 1, the server 1 can read the content ID from the delivery card 4 without having to use the decryption key. For this purpose, in the process performed in steps F140 and F141, the content ID is not encrypted while the other data of the additional information is encrypted.

Figure 13:
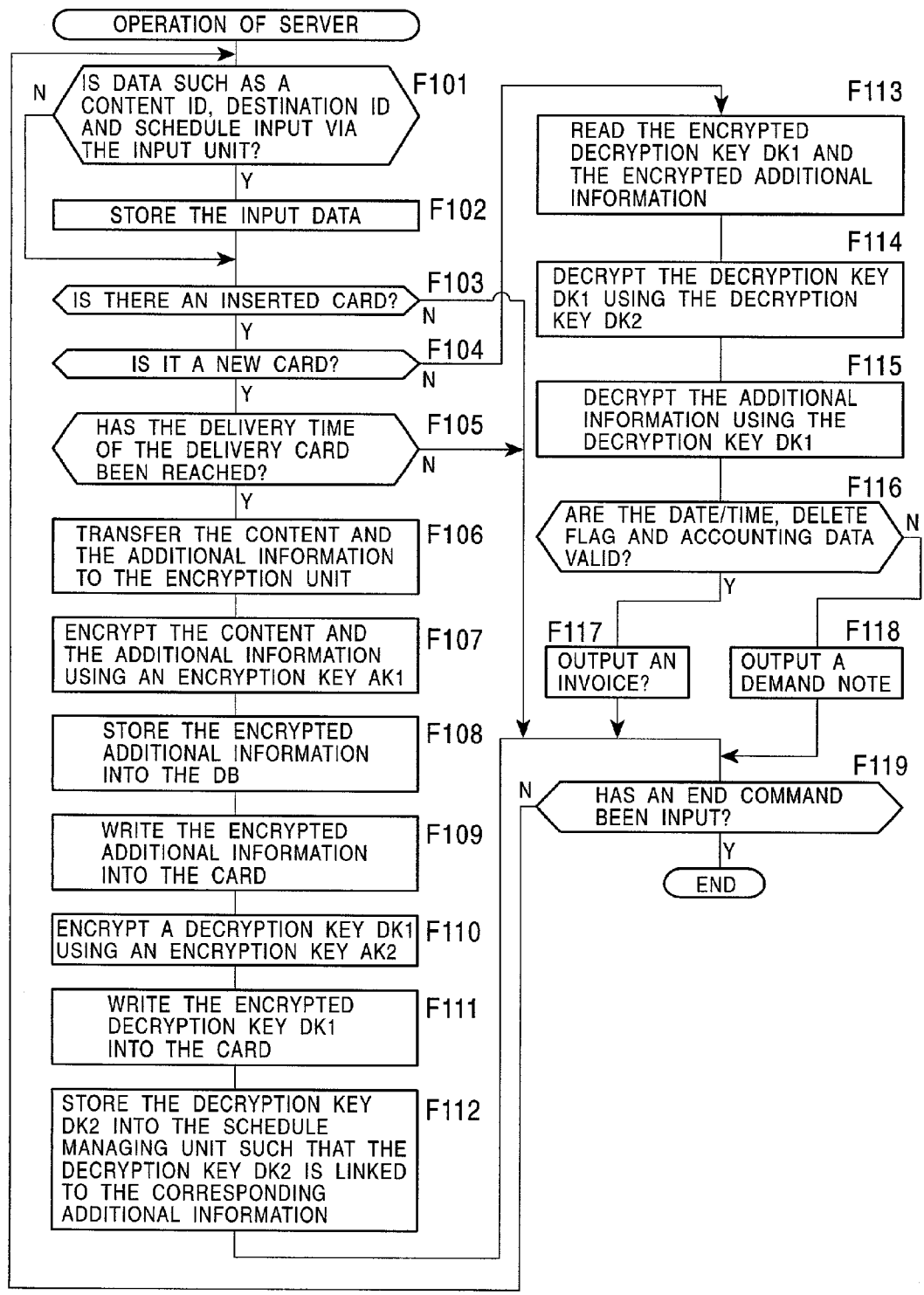
FIG. 13 is a flow chart illustrating a process performed by the server according to the second embodiment of the present invention.

After completion of the rewriting, the delivery card 4 is sent to the server 1 and subjected to the above-described process from step F113 to step F118 shown in FIG. 13.

In step F142, a controller such as the authentication/write controller 106 determines whether an end command has been issued by a human operator. If the end command is detected, the process is ended. However, if the end command is not detected, the flow returns to step F121 to repeat the above-described process.

[H(2)] Process Performed by Playback Apparatus

The process performed by the playback apparatus 3 is similar to that performed by the playback apparatus 3 according to the first embodiment described above with reference to FIG. 9.

[I(2)] Advantages

The configuration and the operation according to the second embodiment of the invention have advantages similar to the advantages (1) to (8) obtained in the first embodiment.

Third Embodiment

[A(3)] Outline

A third embodiment is described below.

The third embodiment has a configuration similar to that of the first embodiment and operates in a similar manner to the first embodiment. The flows of the content data 6 and the delivery card 4 are similar to those shown in FIG. 2. However, the third embodiment is different from the first embodiment in that the additional information further includes data indicating the maximum allowable number of times the content data 6 is played back by the playback apparatus 3 of the movie theater 502 to play the movie and in that a watermark (electronic watermark) indicating that the content data 6 is permitted to be played back is embedded in the content data 6.

In this third embodiment, when the playback apparatus 3 receives the content data from the server 1, the playback apparatus 3 checks whether the playback permission watermark is embedded in the received content data. If the watermark is detected, the playback apparatus 3 is allowed to play back the content data as many times as the number-of-times value described in the additional information.

When the playback apparatus 3 has played back the content data as many times as allowed by the additional information, the watermark embedded in the content data (video or audio signal) is replaced with a playback inhibition code thereby disabling further playback operation.

The number-of-times value indicating the number of times the content data is allowed to be played back is set by the movie production company 500 or the movie distribution company 501 in accordance with the agreement between the movie theater 502 and the movie production company 500 or the movie distribution company 501.

[B(3)] Configuration of Server

Figure 15:
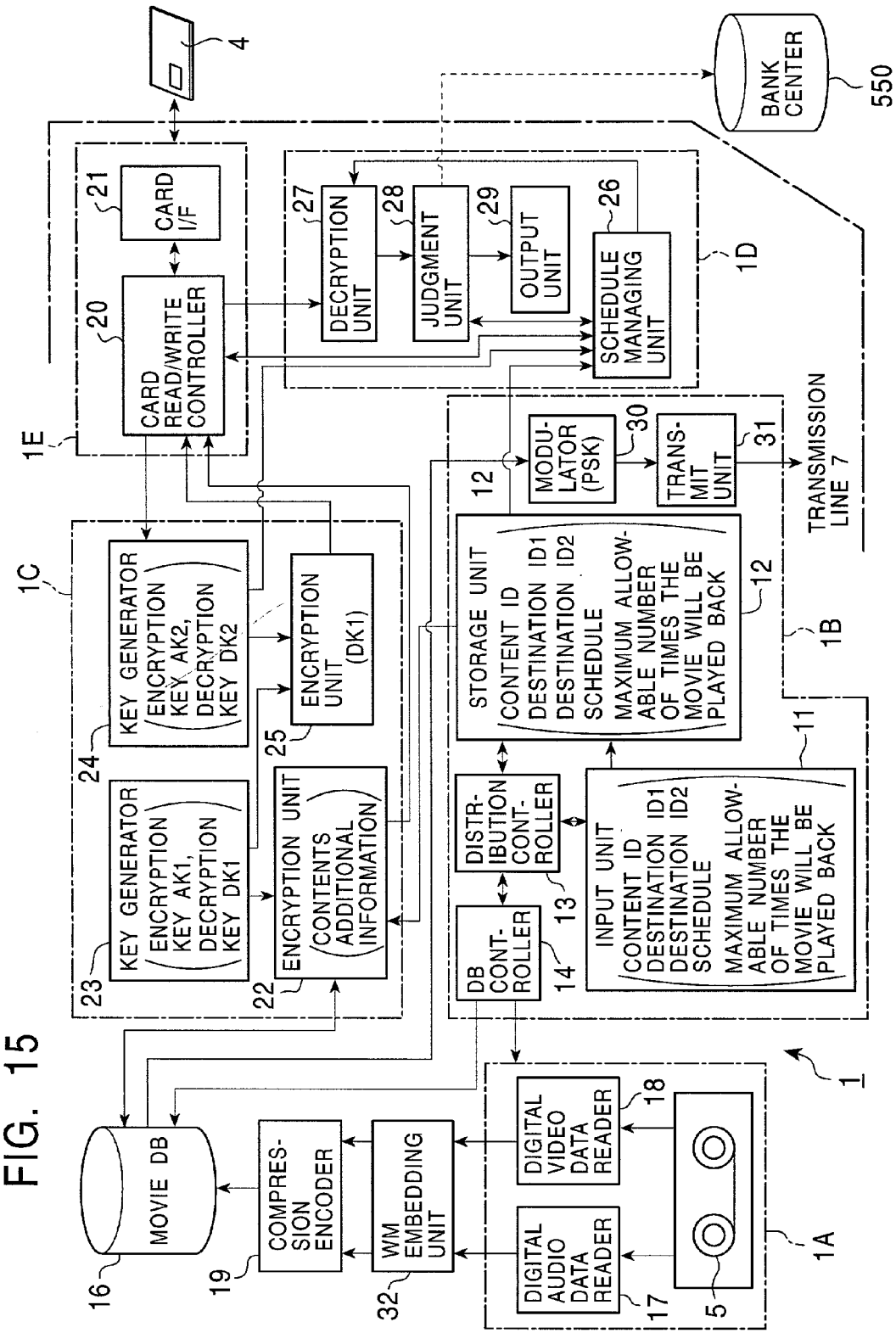
FIG. 15 is a block diagram illustrating a server according to a third embodiment of the present invention.

FIG. 15 illustrates a configuration of the server 1. As shown in FIG. 15, the server 1 has a similar configuration to that shown in FIG. 3 but further includes a watermark embedding unit 32. The server 1 is also different from that shown in FIG. 3 in that additional information which is stored in the storage unit 12 after being input via the input unit 11 includes the number-of-times value indicating the number of times the content data is allowed to be played back, in addition to the content ID, the destination identifiers ID1 and ID2, and the schedule information.

The watermark embedding unit 32 embeds a watermark (PN code) serving as a playback permission code into one or both of digital audio data and digital video data output from the film scanner 1A.

The compression coder 19 compresses the digital audio data and the digital video data including the embedded watermark so as to produce content data in a predetermined format. The resultant content data is written into the movie database 16.

The operations of the other parts are similar to those of the first embodiment, and thus they are not described herein. However, it should be noted that the number-of-times value indicating the number of times the content data is allowed to be played back is included in each of the additional information encrypted by the encryption unit 22, the additional information written by the card controller 1E into the delivery card 4, and the additional information transmitted together with the content data.

[C(3)] Configuration of Card

Figure 16:
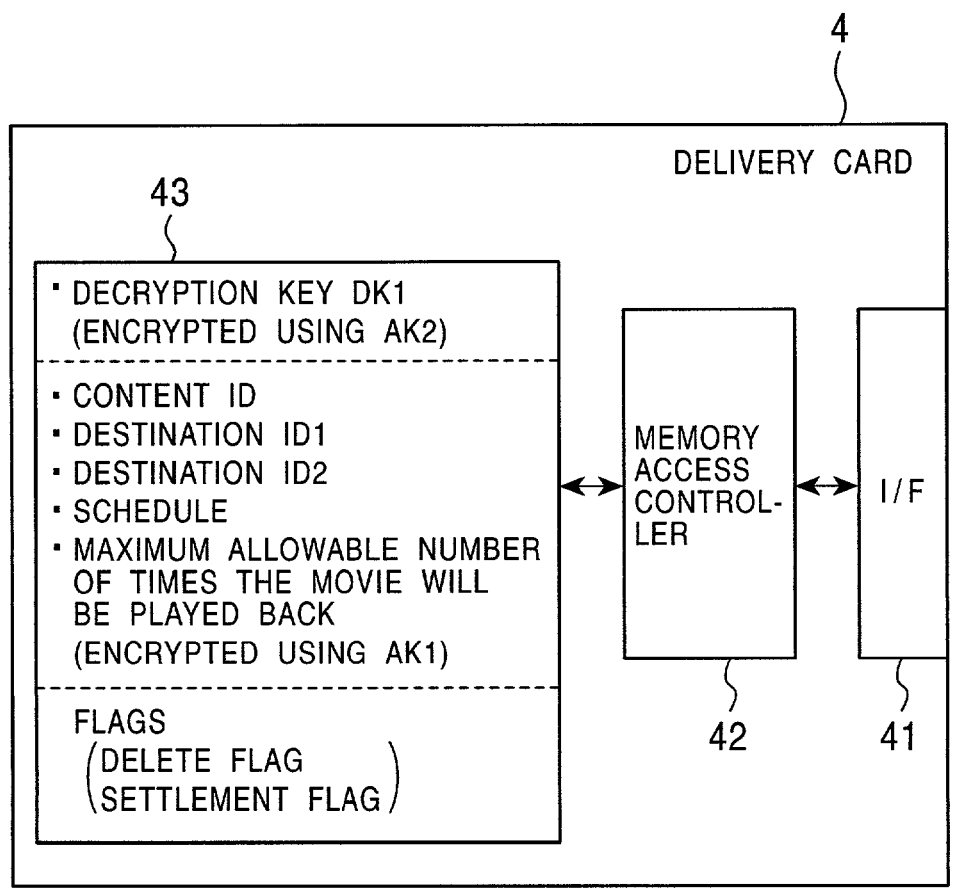
FIG. 16 is a block diagram illustrating a delivery card according to the third embodiment of the present invention.

As shown in FIG. 16, the delivery card 4 is similar to that according to the first embodiment in that the delivery card 4 includes an interface 41, a memory access controller 42, and a memory 43.

However, the difference is that encrypted additional information written in the memory 43 further includes a number-of-times value indicating the number of times the content data is allowed to be played back.

[D(3)] Configuration of Relay Server

The relay server 2 has a similar configuration to that shown in FIG. 5. However, a number-of-times value indicating the number of times the content data is allowed to be played back is included in each of additional information which is demodulated and decrypted after being received by the receiving unit 101, additional information which is read from the delivery card 4 and then decrypted, additional information stored in the storage unit 110, and additional information which is stored together with content data in the compressed data storage unit 109 and transmitted to the movie theater 502.

[E(3)] Configuration of Playback Apparatus

Figure 17:
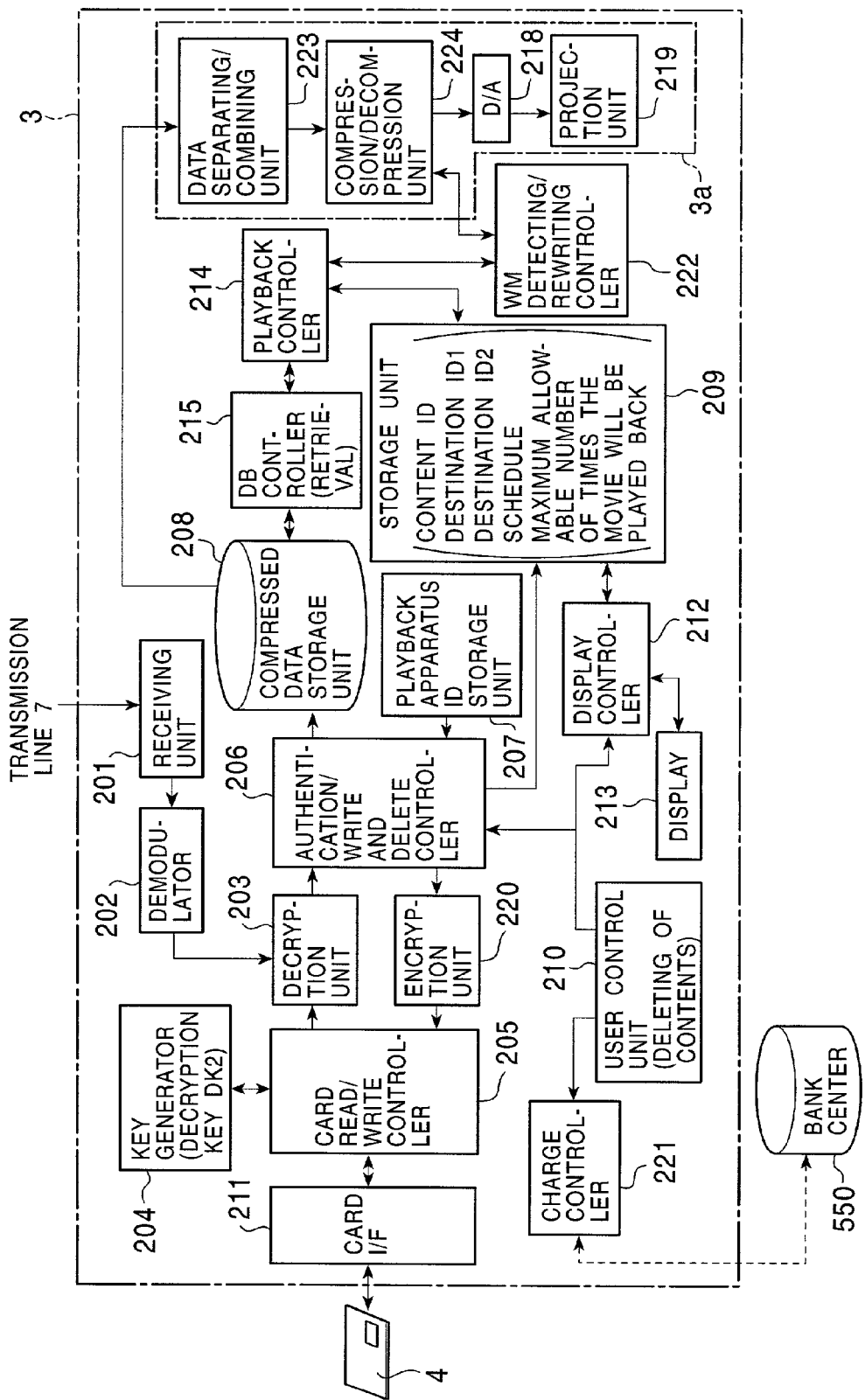
FIG. 17 is a block diagram illustrating a playback apparatus according to the third embodiment of the present invention.

FIG. 17 illustrates the structure of the playback apparatus 3. As shown in FIG. 17, the playback apparatus includes a watermark detection/write controller 222 in addition to the parts shown in FIG. 6.

A number-of-times value indicating the number of times the content data is allowed to be played back is included in each of additional information which is demodulated and decrypted after being received by the receiving unit 201, additional information which is read from the delivery card 4 and then decrypted, additional information stored in the storage unit 209, and additional information which is stored together with content data in the compressed data storage unit 208.

The watermark detection/write controller 222 detects a watermark embedded in content data stored in the compressed data storage unit 208. More specifically, the watermark detection/write controller 222 examines a PN code embedded in the content data and determines whether or not the content data is allowed to be reproduced.

The watermark detection/write controller 222 checks the number-of-times value included in the additional information indicating the number of times the content data is allowed to be played back and also checks the number of times the content data has been actually played back by the digital projector 3a. Depending upon the result of the checking, the watermark detection/write controller 222 rewrites the watermark, embedded in the content data stored in the compressed storage unit 208, into a playback inhibition code.

The other parts operates in similar manners to those according to the first embodiment.

[F(3)] Process Performed by Server

Figure 18:
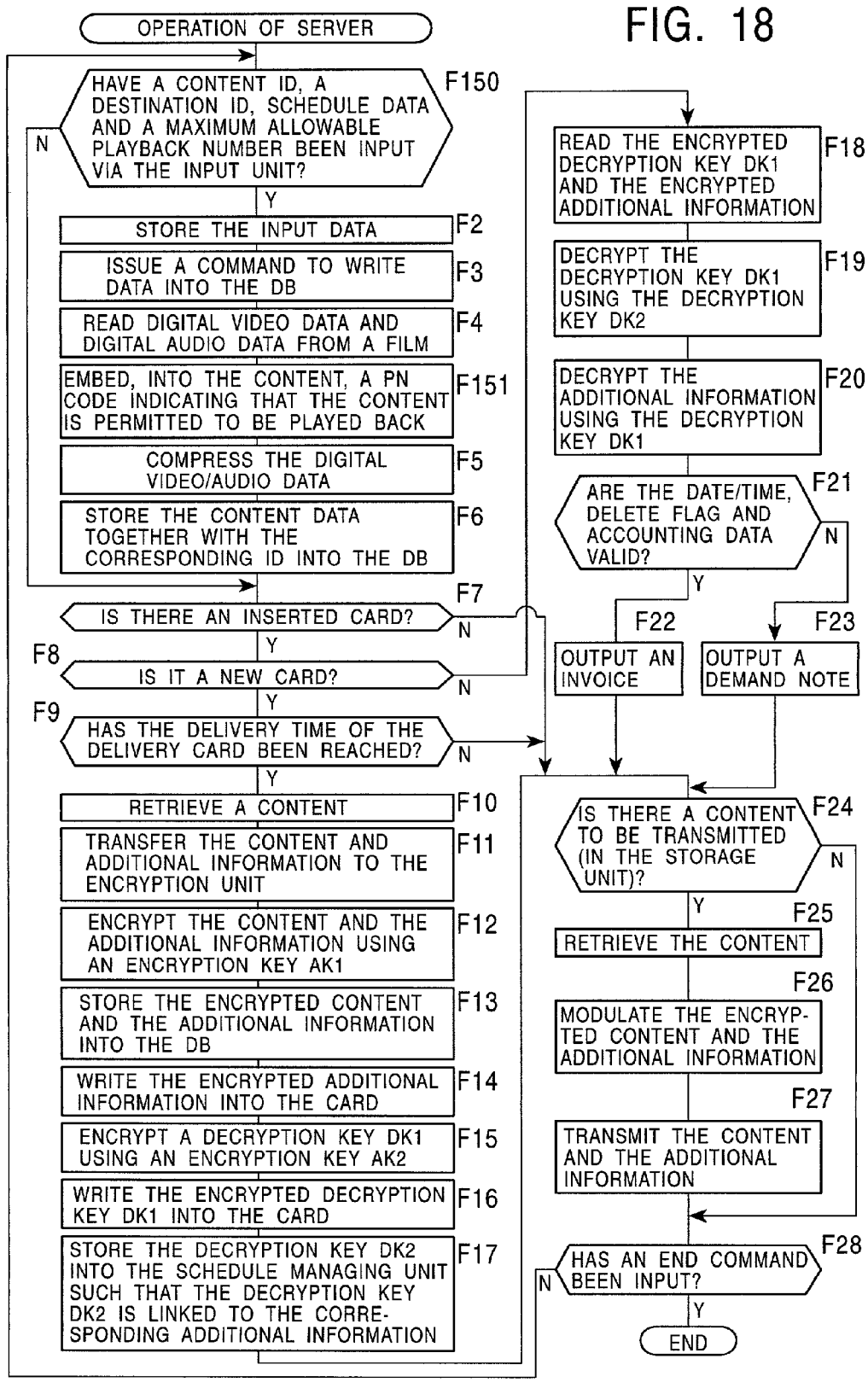
FIG. 18 is a flow chart illustrating a process performed by the server according to the third embodiment of the present invention.

FIG. 18 illustrates a process performed by the server 1. In FIG. 18, similar steps to those shown in FIG. 7 are denoted by similar step numbers, and they are not described in further detail herein. More specifically, steps F2 to F28 are similar to those shown in FIG. 7.

In the process shown in FIG. 18, inputting of data via the input unit 11 is monitored in step F150. The input additional information includes a number-of-times value indicating the number of times content data is allowed to be played back, in addition to a content ID, destination identifiers ID1 and ID2, schedule information. Step F150 checks whether these data have been input.

If the process proceeds to step F2 after detecting inputting of the additional information, the content ID, the destination identifiers ID1 and ID2, the schedule information, and the number-of-times value indicating the number of times the content data is allowed to be played back are stored as the additional information into the storage unit 209. In the following steps F3 to F6, content data is produced from a film 5 and the content data is written together with the associated additional information into the movie database 16.

Note that, in step F151, the watermark embedding unit 32 embeds a PN code indicating that data is permitted to be played back into one or both of the digital audio data and the digital video data which was read from the film 5 in step F4.

Thereafter, the process is performed in a similar manner to that shown in FIG. 7 except that the number-of-times value indicating the number of times the content data is allowed to be played back is included in the additional information dealt with in steps F11 to F17, F18 to F21, F26 and F27.

[G(3)] Process Performed by Relay Server

Figure 8:
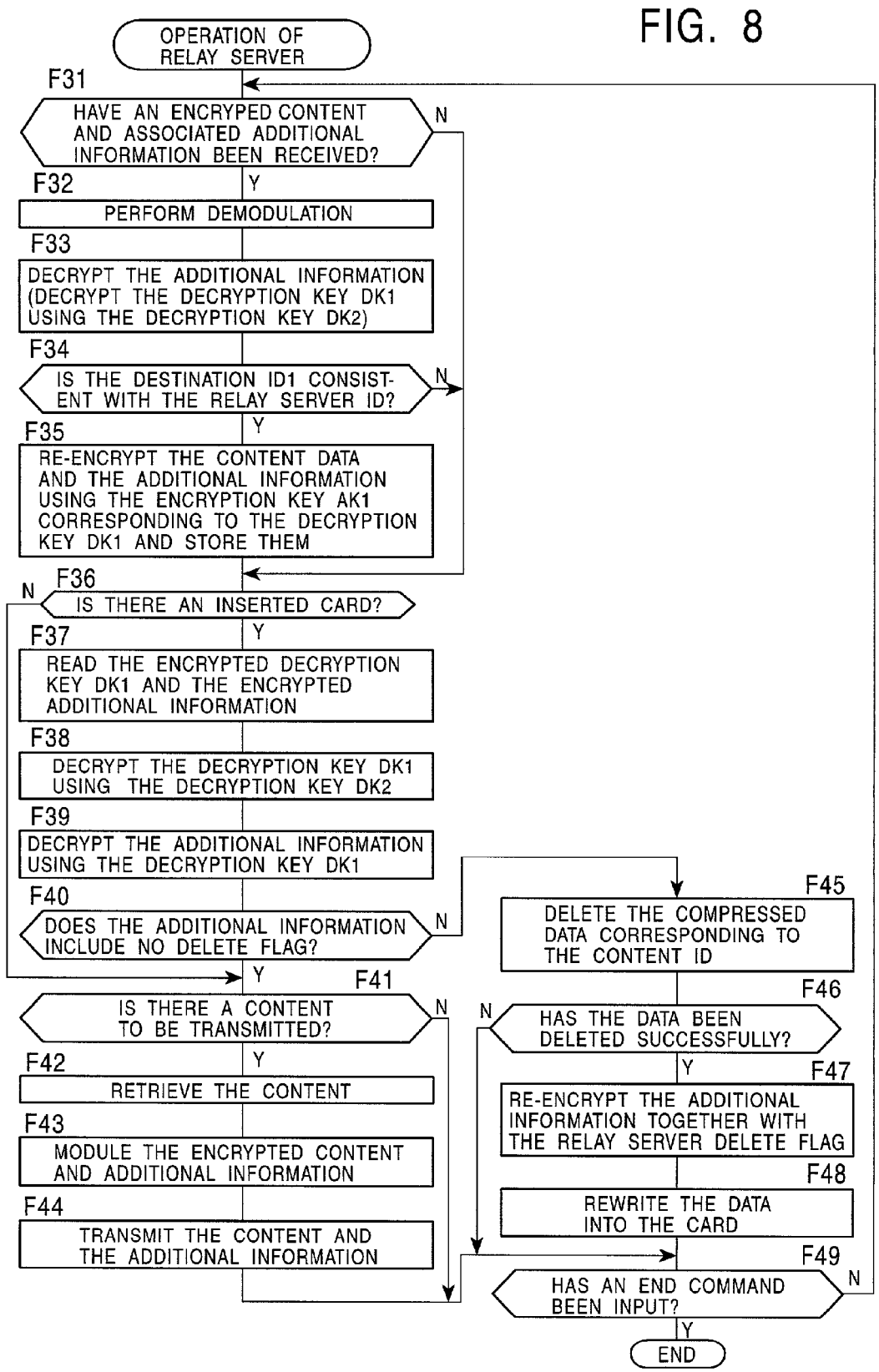
FIG. 8 is a flow chart illustrating a process performed by the relay server according to the first embodiment of the present invention.

The process performed by the relay server 2 is similar to that shown in FIG. 8 except that the number-of-time value indicating the number of times the content data is allowed to be played back is included in the additional information dealt with in steps F31 to F34, F37 to F39, F43, F44, F47, and F48.

[H(3)] Process Performed by Playback Apparatus

Figure 19:
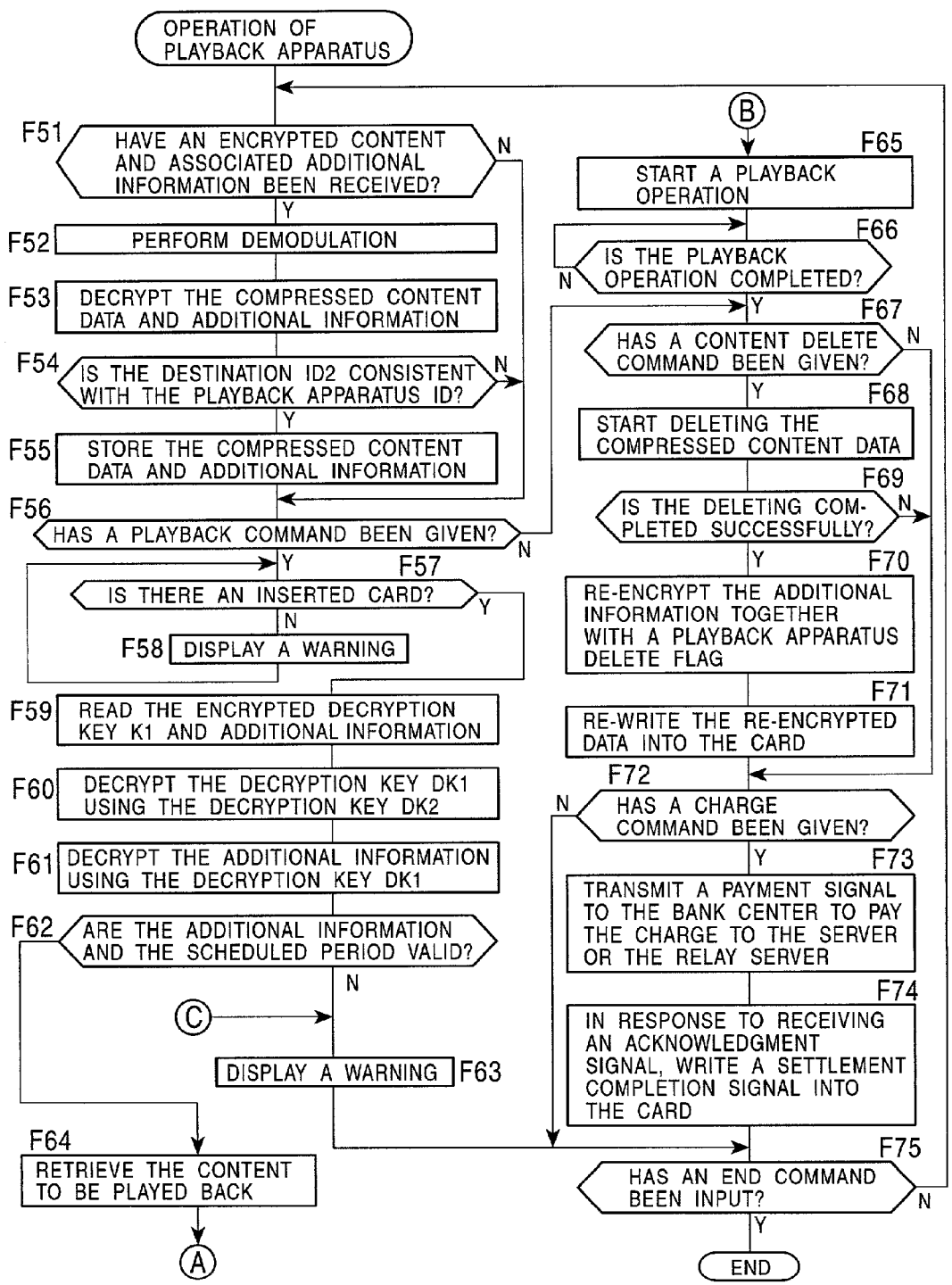
FIG. 19 is a flow chart illustrating a process performed by the playback apparatus according to the third embodiment of the present invention.

The process performed by the playback apparatus 3 is described below with reference to FIGS. 19 and 20. The steps shown in FIG. 19 are basically similar to those having the same step numbers shown in FIG. 9 except that the number-of-times value indicating the number of times the content data is allowed to be played back is included in the additional information dealt with in steps F51 to F55, F59 to F62, F70 and F71.

In the third embodiment, in response to a playback command, the playback apparatus 3 performs steps F57 to F64 to check whether a delivery card 4 is inserted; decrypt the additional information stored in the delivery card 4; check whether the additional information stored in the delivery card 4 is identical to the additional information stored in the storage unit 209; and check whether the present date/time is within the allowed playing period indicated by the schedule information. As in the process shown in FIG. 9, the above-described checks are required to be successfully passed to play back the content. However, the difference is that when it is determined in step F64 that the content data to be played back exists in the compressed data storage unit 208, the process proceeds to step F160 shown in FIG. 20 to check whether a further condition necessary for playback is met.

Figure 20:
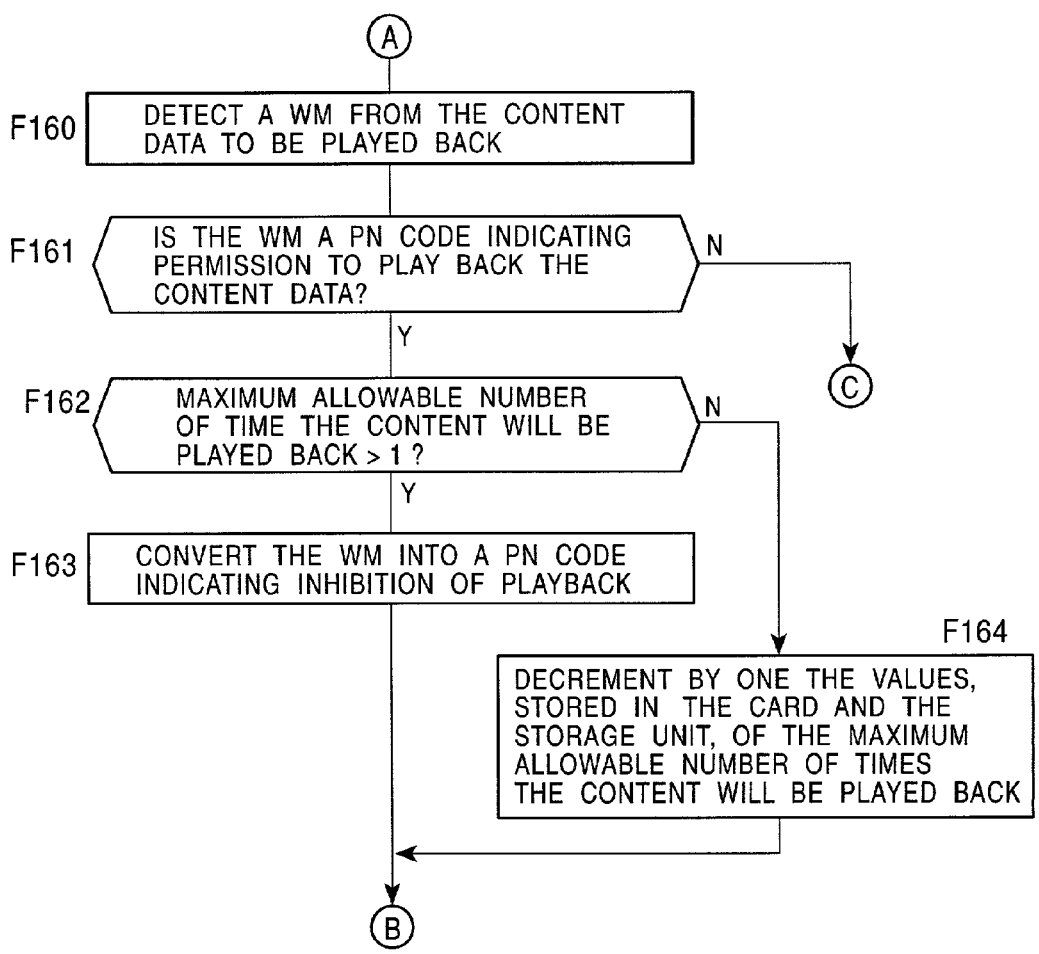
FIG. 20 is a flow chart illustrating a process performed by the playback apparatus according to the third embodiment of the present invention.

In step F160 shown in FIG. 20, the watermark detection/write controller 222 detects a watermark embedded in the content data to be played back which has been retrieved from the compressed data storage unit 208.

In the next step F161, it is determined whether the detected PN code indicates that the content data is permitted to be played back.

If the PN code indicates that the content data is not permitted to be played back, it is determined that all conditions necessary to play back the content are not met, and the process jumps to step F63 to display a warning. Thereafter, the process proceeds to step F75. In this case, the content data is not played back.

On the other hand, if the PN code indicates that the content data is permitted to be played back, the process proceeds to step F162 to further check whether the number-of-times value, indicating the number of times the content data is allowed to be played back, described in the additional information corresponding to the content data is equal to or greater than 2.

If the number-of-times value is equal to or greater than 2, the process proceeds to step F164. In step F164, the number-of-times value indicating the number of times the content data is allowed to be played back is decremented by 1. Thus, under the control of the authentication/write controller 106, the additional information written in the storage unit 209 is rewritten, and the updated additional information concerning the number-of-times value indicating the number of times the content data is allowed to be played back is supplied to the inserted delivery card 4 and the current additional information is replaced with the updated additional information.

After updating the maximum allowable playback number, the process proceeds to step F65 shown in FIG. 19 to play back the content data using the digital projector 3a.

Each time the content data is played back, the number-of-times value indicating the number of times the content data is allowed to be played back described in the additional information stored in the delivery card 4 and also that stored in the storage unit 209 are decremented in step F164, and thus the number-of-times value indicates the number of times the playback apparatus 3 is allowed to further play back the content data.

In the case where it is determined in step F161 that the number-of-times value indicating the number of times the content data is allowed to be played back is equal to 1, the playback apparatus 3 is allowed to the last playback operation. In this case, the process proceeds to step F163 in which the watermark detection/write controller 222 rewrites the watermark embedded in the content data into a PN code so as to indicate that the content data is not allowed to be played back. More specifically, the rewritten watermark is re-compressed, combined with the content data, and rewritten into the compressed data storage unit 208.

Thereafter, the process proceeds to step F65 shown in FIG. 19 to start the last playback operation using the digital projector 3a.

If a playback command is detected in step F56 after completion of the last playback operation, the content data is not played back because step F161 detects that the content data is not allowed to be played back.

[I(3)] Advantages

The third embodiment has the advantages described below in addition to the advantages (1) to (8) described above with reference to the first embodiment.

(9) The server 1 can controls the number of times the content data is played back by the playback apparatus 3 by describing the number-of-times value indicating the number of times the content data is allowed to be played back in the additional information in accordance with the contract.

When the playback apparatus 3 has played back the content data as many times as indicated by the number-of-times value, the watermark embedded in the content data is rewritten so as to indicate that the content data is not permitted to be played back. Thus, the playback apparatus 3 can no longer play back the content data. This prevents the content data from being played back against the contract with the movie production company 500 or the movie distribution company 501. That is, it is ensured that the content data can be played back by the movie theater 502 only as many times as allowed according to the contract.

(10) Because a PN code indicating the inhibition of playback operation is embedded in content data which has already been played back as many times as allowed, the content data can no longer be played back even if the content data is tried to be played back using another playback apparatus. This protects in a highly reliable fashion the content data from being further played back beyond the allowed limit.

(11) The number-of-times value stored in the delivery card 4 is decremented each time the content data is played back. This allows the server 1 to know how many times the content data has been actually played back in the movie theater 502 by checking the number-of-times value described in the delivery card 4 returned from the movie theater 502. This is useful for management and for field investigation of the playing status.

Fourth Embodiment

[A(4)] Outline

Now, a fourth embodiment is described below.

The fourth embodiment has a configuration similar to that of the first embodiment and operates in a similar manner to the first embodiment. The flows of the content data 6 and the delivery card 4 are similar to those shown in FIG. 2. However, the difference is that the playback apparatus 3 has a capability of managing and controlling the operation of copying the content data 6.

That is, if the playback apparatus 3 outputs content data 6, which has been stored after being received by means of electronic transmission, to an external device, and if the content data is copied on a storage medium by the external device, the playback apparatus ID of the playback apparatus 3 is added to the additional information stored in the delivery card 4.

When the delivery card 4 has been returned to the server 1, the server 1 checks whether the additional information stored in the delivery card 4 includes the playback apparatus ID. If the playback apparatus ID is detected, the server 1 determines that the content data 6 has been copied by the playback apparatus 3 indicated by the playback apparatus ID.

[B(4)] Configuration of Server

The server has a similar configuration to that shown in FIG. 3. However, the judgment unit 28 of the return managing unit 1D checks whether the additional information stored in the returned delivery card 4 includes a playback apparatus ID.

If a playback apparatus ID is detected, the output unit 29 issues, to the playback apparatus 3 indicated by the playback apparatus ID, a notification to give a warning or to request the playback apparatus to explain the reason why the copy was made. This allows the server to take necessary action against the playback apparatus 3 (movie theater 502) which has made the copy.

[C(4)] Configuration of Card

Figure 21:
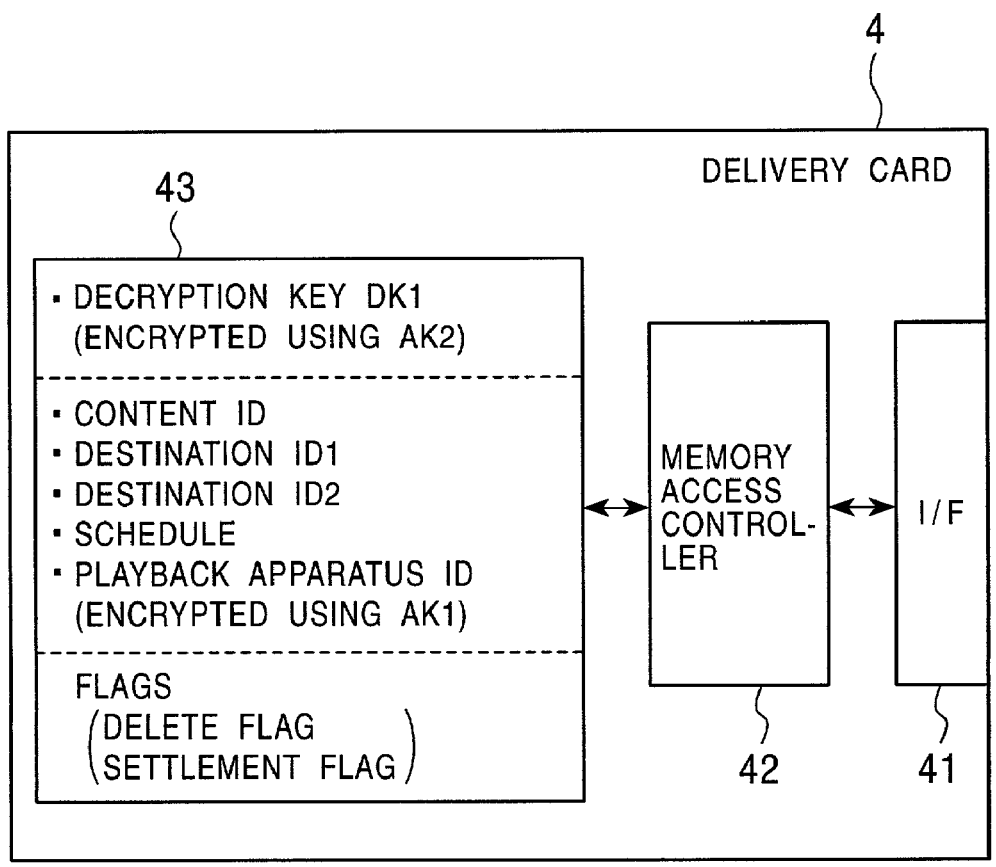
FIG. 21 is a block diagram illustrating a delivery card according to a fourth embodiment of the present invention.

FIG. 21 illustrates the configuration of the delivery card 4. As shown in FIG. 21, the configuration is similar to that shown in FIG. 4. However, in the present embodiment, the additional information stored in the memory 43 can include a playback apparatus ID, depending upon the situation.

Note that the additional information generated by the sever 1 does not include a playback apparatus ID, but a playback apparatus ID is written by the playback apparatus 3 depending upon the situation. That is, when a delivery card 4 is returned to the server 1, there is a possibility that the additional information includes a playback apparatus ID.

[D(4)] Configuration of Relay Server

The relay server 2 has a similar configuration to that shown in FIG. 5. However, the additional information stored in the delivery card 4 returned from the playback apparatus 3 can include the playback apparatus ID.

[E(4)] Configuration of Playback Apparatus

Figure 22:
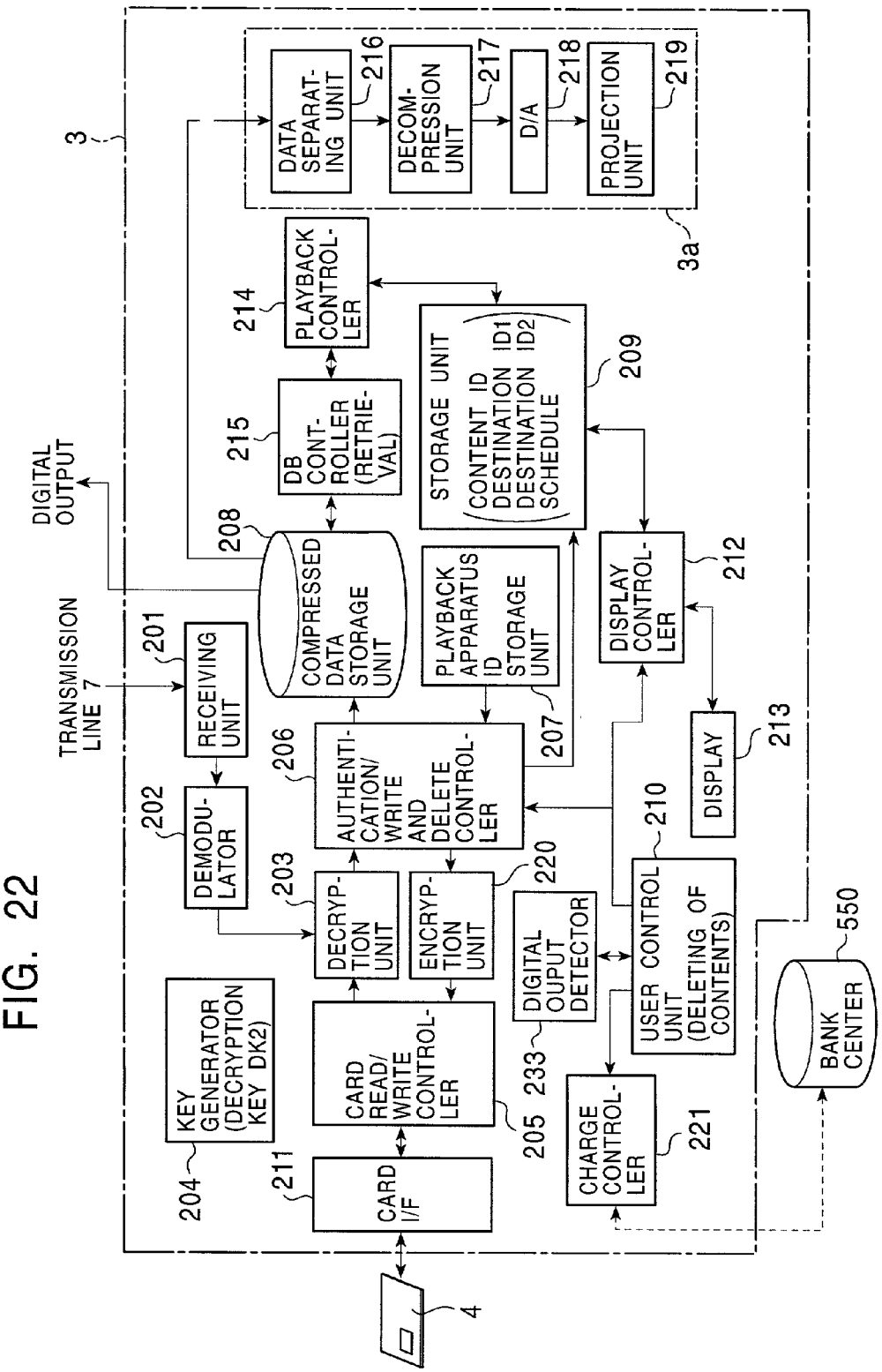
FIG. 22 is a block diagram illustrating a playback apparatus according to the fourth embodiment of the present invention.

FIG. 22 illustrates the configuration of the playback apparatus 3. The configuration is basically similar to that shown in FIG. 6 except that there is further provided a digital output detector 233.

Content data stored in the compressed data storage unit 208 can be output in the form of digital data. For example, when a data transfer command is issued from the user control unit 210, content data stored in the compressed data storage unit 208 is output to an external device and is copied by the external device.

If the digital output detector 233 detects that content data has been transferred to an external device in response to a command issued from the user control unit 210, the digital output detector 233 determines that the content data has been copied, and the digital output detector 233 outputs a detection signal to the authentication/write/delete controller 206.

In response to receiving the detection signal from the digital output detector 233, the authentication/write/delete controller 206 adds the playback apparatus ID stored in the playback apparatus ID storage unit 207 to the additional information. The resultant additional information including the playback apparatus ID is transmitted to the card read/write controller 205. The card read/write controller 205 updates the additional information stored in the delivery card 4 in accordance with the received additional information.

[F(4)] Process Performed by Server

Figure 23:
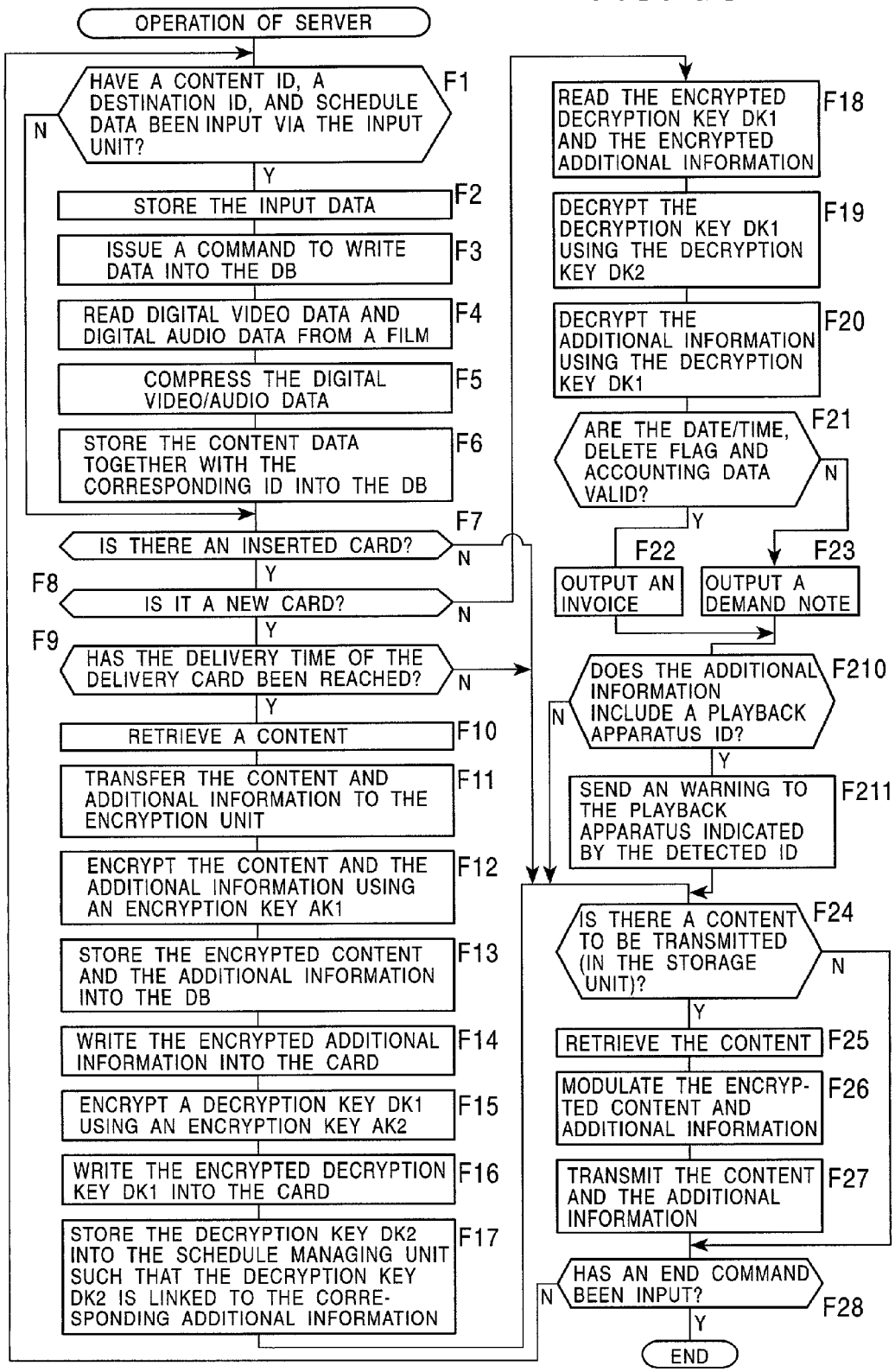
FIG. 23 is a flow chart illustrating a process performed by the server according to the fourth embodiment of the present invention.

FIG. 23 illustrates the process performed by the server 1. In FIG. 23, similar steps to those shown in FIG. 7 are denoted by similar step numbers, and they are not described in further detail herein. More specifically, steps F1 to F23 and steps F24 to F28 are similar to those shown in FIG. 7.

That is, the process shown in FIG. 23 is similar to that according to the first embodiment in that if step F8 determines that the inserted delivery card 4 is not a new card but a returned card, steps F18 to F23 are performed to decrypt the additional information stored in the delivery card; check whether the content data was correctly used by the playback apparatus 3 only during the allowed period, the content data has been adequately deleted, and the settlement has been correctly made; issue an invoice, a demand note, or a warning message depending upon the result of the checking. However, the difference is that in step F210 it is determined whether the additional information stored in the delivery card 4 includes a playback apparatus ID.

If no playback apparatus ID is detected, the process proceeds to step F24 without performing anything. However, if a playback apparatus ID is detected, the process proceeds to step F211 to output a warning message from the output unit 29 to a playback apparatus 3 indicated by the playback apparatus ID, that is, to the playback apparatus 3 which used the returned delivery card 4. That is, a warning regarding the unauthorized copy is given.

[G(4)] Process Performed by Relay Server

The process performed by the relay server 2 is similar to that shown in FIG. 8, except that the additional information dealt with in steps F37 to F39 and F47 to F48 can include a playback apparatus ID.

[H(4)] Process Performed by Playback Apparatus

Figure 24:
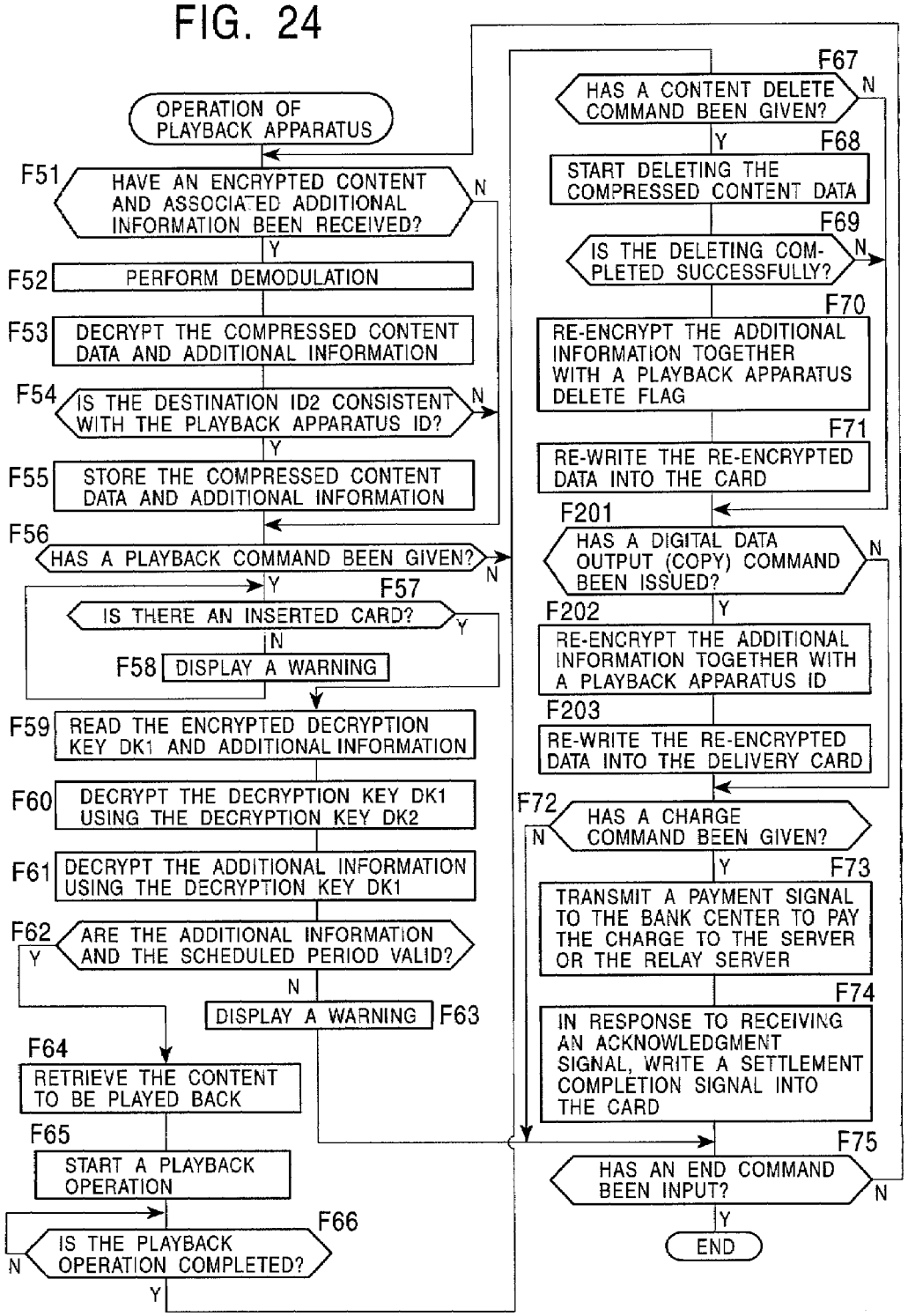
FIG. 24 is a flow chart illustrating a process performed by the playback apparatus according to the fourth embodiment of the present invention.

FIG. 24 illustrates the process performed by the playback apparatus 3. In FIG. 24, similar steps to those shown in FIG. 9 are denoted by similar step numbers, and they are not described in further detail herein.

The process according to this fourth embodiment includes a step F201 in which the digital output detector 233 monitors whether a command is issued to output content data stored in the compressed storage unit 208 of the playback apparatus 3 to an external device.

In the case where outputting of digital data to make a copy of content data is detected, the process proceeds to step F202. In step F202, the authentication/write/delete controller 206 reads the playback apparatus ID stored in the playback apparatus ID storage unit 207 and adds it to the additional information which is stored in the storage unit 209 and which corresponds to the output content data. The resultant additional information now including the playback apparatus ID is encrypted by the encryption unit 220 and transmitted to the card read/write controller 205.

In step F203, the card read/write controller 205 writes the encrypted additional information including the playback apparatus ID into the delivery card 4. For example, the playback apparatus ID is written in the delivery card 4 in such as manner as shown in FIG. 21.

[I(4)] Advantages

The fourth embodiment has the advantages described below in addition to the advantages (1) to (8) described above with reference to the first embodiment.

(12) The server 1 is capable of checking whether content data has been copied by a particular playback apparatus 3, on the basis of information described in a returned delivery card 4. If unauthorized copying of content data is detected, the server 1 can give a warning or take action such as demanding of a penalty for breach of contract.

(13) By monitoring the copying operation performed by the playback apparatus 3, it becomes possible to preventing content data from being copied in an unauthorized manner by the playback apparatus 3. This ensures highly reliable protection of copyright.

(14) Unauthorized copying can be monitored simply by checking information described in a returned delivery card 4 without having to use an additional special monitoring system. This makes it possible to easily perform monitoring for a very large number of movie theaters 502 to which content data is distributed.

Fifth Embodiment

[A(5)] Outline

Now, a fifth embodiment is described below.

The fifth embodiment has a configuration similar to that of the first embodiment and operates in a similar manner to the first embodiment. The flows of the content data 6 and the delivery card 4 are similar to those shown in FIG. 2. However, the difference is that after the delivery card 4 is inserted into the playback apparatus 3, the delivery card is required to be maintained in the inserted state without being removed.

That is, once a delivery card 4 corresponding to content data to be played back is inserted into the playback apparatus 3, it is required that the delivery card 4 must be maintained in the inserted state until the playing period has expired. If the delivery card 4 is removed in the middle of the playing period, it becomes impossible to further play back the content data even if the delivery card 4 is re-inserted.

[B(5)] Configuration of Server

In this embodiment, the server has a similar configuration to that shown in FIG. 3.

[C(5)] Configuration of Card

The configuration of the delivery card 4 is similar to that shown in FIG. 4.

[D(5)] Configuration of Relay Server

The relay server 2 has a similar configuration to that shown in FIG. 5.

[E(5)] Configuration of Playback Apparatus

The configuration of the playback apparatus 3 is similar to that shown in FIG. 6 except that the authentication/write/delete controller 206 includes a counter for counting the number of times a playback command is issued, and the authentication/write/delete controller 206 controls the operation of rewriting the additional information stored in the delivery card 4 depending upon the counter value.

[F(5)] Process Performed by Server

The process performed by the server 1 is similar to that shown in FIG. 7.

[G(5)] Process Performed by Relay Server

The process performed by the relay server 2 is similar to that shown in FIG. 8.

[H(5)] Process Performed by Playback Apparatus

Figure 25:
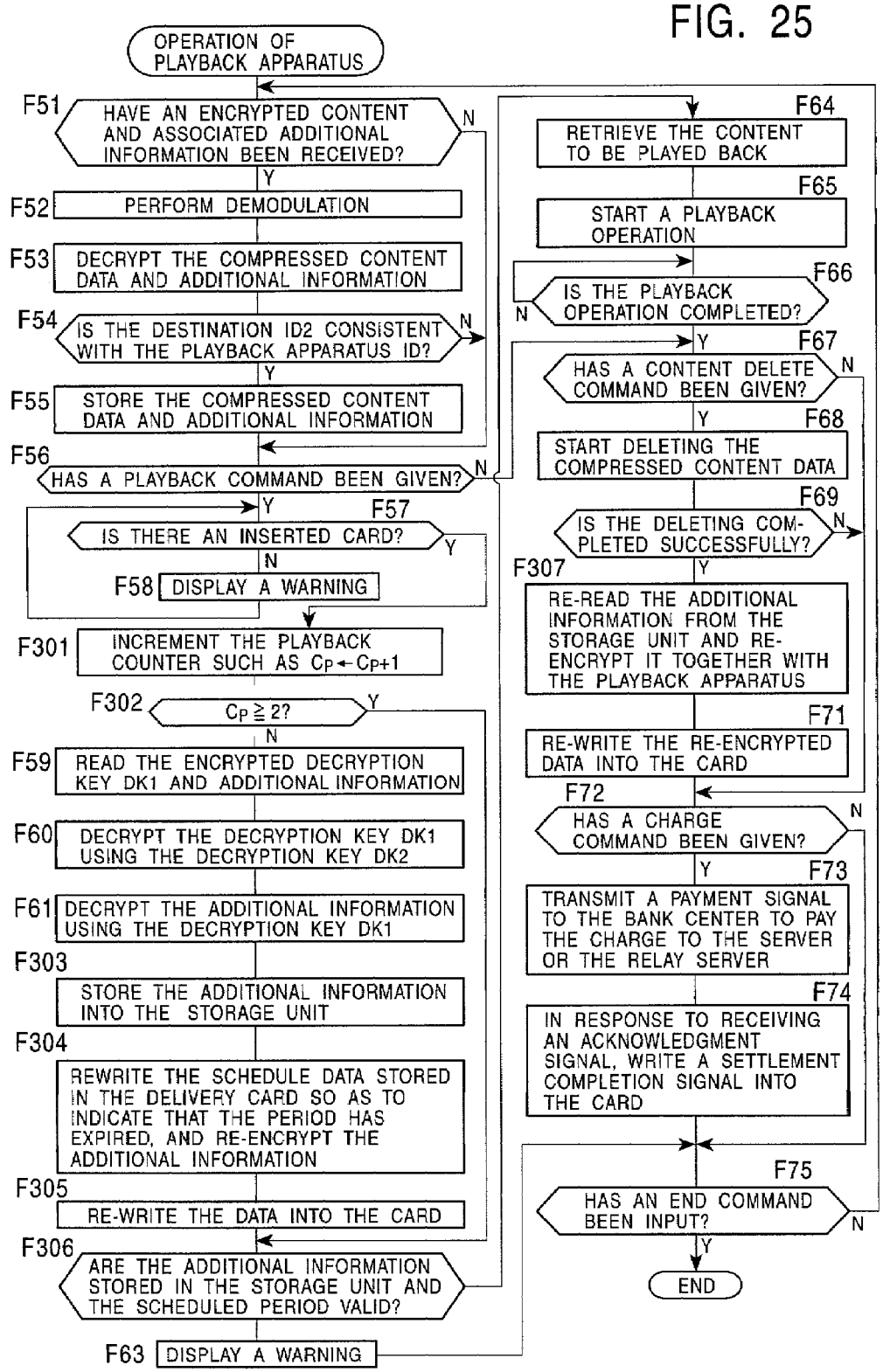
FIG. 25 is a flow chart illustrating a process performed by the playback apparatus according to a fifth embodiment of the present invention.

The process performed by the playback apparatus 3 is described below with reference to FIGS. 25 and 26. In FIG. 25, similar steps to those shown in FIG. 9 are denoted by similar step numbers, and they are not described in further detail herein.

In the fifth embodiment, if a playback command issued by a human operation is detected in step F56, and if it is determined in step F57 that a delivery card 4 is inserted, the process proceeds to step F301 in which the internal counter of the authentication/write/delete controller 206 serving as a playback counter Cp is incremented.

In step F302, it is determined whether the value of the playback counter Cp is equal to or greater than 2. The process branches to different steps depending upon the counter value.

Figure 26:
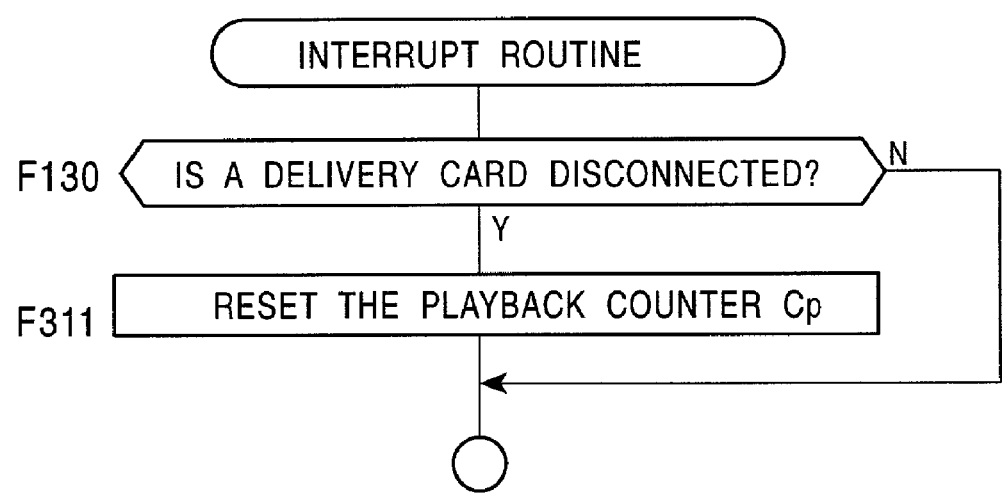
FIG. 26 is a flow chart illustrating a process performed by the playback apparatus according to the fifth embodiment of the present invention.

The playback counter Cp is reset by an interrupt routine shown in FIG. 26.

That is, if the card read/write controller 205 detects that the delivery card 4 has been removed, the authentication/write/delete controller 206 performs the interrupt routine shown in FIG. 26. That is, in step F311, after detecting removal in step F310, the playback counter Cp is reset to 0.

Because the playback counter Cp is incremented in step F301 in FIG. 25 when the delivery card 4 remains in the inserted state, but it is reset when the delivery card 4 is removed, the value of the playback counter Cp indicates the number of times the content data has been played back while maintaining the delivery card 4 in the inserted state.

When the content data is played back for the first time after the delivery card 4 is inserted, the playback counter Cp has a value of 1.

In this case, the process proceeds from step F302 to step F59 in which the card read/write controller 205 reads the encrypted decryption key DK1 and the additional information from the delivery card 4.

In step F60, the decryption key DK1 is decrypted using the decryption key DK2 generated by the key generator 204. In step F61, the additional information is decrypted using the decryption key DK1.

In step F303, the decrypted additional information is stored into the storage unit 209 under the control of the authentication/write controller 106.

In the next step F304, the authentication/write controller 106 rewrites the schedule information included in the additional information so as to indicate that the playing period has expired. The resultant additional information now indicating that the playing period has expired is encrypted by the encryption unit 220 and transferred to the card read/write controller 205. In step F305, the additional information is written into the delivery card 4.

For example, if the playing period indicated by the schedule information read from the delivery card 4 before performing the rewriting is "2001.1.1-2001.3.31", and if the present date is Dec. 30, 2000, then the schedule information stored in the delivery card 4 is rewritten into, for example, "2000.1.1-2000.3.31" so as to indicate that the playing period has expired.

That is, if the additional information is read again in steps F59 to F61 after the delivery card 4 was removed, the additional information is rewritten so as to indicate that the playing period has expired.

If, in step F302, the playback counter Cp is detected as being equal to 1, when the content data is played back for the first time after inserting the delivery card 4, steps F59 to F305 are performed first and then the process proceeds to step F306.

However, if the playback counter Cp detected in step F302 is equal to or grater than 2, when the content data is played back a second or later time after inserting the delivery card 4, the process proceeds directly to step F306 without performing steps F59 to F305.

In step F306, the authentication/write controller 206 determines whether the additional information which was received together with the content data from the relay server 2 and stored in the storage unit 209 via the process from step F52 to step F55 is identical to the additional information which was read from the delivery card 4 and stored in the storage unit 209 via the process from step F59 to step F303. If they are identical to each other, the authentication/write controller 206 further determines whether the present time is within the allowed playing period indicated by the schedule information included in the additional information.

That is, when the content data is tried to be played back for the first time after the delivery card 4 is inserted, the additional information is read from the delivery card 4 and is compared with the additional information which has been received via electronic transmission, and then the schedule information is checked.

In the case where the additional information is valid and the present time is within the allowed playing period, the process proceeds to step F64. However, in the case where the additional information is invalid or in the case where the present time is not within the allowed playing period although the additional information is valid, the process proceeds to step F63 to display a warning on the display unit 213 because the contract does not allow the content data to be played back. The process then proceeds to step F75.

As a matter of course, as in the first embodiment described earlier with reference to FIG. 9, in the case where the content data is tried to be played back when the delivery card 4 corresponding to the content data is not inserted or in the case where the playing period allowed for the content data has already expired, it is determined in step F306 that the required playback condition is not met, and a warning is displayed. In such a case, the content data is not allowed to be played back, as in the process according to the first embodiment described above with reference to FIG. 9.

In the present embodiment, not only in such a situation, but step F306 determines that the playback condition is not met, and the playing back of the content data is disabled also in the case where the content data is tried to be played back by re-inserting the delivery card 4 which was removed, even if the present time is within the playing period.

That is, as described above, In step F306, the authentication/write controller 206 determines whether when the content data is tried to be played back for the first time after inserting the delivery card 4, it is determined in step F306 whether the additional information read from the delivery card 4 is identical to the additional information received from the relay server 2 via electronic transmission. Note that the schedule information of the delivery card 4 has been rewritten in step F305 so as to indicate that the allowed playing period has expired.

If a playback command is issued after re-inserting the delivery card 4 which was removed once during the allowed playing period, it is determined in step F302 that the playback counter Cp has a value equal to 1 because the playback counter Cp was reset to 0 in the process shown in FIG. 26 when the delivery card 4 was removed, and thus steps F59 to F305 are performed.

In this case, because the additional information including the rewritten schedule information is compared, in step F306, with the additional information including the original schedule information which has been received via electronic transmission, it is determined that they are not identical to each other, that is, it is determined that the playing period is invalid.

In this case, a warning is displayed in step F63, and the content data is not allowed to be played back.

When the delivery card 4 remains in the inserted state without being removed, it is determined in step F306 that the additional information is valid, because, in this case, the original additional information which was read from the delivery card 4 and stored, in step F303, into the storage unit 209 without being changed is compared with the additional information which was received via electronic transmission.

Therefore, as long as the delivery card 4 maintained in the inserted state without being removed, the process proceeds to step F64 in which the content data to be played back is retrieved from the compressed data storage unit 208, and the retrieved content data is started to be played back in the next step F65.

In the case where the playback command from the user control unit 210 is not detected in step F56, or in the case where completion of playback operation is detected in step F66, the process proceeds to step F67 to determine whether a command to delete the content data has been issued from the user control unit 210. If the delete command is detected, the process proceeds to step F68.

Deleting the content data is performed by the playback apparatus 3 when the allowed playing period has expired.

As in the first embodiment described earlier with reference to FIG. 9, the deleting is performed such that the content data is deleted, in step F68, from the compressed data storage unit 208 and then it is confirmed in step F69 that the content data has been successfully deleted. However, in the present embodiment, after confirming that the content data has been deleted successfully, the process proceeds to step F307 to rewrite the additional information of the delivery card 4 into the original one.

More specifically, the authentication/write/delete controller 206 reads the original additional information which is retained in the storage unit 209 without being changed, and sets the deletion-from-playback-apparatus flag so as to indicate that the content data has been deleted. The resultant additional information is encrypted by the encryption unit 220 and transferred to the card read/write controller 205.

In step F71, the additional information including the deletion-from-playback-apparatus flag is written into the inserted delivery card 4 via the card interface 211 under the control of the card read/write controller 205.

That is, before returning the delivery card 4, the schedule information which was changed is rewritten so as to have the original value, and the deletion-from-playback-apparatus flag is added to the additional information.

When the server 1 checks the additional information described in the returned delivery card 4, no problem occurs because the schedule information has the correct value.

As described earlier with reference to the first embodiment, it is required that when the delivery card 4 is returned to the relay server 2, the relay server 2 can read the content ID from the delivery card 4 without having to use the decryption key. To this end, in the process performed in steps F70 and F71, the content ID is not encrypted while the other data of the additional information is encrypted.

[I(5)] Advantages

The fifth embodiment has the advantages described below in addition to the advantages (1) to (8) described above with reference to the first embodiment.

(15) After inserting the delivery card 4 into the playback apparatus 4, the delivery card 4 is required to be maintained in the inserted state during the allowed paying period. To further playback the content data in the playing period, the delivery card 4 must be maintained in the inserted state without being removed. This prevents the delivery card 4 from being dealt with for another purpose during the playing period, and thus prevents the additional information or the flag described in the delivery card 4 from being rewritten in an unauthorized fashion.

More specifically, this prevents the schedule information from being changed such that the allowed playing period is extended. Furthermore, the content data is prevented from being played back in an unauthorized fashion. Still furthermore, the destination identifier ID2 is prevented from being changed. Note that if the destination identifier ID2 is changed, the delivery card 4 can be used by a playback apparatus having the changed destination identifier ID2.

(16) If the delivery card 4 is removed after the expiration of the playing period and before deleting the content data, the schedule information of the delivery card 4 is rewritten into a value different from the value which was originally assigned to the playback apparatus 3. Therefore, the server 1 can check whether the delivery card 4 was inadequately removed from the playback apparatus 3 by examining the schedule information stored in the returned delivery card 4. The server 1 can take adequate action if necessary.

Sixth Embodiment

[A(6)] Outline

A sixth embodiment is described below. In the sixth embodiment, the playback apparatus 3 has a capability of transmitting a request message to the server 1 to ask it to extend the playing period. If the request is accepted, it becomes possible for the playback apparatus 3 to update the additional information. More specifically, the playback apparatus 3 can update the schedule information described in the delivery card 4 so that the playback apparatus 3 can play back the content data during the extended period.

Figure 27:
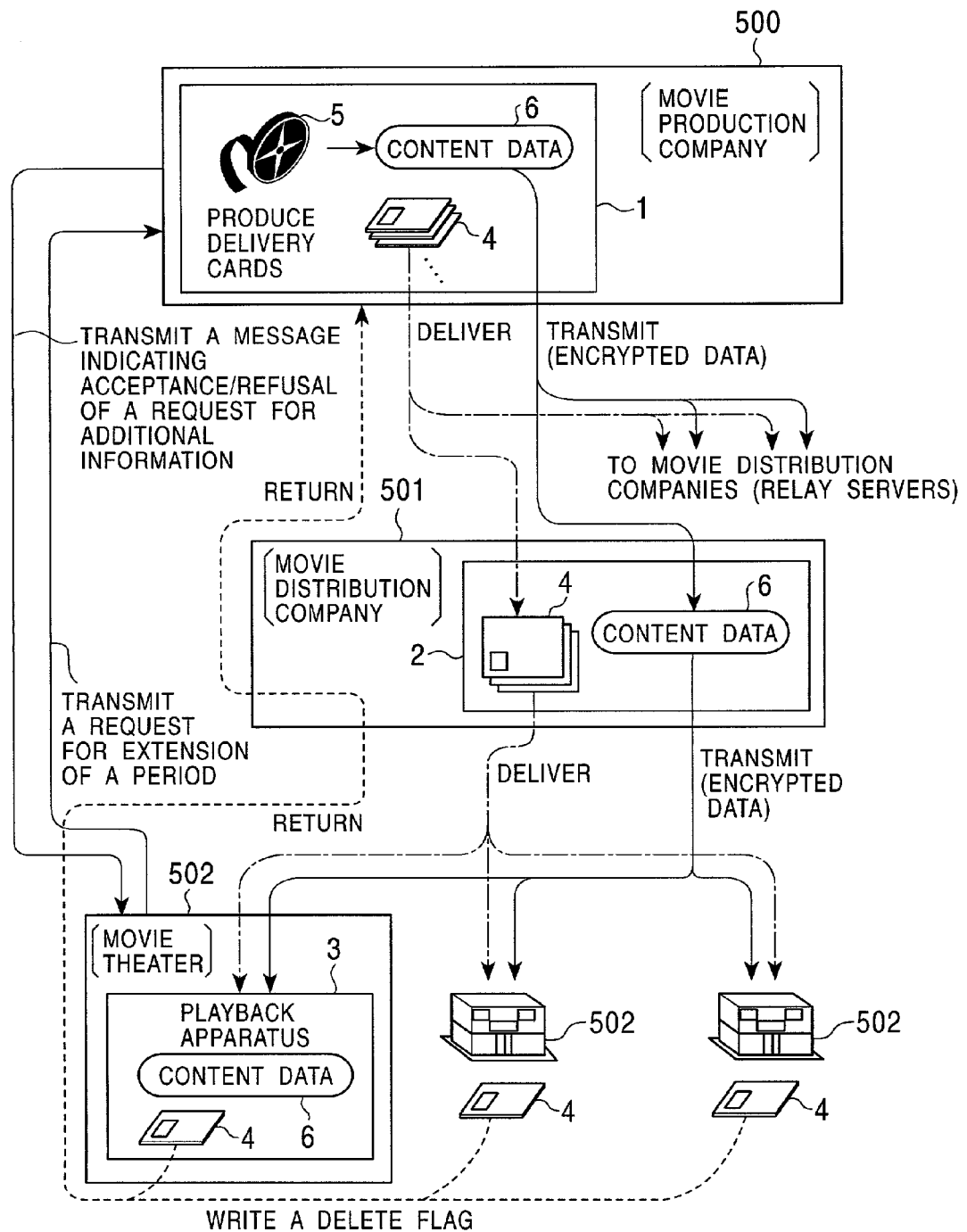
FIG. 27 is a schematic diagram illustrating a movie distribution system according to a sixth embodiment of the present invention.

FIG. 27 illustrates the flows of information and the delivery card 4. The content data 6 is transmitted and the delivery card 4 is delivered and returned in similar manners to those shown in FIG. 2 except that the playback apparatus 3 can transmits a request for extending the playing period to the server 1.

In response to receiving the request, the server 1 determines whether or not to permit the extension. When the server 1 decides to permit the extension, the server 1 transmits, to the playback apparatus 3, a message indicating that additional information including schedule information having a value corresponding to an extended period is allowed to be employed as new additional information.

Upon receiving the permission message, the playback apparatus 3 updates the additional information stored in the delivery card 4 and that stored in the storage unit 209 of the playback apparatus 3 so that the playback apparatus 3 can playback the content data during the extended playback period.

When the request for extension of the playback period is refused by the server 1, the playback apparatus 3 cannot update the additional information to extend the playing period.

The transmission of the period extension request from the playback apparatus 3 to the server 1 and the transmission of the new additional information from the server 1 to the playback apparatus 3 may be performed via the relay server 2.

The reception of the period extension request, the decision on whether to permit the extension of the period, and the transmission of the new additional information may be performed by the relay server 2.

Although in the present embodiment, the rewriting of the additional information is performed by the playback apparatus 3, the delivery card 4 may be returned to the server 1 or the relay server 2 and the server 1 or the relay server 2 may rewrite the additional information stored in the delivery card 4.

The extension of the playing period may be permitted not only in response to a request issued by the playback apparatus 3, but the playing period may also be extended by the relay server 2 or the server 1 according to their will. That is, the movie production company 500 or the movie distribution company 501 may extend the playing period during which the movie is allowed to be shown in the movie theater 502 even if an extension request is not issued by the movie theater 502.

The period extension request issued by the playback apparatus 3 may be generated in various forms, and a period extension permission message transmitted in response to the period extension request may be generated in various forms.

First, the playback apparatus 3 generates a period extension request including new additional information which includes new schedule information indicating a new desired playing period. The generated period extension request is transmitted to the server 1. The server 1 determines whether to accept the new additional information and transmits a permission/refusal message together with encrypted new additional information. In accordance with the received message, the playback apparatus 3 rewrites the current additional information into the new additional information. The process associated with extension of the playing period, which will be described later, is also performed in a similar manner.

In response to the period extension request issued by the playback apparatus 3, the server 1 not only determines whether to accept the new additional information including the new desired schedule information, but the server 1 may modify the new additional information. In this case, the server 1 transmits the modified new additional information together with the permission message to the playback apparatus 3. The playback apparatus 3 rewrites the current additional information in the received new additional information.

Alternatively, the playback apparatus 3 may simply issue a request for extension of the playing period. In response to the request, the server 1 may determine a new extended playing period and creates new additional information including new schedule information indicating the new extended playing period. The created new additional information is transmitted to the playback apparatus 3. The playback apparatus 3 updates the additional information in accordance with the received new additional information.

The information transmitted between the playback apparatus 3 and the server 1 to extend the period is not limited to the above examples, but the information may also be formed in various fashions so that the period can be extended in response to the request issued by the playback apparatus 3.

[B(6)] Configuration of Server

Figure 28:
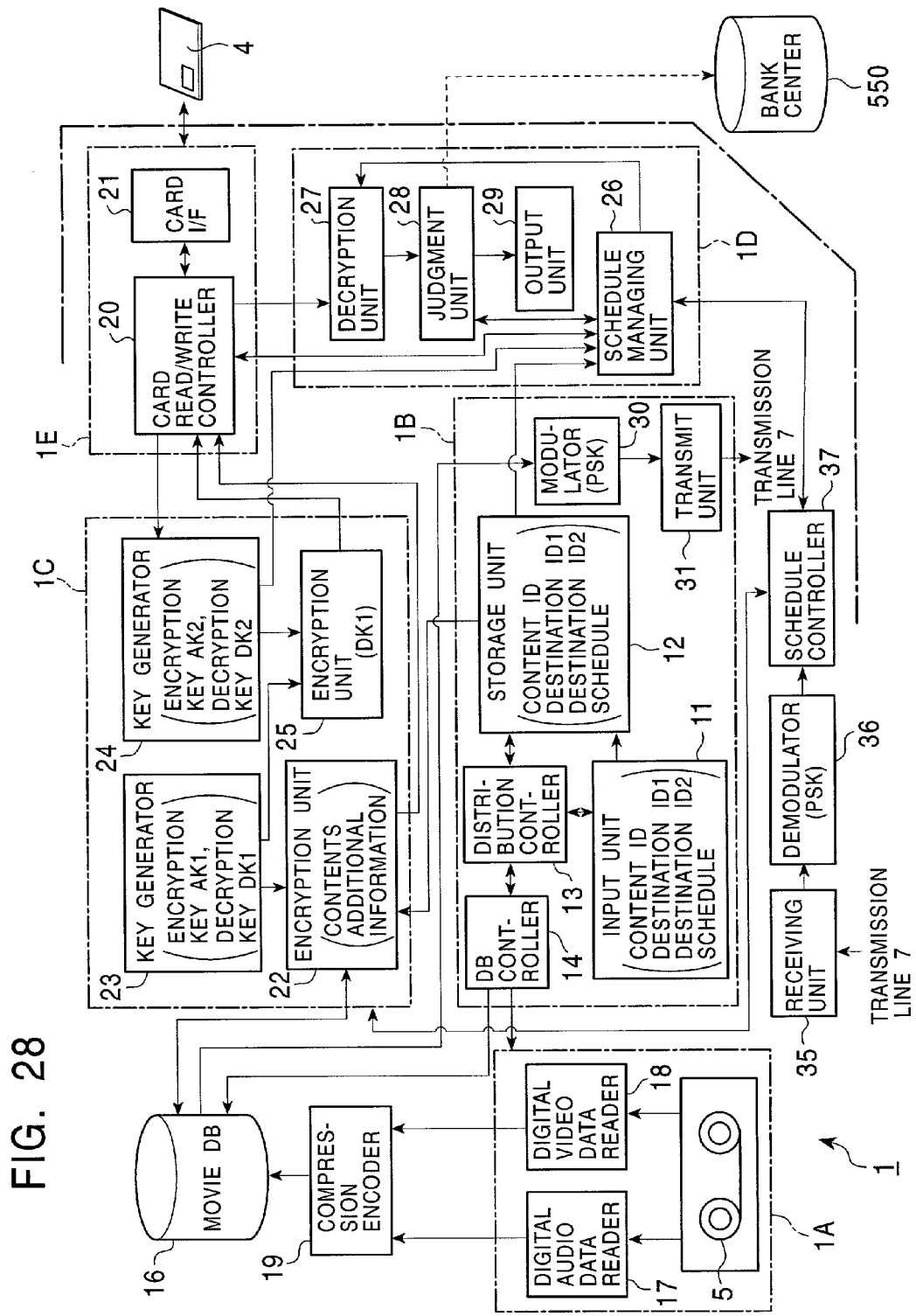
FIG. 28 is a block diagram illustrating a server according to the sixth embodiment of the present invention.

FIG. 28 illustrates the configuration of the server 1. As shown in FIG. 28, the server 1 includes a receiving unit 35, a demodulator 36, and a schedule controller 37 in addition to the parts shown in FIG. 3.

The receiving unit 35 receives information via the transmission line 7. In particular, the receiving unit 35 is used to receive a period extension request issued by the playback apparatus 3.

In the case where PSK-modulated information is received, the demodulator 36 performs PSK demodulation upon the received signal.

The received information, that is, the period extension request from the playback apparatus 3, is supplied to the schedule controller 37 after being demodulated.

The period extension request is assumed to include new additional information including new schedule information requested by the playback apparatus 3.

From the additional information included in the period extension request received from the playback apparatus 3, the schedule controller 37 detects the extended period requested by the playback apparatus 3. The schedule controller 37 then checks whether the additional information (data such as the content ID other than the schedule information) is identical to the additional information stored in the schedule managing unit 26. The schedule controller 37 determines whether to permit the extension of the playing period requested by the playback apparatus 3, on the basis of the result of the checking of the validity of the additional information and in accordance with an extension permission judgment program or in accordance with a command issued via the input unit 11.

When the schedule controller 37 decides to permit the extension, the schedule controller 37 transmits new additional information to the encryption unit 22. After being encrypted by the encryption unit 22, the new additional information is transmitted together with a signal indicating the permission to the playback apparatus 3 via the modulator 30 and the transmitting unit 31.

As described above, the schedule controller 37 may modify the new additional information requested by the playback apparatus 3. For example, the playing period may be extended to a period shorter than is requested, and the resultant new additional information is transmitted after being encrypted.

[C(6)] Configuration of Card

The configuration of the delivery card 4 is similar to that shown in FIG. 4.

[D(6)] Configuration of Relay Server

The configuration of the relay server 2 is similar to that shown in FIG. 5.

[E(6)] Configuration of Playback Apparatus

Figure 29:
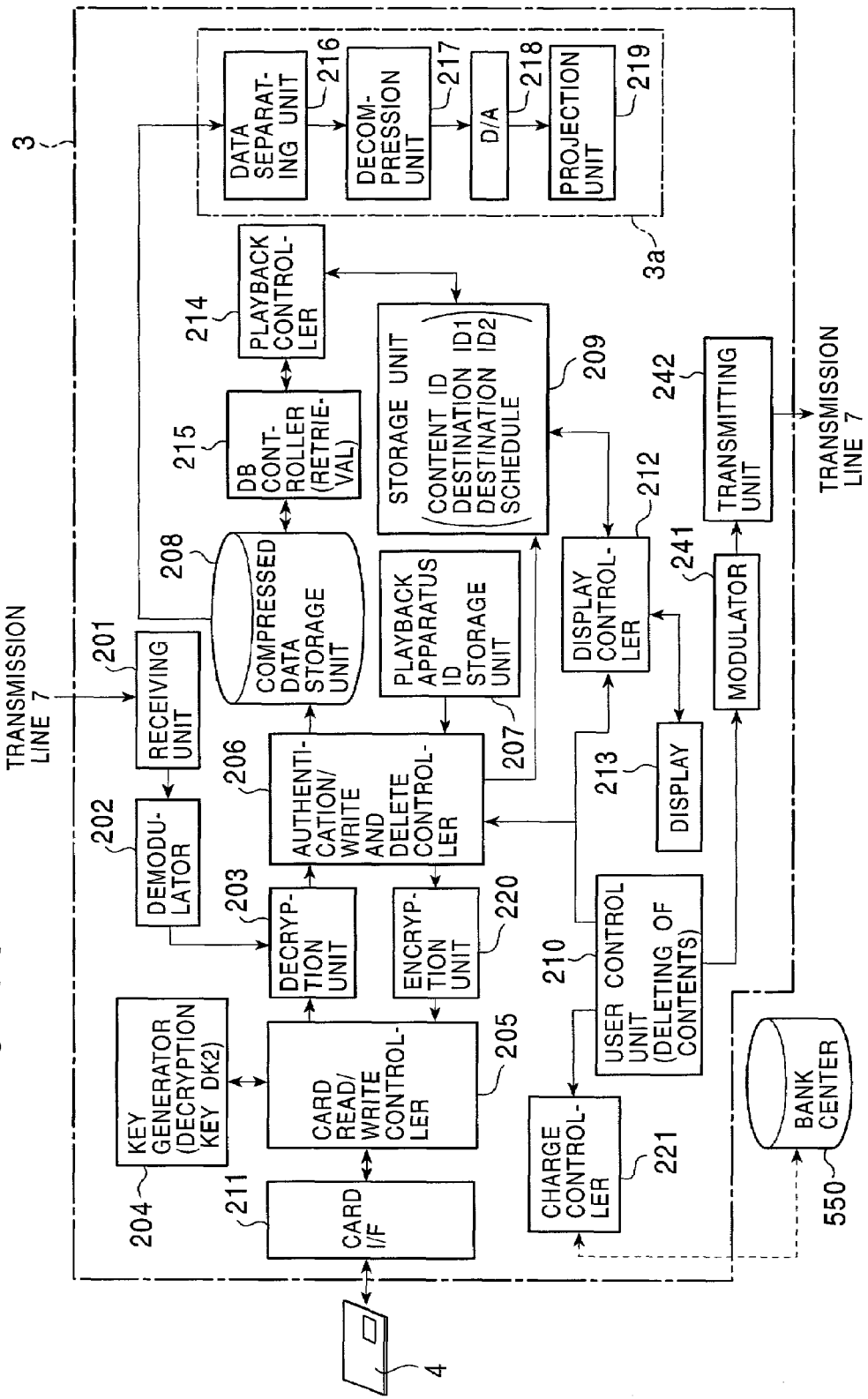
FIG. 29 is a block diagram illustrating a playback apparatus according to the sixth embodiment of the present invention.

FIG. 29 illustrates the structure of the playback apparatus 3. As shown in FIG. 29, the playback apparatus 3 includes a modulator 241 and a transmitting unit 242 in addition to the parts shown in FIG. 6.

That is, the playback apparatus 3 is constructed so as to having a capability of transmitting a period extension request to the server 1.

When the period extension request is transmitted, new additional information including schedule information indicating a desired period is created in accordance with data input by a human operator via the user control unit 210. For example, the content of the additional information which corresponds to a certain content data and which is stored in the storage unit 209 is displayed on the display unit 213 so that the human operator can change the date value of the schedule information indicating the playing period by operating the user control unit 210.

The new additional information created by the playback apparatus 3 in the above-described manner is supplied to modulator 241 and PSK-modulated. The modulated new additional information is transmitted from the transmitting unit 242 to the server 1 via the transmission line 7.

On the other hand, the signal indicating the permission/refusal of the new additional information and the encrypted new additional information from the server 1 are received by the receiving unit 201 and PSK-demodulated by the demodulator 202. Thereafter, the permission/refusal signal and the new additional information are decrypted by the decryption unit 203 in a manner similar to that in which the received content data is decrypted, and the decrypted signal and information are applied to the authentication/write/delete controller 206.

In accordance with the new additional information received together with the permission message, the authentication/write/delete controller 206 updates the additional information stored in the storage unit 209.

Furthermore, the received new additional information is encrypted by the encryption unit 220 and transmitted to the card read/write controller 205. The card read/write controller 205 writes the encrypted new additional information into the inserted delivery card 4.

[F(6)] Process Performed by Server

Figure 30:
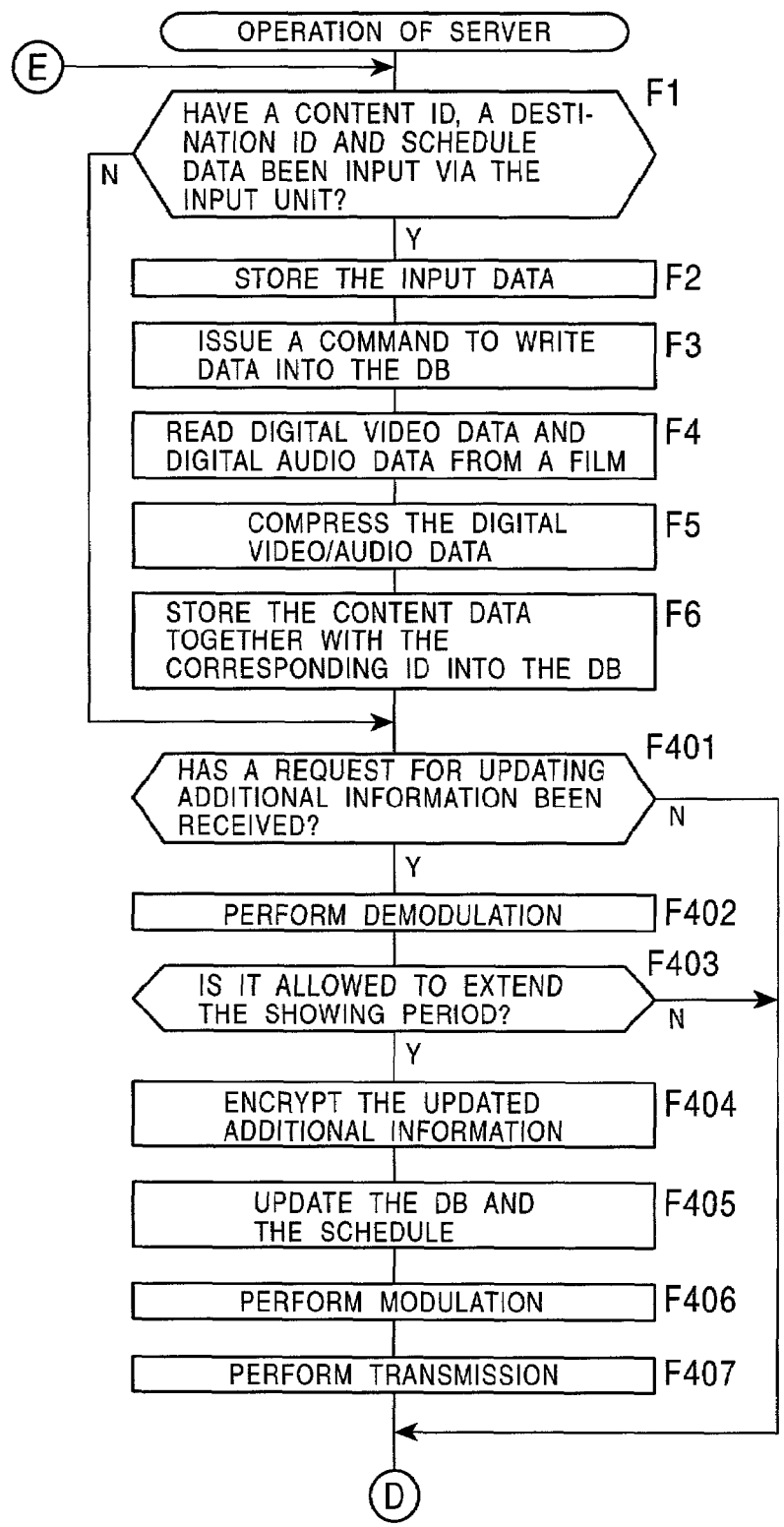
FIG. 30 is a flow chart illustrating a process performed by the server according to the sixth embodiment of the present invention.
Figure 31:
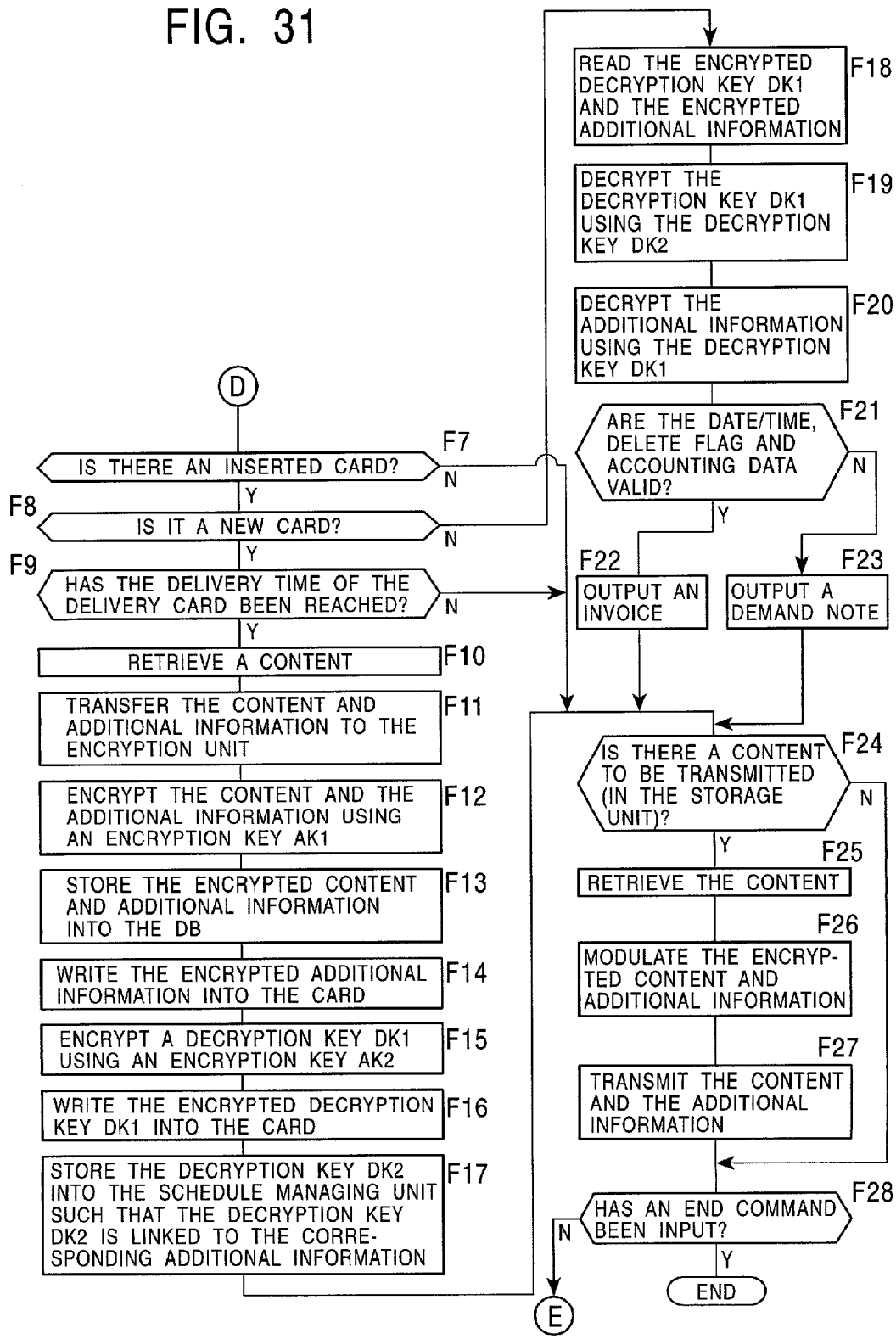
FIG. 31 is a flow chart illustrating a process performed by the server according to the sixth embodiment of the present invention.

The flow chart of the process performed by the server is shown in FIGS. 30 and 31. In these figures, steps F1 to F6 and steps F7 to F28 are similar to steps having similar step numbers shown in FIG. 7. That is, the inputting of additional information, conversion of a film 5 into content data, encryption, transmission of content data and additional information, production of a delivery card 4, and checking of a returned delivery card 4 are performed in similar manners to those shown in FIG. 7.

These steps are not described in further detail, but the process performed in response to receiving a period extension request from the playback apparatus 3 is described below.

In step F401, the receiving unit 407 monitors whether a period extension request has been received together with new additional information from the playback apparatus 3. When the request is not detected, the process proceeds from step F401 to step F7 shown in FIG. 31 to perform a process associated with the delivery card 4.

In the case where the receiving unit 35 detects that the period extension request issued by the playback apparatus 3 has been received, the process proceeds from step F401 to F402. In step F402, the demodulator 36 demodulates the received signal, and the resultant demodulated information is supplied to the schedule controller 37. Thus, the schedule controller 37 acquires the new additional information requested by the playback apparatus 3 as well as the period extension request.

In step F403, the schedule controller 37 examines the content of the acquired new additional information and determines whether the extension of the playing period should be permitted.

More specifically, the schedule controller 37 compares the received new additional information and the additional information (having the same content ID as that of the received new additional information) stored in the schedule managing unit 26 to check whether data other than the schedule information are identical. Furthermore, in accordance with a judgment program, the schedule controller 37 determines whether the extension of the period is permitted or refused. For example, the judgment program judges whether the additional information is consistent and/or whether the schedule information included in the new additional information has a proper value within an allowable range, and the judgment program determines whether the request for extension should be permitted or refused, depending upon the result of the judgment.

The judgment, for a movie theater which has issued a request for extension and which is indicated by the destination identifier ID2, may be made using the judgment program, on the basis of other items such as the contract condition, the playing history of the movie theater 502, or the history of violence of the contract. Alternatively, taking into these conditions and factors, a human operator may input a permission/refusal command via the input unit 11. Still alternatively, the human operator may input a condition, and the schedule controller 37 may determine whether to accept or refuse the request in accordance with the input condition.

In the case where it is determined that the extension should be refused, the process proceeds from step F403 to step F7 shown in FIG. 31. In this case, the permission message and the encrypted new additional information are not transmitted to the playback apparatus 3.

Although not shown in the flow charts, when the extension request is refused, it is preferable to transmit a refusal message to the playback apparatus 3.

In the case where the extension is permitted, the process proceeds to step F404 in which the encryption unit 22 encrypts the new additional information under the control of the schedule controller 37. In step F405, the additional information described together with the content data in the movie database 16 is updated in accordance with the new additional information. That is, the old additional information in the movie database 16 is replaced with the new additional information decrypted by the decryption unit 22.

In step F406, the updated new additional information is then read from the movie database 16 and transmitted to the modulator 30 and PSK-modulated. In step F407, the resultant PSK-modulated additional information is transmitted from the transmitting unit 31 to the playback apparatus 3.

[G(6)] Process Performed by Relay Server

The process performed by the relay server 2 is similar to that shown in FIG. 8.

[H(6)] Process Performed by Playback Apparatus

The process performed by the playback apparatus 3 is described below with reference to FIGS. 32 and 33. In these figures, similar steps to those shown in FIG. 9 are denoted by similar step numbers, and they are not described in further detail herein. The process is similar in that the received content data can be played back if it is determined that the additional information received via electronic transmission and the additional information recorded in the delivery card 4 are identical to each other, and if the schedule information is valid. The process performed in response to a command to delete the content data and the process performed in response to a pay command are also similar.

When it is desired to extend the playing period of content data which is within the currently allowed playing period or whose playing period has expired, the operator of the playback apparatus 3 inputs new additional information indicating a desired new period via the user control unit 210.

Figure 32:
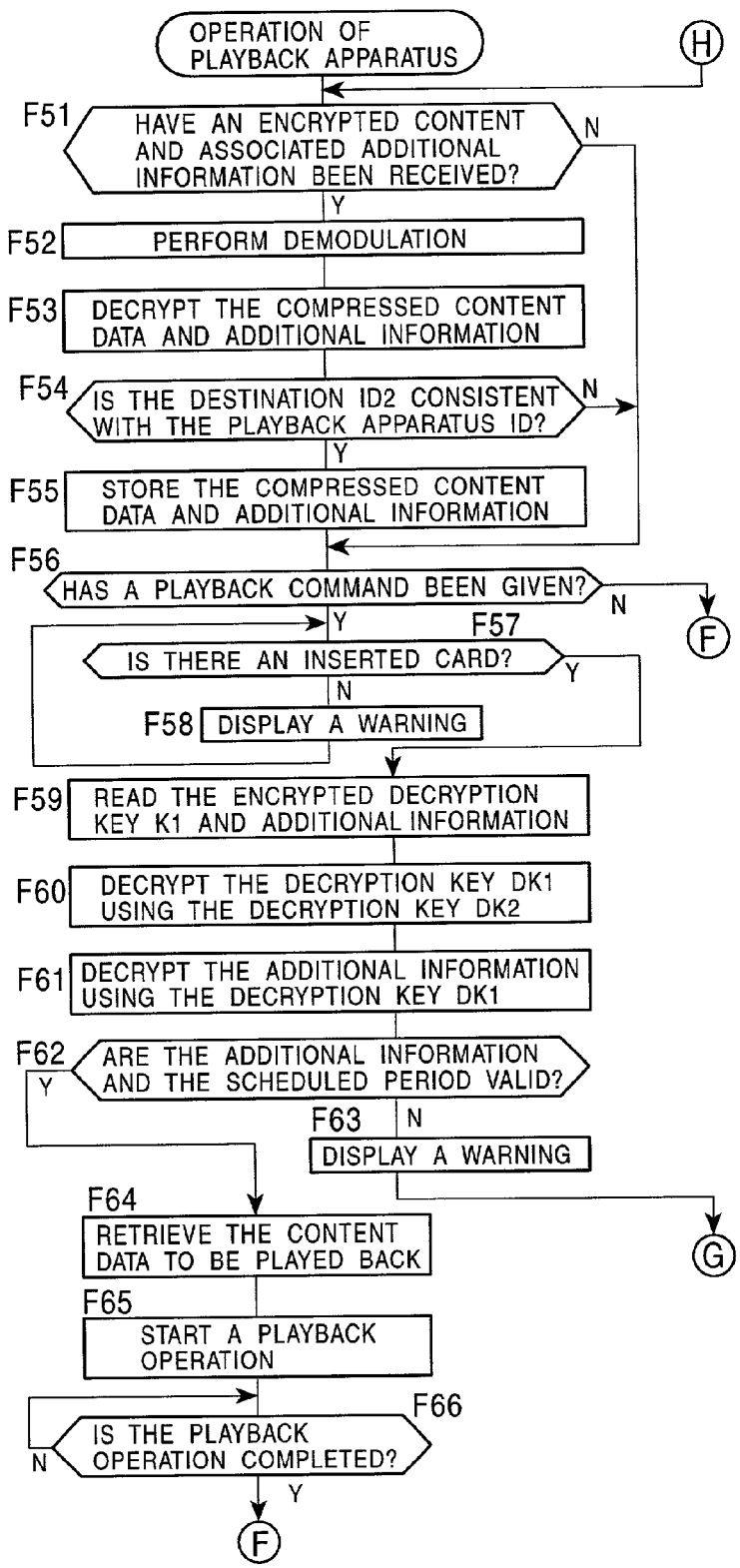
FIG. 32 is a flow chart illustrating a process performed by the playback apparatus according to the sixth embodiment of the present invention.
Figure 33:
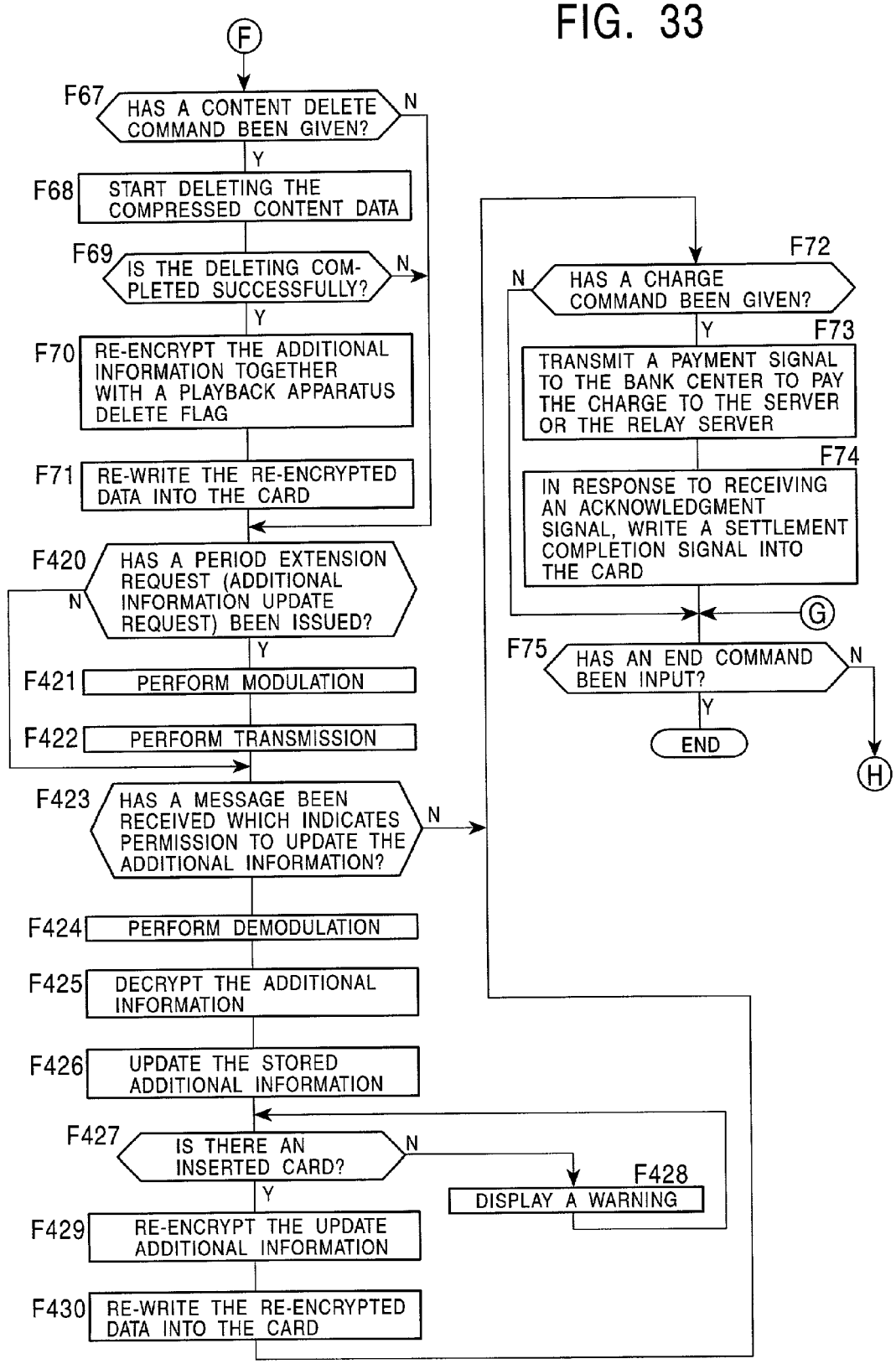
FIG. 33 is a flow chart illustrating a process performed by the playback apparatus according to the sixth embodiment of the present invention.

In the process performed by the playback apparatus 3, as shown in FIGS. 32 and 33, issuing of a period extension request by a human operator is monitored in step F420.

If new additional information including schedule information indicating a desired playing period is input thereby issuing a period extension request, the process of the playback apparatus 3 proceeds from step F420 to F422. In step F422, the modulator 241 modulates the input new additional information together with the extension request message. In step F422, the modulated new additional information is transmitted from the transmitting unit 242 to the server 1.

In response to receiving the period extension request, the server 1 performs the process described earlier. In the case where the request is accepted, a permission massage is transmitted together with encrypted new additional information.

In step F423, reception of the permission message and the encrypted new additional information transmitted from the server 1 is monitored. When reception is not detected, the process awaits the arrival of the permission message while repeating the monitoring process in steps F72, F75, F51, and F56.

If the receiving unit 201 receives the extension permission message and the encrypted new additional information from the server 1, the process proceeds from step F423 to F424. In F424, the received message and information are demodulated by the demodulator 202. In step F425, the decryption unit 203 decrypts the received new additional information in the encrypted form. The decryption is performed in a manner similar to that in which additional information received together with content data is decrypted.

In the next step F426, the authentication/write/delete controller 206 updates the additional information stored in the storage unit 209 in accordance with the decrypted new additional information.

In step F427, the authentication/write/delete controller 206 checks, via the card read/write controller 205, whether a delivery card 4 is inserted if no inserted delivery card 4 is detected, the process proceeds to step F428 to display a warning on the display unit 213 thereby asking the operator to insert a delivery card 4. The warning is displayed until a delivery card 4 is inserted.

If an inserted delivery card 4 is detected, the process proceeds to step F429 in which the new additional information is encrypted by the encryption unit 220 and transferred to the card read/write controller 205. In step F430, the card read/write controller 205 writes the encrypted new additional information into the delivery card 4. That is, the additional information stored in the delivery card 4 is updated in accordance with the new additional information.

As described above, in the case where the extension is permitted, the additional information stored in the storage unit 209 and the additional information stored in the delivery card 4 are updated in accordance with the new additional information so that the schedule information indicates the extended new playing period. Thus, as long as the present time is within the new allowed paying period, even after the end of the original playing period, it is determined in step F62 that the present time is within the allowed playing period, and the process can proceed to steps F64 and F65 to play back the content data.

[I(6)] Advantages

The sixth embodiment has the advantages described below in addition to the advantages (1) to (8) described above with reference to the first embodiment.

(17) When the playback apparatus 3 (movie theater 502) wishes to extend the playing period for a certain movie, because, for example, the movie is favorably received, the playback apparatus 3 can extend the playing period by issuing a period extension request to the server 1. That is, in the movie distribution system according to the present embodiment, it is possible to flexibly control the allowed playing period. This is very advantageous in managing the movie distribution system.

(18) Requesting the extension of the playing period can be performed simply by transmitting a period extension request from the playback apparatus 3, and the extension can be achieved simply by transmitting a permission message from the server 1 to the playback apparatus 3. That is, extension of the playing period can be easily and quickly performed without needing any complicated operation.

(19) The server 1 can determine whether to permit extension, taking account various factors. This allows the server 1 to manage and control the distribution of the content data. For example, the server 1 can determine whether to permit extension, depending upon whether unauthorized use is performed by an user. This ensures that the contract is well kept and that the copyright is protected in a highly reliable fashion.

Seventh Embodiment

[A(7)] Outline

Now, a seventh embodiment is described below.

Figure 34:
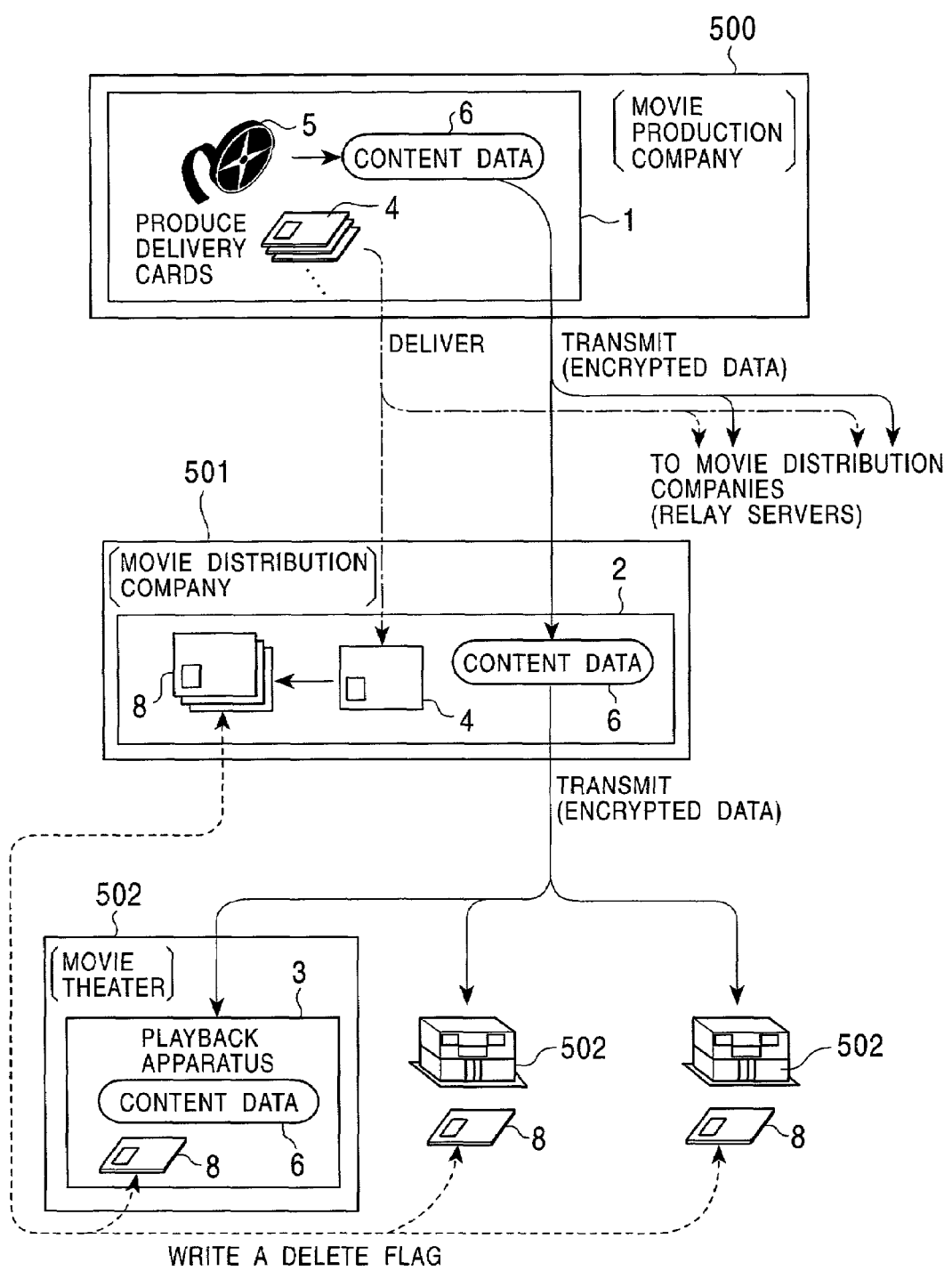
FIG. 34 is a schematic diagram illustrating a movie distribution system according to a seventh embodiment of the present invention.

In the first to sixth embodiments described above, a delivery card 4 issued by the server 1 is delivered to each movie theater 502. In contrast, in this seventh embodiment and also in the following embodiments, each movie theater 502 uses one IC card (one IC card for at lest one content data) to play back a movie. (Hereinafter, the IC card is referred to as a playback card.) FIG. 34 illustrates a movie distribution system according to the seventh embodiment of the present invention. As shown in FIG. 34, the server 1 converts a movie film 5, which has been edited after being shot, into the form of content data 6 so as to be able to be transmitted to movie distribution companies 501 via a transmission line 7.

In addition to the content data 6, the server 7 also produces delivery cards 4 to be distributed to the movie distribution companies 501. The server 1 produces as many delivery cards 4 as there are movie distribution companies 501 to which the delivery cards 4 are to be delivered.

The server 1 encrypts the content data and the associated additional information and transmits them to the relay servers 2 of the respective distribution companies 501. Furthermore, the server 1 sends one delivery card 4 in which the additional information is stored to each movie distribution company 501.

In each movie distribution company 501, the relay server 2 receives the transmitted content data 6 and the associated additional information and also receives the transported delivery card 4.

The relay server 2 performs a necessary process upon the content data 6 and the information stored on the delivery card 4. In particular, the relay server 2 writes the additional information described in the delivery card 4 into the playback cards 8 received from the respective movie theaters 502.

The relay server 2 transmits the encrypted content data 6 and associated additional information to each movie theater 502. Separately, the relay server 2 delivers the a playback card 8 to each movie theater 502.

The playback apparatus 3 in each movie theater 502 receives the content data 6 and the associated additional information. The playback apparatus 3 also reads the additional information and other information stored on the playback card 8 received from the relay server 2. Using a key read from the playback card 8, the playback apparatus 3 decrypts the encrypted content data and additional information, and plays back the content data 6 in accordance with the additional information read from the playback card 8.

When a movie theater 502 wants to receive new content data from the relay server 2, the movie theater 502 sends, in advance, a playback card 8 uniquely assigned to the movie theater 502 to the relay server 2.

In the playback apparatus 3 of the movie theater 502, when the allowed playing period of content data has expired, the content data 6 stored in the playback apparatus 3 is deleted as in the previous embodiments described above. In response to deleting the content data 6, a delete flag indicating that the content data 6 has been deleted is written into the playback card 8.

When the relay server 2 receives the playback card 8 sent from the movie theater 502, the relay server 2 checks the information stored in the playback card 8 to determine whether the corresponding content data 6 was used in an authorized manner. Depending upon the result of the checking, the relay server 2 writes the same additional information as that stored in the delivery card 4 issued by the server 1 into the playback card 8. The resultant playback card 8 is delivered to the movie theater 502 so that the movie theater 502 can use the playback card 8 to play back content data which will be transmitted next.

When the relay server 2 receives the playback card 8 from the movie theater 502, the relay server 2 detects the flags or the like described in the playback card 8 and writes the detected flags together with the identifier (playback ID) uniquely assigned to the playback card 8 into the delivery card 4 and returns the delivery card 4 to the server 1.

The server 1 checks the information described in the received delivery card 4 to determine whether the corresponding content data has been correctly deleted and whether payment for the fee has been correctly made.

[B(7)] Configuration of Server

The configuration of the server 1 is similar to that shown in FIG. 3.

[C(7)] Configuration of Cards

Figure 35A:
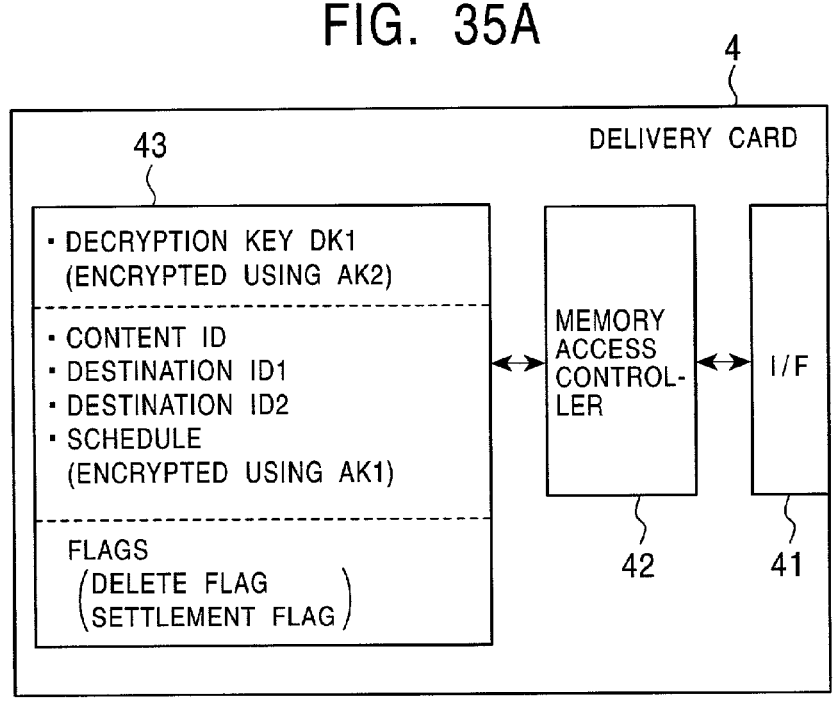
FIG. 35 is a block diagram illustrating a delivery card and a playback card according to the seventh embodiment of the present invention.
Figure 35B:
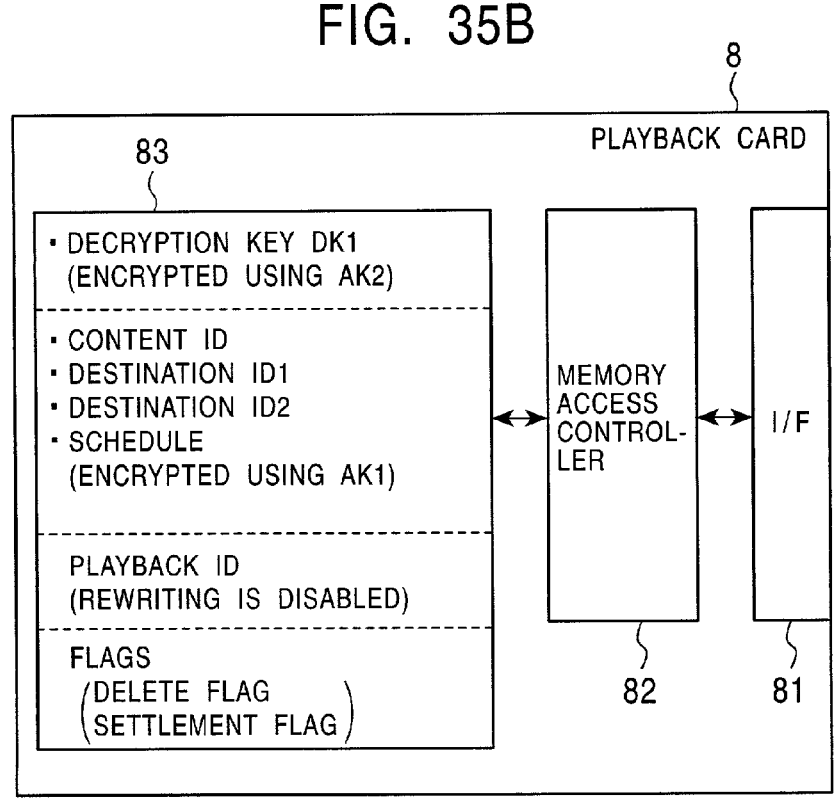

FIGS. 35A and 35B illustrate the configurations of the delivery card 4 and the playback card 8, respectively.

The delivery card 4 includes an interface 41, a memory access controller 42, and a memory 43. As in the delivery card 4 shown in FIG. 4, the decryption key DK1 and the additional information decrypted by the server 1 are written in the delivery card 4.

Note that the delete flag and the settlement completion flag are not recorded by the playback apparatus 3, but these data are copied from the playback card 8 by the relay server 2. Although not shown in the figure, various flags are copied from a plurality of playback cards 8. For this reason, each flag is recorded together with a corresponding playback card ID.

The playback card 8 is similar in structure to the delivery card 4 and includes an interface 81, a memory access controller 82, and a memory 83.

As shown in FIG. 35B, the encrypted decryption key DK1 and the encrypted additional information including the content ID, the destination identifiers ID1 and ID2, and the schedule information are copied by the relay server 2 from the delivery card 4 into the playback card 8. In the delivery card 4, destination identifiers ID2 of all playback apparatuses 3 to which the content data is to be transmitted are recorded. However, only a destination identifier ID2 indicating a playback apparatus 3 which will use a playback card 8 is copied into that playback card 8.

In the playback apparatus 3, a delete flag or a settlement completion flag are recorded in response to deleting process or payment process.

Furthermore, the playback card 8 includes a playback card ID which is an identifier uniquely assigned to the playback card 8. Note that the playback card ID is recorded in such a manner that it cannot be rewritten. In the case where the playback card ID is not consistent with the destination identifier ID2, the data may not be copied to the playback card 8.

[D(7)] Configuration of Relay Server

Figure 36:
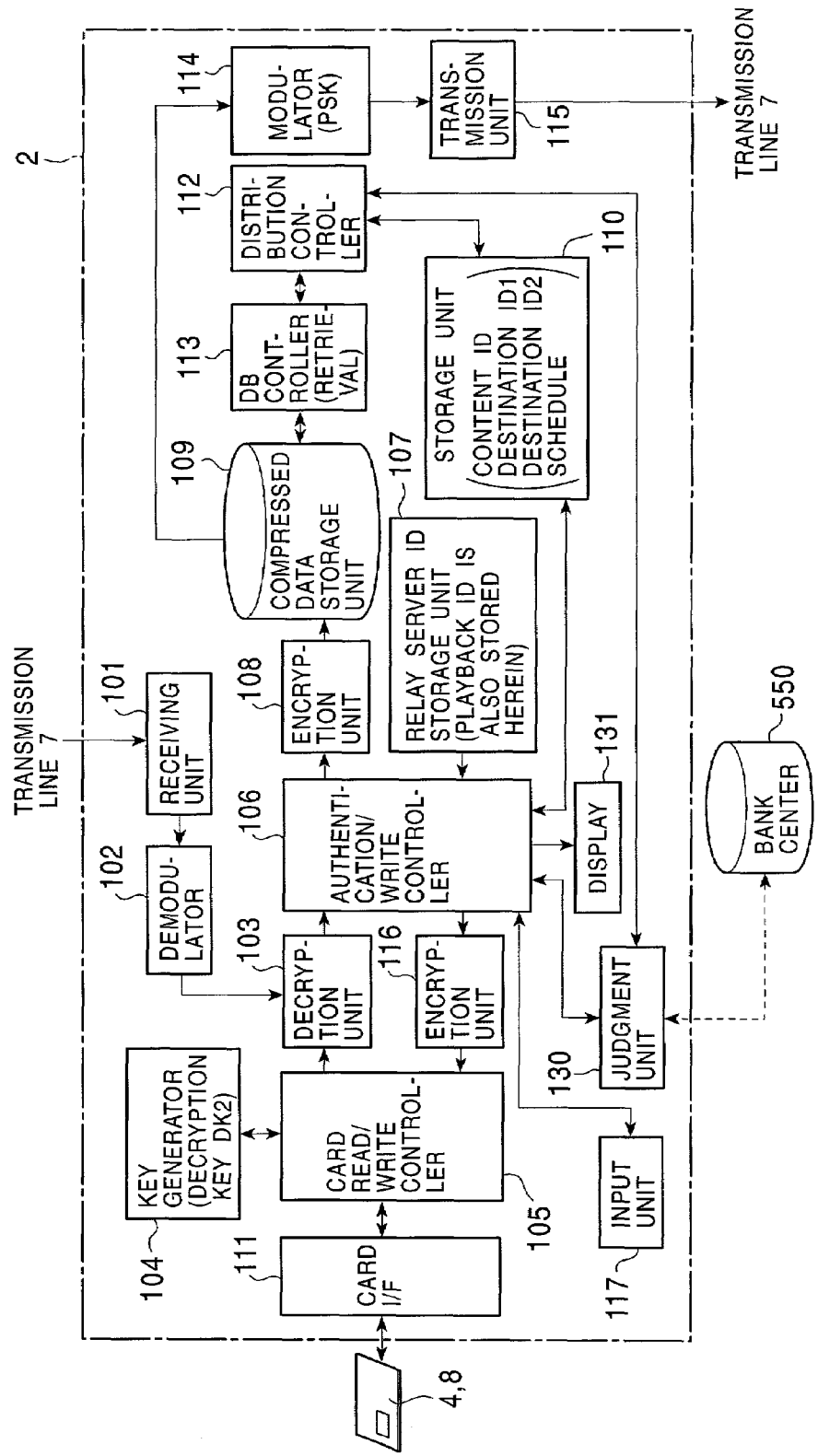
FIG. 36 is a block diagram illustrating a relay server according to the seventh embodiment of the present invention.

FIG. 36 illustrates the configuration of the relay server 2. As shown in FIG. 36, the relay server 2 includes an input unit 117, a judgment unit 130, and a display unit 131, in addition to those parts shown in FIG. 5.

The input unit 117 is used to input various data or commands.

The display unit 131 serves to display various kinds of information, data or operation guides thereby presenting the information to the human user or prompting the user to perform an operation.

The judgment unit 130 judges the status regarding the playback operations performed in the past, on the basis of the additional information or flags stored in the playback card 8 received from the movie theater 502 or by communication with the bank center 550. In accordance with the result of the judgment made by the judgment unit 130, the distribution controller 112 controls the data distribution and the authentication/write controller 106 controls the operation of writing the additional information into the playback card 8.

The relay server ID storage unit 107 stores not only the relay server ID but also the playback card IDs which serves as identifiers of the respective playback cards 8 used by the respective movie theaters 502 (playback apparatuses 3).

Recording the playback card ID in the playback card 8 allows the relay server 2 to identify the corresponding playback apparatus 3 by detecting the playback card ID recorded in the playback card 8. This also makes it possible to produce a playback card 8.

[E(7)] Configuration of Playback Apparatus

The construction of the playback apparatus 3 is similar to that shown in FIG. 6 except that the playback card 8 is employed as the card connected to the card interface 211.

[F(7)] Process Performed by Server The process performed by the server 1 is similar to that shown in FIG. 7. However, information (such as a flag) of a large number of playback card 8 is recorded in each delivery card 4 wherein flags are recorded in correspondence with playback IDs. Therefore, when a returned delivery card 4 is checked in steps F18 to F23, flags are examined to detect the status of the playback apparatuses 3 corresponding to the respective playback card IDs.

[G(7)] Process Performed by Relay Server

Figure 37:
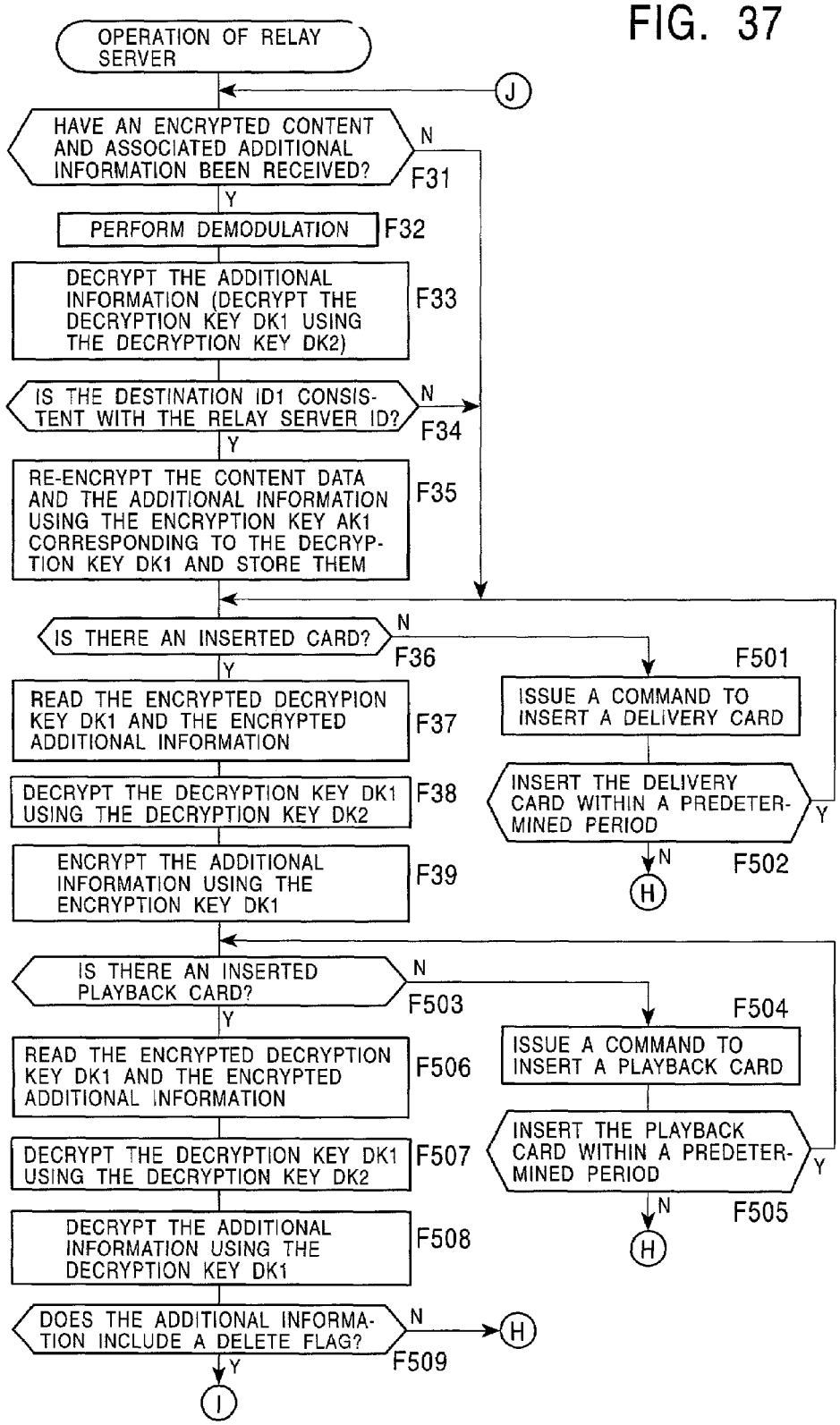
FIG. 37 is a flow chart illustrating a process performed by the relay server according to the seventh embodiment of the present invention.
Figure 38:
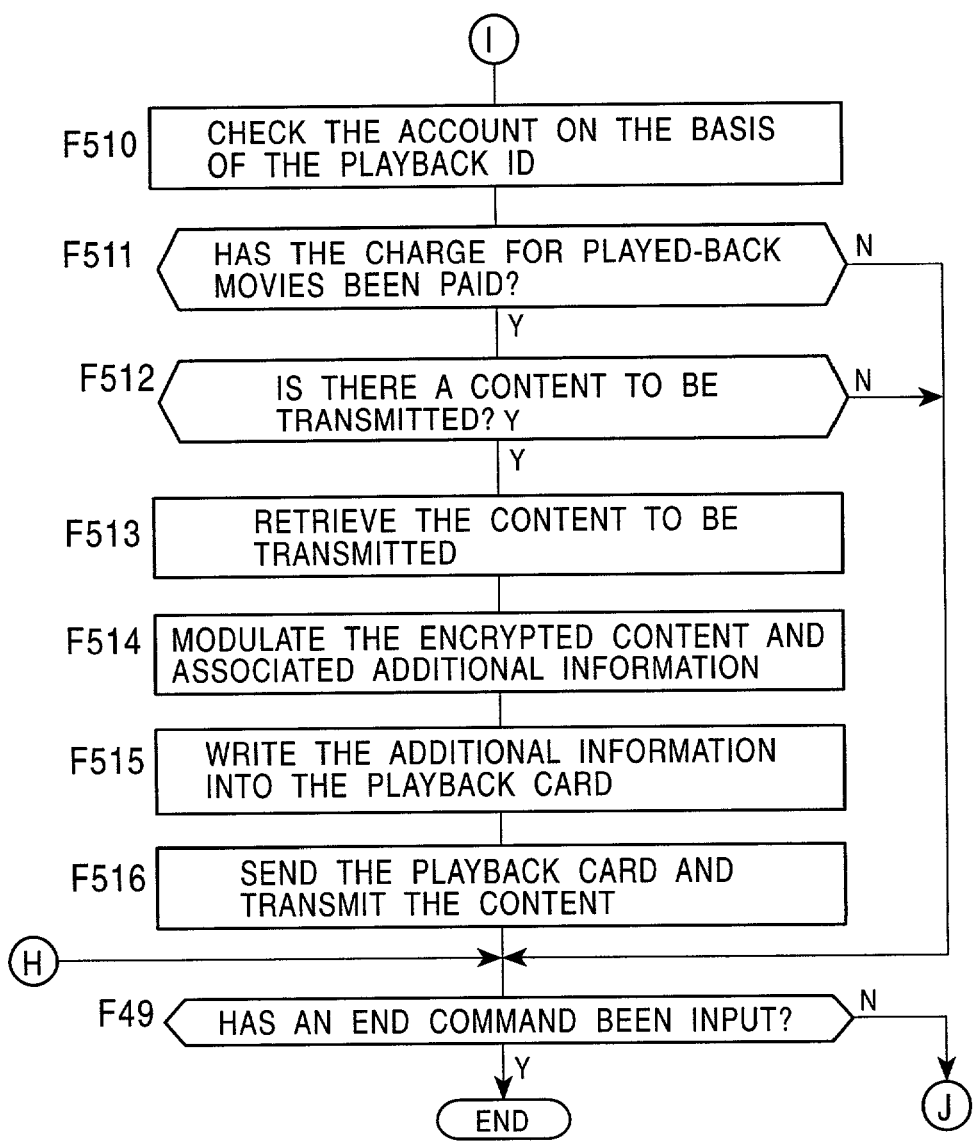
FIG. 38 is a flow chart illustrating a process performed by the relay server according to the seventh embodiment of the present invention.

FIGS. 37 and 38 illustrate the process performed by the relay server 2. In these figures, similar steps to those shown in FIG. 8 are denoted by similar step numbers, and they are not described in further detail herein.

Reception of encrypted content data and additional information from the sever 1 is performed in steps F31 to F35 in a similar manner as described above with reference to FIG. 8.

In step F36, it is checked whether a delivery card 4 received from the server 1 is inserted. If no inserted delivery card is detected, the process proceeds to step F501 to display, on the display unit 131, a message to ask a human operator to insert a delivery card 4. If, in response to the message, the operator inserts a delivery card 4 within a predetermined period of time, the process returns to step F36. However, if no delivery card 4 is inserted within the predetermined period of time, the process jumps to step F49 shown in FIG. 38.

If it is determined in step F36 that an inserted delivery card 4 is detected, the decryption key DK1 stored in the delivery card 4 is decrypted and then the additional information is decrypted using the decryption key DK1 in steps F37 to F39, in a similar manner as described above with reference to FIG. 8.

Thereafter, in step F503, it is checked whether a playback card 8 is inserted. If no inserted playback card 8 is detected, the process proceeds to step F504 to display, on the display unit 131, a message to ask a human operator to insert a playback card 8. If, in response to the message, the operator inserts a playback card 8 within a predetermined period of time (for example, if the delivery card 4 is replaced with a playback card 8), the process returns to F503. However, if no playback card 8 is inserted within the predetermined period of time, the process jumps to step F49 shown in FIG. 38.

If an inserted playback card 8 is detected in step F503, the additional information is decrypted in steps F506 to F508 in a similar manner to the delivery card 4.

That is, in step F506, decryption key DK1 and the additional information (and various flags) encrypted using the encryption key AK2 are read from the playback card 8.

In step F507, the decryption key DK1 is decrypted using the decryption key DK2 generated by the key generator 104.

In step F508, the additional information and flags encrypted using the encryption key AK1 are decrypted using the decryption key DK1.

In this process, the playback card ID is also read.

In step F509, the authentication/write controller 106 checks whether the information read from the playback card 8 includes a deletion-from-playback-apparatus flag indicating that the content data stored in the playback apparatus 3 has been deleted. If such a deletion-from-playback-apparatus flag is not detected, the process proceeds to step F49.

If the deletion-from-playback-apparatus flag indicating that the content data stored in the playback apparatus 3 has been deleted is detected, the process proceeds to step F510. In step F510, the judgment unit 130 communicates with the bank center 550 to check the status regarding the payment.

More specifically, the judgment unit 130 checks whether the movie theater 502 having the playback apparatus indicated by the playback card ID has correctly paid the fee for the content data which was delivered to the movie theater 502 in the past.

If it is determined that payment has been correctly performed, the process proceeds from step F511 to F512. However, it is determined that payment has not been correctly performed, the process jumps from F511 to F49.

Herein, it is assumed that the movie theater 502 is required to pay the fee for the movie which has been already played. Alternatively, the movie theater 502 may pay the fee for a movie which will be received next (and will be played).

If it is determined that the movie theater 502 has paid the fee for the content data which was transmitted in the past, then in step F512 it is determined which content data is to be transmitted next. That is, the schedule information is examined which is included in the additional information received from the server 1 or read from the delivery card 4. If it is determined that there is a content data to be transmitted at the present time, the process proceeds to step F513 to transmit the content data. However, no content data to be transmitted at the present time is detected, the process proceeds to step F49.

In the case where content data to be transmitted at the present time is detected, the process proceeds to step F513. In step F513, the database controller 113 retrieves, under the control of the distribution controller 112, the content data to be transmitted from the compressed data stored unit 109.

In step F514, the encrypted content data and the associated additional information which have been retrieved are modulated by the modulator 114.

In parallel, in step F515, information such as the additional information read from the delivery card 4 is written into the playback card 8. More specifically, under the control of the authentication/write controller 106, the encryption unit 116 encrypts the decryption key DK1 read from the delivery card 4 and transmits the encrypted decryption key DK1 to the card read/write controller 105. Furthermore, the encryption unit 116 encrypts the additional information including the content ID, the destination identifiers ID1 and ID2, and the schedule information using the encryption key AK1 and transmits the encrypted additional information to the card read/write controller 105. The card read/write controller 105 writes them into the playback card 8.

In step F516, the encrypted content data and additional information, which have been modulated in step F514 by the modulator 114 after being read from the compressed data storage unit 109, are transmitted from the transmitting unit 115 to the playback apparatus 3. Furthermore, the playback card 8 including the decryption key DK1 and the additional information written therein in step F515 is sent to the movie theater 502.

In the process described above, transmission of the content data to the playback apparatus 3 is performed in steps F512 to F516 only if the deletion-from-playback-apparatus flag written in the playback card 8 indicates that the content data which was used in the past has been deleted from the playback apparatus 3 and if the checking of the account indicates that payment has been correctly performed. That is, transmission of the content data is performed only if it is determined that content data has been dealt with correctly and also payment has been made correctly by the playback apparatus 3.

Figure 39:
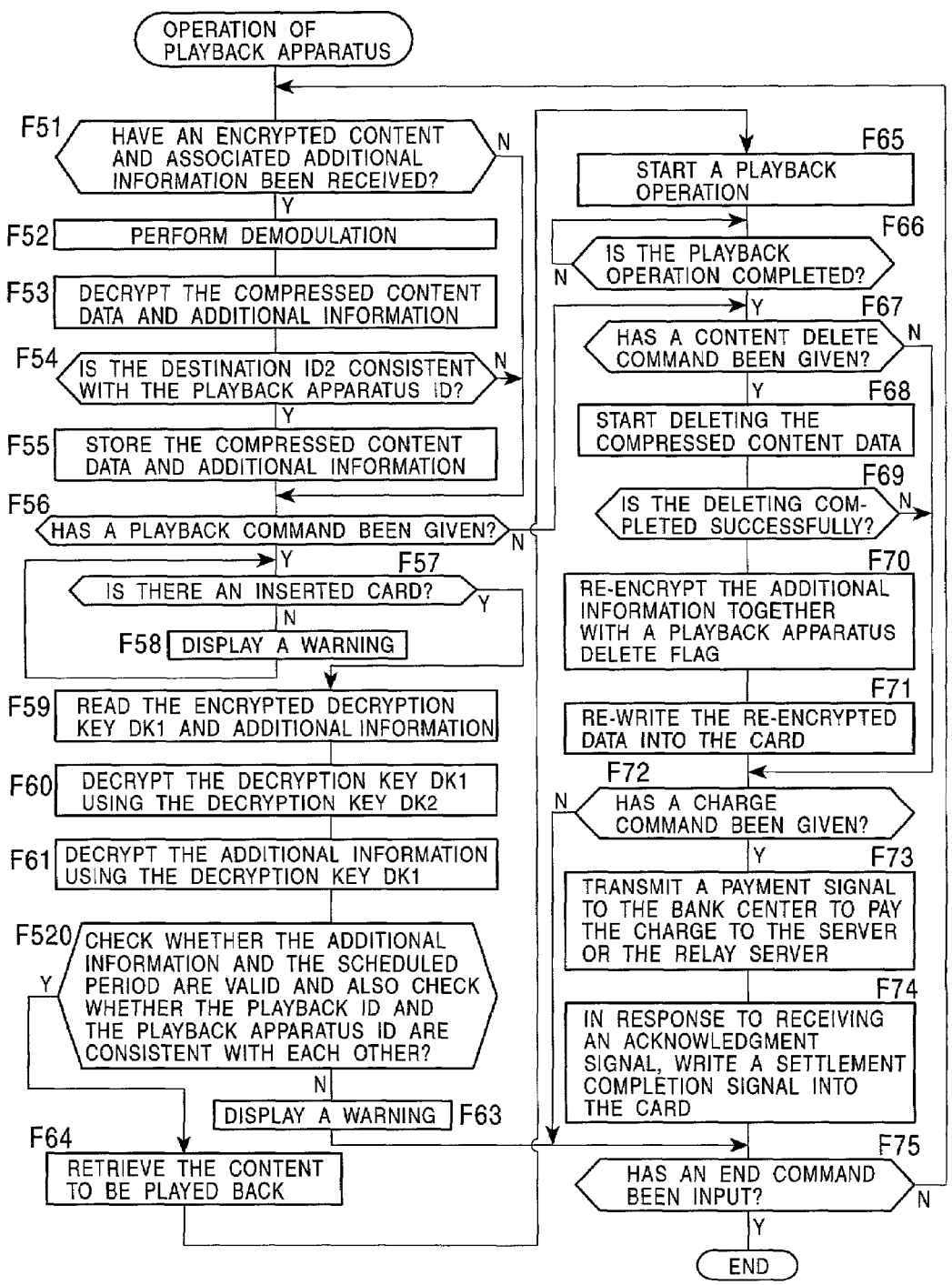
FIG. 39 is a flow chart illustrating a process performed by the playback apparatus according to the seventh embodiment of the present invention.

Although the process of writing data into the delivery card 4 to be returned to the server 1 is not shown in the flow charts in FIGS. 38 and 39, the flags stored in the playback card 8 received from each movie theater 502 are written together with the playback card ID into the delivery card 4 at a proper time after reading the data from the playback card 8. This allows the server 1 to perform the checking process in steps F18 to F23 shown in FIG. 7 when the server 1 receives the delivery card 4.

When the check of whether the playback card 8 is inserted is performed in step F503, authentication of the human operator may be performed to confirm that the human operator who is now operating the playback apparatus 3 is an authorized operator. Authentication may be performed by asking the operator to input his/her personal ID and/or password, and verifying the input data.

To this end, it is required that a user ID or a password for identifying an authorize operator be stored in the playback card 8 or the storage unit 110.

Preferably, to prevent production of a replica of the playback card 8 or the delivery card 4, the additional information stored in the storage unit 110 is prevented from being read out unless authentication is successfully passed.

Furthermore, the playback ID recorded in the playback card 8 may be prevented from being read out unless authentication is successfully passed.

[H(7)] Process Performed by Playback Apparatus

FIG. 39 illustrates the process performed by the playback apparatus 3. The process shown in FIG. 39 is basically the same as that shown in FIG. 9.

However, the card dealt with in steps F57 to F61, F71, and F74 are replaced with the playback card 8.

In the case where a playback command is detected in step F56, steps F57 to F61 are performed to read information such as the additional information from the playback card 8. Thereafter, in step F520, it is determined whether to permit a playback operation. In this process in step F520, it is checked whether the additional information read from the playback card 8 is identical to the additional information which is retained in the storage unit 209 after being received via electronic transmission; whether the present time is within the allowed playing period indicated by the schedule information included in the additional information; and whether the playback card ID is identical to (or consistent with) the playback apparatus ID. Only when the above requirements are all satisfied, it is determined that the playback operation should be permitted, and the process can proceed to step F64 and further to step F65 to perform the playback operation.

[I(7)] Advantages

The configuration and the operation according to the seventh embodiment of the present invention provide the advantages described below in addition to the advantages (1) to (8) described earlier with reference to the first embodiment.

(20) When a relay server 2 receives a playback card 8, the relay server 2 checks whether content data transmitted in the past has been correctly deleted and/or whether payment has been correctly performed. Only if the answer to the check is affirmative, next content data is transmitted. This ensures that the movie theater 502 obeys the contract.

(21) In a system in which a delivery card 4 is delivered between a server 1 and a relay server 2, and a playback card 8 is delivered between the relay server 2 and a playback apparatus 3, it becomes possible to easily deliver cards and easily manage the delivery compared with a system in which the delivery card 4 is delivered to a movie theater 502, although the advantage of the system depends upon the scale of the system or the number of relay servers and playback apparatuses.

Eighth Embodiment

[A(8)] Outline

The outline of a movie distribution system according to an eighth embodiment of the present invention is described below with reference to FIG. 40.

In this eighth embodiment, a server 1 does not distribute content data by means of transmission but the server 1 delivers a movie film 5, which has been edited after being shot, to respective movie distribution companies 501.

As in the seventh embodiment, the server 1 produces as many delivery cards 4 as required, and the server 1 sends the delivery cards 4 to the respective movie distribution companies 501 in parallel with or together with the films 5.

In each movie distribution company 501, a relay server 2 receives a film 5 and a delivery card 4 sent from the server 1. The movie recorded on the film 5 is converted into the form of content data 6 so that it can be transmitted.

The relay server 2 transmits the encrypted content data 6 and associated additional information to each movie theater 502. Furthermore, the relay sever 2 sends the playback card 8 produced on the basis of the delivery card 4 to each movie theater 502.

The playback apparatus 3 in each movie theater 502 receives the content data 6 and the associated additional information. The playback apparatus 3 also reads various kinds of information such as the additional information stored on the received playback card 8. Furthermore, using the key read from the playback card 8, the encrypted content data and additional information are decrypted. Thereafter, the content data is played back in accordance with the additional information read from the playback card 8 and the additional information received via electronic transmission.

In each movie theater 502, when the predetermined playing period has expired, the content data 6 stored in the playback apparatus 3 is deleted, and a delete flag is written into the playback card 8 to indicate that the content data 6 has been deleted from the playback apparatus 3.

The playback card 8 is then sent to the relay server 2 and updated so that another content data can be received. The information such as flags recorded in the playback card 8 is recorded into the delivery card 4. Thereafter, the delivery card 4 is sent to the movie production company 500.

On the basis of the information stored on the collected delivery cards 4, the server 1 checks whether the distributed content data 6 has been used adequately.

[B(8)] Configuration of Server

The configuration of the server 1 is similar to that shown in FIG. 11.

[C(8)] Configuration of Card

The configuration of the delivery card 4 and that of the playback card 8 are similar to those shown in FIGS. 35A and 35B, respectively.

[D(8)] Configuration of Relay Server

Figure 41:
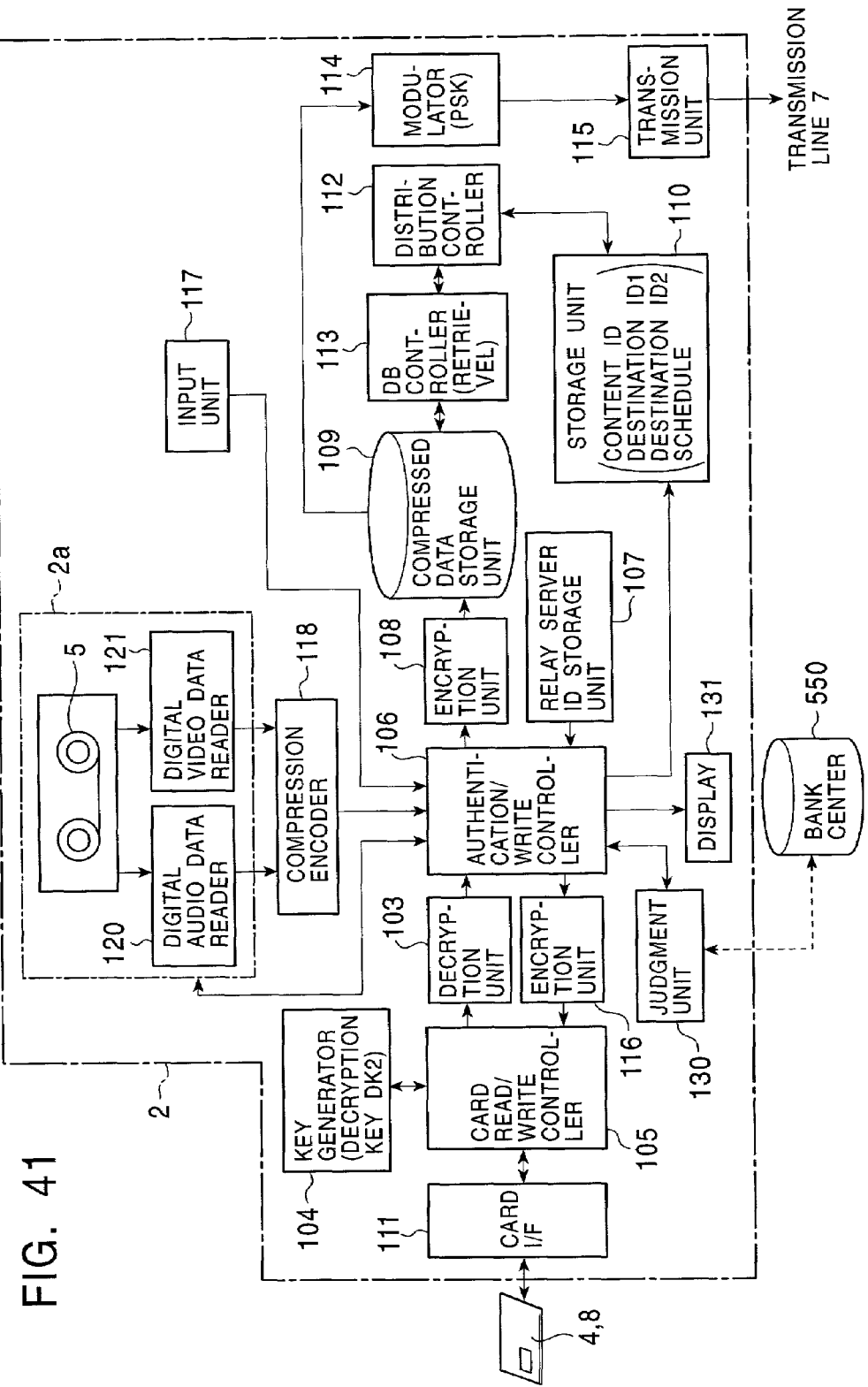
FIG. 41 is a block diagram illustrating a relay server according to the eighth embodiment of the present invention.

FIG. 41 illustrates a configuration of the relay server 2. As shown in FIG. 41, the relay server 2 includes a judgment unit 130 and a display unit 131, in addition to those parts shown in FIG. 12.

The input unit 117 is used, as described earlier with reference to FIG. 12, to input additional information and other necessary data or commands when content data is produced from a film 5.

The display unit 131 serves to display various kinds of information, data or operation guides thereby presenting the information to the human user or prompting the user to perform an operation.

The judgment unit 130 judges the status regarding the playback operations performed in the past, on the basis of the additional information or flags stored in the playback card 8 received from the movie theater 502 or by communication with the bank center 550. In accordance with the result of the judgment made by the judgment unit 130, the distribution controller 112 controls the data distribution and the authentication/write controller 106 controls the operation of writing the additional information into the playback card 8.

The relay server ID storage unit 107 stores not only the relay server ID but also the playback card IDs which serves as identifiers of the respective playback cards 8 used by the respective movie theaters 502 (playback apparatuses 3).

Recording the playback card ID in the playback card 8 allows the relay server 2 to identify the corresponding playback apparatus 3 by detecting the playback card ID recorded in the playback card 8. This also makes it possible to produce a playback card 8.

[E(8)] Configuration of Playback Apparatus

The construction of the playback apparatus 3 is similar to that shown in FIG. 6 except that the playback card 8 is employed as the card connected to the card interface 211.

[F(8)] Process Performed by Server

The process performed by the server 1 is similar to that shown in FIG. 13. However, information (such as a flag) of a large number of playback card 8 is recorded in each delivery card 4 wherein flags are recorded in correspondence with playback IDS. Therefore, when a returned delivery card 4 is checked in steps F113 to F118, flags are examined to detect the status of the playback apparatuses 3 corresponding to the respective playback card IDs.

[G(8)] Process Performed by Relay Server

Figure 42A:
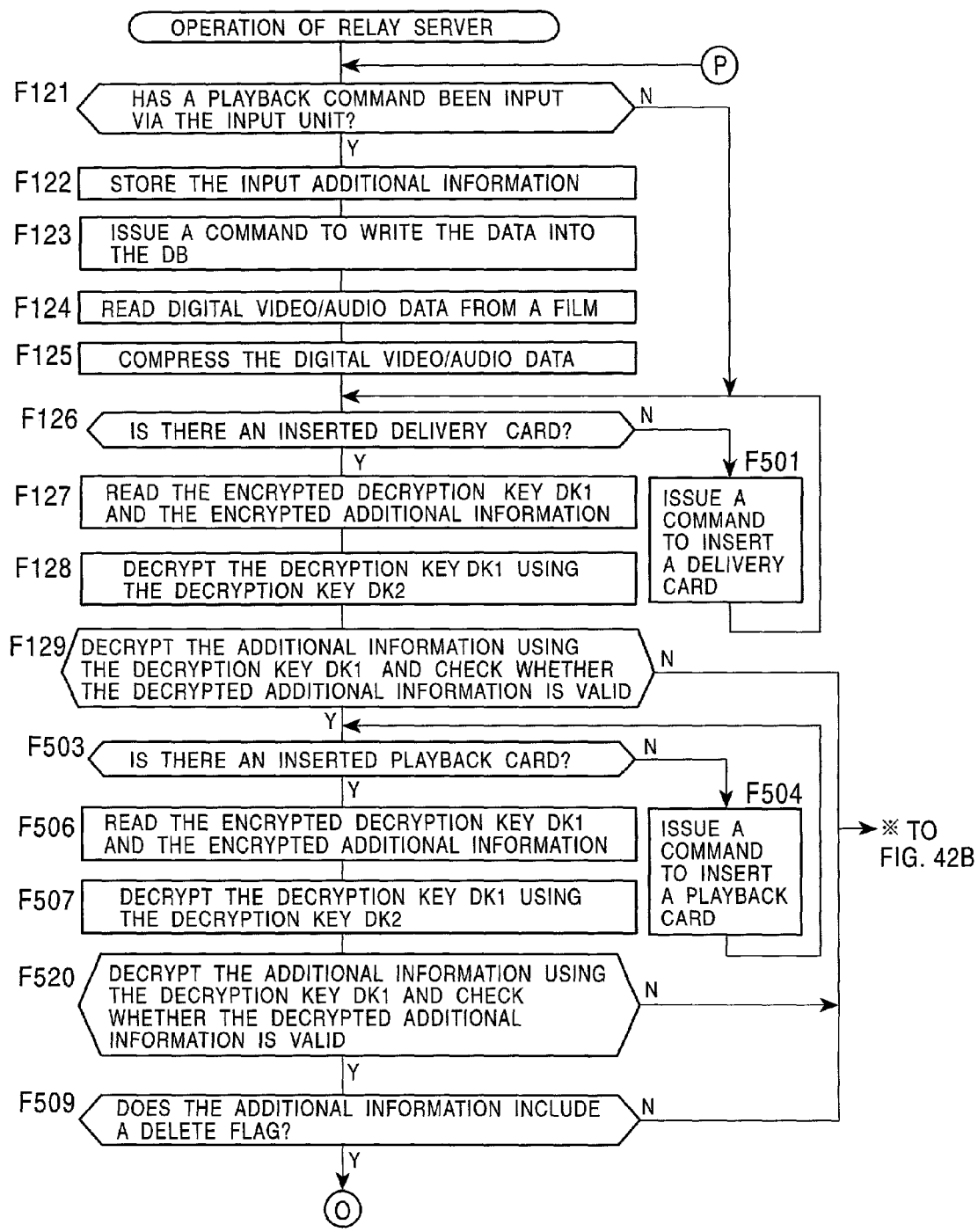
FIGS. 42A and 42B are flow charts illustrating a process performed by the relay server according to the eighth embodiment of the present invention.
Figure 42B:
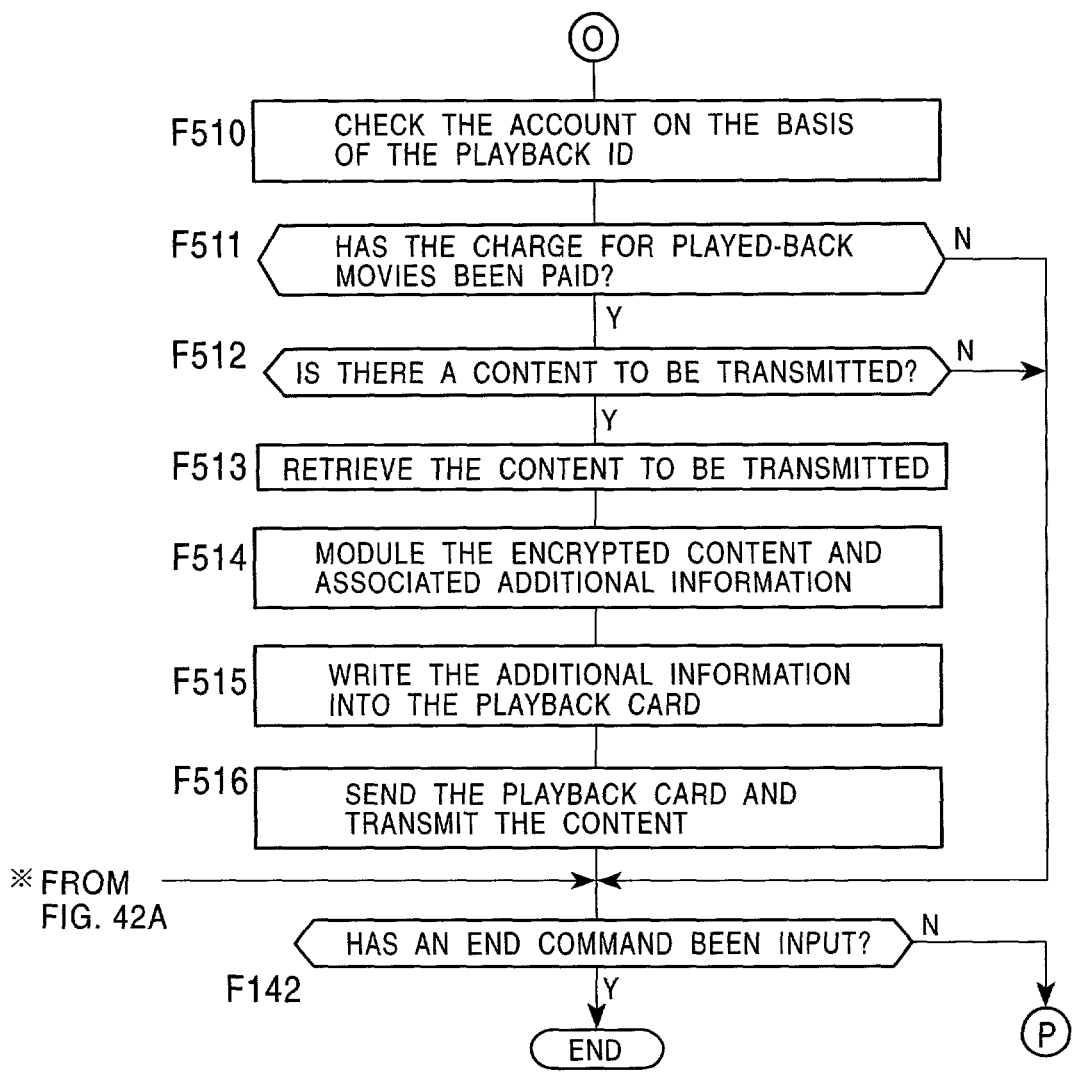

FIGS. 42A and 42B illustrate the process performed by the relay server 2. In FIGS. 42A and 42B, similar steps to those shown in FIG. 14 are denoted by similar step numbers, and they are not described in further detail herein.

The process of producing content data from the film 5 received from the server 1 is performed in steps F121 to F125 in a similar manner as described above with reference to FIG. 14.

In step F126, it is checked whether a delivery card 4 received from the server 1 is inserted. If no inserted delivery card is detected, the process proceeds to step F501 to display, on the display unit 131, a message to ask a human operator to insert a delivery card 4. Thereafter, the process returns to step F126.

If an inserted delivery card 4 is detected in step F126, the decryption key DK1 stored in the delivery card 4 is decrypted and then the additional information is decrypted using the decryption key DK1 in steps F127 to F129, in a similar manner as described above with reference to FIG. 8. Furthermore, it is judged whether the additional information is valid.

More specifically, using for example the content ID as a retrieval key, the authentication/write controller 106 retrieves additional information which is retained in the storage unit 110 after being input via the input unit 117 to judge whether there is stored additional information which is identical to the additional information read from the delivery card 4.

If identical additional information is not found, it is determined that the currently inserted delivery card 4 is not one associated with content data existing at this point of time in the compressed data storage unit 109, that is, it is determined that the delivery card 4 is not one associated with content data which is to be transmitted or was transmitted in the past to the movie theaters 502. In this case, the process proceeds to step F142 without doing anything.

If the additional information is determined as being valid, then in the next step F503 it is checked whether a playback card 8 is inserted. If no inserted playback card 8 is detected, the process proceeds to step F504 to display, on the display unit 131, a message to ask a human operator to insert a playback card 8. Thereafter, the process returns to step F503.

If an inserted playback card 8 is detected in step F503, the additional information is decrypted in steps F506, F507, and F520 in a similar manner to the delivery card 4.

That is, in step F506, decryption key DK1 and the additional information (and various flags) encrypted using the encryption key AK2 are read from the playback card 8.

In step F507, the decryption key DK1 is decrypted using the decryption key DK2 generated by the key generator 104.

In step F508, the additional information and flags encrypted using the encryption key AK1 are decrypted using the decryption key DK1. In this process, the playback card ID is also read. Furthermore, it is judged whether the decrypted additional information is valid.

That is, using for example the content ID as a retrieval key, the authentication/write controller 106 retrieves additional information stored in the storage unit 110 to judge whether there is stored additional information which is identical to the additional information read from the playback key 8.

If identical additional information is not found, it is determined that the currently inserted playback card 8 is not one associated with content data existing at this point of time in the compressed data storage unit 109, that is, it is determined that the playback card 8 is not one associated with content data which was transmitted in the past to the movie theaters 502. In this case, the process proceeds to step F142 without doing anything.

On the other hand, if identical additional information is detected, the process proceeds to step F509 in which the authentication/write controller 106 checks whether the information read from the playback card 8 includes a deletion-from-playback-apparatus flag indicating that the content data stored in the playback apparatus 3 has been deleted. If such a deletion-from-playback-apparatus flag is not detected, the process proceeds to step F142.

If the deletion-from-playback-apparatus flag indicating that the content data stored in the playback apparatus 3 has been deleted is detected, the process proceeds to step F510. In step F510, the judgment unit 130 communicates with the bank center 550 to check the status regarding the payment.

More specifically, the judgment unit 130 checks whether the movie theater 502 having the playback apparatus indicated by the playback card ID has correctly paid the fee for the content data which was delivered to the movie theater 502 in the past.

If it is determined that payment has been correctly performed, the process proceeds from step F511 to F512. However, it is determined that payment has not been correctly performed, the process jumps from F511 to F142.

Herein, it is assumed that the movie theater 502 is required to pay the fee for the movie which has been already played. Alternatively, the movie theater 502 may pay the fee for a movie which will be received next (and will be played).

If it is determined that the movie theater 502 has paid the fee for the content data which was transmitted in the past, then in step F512 it is determined which content data is to be transmitted next. That is, the schedule information is examined which is included in the additional information received from the server 1 or read from the delivery card 4. If it is determined that there is a content data to be transmitted at the present time, the process proceeds to step F513 to transmit the content data. However, no content data to be transmitted at the present time is detected, the process proceeds to step F142.

In the case where content data to be transmitted at the present time is detected, the process proceeds to step F513. In step F513, the database controller 113 retrieves, under the control of the distribution controller 112, the content data to be transmitted from the compressed data stored unit 109.

In step F514, the encrypted content data and the associated additional information which have been retrieved are modulated by the modulator 114.

In parallel, in step F515, information such as the additional information read from the delivery card 4 is written into the playback card 8. More specifically, under the control of the authentication/write controller 106, the encryption unit 116 encrypts the decryption key DK1 read from the delivery card 4 and transmits the encrypted decryption key DK1 to the card read/write controller 105. Furthermore, the encryption unit 116 encrypts the additional information including the content ID, the destination identifiers ID1 and ID2, and the schedule information using the encryption key AK1 and transmits the encrypted additional information to the card read/write controller 105. The card read/write controller 105 writes them into the playback card 8.

In step F516, the encrypted content data and additional information, which have been modulated in step F514 by the modulator 114 after being read from the compressed data storage unit 109, are transmitted from the transmitting unit 115 to the playback apparatus 3. Furthermore, the playback card 8 including the decryption key DK1 and the additional information written therein in step F515 is sent to the movie theater 502.

In the process described above, as in the seventh embodiment described above, transmission of the content data to the playback apparatus 3 is performed in steps F512 to F516 only if the deletion-from-playback-apparatus flag written in the playback card 8 indicates that the content data which was used in the past has been deleted from the playback apparatus 3 and if the checking of the account indicates that payment has been correctly performed. That is, transmission of the content data is performed only if it is determined that content data has been dealt with correctly and also payment has been made correctly by the playback apparatus 3.

Although the process of writing data into the delivery card 4 to be returned to the server 1 is not shown in the flow charts shown in FIGS. 42A and 42B, the flags stored in the playback card 8 received from each movie theater 502 are written together with the playback card ID into the delivery card 4 at a proper time after reading the data from the playback card 8. This allows the server 1 to perform the checking process in steps F113 to F118 shown in FIG. 13 when the server 1 receives the delivery card 4.

As is described above with reference to the seventh embodiment, when the check of whether the playback card 8 is inserted is performed in step F503, authentication of the human operator may be performed to confirm that the human operator who is now operating the playback apparatus 3 is an authorized operator. Authentication may be performed by asking the operator to input his/her personal ID and/or password, and verifying the input data.

To prevent production of a replica of the playback card 8 or the delivery card 4, the additional information stored in the storage unit 110 is prevented from being read out unless authentication is successfully passed. Furthermore, the playback ID recorded in the playback card 8 may be prevented from being read out unless authentication is successfully passed.

[H(8)] Process Performed by Playback Apparatus

The process performed by the playback apparatus 3 is similar to that shown in FIG. 39.

[I(8)] Advantages

As with the seventh embodiment described above, the eighth embodiment provides advantages (1) to (8) and advantages (20) and (21).

Ninth Embodiment

[A(9)] Outline

A ninth embodiment is described below.

Figure 40:
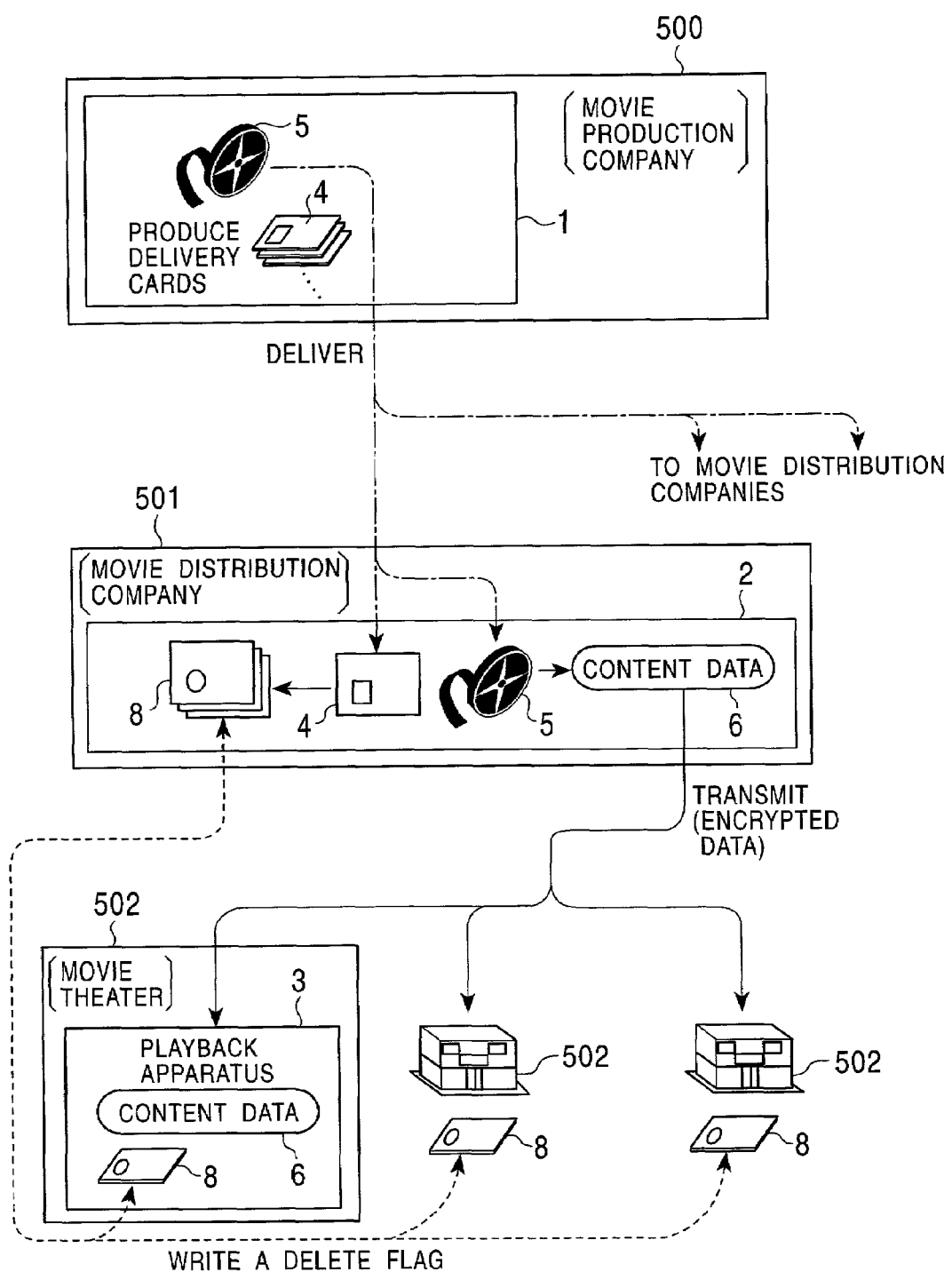
FIG. 40 is a schematic diagram illustrating a movie distribution system according to an eighth embodiment of the present invention.

The configuration and the operation of the ninth embodiment are based on the eighth embodiment described above, and the flows of the content data 6, the delivery card 4, and the playback card 8 are similar to those shown in FIG. 40.

However, the difference is that the additional information transmitted and the additional information recorded in the playback card 8 further include a number-of-times value indicating the number of times content data is allowed to be played back by the playback apparatus 3 of the movie theater 502 to play a movie.

In the ninth embodiment, the number of times the playback apparatus 3 is allowed to play back the received content data is limited to the number-of-times value described in the corresponding additional information. If a playback command is further issued after the content data has been played back as many times as allowed, the commanded playback operation is not executed.

The number-of-times value indicating the number of times the content data is allowed to be played back is set by the movie production company 500 or the movie distribution company 501 in accordance with the agreement between the movie theater 502 and the movie production company 500 or the movie distribution company 501.

Although not described in detail, a watermark may be embedded in the content data as in the third embodiment described below.

In this case, the relay server 2 embeds a PN code indicating that the content data is permitted to be played back into the content data. In the playback apparatus 3, when the content data has been played back as many times as permitted, the watermark is rewritten into a PN code which disables the content data to be played back.

[B(9)] Configuration of Server

The configuration of the server 1 is similar to that shown in FIG. 11.

[C(9)] Configuration of Card

Figure 43A:
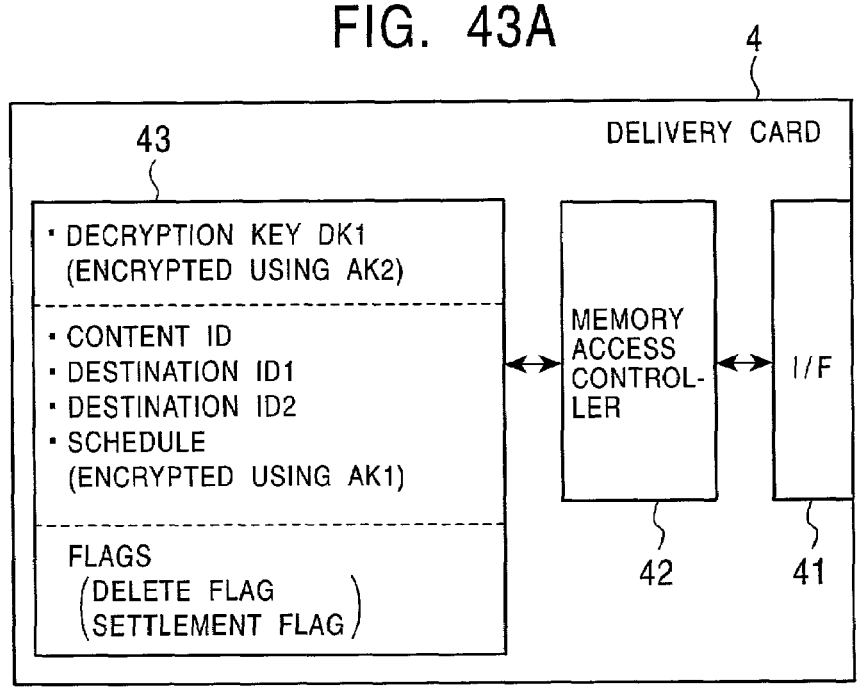
FIG. 43 is a block diagram illustrating a delivery card and a playback card according to a ninth embodiment of the present invention.
Figure 43B:
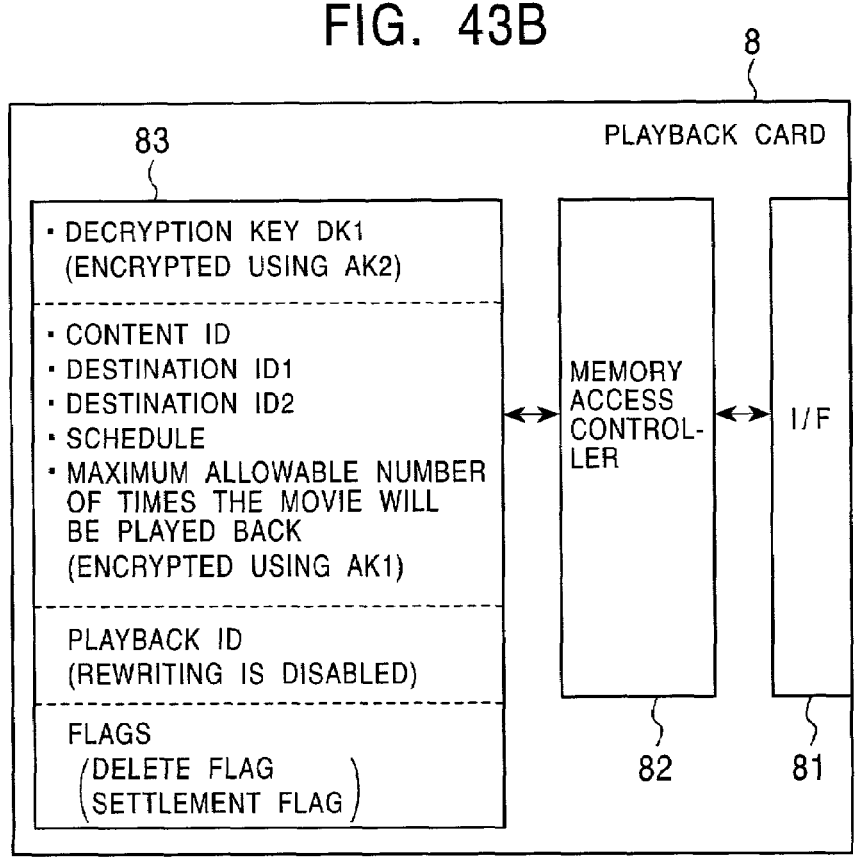

FIGS. 43A and 43B illustrate the configurations of the delivery card 4 and the playback card 8, respectively. These are basically similar to those shown in FIGS. 35A and 35B, respectively. However, the difference is that the number of times the content data is allowed to be played back is added to the additional information which is written in an encrypted form into the memory 83 of the playback card 8.

In the present embodiment, the number of times the content data is allowed to be played back is set by the relay server 2, and thus the number of times the content data is allowed to be played back is not described in the delivery card 4. Alternatively, the number of times the content data is allowed to be played back may be set by the server 1. In this case, the number of times the content data is allowed to be played back is recorded in the delivery card 4 and delivered to the relay server 2.

[D(9)] Configuration of Relay Server

The relay server 2 has a similar configuration to that shown in FIG. 41. However, the difference is that the additional information input via the input unit 117, the additional information written in the playback card 8, the additional information stored in the storage unit 110, and the additional information which is stored together with the content data in the compressed data storage unit 109 and which is transmitted to the movie theater 502 all includes the number of times the content data is allowed to be played back.

[E(9)] Configuration of Playback Apparatus

Figure 44:
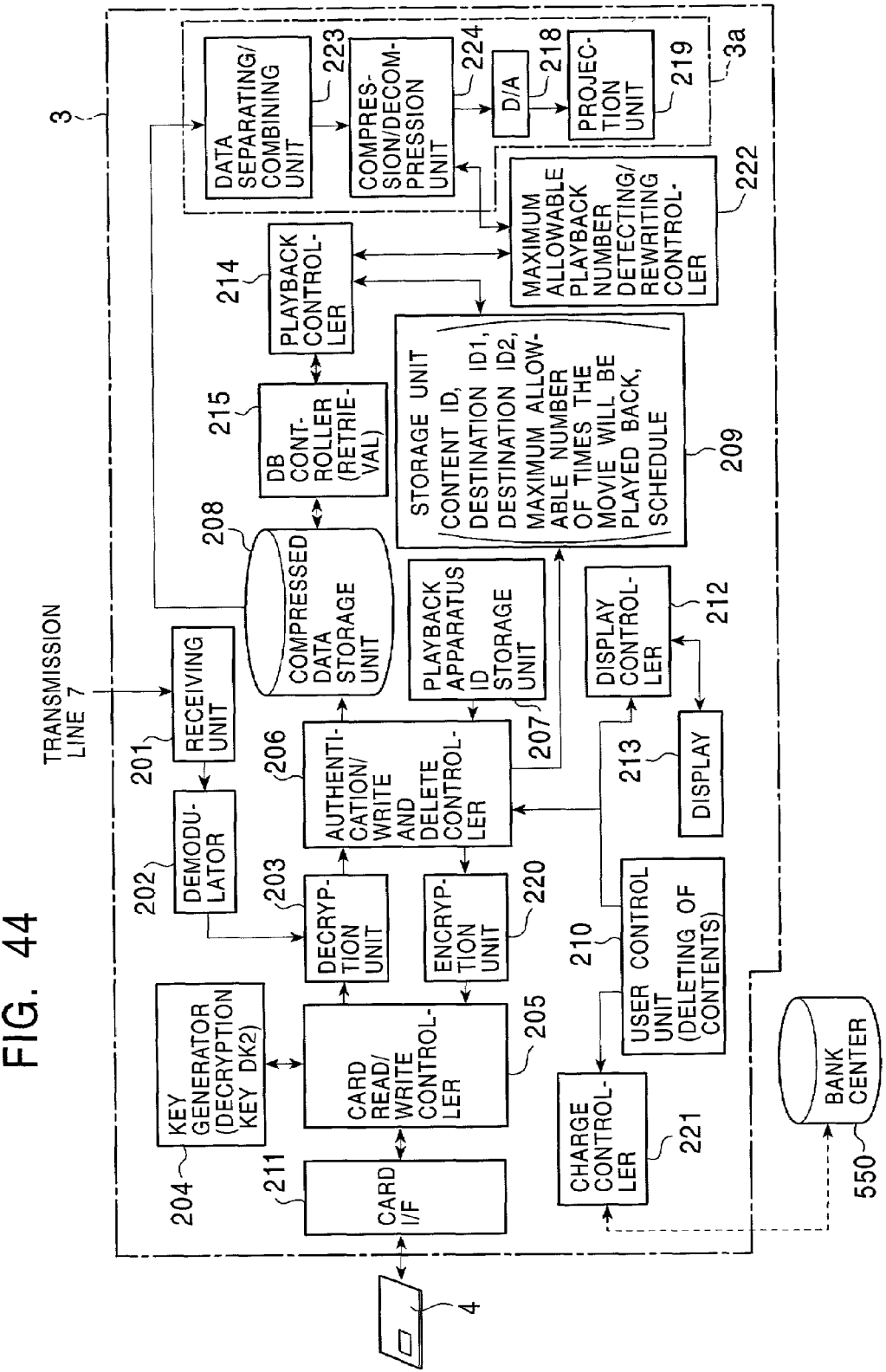
FIG. 44 is a block diagram illustrating a playback apparatus according to the ninth embodiment of the present invention.

FIG. 44 illustrates the structure of the playback apparatus 3. As shown in FIG. 44, the playback apparatus 3 includes a maximum playback number detection/write controller 230.

A number-of-times value indicating the number of times content data is allowed to be played back is included in additional information which is demodulated and decrypted after being received by the receiving unit 201, additional information which is read from the delivery card 4 and then decrypted, additional information stored in the storage unit 209, and additional information which is stored together with content data in the compressed data storage unit 208.

The maximum playback number detection/write controller 230 detects the number-of-times value indicating the number of times the content data is allowed to be played back, from the additional information corresponding to the content data to be played back. On the basis of the detected value, the maximum playback number detection/write controller 230 determines whether to permit the content data to be played back.

Each time the content data is played back, the number-of-times value indicating the number of times the content data is allowed to be played back is decremented under the control of the maximum playback number detection/write controller 230. More specifically, each time the content data is played back, the number-of-times value which indicates the number of times the content data is allowed to be played back and which is included in the additional information stored in the storage unit 209 and also in the playback card 8 is decremented by one.

[F(9)] Process Performed by Server

The process performed by the server 1 is similar to that shown in FIG. 13. However, information (such as a flag) of a large number of playback card 8 is recorded in each delivery card 4 wherein flags are recorded in correspondence with playback IDs. Therefore, when a returned delivery card 4 is checked in steps F113 to F118, flags are examined to detect the status of the playback apparatuses 3 corresponding to the respective playback card IDs.

[G(9)] Process Performed by Relay Server

Figure 45:
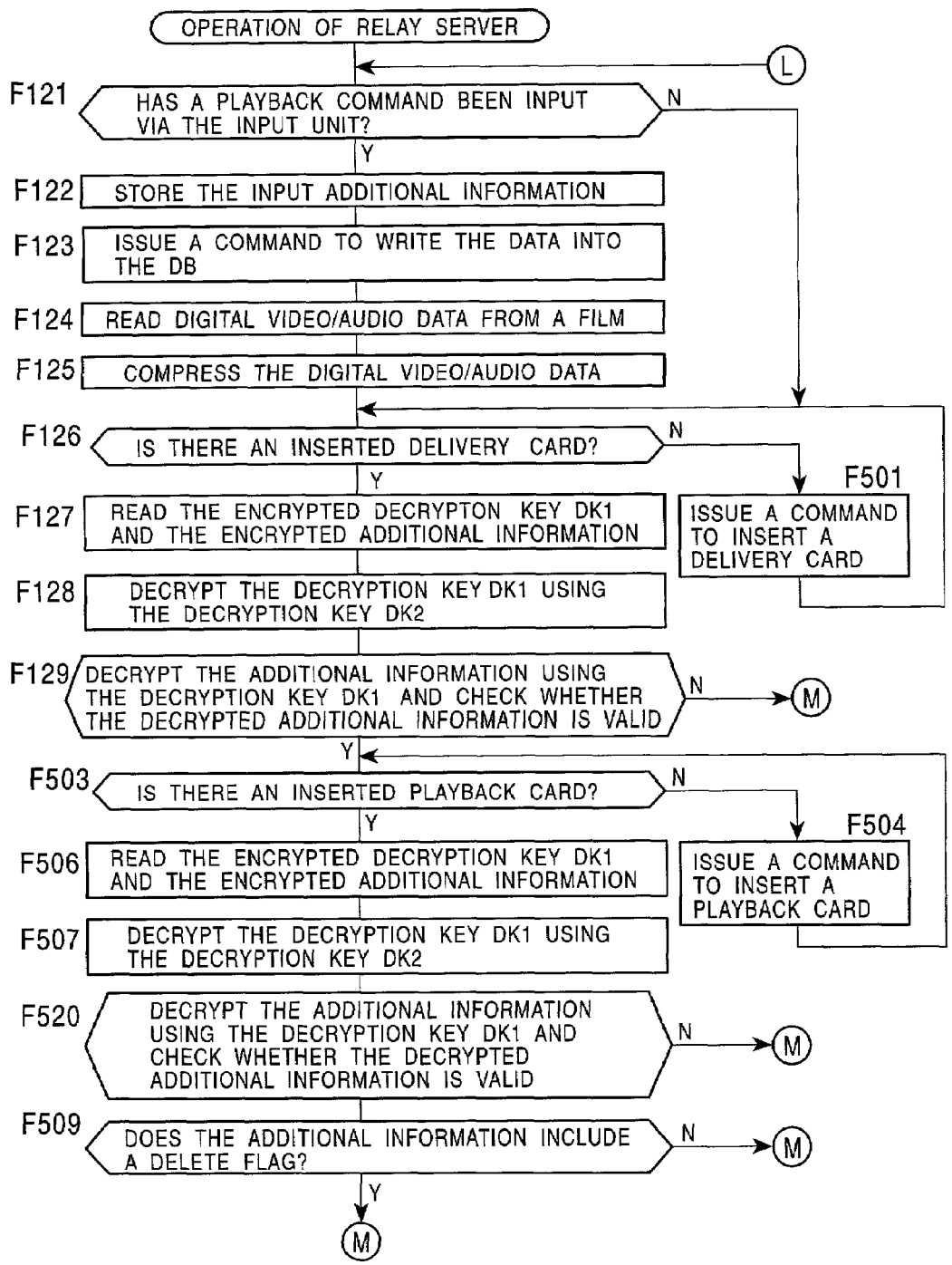
FIG. 45 is a flow chart illustrating a process performed by the relay server according to the ninth embodiment of the present invention.
Figure 46:
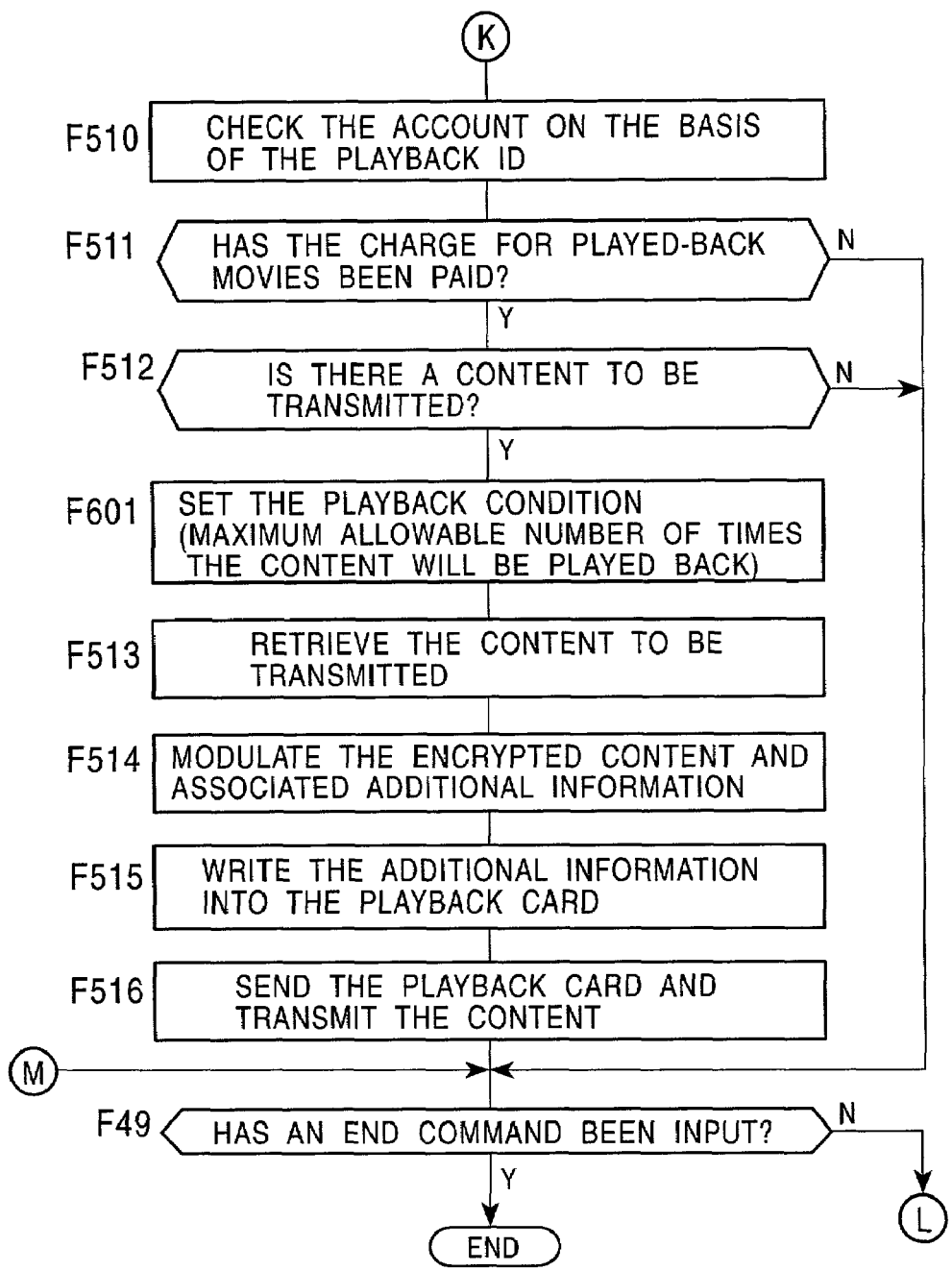
FIG. 46 is a flow chart illustrating a process performed by the relay server according to the ninth embodiment of the present invention.

FIGS. 45 and 46 illustrate the process performed by the relay server 2. In FIGS. 45 and 46, similar steps to those shown in FIG. 14 or FIG. 42A or 42B are denoted by similar step numbers, and they are not described in further detail herein.

More specifically, steps F121 to F509 shown in FIG. 45 are similar to those shown in FIG. 42A. Furthermore, steps F510 to F512 and steps F513 to F516 shown in FIG. 46 are similar to those shown in FIG. 42B.

However, the process according to the ninth embodiment is different from that shown in FIGS. 42A and 42B in that the playback condition of the delivered content data is set in step F601 shown in FIG. 46.

Also in the process described above, as in the seventh and eighth embodiments described above, transmission of the content data to the playback apparatus 3 is performed in steps F512 to F516 only if the deletion-from-playback-apparatus flag written in the playback card 8 indicates that the content data which was used in the past has been deleted from the playback apparatus 3 and if the checking of the account indicates that payment has been correctly performed. In the above transmission process, the playback condition is set in step F601.

In this case, the number of times the content data is allowed to be played back is set as the playback condition. More specifically, for example, the authentication/write controller 106 sets the number of times the content data is allowed to be played back in accordance with the contract. The resultant value is added to the additional information.

As a result, the additional information which is modulated in step F514 and then transmitted in step F516 together with the content data and also the additional information which is written in step F515 into the playback card 8 both includes the number of times the content data is allowed to be played back.

Because the number of times the playback apparatus 3 can play back the content data is limited to the above-described value, the checking in step F510 is performed as to whether the fee for the previous content data has been correctly paid.

[H(9)] Process Performed by Playback Apparatus

Figure 47:
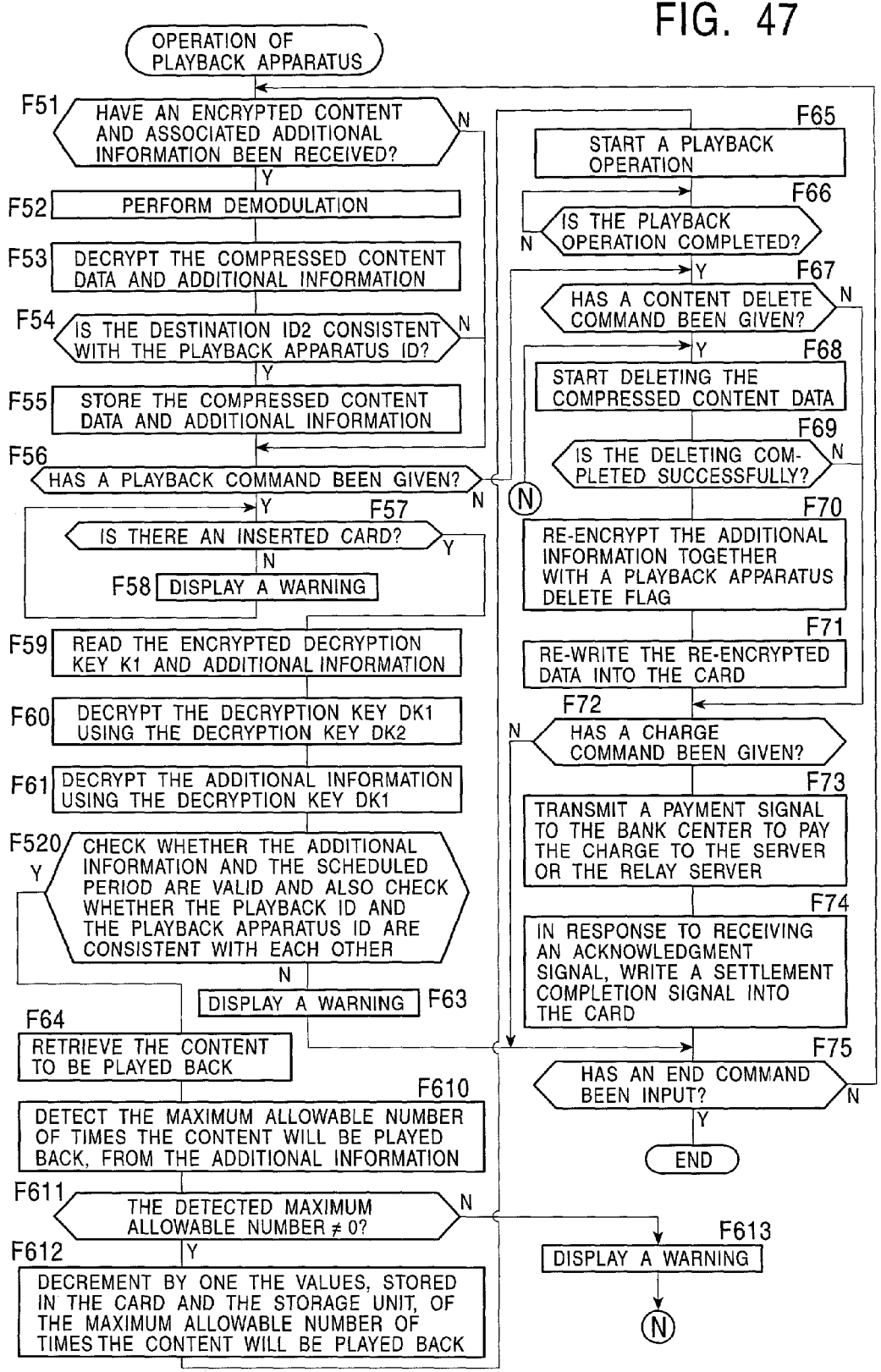
FIG. 47 is a flow chart illustrating a process performed by the playback apparatus according to the ninth embodiment of the present invention.
Figure 51:
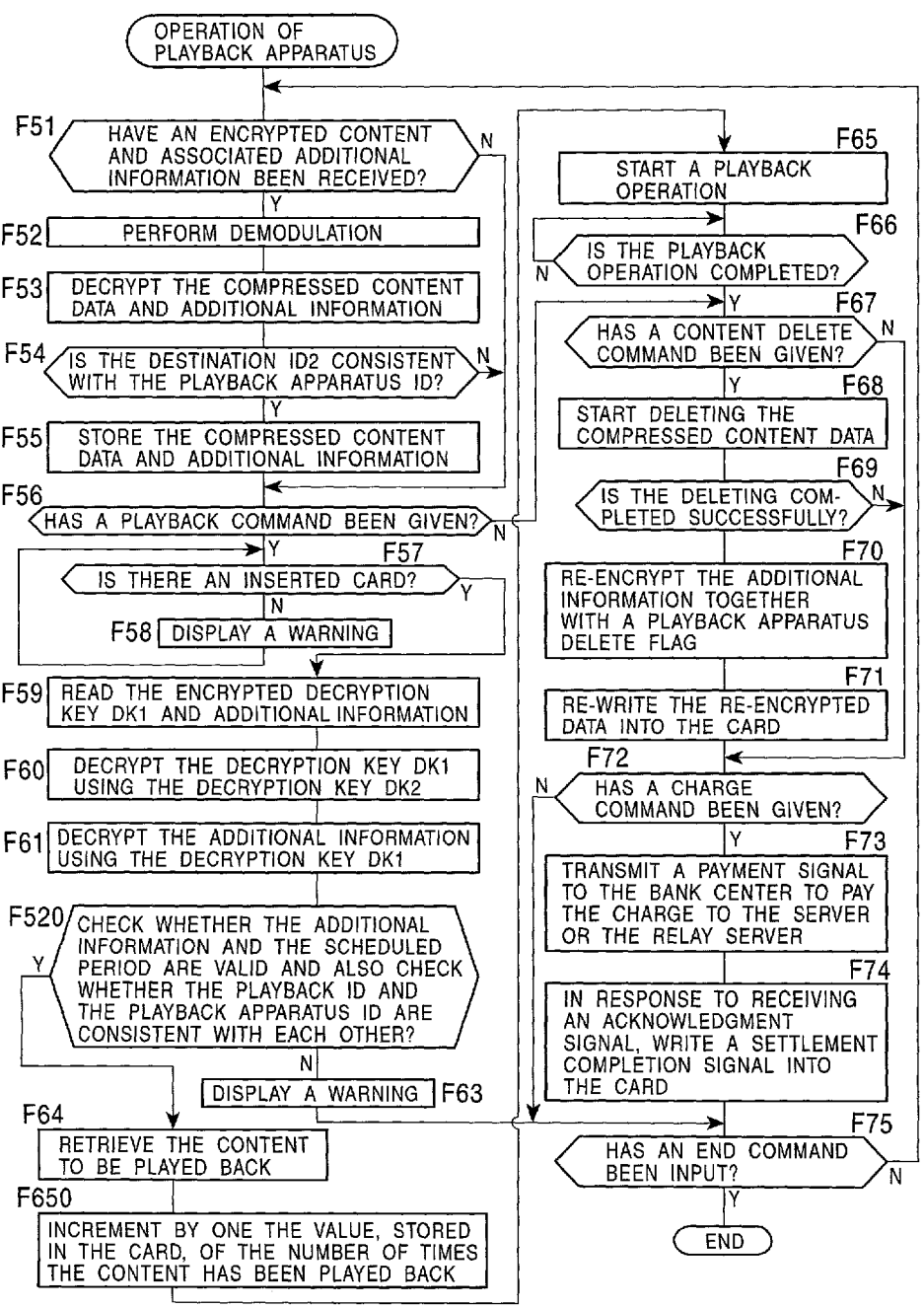
FIG. 51 is a flow chart illustrating a process performed by the playback apparatus according to the tenth embodiment of the present invention.

FIG. 47 illustrates the process performed by the playback apparatus 3. In FIG. 51, similar steps to those shown in FIG. 39 or FIG. 9 are denoted by similar step numbers, and they are not described in further detail herein.

In the process shown in FIG. 47, as in the process described above with reference to FIG. 39, when a playback command is detected in step F56, steps F57 to F61 are performed to read information such as the additional information from the playback card 8. Thereafter, in step F520, it is determined whether to permit a playback operation. In this process in step F520, it is checked whether the additional information read from the playback card 8 is identical to the additional information which is retained in the storage unit 209 after being received via electronic transmission; whether the present time is within the allowed playing period indicated by the schedule information included in the additional information; and whether the playback card ID is identical to (or consistent with) the playback apparatus ID. Only when the above requirements are all satisfied, the process can proceed to step F64 to perform the playback operation.

However, after retrieving the content data in step F64, the process proceeds to step F610 in which the maximum playback number detection/write controller 230 detects the number-of-times value indicating the number of times the content data is allowed to be played back, from the corresponding additional information.

If it is determined in step F611 that the number of times the content data is allowed to be played back is not equal to 0, it is determined that the specified content data is allowed to be further played back.

In this case, the process proceeds to step F612 in which the number-of-times value described in the additional information is decremented by 1 under the control of the maximum playback number detection/write controller 230. More specifically, the number-of-times value described in the additional information stored in the storage unit 209 and also the number-of-times value described in the additional information stored in the compressed data storage unit 208 are decremented, and the authentication/write/delete controller 206 transmits the additional information including the decremented number-of-times value to the card read/write controller 205 via the encryption unit 220. The card read/write controller 205 updates the additional information recorded in the playback card 8 in accordance with the received additional information.

In step F65, the content data is played back.

Because each time the content data is played back, the number-of-times value indicating the number of times the content data is allowed to be played back is decremented, if a playback command is issued after the content data has been played back as many times as the original number-of-times value which was set by the relay server 2, it is determined in step F611 that the number-of-times value indicating the number of times the content data is allowed to be played back is equal to 0, and thus the process can no longer proceed to step F65 to further play back the content data.

In this case, the process proceeds to step F613 to display a warning on the display unit 213. Then in step F68, the content data is deleted.

That is, in the present embodiment, even when no command issued by the human operator is detected in step F67, the content data is deleted from the compressed data storage unit 208 when the content data has been played back as many times as allowed.

In the present embodiment, the movie theater 502 pays the fee to the relay server 2 or the server 1, depending upon the original number-of-times value which is set by the relay server 2 so as to indicate the number of times the content is allowed to be played back. That is, in the payment process in steps F72 to F74, the amount of money to be paid is determined according to the number-of-times value indicating the number of times the content data is allowed to be played back, which is detected a first time after the additional information was received (or after the additional information was read from the playback card 8).

In the present embodiment, the decrementing of the number of times the content data is allowed to be played back is performed in step F612 for all the additional information stored in the storage unit 209, that stored in the compressed data storage unit 208, and that stored in the playback card 8. However, in the case where the number of times the content data is allowed to be played back is not required to be determined as being identical in the judgment in step F520, the decrementing may be performed only for the additional information recorded in the playback card 8, or for the additional information stored in the storage unit 209 or compressed data storage unit 208. Of course, in this case, the detection of the number of times the content data is allowed to be played back in step F610 must be performed for the additional information that is subjected to the decrementing.

[I(9)] Advantages

As with the seventh and eighth embodiments described above, the ninth embodiment provides advantages (1) to (8) and advantages (20) and (21). In addition, the following advantages are obtained.

(22) The relay sever 2 (or the server 1) can control the number of times the content data is played back by the playback apparatus 3 by describing, in the additional information, the number of times the content data is allowed to be played back. The number of times the content data is allowed to be played back can be defined in the contract.

(23) By charging the fee in accordance with the original number-of-times value indicating the number of times the content data is allowed to be played back, it is possible to correctly and clearly charge the fee in the movie delivery system. Furthermore, it is possible to control the number of times the content data is allowed to be played back, depending upon the payment status.

(24) When the content data has been played back as many times as allowed, the content data is deleted from the playback apparatus 3 without waiting for a delete command. This prevents the content data from being copied to another playback apparatus or the like. This ensures that the content data is managed strictly.

(25) The number of times the content data is allowed to be played back, which is described in the playback card 8, is decremented each time the content data is played back. Therefore, when the playback card 8 is returned to the relay server 2, the relay server 2 can detect the number of times the content data has actually been played back in the movie theater 502 by checking the value of the number of times the content data is allowed to be played back, which is described in the playback card 8. This is useful for management and for field investigation of the playing status.

This can also be used to realize a system in which a fee is charged not on a prepayment basis, but the number of times the content data has actually been played back is detected from the data described in the playback card 8 returned to the relay server 2 and a fee corresponding to the detected number of times the content data has actually been played back is charged. In this case, the number of times the content data is allowed to be played back is limited to a predetermined value.

Tenth Embodiment

[A(10)] Outline

A tenth embodiment is described below.

The configuration and the operation of the tenth embodiment are based on those of the eighth embodiment. Therefore, the flows of the content data 6, the delivery card 4, and the playback card 8 are similar to those shown in FIG. 40.

However, the number of times the content data has been played back by the playback apparatus 3 of the movie theater 502 is added to the additional information recorded in the playback card 8 which is sent from the playback apparatus 3 to the relay server 2.

In this tenth embodiment, as in the previous embodiments described above, the playback apparatus 3 determines whether the received content data is allowed to be played back on the basis of the corresponding additional information. Each time the content data is played back, the count of the number of times the content data has been played back is incremented, and the count value is written into the playback card 8.

On the other hand, when the playback card 8 is sent from the movie theater 502 to the relay server 2, the relay server 2 checks the count value recorded in the playback card 8 to determine how many times the content data has been actually played back by the playback apparatus 3. The relay server 2 further checks whether payment corresponding to the count value has been correctly made.

[B(10)] Configuration of Server

The configuration of the server 1 is similar to that shown in FIG. 11.

[C(10)] Configuration of Card

Figure 48A:
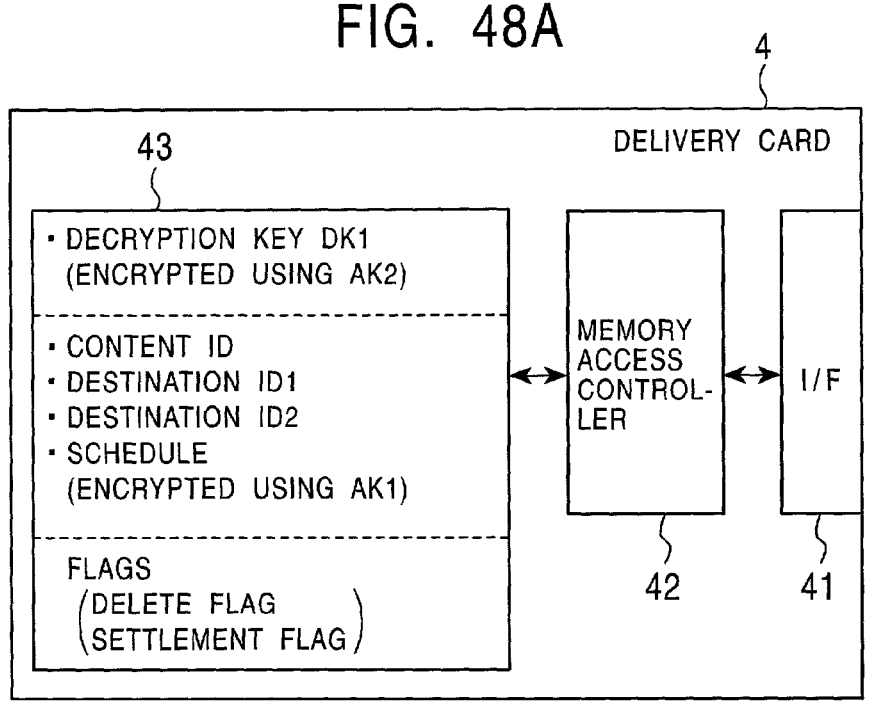
FIG. 48 is a block diagram illustrating a delivery card and a playback card according to a tenth embodiment of the present invention.
Figure 48B:
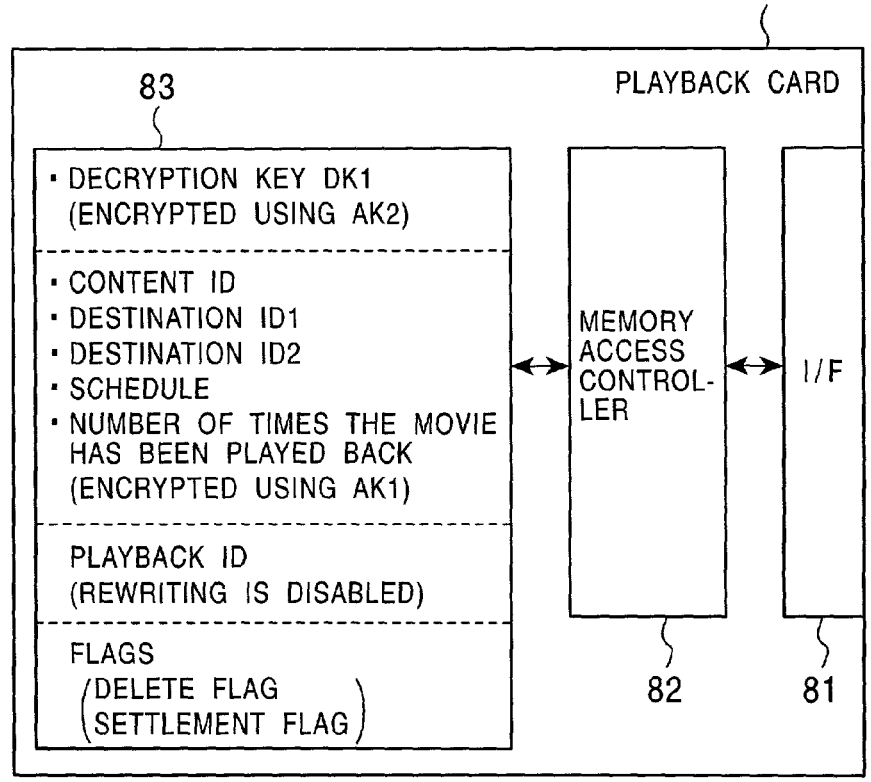

FIGS. 48A and 48B illustrate the configurations of the delivery card 4 and the playback card 8, respectively. The configurations are basically similar to those shown in FIGS. 35A and 35B, respectively. However, the number of times the content data has been played back is added to the additional information which is written in an encrypted form into the memory 83 of the playback card 8. Note that because the number of times the content data has been played back is written by the playback apparatus 3, the number of times the content data has been played back is not included in the additional information described in the playback card 8 when it is sent from the relay server 2 to the playback apparatus 3 in parallel with the transmission of the content data. Alternatively, the count value is reset to 0 when the playback card 8 is sent to the playback apparatus 3.

In the present embodiment, the check on the number of times the content data has been played back is made by the relay sever 2. Therefore, it is not necessarily required that the number of times the content data has been played back be described in the delivery card 4. However, when the delivery card 4 is returned from the relay server 2 to the server 1, the relay server 2 may write the number of times the content data has been played back together with the playback card ID into the delivery card 4 in accordance with the count value detected from the playback card 8. This allows the server 1 to detect the number of times the content data has been actually played back by each playback apparatus 3. This is useful for management and for field investigation of the playing status.

[D(10)] Configuration of Relay Server

The relay server 2 has a similar configuration to that shown in FIG. 41. However, the difference is that the additional information read from the playback card 8 received from the movie theater 502 includes the number of times the content data has been played back. The authentication/write controller 106 and the judgment unit 130 perform the process using the detected number of times the content data has been played back.

As for the number of times the content data has been played back, which is included in the additional information which is sent or transmitted to the playback apparatus 3, that is, the additional information written in the playback card 8, the additional information stored in the storage unit 110 after being input, the additional information which is stored together with the content data in the compressed data storage unit 109 and which is transmitted to the movie theater 502, the count value may be set to 0.

[E(10)] Configuration of Playback Apparatus

Figure 49:
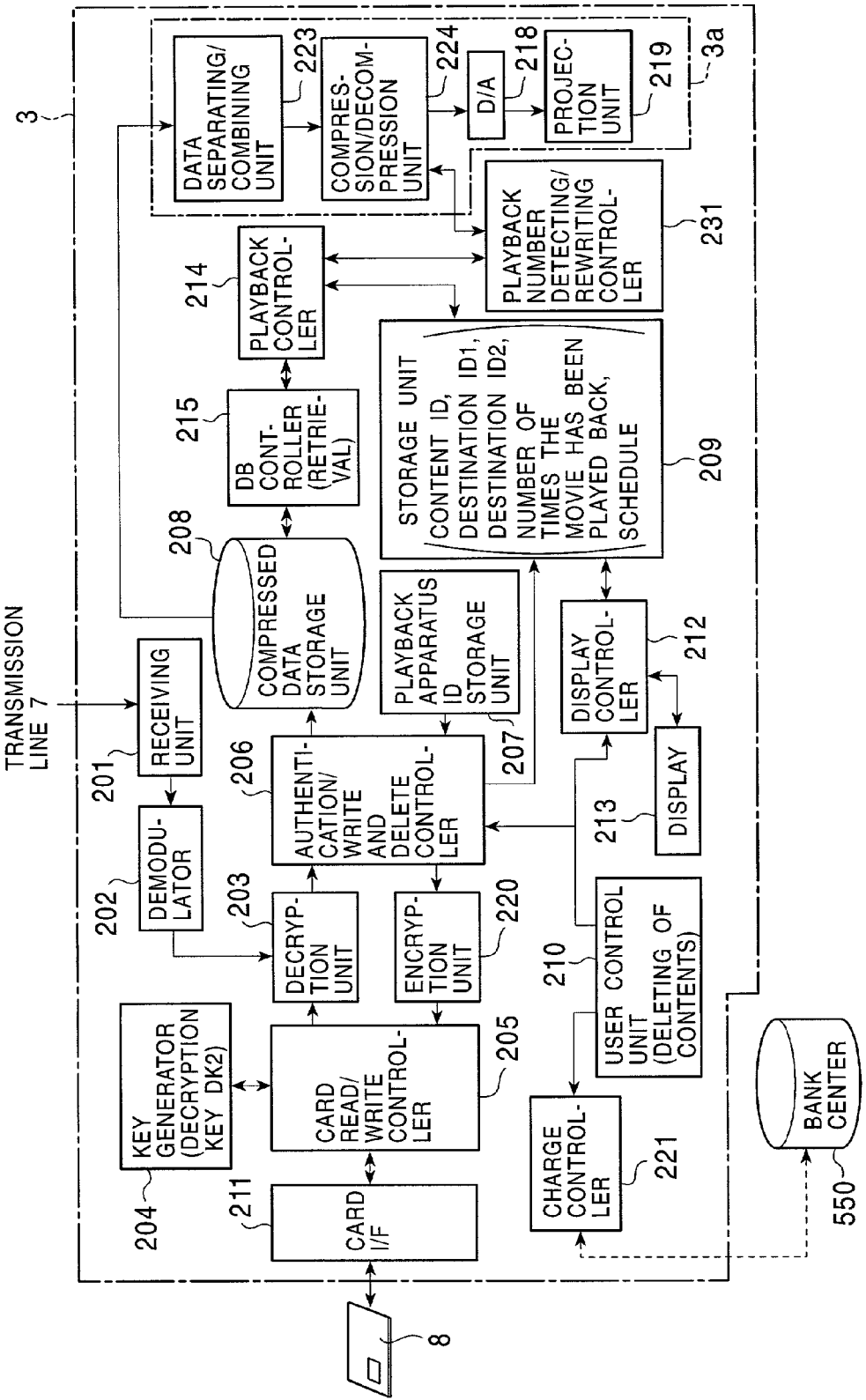
FIG. 49 is a block diagram illustrating a playback apparatus according to the tenth embodiment of the present invention.

FIG. 49 illustrates the structure of the playback apparatus 3. As shown in FIG. 49, the playback apparatus 3 includes a playback counter value detection/write controller 231, in addition to the parts shown in FIG. 6.

The playback counter value detection/write controller 231 increments the playback counter value by one each time the content data is played back.

Each time the playback counter value is incremented, the playback counter value included in the additional information recorded in the storage unit 209 and that recorded in the playback card 8 is updated under the control of the authentication/write/delete controller 206.

[F(10)] Process Performed by Server

The process performed by the server 1 is similar to that shown in FIG. 13. However, information (such as a flag) of a large number of playback cards 8 is recorded in each delivery card 4 wherein flags are recorded in correspondence with playback IDs. Therefore, when a returned delivery card 4 is checked in steps F113 to F118, flags are examined to detect the status of the playback apparatuses 3 corresponding to the respective playback card IDs.

If the playback counter value is recorded together with the playback card ID, the determination of how many times the content data has been actually played back can be made for each playback apparatus 3 on the basis of the playback counter value corresponding to the playback card ID.

[G(10)] Process Performed by Relay Server

FIGS. 50A and 50B illustrate the process performed by the relay server 2. In FIGS. 50A and 50B, similar steps to those shown in FIG. 14 or FIG. 42A or 42B are denoted by similar step numbers, and they are not described in further detail herein.

More specifically, steps F121 to F509 shown in FIG. 50A are similar to those shown in FIG. 42A. Furthermore, steps F511 to F516 shown in FIG. 50B are also similar to those shown in FIG. 42B.

Also in this process shown in FIGS. 50A and 50B, as in the seventh and eighth embodiments described above, transmission of the content data to the playback apparatus 3 is performed in steps F512 to F516 only if the deletion-from-playback-apparatus flag written in the playback card 8 indicates that the content data which was used in the past has been deleted from the playback apparatus 3 and if the checking of the account indicates that payment has been correctly performed. However, the check on the payment in step F660 is performed differently.

In step F660, the judgment unit 130 checks the account by communicating with the bank center 550. This checking process performed by the judgment unit 130 is based on the playback counter value included in the additional information read from the playback card 8 which is mounted on the relay server 2 after being received from the movie theater 502.

That is, in the movie distribution system according to the present embodiment, a fee is charged to the movie theater 502 on the basis of the playback counter value. If the amount of money paid into the bank account, detected by the judgment unit 130 in step F660, is equal to or greater than the value corresponding to the playback counter value, then in step F511 the judgment unit F550 makes an affirmative judgment.

[H(10)] Process Performed by Playback Apparatus

FIG. 51 illustrates the process performed by the playback apparatus 3. In FIG. 51, similar steps to those shown in FIG. 39 or FIG. 9 are denoted by similar step numbers, and they are not described in further detail herein.

In the process shown in FIG. 51, as in the process shown in FIG. 39, if a playback command is detected in step F56, steps F57 to F61 are performed to read information such as the additional information from the playback card 8. Thereafter, in step F520, it is determined whether to permit a playback operation. In this process in step F520, it is checked whether the additional information read from the playback card 8 is identical to the additional information which is retained in the storage unit 209 after being received via electronic transmission; whether the present time is within the allowed playing period indicated by the schedule information included in the additional information; and whether the playback card ID is identical to (or consistent with) the playback apparatus ID. Only when the above requirements are all satisfied, it is determined that the playback operation should be permitted, and the process can proceed to step F64 to perform the playback operation.

After retrieving the content data in step F64, the process proceeds to step F650 in which, under the control of the playback counter value detection/write controller 231, the playback counter value is detected from the additional information corresponding to the retrieved content data, and the playback counter value is incremented by one. More specifically, in the addition information stored in the storage unit 209 and in the additional information stored in the compressed data storage unit 208, the playback counter value is incremented, and the authentication/write/delete controller 206 transmits the additional information including the incremented playback counter value to the card read/write controller 205 via the encryption unit 220. The card read/write controller 205 updates the additional information recorded in the playback card 8 in accordance with the received additional information.

In step F65, the content data is played back.

In the above-described process, the playback counter value included in the additional information is counted so that it indicates the actual number of times the content data has been played back.

When the playback card 8 is sent to the relay server 2 after the end of the playing period, the relay server 2 checks, in step F660 in FIG. 50B, whether payment corresponding to the playback counter value has been correctly made.

In the present embodiment, the movie theater 502 pays the charge corresponding to the number of times the content data has been actually played back, to the relay server 2 or the server 1. Therefore, in the payment process in step F72 to F74, if payment is made by an amount corresponding to the playback counter value which is included in the additional information after completion of the deleting of the content data and the writing of the deletion-from-playback-apparatus flag in steps F67 to F71, then the payment is correctly made.

In the present embodiment, the incrementing of the playback counter value is performed in step F650 for all the additional information stored in the storage unit 209, that stored in the compressed data storage unit 208, and that stored in the playback card 8. However, for example, the playback counter value recorded in the playback card 8 may not be updated each time the content data is played back. In this case, when the deletion-from-playback-apparatus flag is written in step F71, the additional information which is stored in the storage unit 209 at that time and which thus includes the correct playback counter value is written into the playback card 8.

[I(10)] Advantages

As with the seventh, eighth, and ninth embodiments described above, the tenth embodiment provides advantages (1) to (8) and advantages (20) and (21). In addition, the following advantages are obtained.

(26) The relay serve 2 (or server 1) charges the fee on the basis of the playback counter value indicating the number of times the content data has been actually played back by the playback apparatus 3. This makes it possible for the movie theater 502 to pay the fee on the basis of the number of times the content data has been actually played back. This allows the movie theater 502 to play back the content data as many times as the movie theater 502 desires. Therefore, this movie distribution system is very useful also for the movie theater 502.

(27) The relay server 2 or the server 1 can detect how many times the content data has been actually played back by the movie theater 502, from the playback counter value described in the playback card 8. This is useful for management and for field investigation of the playing status.

Eleventh Embodiment

[A(11)] Outline

An eleventh embodiment is described below.

The configuration and the operation of the eleventh embodiment are based on those of the eighth embodiment. Therefore, the flows of the content data 6, the delivery card 4, and the playback card 8 are similar to those shown in FIG. 40.

However, in this movie distribution system according to the eleventh embodiment, the playback card 8 also serves as a prepaid card.

That is, if the playback apparatus 3 makes payment, the payment amount is recorded as the prepaid amount in the playback card 8.

The relay server 2 checks the prepaid amount recorded in the playback card 8 received from the playback apparatus 3, and the relay server 2 charges the fee according to the playback condition of the content data when the relay server 2 transmits the content data. More specifically, the relay server 2 reduces the prepaid amount recorded in the playback card 8 by a proper amount.

If the remaining prepaid amount is not sufficient, the content data is not transmitted or the content data is transmitted after modifying the playback condition in accordance with the remaining prepaid amount. For example, the number of times the content data is allowed to be played back may be employed as the playback condition.

In the following explanation of [B(11)] Configuration of Server to [H(11)] Process Performed by Playback Apparatus, it is assumed that when the playback apparatus 3 makes payment (into a bank account), the payment amount is recorded in the playback card 8, and the relay server 2 can charge a fee simply by changing the prepaid amount described in the playback card 8. However, the playback card 8 may also be used as a prepaid card in other various manners.

For example, the playback apparatus 3 writes the prepaid amount into the playback card 8 without making actual payment. When the relay server 2 reduces the prepaid amount recorded in the playback card 3 by a proper amount, the relay server 2 informs the bank center 550 of the amount of reduction. The bank center 550 transfers the specified amount of money from the account of the playback apparatus 3 to the account of the relay server 2 (or the server 1).

Alternatively, when the playback apparatus 3 pays money into an account for prepayment, the prepaid amount is recorded in the playback card 8. When the relay server 2 updates the prepaid amount recorded in the playback card 8, the relay server 2 asks the bank center 550 to transfer a proper amount of money from the account for prepayment to the account of the relay server 2.

In the present embodiment, when the relay sever 2 transmits content data, the relay server 2 receives a proper amount of money depending upon the playback condition from the prepaid money. Alternatively, as in the tenth embodiment described above, the playback counter value indicating the number of times the content data has been actually played back is written by the playback apparatus 3 into the playback card 8, and the relay server 2 reduces the prepaid amount by an amount corresponding to the playback counter value thereby receiving the corresponding amount of money. In this case, payment for the fee for the content data is made from the prepaid money after the end of the playing period.

[B(11)] Configuration of Server

The configuration of the server 1 is similar to that shown in FIG. 11.

[C(11)] Configuration of Card

Figure 52A:
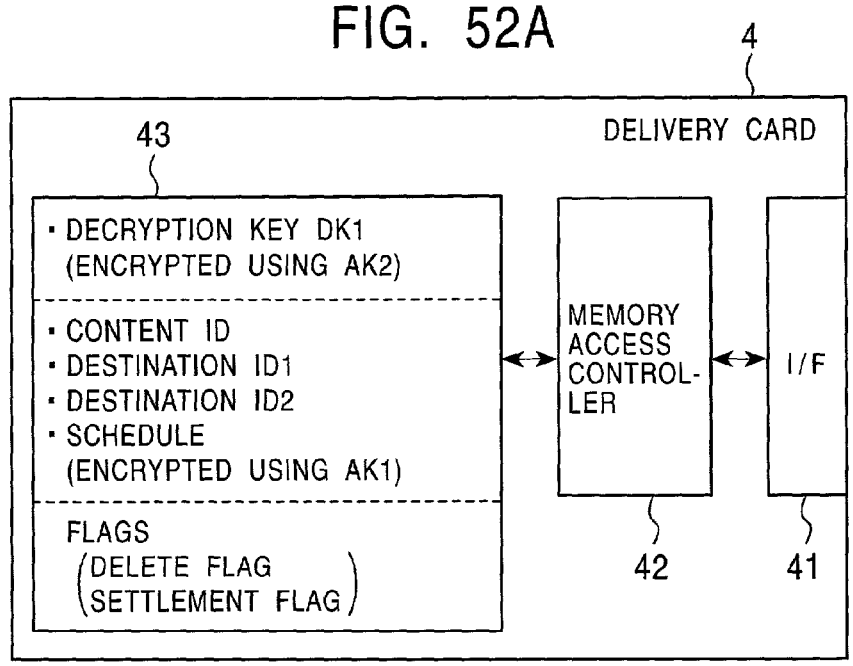
FIG. 52 is a block diagram illustrating a delivery card and a playback card according to an eleventh embodiment of the present invention.
Figure 52B:
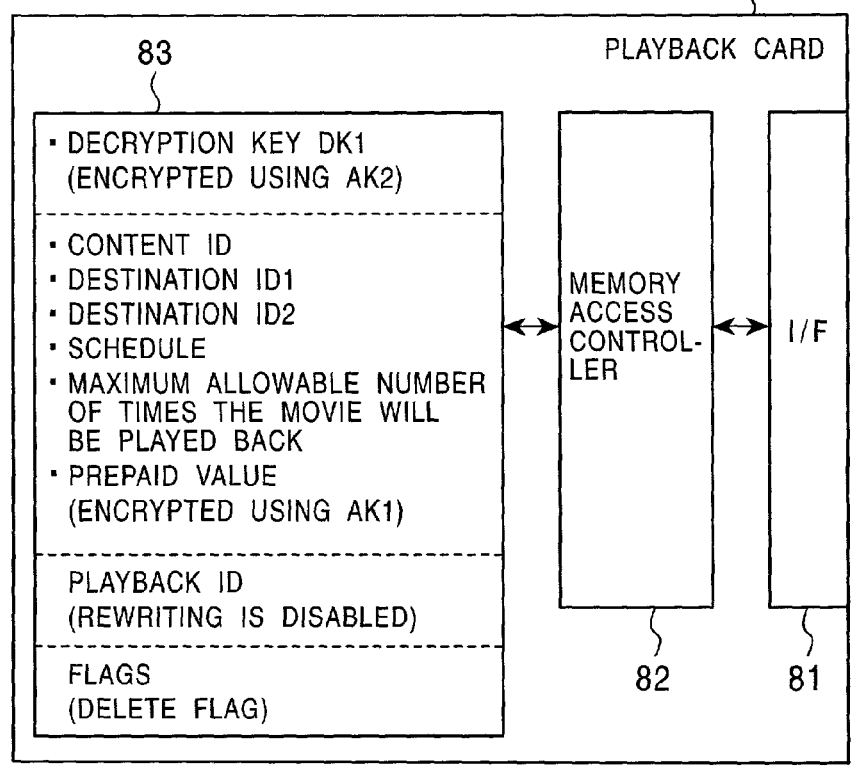

FIGS. 52A and 35B illustrate the configurations of the delivery card 4 and the playback card 8, respectively. The configurations are basically similar to those shown in FIGS. 35A and 35B, respectively. However, the prepaid amount of money is added to the additional information which is written in an encrypted form into the memory 83 of the playback card 8. The prepaid amount of money is written by the playback apparatus 3. The relay server 2 can reduce the prepaid amount of money.

In the present embodiment, the reduction of the prepaid amount of money performed by the relay server 2 is based on the number of times the content data is allowed to be played back, which is predetermined as the playback condition. In other words, the number of times the playback apparatus 3 plays back the content data is limited to the predetermined number.

For the above purpose, the number of times the content data is allowed to be played back is also recorded in the playback card 8.

In the present embodiment, the number of times the content data is allowed to be played back is set by the relay server 2, and thus the number of times the content data is allowed to be played back is not described in the delivery card 4. Alternatively, the number of times the content data is allowed to be played back may be set by the server 1. In this case, the number of times the content data is allowed to be played back is recorded in the delivery card 4 and delivered to the relay server 2.

[D(11)] Configuration of Relay Server

The relay server 2 has a similar configuration to that shown in FIG. 41. However, the additional information read from the playback card 8 sent from the movie theater 502 includes the prepaid amount of money. The authentication/write controller 106 and the judgment unit 130 perform the charging process such that the prepaid amount is reduced by an amount corresponding to the number of times the content data has been played back.

The additional information input via the input unit 117, the additional information written in the playback card 8, the additional information stored in the storage unit 110, and the additional information which is stored together with the content data in the compressed data storage unit 109 and which is transmitted to the movie theater 502 all includes the number of times the content data is allowed to be played back, wherein the number of times the content data is allowed to be played back is the playback condition determined according to the prepaid amount of money.

[E(11)] Configuration of Playback Apparatus

The construction of the playback apparatus 3 is similar to that shown in FIG. 44 That is, the playback apparatus 3 includes a maximum playback number write/write controller 230.

The number-of-times value indicating the number of times content data is allowed to be played back is included in additional information which is demodulated and decrypted after being received by the receiving unit 201, additional information which is read from the delivery card 4 and then decrypted, additional information stored in the storage unit 209, and additional information which is stored together with content data in the compressed data storage unit 109.

The maximum playback number detection/write controller 230 detects the number-of-times value indicating the number of times the content data is allowed to be played back, from the additional information corresponding to the content data to be played back. On the basis of the detected value, the maximum playback number detection/write controller 230 determines whether to permit the content data to be played back.

Each time the content data is played back, the number of times the content data is allowed to be played back is decremented under the control of the maximum playback number detection/write controller 230. More specifically, each time the content data is played back, the value which indicates the number of times the content data is allowed to be played back and which is included in the additional information stored in the storage unit 209 and also in the playback card 8 is decremented by one.

In response to an operation of the user control unit 210, the charge controller 221 communicates with the bank center 550 to prepay a particular amount of money into a specified account.

The delete/write/delete controller 206 is informed of the prepaid amount. In response, the authentication/write/delete controller 206 updates the prepaid amount of money stored in the playback card 8 or the storage unit 209 such that the prepaid amount is added to the current value described in the playback card 8.

[F(11)] Process Performed by Server The process performed by the server 1 is similar to that shown in FIG. 13. However, information (such as a flag) of a large number of playback card 8 is recorded in each delivery card 4 wherein flags are recorded in correspondence with playback IDs. Therefore, when a returned delivery card 4 is checked in steps F113 to F118, flags are examined to detect the status of the playback apparatuses 3 corresponding to the respective playback card IDs.

[G(11)] Process Performed by Relay Server

Figure 53A:
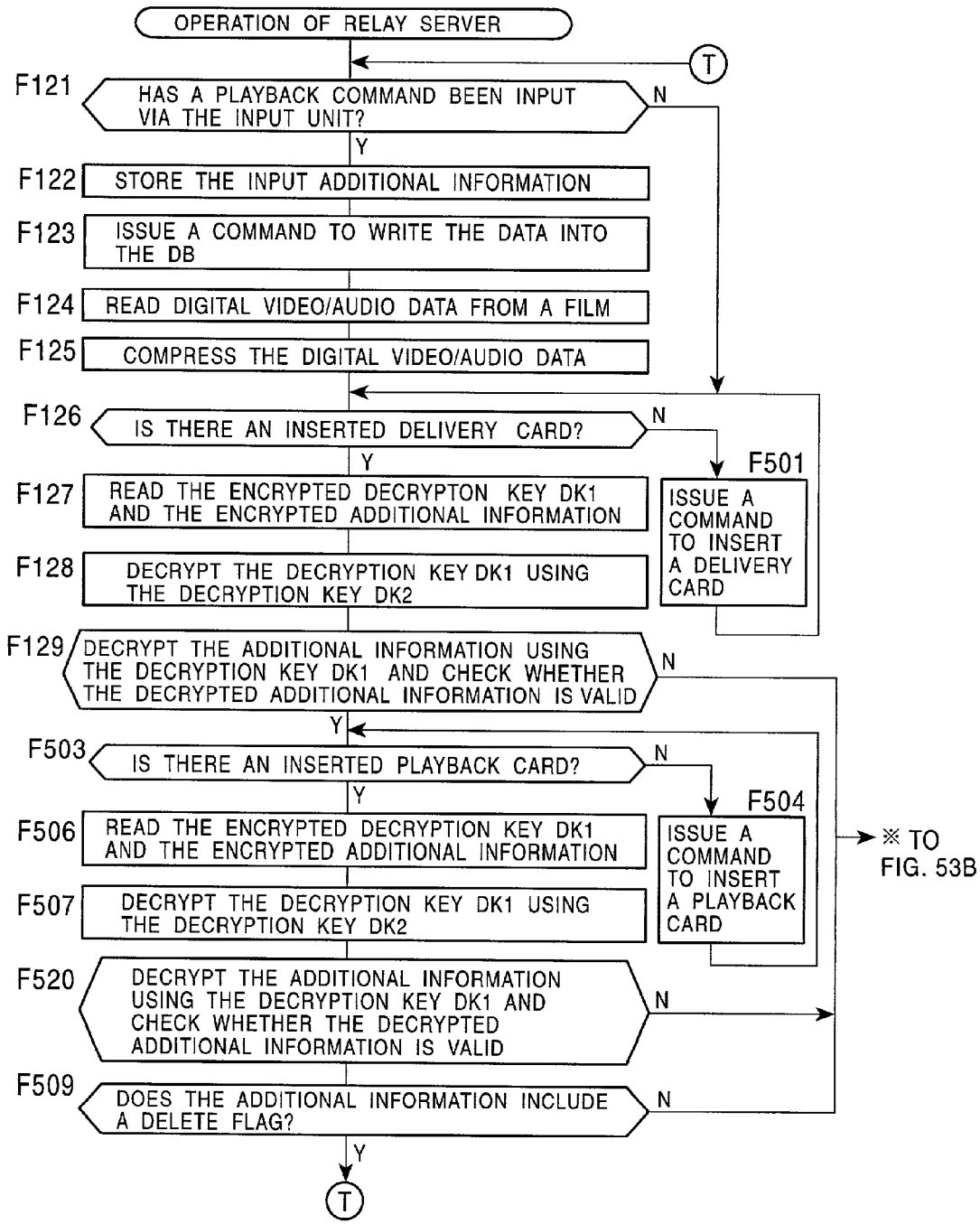
FIGS. 53A and 53B are flow charts illustrating a process performed by the relay server according to the eleventh embodiment of the present invention.
Figure 53B:
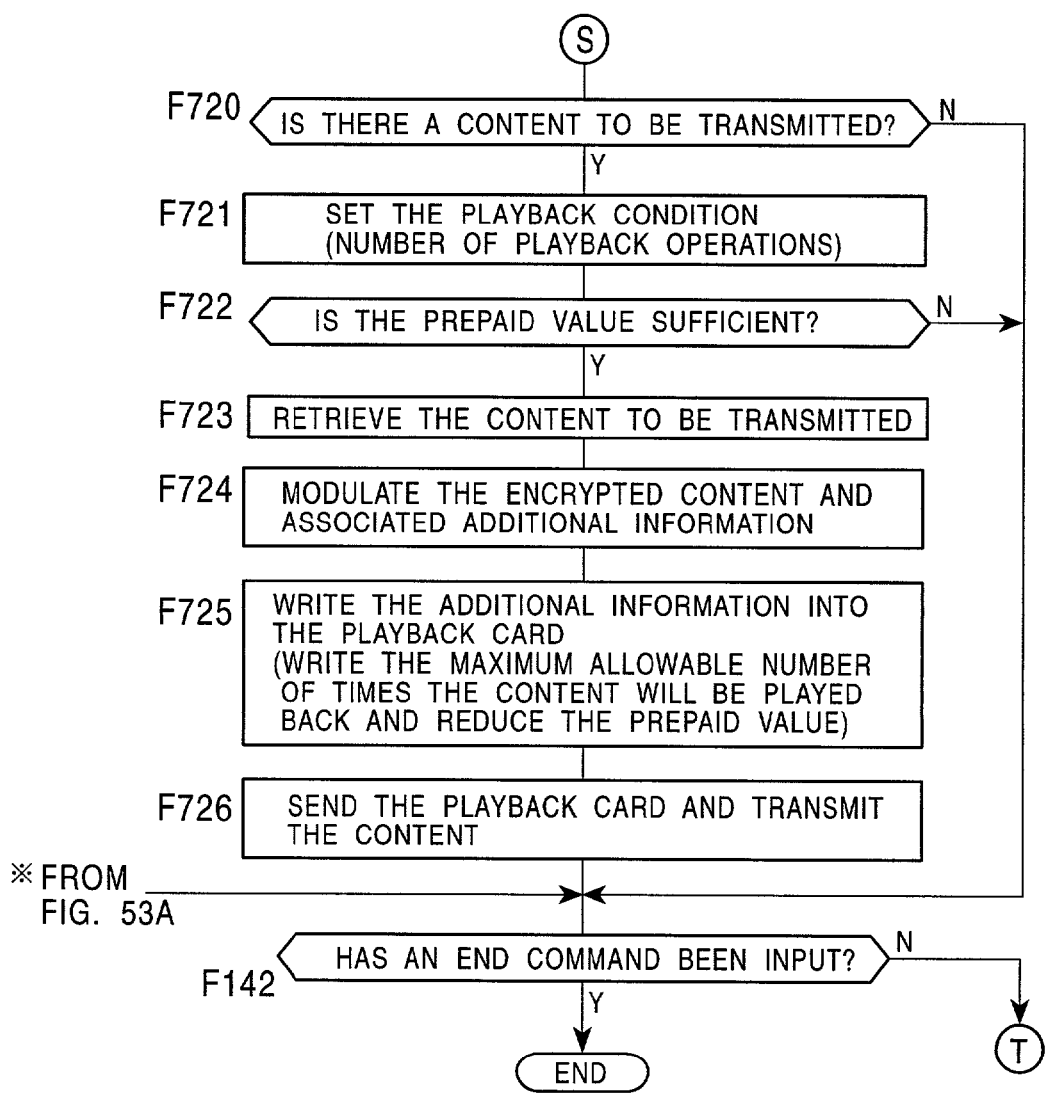

FIGS. 53A and 53B illustrate the process performed by the relay server 2. In FIGS. 50A and 50B, similar steps to those shown in FIG. 14 or FIG. 42A or 42B are denoted by similar step numbers, and they are not described in further detail herein.

More specifically, steps F121 to F509 shown in FIG. 53A are similar to those shown in FIG. 42A.

In this eleventh embodiment, as in the seventh to tenth embodiments described above, transmission of the content data to the playback apparatus 3 is performed only if the deletion-from-playback-apparatus flag written in the playback card 8 indicates that the content data which was used in the past has been deleted from the playback apparatus 3. After the content data is determined as having been deleted in step F509, the following steps are performed in the manner as described below.

If a deletion-from-playback-apparatus flag is detected in step F509, the process proceeds to step F720 to check whether there is content data to be transmitted at the present time. That is, the schedule information is examined which is included in the additional information received from the server 1 or read from the delivery card 4. If it is determined that there is a content data to be transmitted at the present time, the process proceeds to step F720 to transmit the content data. However, no content data to be transmitted at the present time is detected, the process proceeds to step F142.

In the case where content data to be transmitted at the present time is detected, the process proceeds to step F721 to set the playback condition.

In the present embodiment, the number of times the content data is allowed to be played back is set as the playback condition. More specifically, for example, according to the contract, the authentication/write controller 106 sets the number of times the content data is allowed to be played back.

Alternatively, the allowed playing period may be employed as the playback condition. Still alternatively, both the number of times the content data is allowed to be played back and the playing period may be set as the playback conditions. In the case where the playing period is set so as to be different from the playing period indicated by the schedule information included in the additional information, the schedule information is changed.

Thereafter, in step F722, the prepaid amount is checked from the additional information read from the playback card 8 to determine whether the remaining amount is sufficient to charge the fee corresponding to the playback condition (the number of times the content data is allowed to be played back).

If the remaining amount of money is insufficient, the process proceeds to step F142 without transmitting the content data.

If the remaining prepaid amount is sufficient, the process proceeds to step F723. In step F723, the database controller 113 retrieves, under the control of the distribution controller 112, the content data to be transmitted from the compressed data stored unit 109.

In step F724, the encrypted content data and the associated additional information which have been retrieved are modulated by the modulator 114.

In parallel, in step F725, information such as the additional information read from the delivery card 4 is written into the playback card 8. More specifically, under the control of the authentication/write controller 106, the encryption unit 116 encrypts the decryption key DK1 read from the delivery card 4 and transmits the encrypted decryption key DK1 to the card read/write controller 105. The additional information including the content ID, the destination identifiers ID1 and ID2, the schedule information, and the number of times the content data is allowed to be played back, employed as the playback condition, are encrypted by the encryption unit 116 using the encryption key AK1, and supplied to the card read/write controller 105.

Herein, the write/write controller 106 subtracts the amount of charge for the transmission of the content data, which was calculated in step F722, from the prepaid amount recorded in the playback card 8. The resultant reduced value is written into the additional information. The additional information including the prepaid amount is encrypted by the encryption unit 116 using the encryption key AK1 and supplied to the card read/write controller 105.

The card read/write controller 105 writes them into the playback card 8. As a result, the prepaid amount described in the playback card 8 is updated into the reduced value.

In step F726, the encrypted content data and additional information, which have been modulated in step F724 by the modulator 114 after being read from the compressed data storage unit 109, are transmitted from the transmitting unit 115 to the playback apparatus 3. Furthermore, the playback card 8 including the decryption key DK1 and the additional information written therein in step F725 is sent to the movie theater 502.

In the process according to the present embodiment, transmission of the content data to the playback apparatus 3 is performed only if the deletion-from-playback-apparatus flag written in the playback card 8 indicates that the content data which was used in the past has been deleted from the playback apparatus 3 and if the charging for the fee of the content data can be successfully performed by reducing the prepaid amount described in the playback card 8.

Although the process of writing data into the delivery card 4 to be returned to the server 1 is not shown in the flow charts shown in FIGS. 53A and 53B as in FIGS. 42A and 42B, the flags stored in the playback card 8 received from each movie theater 502 are written together with the playback card ID into the delivery card 4 at a proper time after reading the data from the playback card 8. This allows the server 1 to perform the checking process in steps F113 to F118 shown in FIG. 13 when the server 1 receives the delivery card 4.

[H(11)] Process Performed by Playback Apparatus

Figure 54:
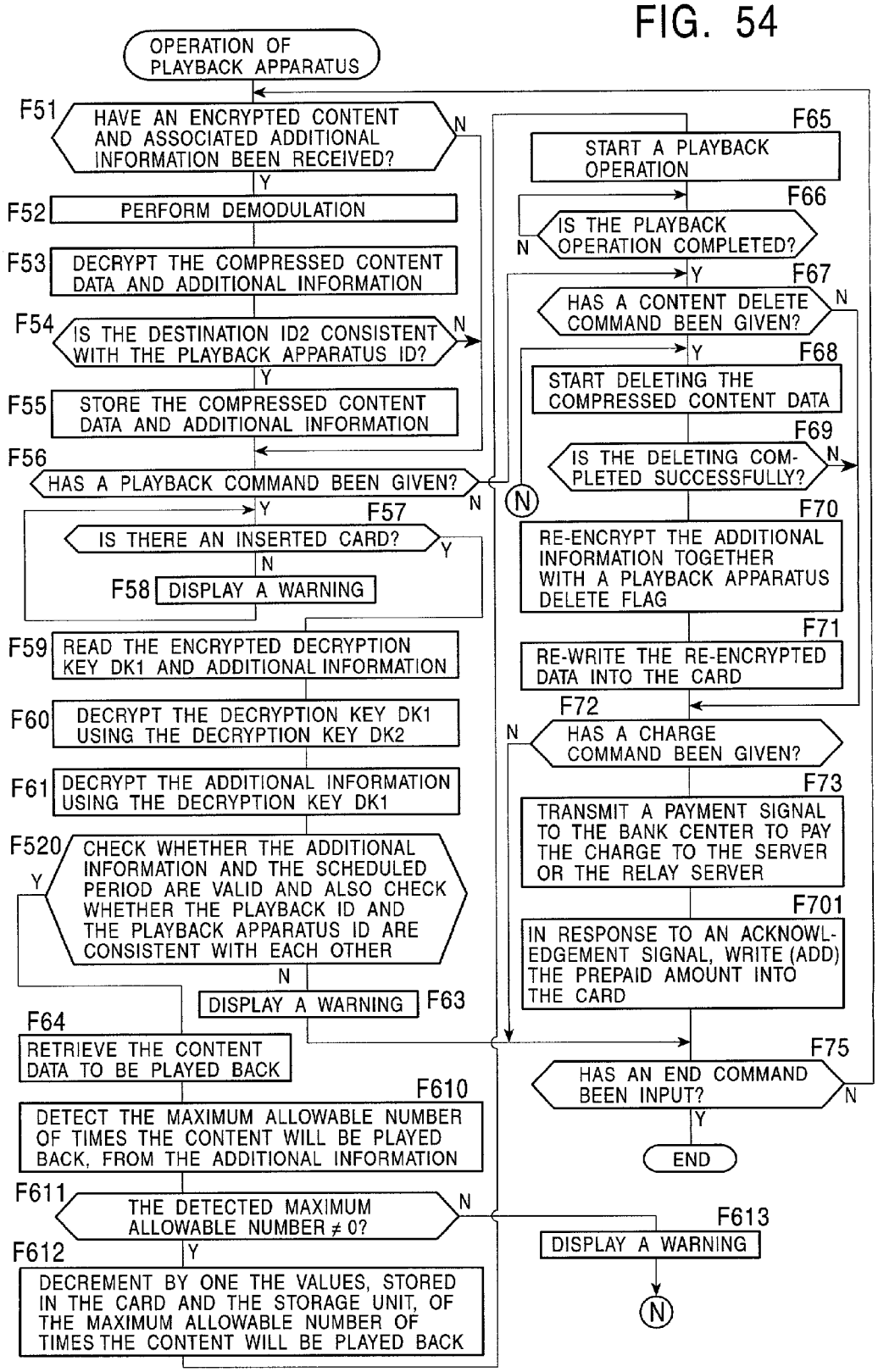
FIG. 54 is a flow chart illustrating a process performed by the playback apparatus according to the eleventh embodiment of the present invention.

FIG. 54 illustrates the process performed by the playback apparatus 3. In FIG. 54, similar steps to those shown in FIG. 47 or FIG. 9 are denoted by similar step numbers, and they are not described in further detail herein.

In the process shown in FIG. 54, as in the process shown in FIG. 47, if a playback command is detected in step F56, steps F57 to F61 are performed to read information such as the additional information from the playback card 8. Thereafter, in step F520, it is determined whether to permit a playback operation. In this process in step F520, it is checked whether the additional information read from the playback card 8 is identical to the additional information which is retained in the storage unit 209 after being received via electronic transmission; whether the present time is within the allowed playing period indicated by the schedule information included in the additional information; and whether the playback card ID is identical to (or consistent with) the playback apparatus ID. Only when the above requirements are all satisfied, the process can proceed to step F64 to perform the playback operation.

After retrieving the content data in step F64, the process proceeds to step F610 in which the maximum playback number detection/write controller 230 detects the number of times the content data is allowed to be played back, from the corresponding additional information. If it is determined in the next step F611 that the number of times the content data is allowed to be played back is not equal to 0, it is determined that the content data should be permitted to be played back.

In this case, the process proceeds to step F612 in which the number of times the content data is allowed to be played back, which is described in the additional information, is decremented by 1 under the control of the maximum playback number write/write controller 230. More specifically, in the additional information stored in the storage unit 209 and in the additional information stored in the compressed data storage unit 208, the number of times the content data is allowed to be played back is decremented, and the authentication/write/delete controller 206 transmits the additional information including the decremented number of times the content data is allowed to be played back to the card read/write controller 205 via the encryption unit 220. The card read/write controller 205 updates the additional information recorded in the playback card 8 in accordance with the received additional information.

In step F65, the content data is played back.

Because each time the content data is played back, the number of times the content data is allowed to be played back is decremented, if a playback command is issued after the content data has been played back as many times as the original number which was set by the relay server 2 in accordance with the prepaid amount, the number of times the content data is allowed to be played back is determined, in step F611, as being equal to 0, and thus the process can no longer proceed to step F65 to further play back the content data. In this case, the process proceeds to step F613 to display a warning on the display unit 213. Then in step F68, the content data is deleted.

That is, the playback apparatus 3 can play back the content data only as many times as allowed by the original value of the number of times the content data is allowed to be played back, which is set by the relay server 2 in accordance to the prepaid amount.

In the case where the relay server 2 sets the playing period as the playback condition and payment is made by means of prepayment, the judgment of whether the present time is within the playing period is made in step F520.

In the playback apparatus 3, the charging unit 221 makes payment by means of prepayment at an arbitrary time in response to a command issued by a human operator.

If a pay command issued by the operator is detected in step F72, the process proceeds to step F73. In step F73, the charging unit 221 communicates with the bank center 550 to ask the bank center 550 to make payment by an amount specified by the operator, into a specified bank account.

If in step F701 a message indicating that the payment has been successfully made is received from the bank center 550, the additional information recorded in the playback card 8 is updated such that the amount of payment made this time is added to the current prepaid amount.

More specifically, the charging unit 221 informs the authentication/write/delete controller 206 of the amount of payment. The delete/write/delete controller 206 updates the prepaid amount described in the playback card 8 and also that stored in the storage unit 209 such that the resultant prepaid amount becomes equal to the sum the current prepaid amount described in the playback card 8 and the amount of payment made this time.

[I(11)] Advantages

As with the seventh, eighth, and ninth embodiments described above, the eleventh embodiment provides advantages (1) to (8) and advantages (20) and (21). In addition, the following advantages are obtained.

(28) The relay server 2 (or the server 1) properly sets the playback condition of the content data. For example, the number of times the content data is allowed to be played back by the playback apparatus 3 is set. After charging the fee corresponding to the playback condition on the prepayment basis, the content data is transmitted. This makes it possible for the relay server 2 to easily charge the fee in a highly reliable fashion.

(29) In the case the prepaid amount is insufficient, the relay server 2 may not transmit the content data or may transmit the content data after reducing the number of times the content data is allowed to be played back to a value corresponding to the remaining prepaid amount. That is, transmission of the content may be performed in a flexible manner depending upon the situation.

(30) The playback apparatus 3 can make payment for the fee of the transmission of the content data simply by make prepayment at an arbitrary time.

SPECIFIC EXAMPLES OF IMPLEMENTATIONS OF EMBODIMENTS

Embodiments of the invention have been described above. Specific examples of implementations of the embodiments are described below.

The processes performed by the server 1, the relay server 2, and the playback apparatus 3, respectively, may be performed by means of hardware or software. In the case where the processes are performed by means of software, a software program is installed on a computer embedded in special-purpose hardware such as a transmitter/receiver apparatus or a recording/playing back apparatus or is installed on a general-purpose computer.

Figure 55:
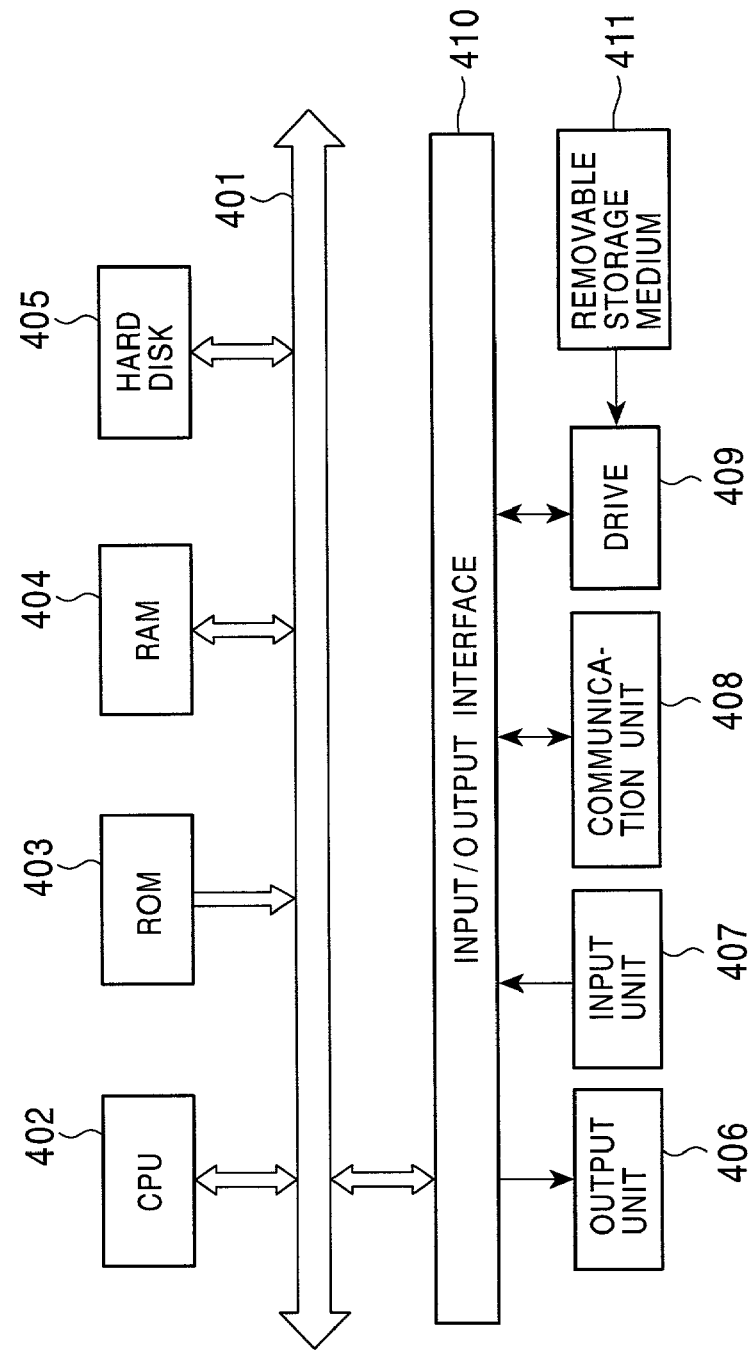
FIG. 55 is a schematic diagram illustrating an embodiment of the present invention.
Figure 56:
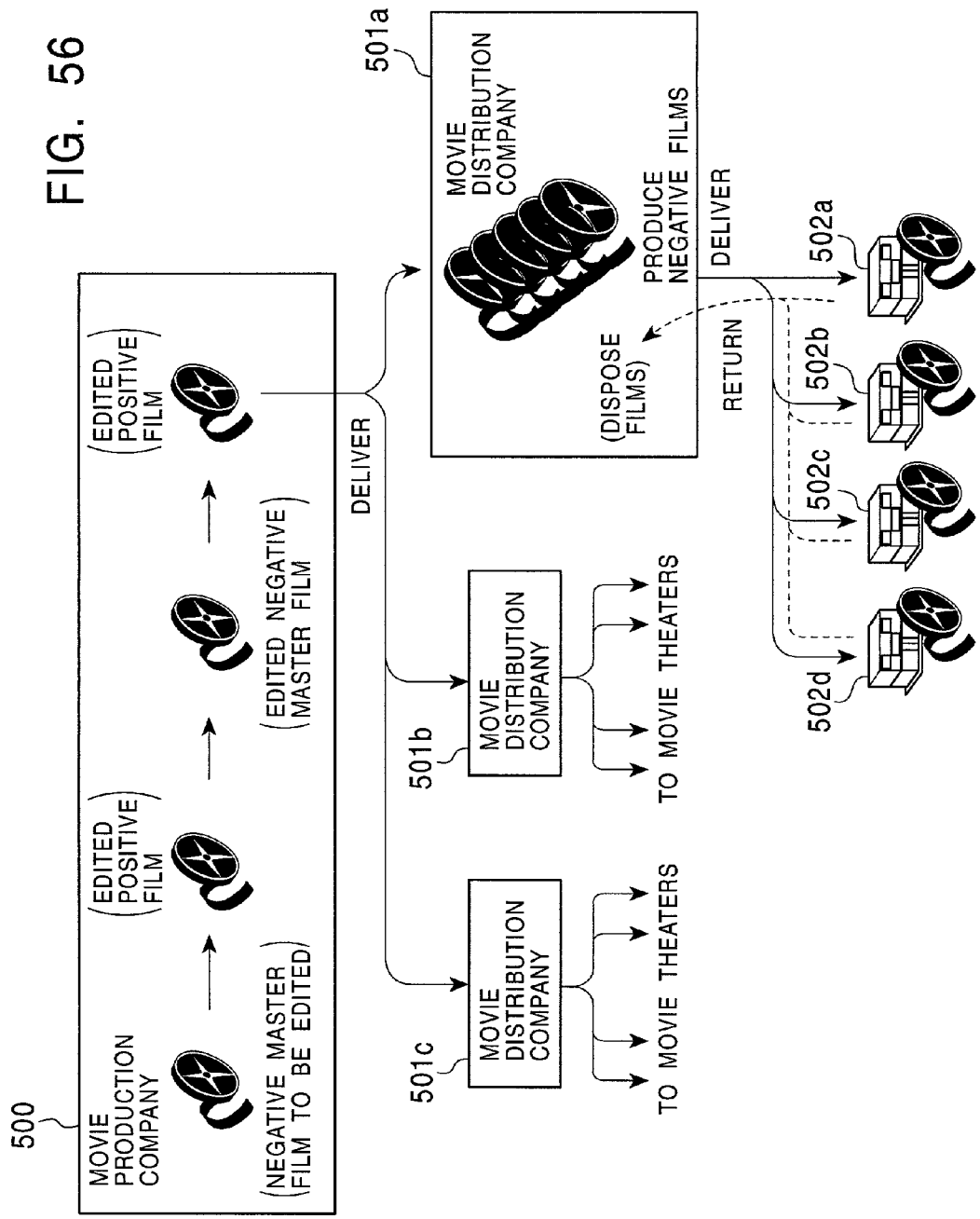
FIG. 56 is a schematic diagram illustrating a conventional movie distribution system.

FIG. 55 illustrates an example of a configuration of a computer in which a program used to execute the processes described above is installed.

The program may be stored, in advance, on a hard disk 405 serving as a storage medium or in a ROM 403 which are disposed inside the computer.

Alternatively, the program may be stored (recorded) temporarily or permanently on a removable storage medium 111 such as a floppy disk, a CD-ROM (Compact Disc Read Only Memory), a MO (Magnetooptical) disk, a DVD (Digital Versatile Disc), a magnetic disk, or a semiconductor memory. Such a removable recording medium 411 may be provided in the form of so-called package software.

Instead of installing the program from the removable recording medium 411 onto the computer, the program may also be transferred to the computer from a download site via a digital broadcasting satellite by means of radio transmission or via a network such as a LAN (Local Area Network) or the Internet by means of wire communication. In this case, the computer receives, using a communication unit 408, the program transmitted in such a manner and installed the program on the hard disk 405 disposed in the computer.

The computer includes a CPU (Central Processing Unit) 402. When a user inputs a command by operating an input device 407 such as a keyboard or a mouse, the command is transferred to the CPU 402 via the input/output interface 410. In accordance with the command, the CPU 402 executes a program stored in the ROM (Read Only Memory) 403. Alternatively, the CPU 402 may execute a program loaded in a RAM (Random Access Memory) 404 wherein the program may be loaded into the RAM 404 by transferring a program stored on the hard disk 405 into the RAM 404, or transferring a program which has been installed on the hard disk 405 after being received from a satellite or a network via the communication unit 408, or transferring a program which has been installed on the hard disk 405 after being read from a removable recording medium 411 loaded on a drive 409, By executing the program, the CPU 402 performs the process described above with reference to the flow charts.

The CPU 402 outputs the result of the process, as required, to an output device such as a LCD (Liquid Crystal Display) or a loudspeaker via an input/output interface 410. The result of the process may also be transmitted via the communication unit 408 or may be stored on the hard disk 405.

In the present invention, the processing steps described in the program to be executed by a computer to perform various kinds of processing are not necessarily required to be executed in time sequence according to the order described in the flow chart. Instead, the processing steps may be performed in parallel or separately (by means of parallel processing or object processing).

The program may be executed either by a single computer or by a plurality of computers in a distributed fashion. The program may be transferred to a computer at a remote site and may be executed thereby.

The first to eleventh embodiments have been described above by way of example only, but not limitation. Various modifications and changes in terms of the configuration and the process are possible. Furthermore, two or more embodiments regarding the configuration or process may be combined. Also in such a case, the configurations and the processes of the server 1, the relay server 2, and the playback apparatus 3 may be implemented using a computer such as that shown in FIG. 55.

As can be understood from the above description, the present invention has various great advantages.

That is, content data including a video source such as a movie data and/or an audio source is transmitted from a server apparatus to a playback apparatus after being encrypted. A key used to decrypt the encrypted data is stored on a storage medium such as a memory card and the storage medium is sent from the server apparatus to the playback apparatus in parallel with the transmission of the content data. This allows both the content data and the key to be delivered without being hacked during the delivery, and thus high security is achieved in the delivery.

When playing-back of the content data performed by the playback apparatus in for example a movie theater is completed, the storage medium is returned to the server apparatus. The server apparatus checks whether an authorized use of the content data delivered by means of electronic transmission is made, on the basis of information recorded on the storage medium. This makes it possible for the server to properly manage and control the use of the data at the playback apparatus site. This makes it possible to monitor whether the data is copied or transferred in an unauthorized manner.

Thus, it is ensured that data such as a movie data whose copyright is needed to be protected can be transmitted in a highly secure manner. In particular, the present invention is useful when applied to a movie distribution system, because a movie can be distributed at less cost and with higher efficiency than can be achieved by a conventional movie distribution system using a film.

Information for the purpose of management performed at the server site and information for the purpose of controlling the playback operation at the playback apparatus site may be stored on the storage medium. Specific examples of such information include a playing period during which the data is allowed to be played back, settlement information, the number of times the data is allowed to be played back, a delete flag indicating that the data has been deleted, information (ID of transfer means) indicating that the data has been output or transferred, and payment amount information.

What is claimed is:

1. A data delivery system comprising:
   encrypting means for encrypting data and outputting the resultant encrypted data;
   transmitting means for transmitting the encrypted data;
   medium recording means for recording, on a physical storage medium, a key used to decrypt the encrypted data, the physical storage medium being physically transportable;
   receiving means for receiving the encrypted data transmitted by the transmitting means;
   medium reading means for reading the key stored on the physical storage medium and physically received by said medium reading means;
   decrypting means for decrypting the encrypted data received by the receiving means, using the key read by the reading means;
   reproducing means for reproducing the data decrypted by the decrypting means;
   control means for controlling the reproduction of the data performed by the reproducing means in accordance with stored information on the storage medium and relating to the permitted use of the data;
   judgment means for detecting unauthorized use of the data, on the basis of said information stored on the physical storage medium;
   storage means for storing the received encrypted data; and
   delete flag recording means for, when the encrypted data stored in the storage means is deleted, recording a delete flag on the physical storage medium,
   wherein the judgment means detects unauthorized use of the data by judging whether the delete flag is recorded on the physical storage medium.

2. A data delivery system according to claim 1, wherein the recording means records an allowed reproduction period during which data corresponding to the key stored on the storage medium is allowed to be reproduced; and the judgment means detects unauthorized use of the data, on the basis of the allowed reproduction period recorded on the storage medium.

3. A data delivery system according to claim 1, further comprising: settling means for performing settlement corresponding to data reproduced by the reproducing means, and settlement information recording means for recording settlement information on the storage medium in response to the settlement, wherein the judgment means detects unauthorized use of the data, on the basis of the settlement information stored on the storage medium.

4. A data delivery system according to claim 1, wherein the recording means records an allowed reproduction period during which data corresponding to the key stored on the storage medium is allowed to be reproduced; and the control means enables or disables the reproducing means to reproduce the data, in accordance with the allowed reproduction period recorded on the storage means.

5. A data delivery system according to claim 1, wherein the recording means records a number-of-times value indicating the number of times data corresponding to the key stored on the storage medium is allowed to be reproduced; and the control means enables or disables the reproducing means to reproduce the data in accordance with the number-of-times value recorded on the storage medium.

6. A data delivery system according to claim 5, further comprising embedding means for embedding an electronic watermark indicating the allowance of reproduction into the data, wherein the control means reduces the number-of-times value each time the reproducing means reproduces the data, and the control means rewrites the electronic watermark embedded in the data so as to indicate inhibition of reproduction when the number-of-times value becomes equal to zero.

7. A data delivery system according to claim 1, further comprising: transfer means capable of transferring the encrypted data received by the receiving means to another electronic apparatus; detecting means for detecting a transfer operation performed by the transfer means; and ID recording means for, when the detecting means detects a transfer operation, recording an ID corresponding to the transfer means on the storage medium.

8. A data delivery system according to claim 1, further comprising: a mounting part for mounting the storage medium therein: memory means on which information recorded on the storage medium is stored when the storage medium is mounted in the mounting part; and rewriting means for rewriting the information recorded on the storage medium, wherein the control means controls the reproduction of the data performed by the reproducing means in accordance with the information stored in the memory means.

9. A data delivery system according to claim 2, further comprising rewriting means capable of rewriting the allowed reproduction period during which the data corresponding to the key stored on the storage medium is allowed to be reproduced, so as to extend the allowed reproduction period.

10. A data delivery system according to claim 1, further comprising updating means for updating the information recorded on the storage medium if the judgment means determines, from the information recorded on the storage medium, that the use of the data is valid.

11. A data delivery system according to claim 10, wherein the recording means records, on the storage medium, an identifier of the data, an allowed reproduction period assigned to the data, and a key used to decrypt the data; and the updating means updates the information recorded on the storage medium, if the judgment means determines, from the information recorded on the storage medium, that the use of the data is valid.

12. A data delivery system according to claim 5, further comprising settling means for performing settlement in accordance with the number-of-times value recorded on the storage medium by the recording means, the number-of-times value indicating the number of times the data is allowed to be reproduced.

13. A data delivery system according to claim 1, further comprising: counter means for counting the number of times the data is reproduced by the reproducing means; and settlement means for performing settlement in accordance with a count value output by the counter means.

14. A data delivery system according to claim 1, further comprising: payment amount recording means for recording payment amount information on the storage medium in response to paying a fee; and payment amount updating means for updating the payment amount information recorded on the storage medium in such a manner as to reduce the payment amount in accordance with the information recorded on the storage medium by the recording means.

15. A server apparatus for delivering data to a reproducing apparatus located at a reproducing site, comprising:
  encrypting means for encrypting data and outputting the resultant encrypted data;
  transmitting means for transmitting the encrypted data to the reproducing apparatus;
  medium recording means for recording, on a physical storage medium, a key used to decrypt the encrypted data, the physical storage medium being physically transportable to said reproducing site; and
  judgment means for detecting unauthorized use of the data transmitted from the transmitting means, on the basis of information relating to the permitted use of the data stored on the physical storage medium returned from the reproducing site,
  wherein the judgment means detects unauthorized use of the data by judging whether a delete flag, which indicates that the data transmitted from the transmitting means has been deleted, is recorded on the physical storage medium returned from the reproducing apparatus.

16. A server apparatus according to claim 15, wherein the recording means records an allowed reproduction period during which data corresponding to the key stored on the storage medium is allowed to be reproduced.

17. A server apparatus according to claim 16, wherein the judgment means detects unauthorized use of the data, on the basis of the allowed reproduction period recorded on the storage medium.

18. A server apparatus according to claim 15, wherein the judgment means detects unauthorized use of the data, on the basis of the settlement information recorded on the storage medium by the reproducing apparatus.

19. A server apparatus according to claim 15, wherein the recording means records a number-of-times value indicating the number of times data corresponding to the key stored on the storage medium is allowed to be reproduced.

20. A server apparatus according to claim 15, further comprising embedding means for embedding an electronic watermark indicating the allowance of reproduction into the data.

21. A server apparatus according to claim 15, wherein the judgment means detects unauthorized use of the data by judging whether information indicating that the data transmitted from the transmitting means has been transferred is recorded on a storage medium returned from the reproducing apparatus.

22. A server apparatus according to claim 16, further comprising rewriting means capable of rewriting the allowed reproduction period during which the data corresponding to the key stored on the storage medium is allowed to be reproduced, so as to extend the allowed reproduction period.

23. A server apparatus according to claim 15, further comprising updating means for updating the information recorded on the storage medium if the judgment means determines, from the information recorded on the storage medium, that the use of the data is valid.

24. A server apparatus according to claim 23, wherein the recording means records, on the storage medium, an identifier of the data, an allowed reproduction period assigned to the data, and a key used to decrypt the data; and the updating means updates the information recorded on the storage medium, if the judgment means determines, from the information recorded on the storage medium, that the use of the data is valid.

25. A server apparatus according to claim 15, further comprising, payment amount updating means for, when payment amount information is recorded on the storage medium in response to payment of a fee performed by the reproducing apparatus, updating the payment amount information recorded on the storage medium in such a manner as to reduce the payment amount in accordance with the information recorded on the storage medium by the recording means.

26. A reproducing apparatus to which encrypted data is transmitted from a predetermined server apparatus and to which a physical storage medium including a key stored thereon for use in decrypting the encrypted data is physically delivered, the reproducing apparatus comprising:
  receiving means for receiving the encrypted data transmitted from the predetermined server apparatus;
  medium reading means for reading the key stored on the delivered physical storage medium;
  decrypting means for decrypting the encrypted data received by the receiving means, using the key read by the reading means;
  reproducing means for reproducing the data decrypted by the decrypting means;
  control means for controlling the reproduction of the data performed by the reproducing means in accordance with information stored on the physical storage medium;
  storage means for storing the received encrypted data; and
  delete flag recording means for, when the encrypted data stored in the storage means is deleted, recording a delete flag on the physical storage medium.

27. A reproducing apparatus according to claim 26, wherein the recording means records an allowed reproduction period during which data corresponding to the key stored on the storage medium is allowed to be reproduced; and the control means enables or disables the reproducing means to reproduce the data, in accordance with the allowed reproduction period recorded on the storage means.

28. A reproducing apparatus according to claim 26, further comprising: settling means for performing settlement corresponding to data reproduced by the reproducing means; and settlement information recording means for recording settlement information on the storage medium in response to the settlement.

29. A reproducing apparatus according to claim 26, wherein a number-of-times value, indicating the number of times data corresponding to the key stored on the storage medium is allowed to be reproduced, is stored on the storage medium; and the control means enables or disables the reproducing means to reproduce the data in accordance with the number-of-times value recorded on the storage medium.

30. A reproducing apparatus according to claim 29, wherein data received by the receiving means includes an electronic watermark embedded in the data, the watermark indicating that the data is permitted to be reproduced; and the control means reduces the number-of-times value each time the reproducing means reproduces the data, and the control means rewrites the electronic watermark embedded in the data so as to indicate inhibition of reproduction when the number-of-times value becomes equal to zero.

31. A reproducing apparatus according to claim 26, further comprising: transfer means capable of transferring the encrypted data received by the receiving means to another electronic apparatus; detecting means for detecting a transfer operation performed by the transfer means; and ID recording means for, when the detecting means detects a transfer operation, recording an ID corresponding to the transfer means on the storage medium.

32. A reproducing apparatus according to claim 26, further comprising: a mounting part for mounting the storage medium therein; memory means on which information recorded on the storage medium is stored when the storage medium is mounted in the mounting part; and rewriting means for rewriting the information recorded on the storage medium, wherein the control means controls the reproduction of the data performed by the reproducing means in accordance with the information stored in the memory means.

33. A reproducing apparatus according to claim 27, further comprising rewriting means capable of rewriting the allowed reproduction period during which the data corresponding to the key stored on the storage medium is allowed to be reproduced, so as to extend the allowed reproduction period.

34. A reproducing apparatus according to claim 29, further comprising settling means for performing settlement in accordance with the number-of-times value recorded on the storage medium, the number-of-times value indicating the number of times the data is allowed to be reproduced.

35. A reproducing apparatus according to claim 26, further comprising: counter means forcounting the number of times the data is reproduced by the reproducing means; and settlement means for performing settlement in accordance with a count value output by the counter means.

36. A reproducing apparatus according to claim 26, further comprising payment amount recording means for recording payment amount information on the storage medium in response to paying a fee.

37. A data delivery method comprising:
an encrypting step for encrypting data and outputting the resultant encrypted data;
a transmitting step for transmitting the encrypted data;
a medium recording step for recording, on a physical storage medium, a key used to decrypt the encrypted data;
a transporting step for physically transporting the physical storage medium;
a receiving step for receiving the encrypted data transmitted in the transmitting step;
a medium reading step for reading the key stored on the transported physical storage medium;
a decrypting step for decrypting the encrypted data received in the receiving step, using the key read in the reading step;
a reproducing step for reproducing the data decrypted in the decrypting step;
a control step for controlling the reproduction of the data performed in the reproducing step, in accordance with information stored on the physical storage medium and relating to the permitted use of the data;
a judgment step for detecting unauthorized use of the data, on the basis of said information stored on the physical storage medium;
a storing step for storing the received encrypted data in a storage means; and
a delete flag recording step for, when the encrypted data stored in the storage means is deleted, recording a delete flag on the physical storage medium,
wherein the judgment step detects unauthorized use of the data by judging whether the delete flag is recorded on the physical storage medium.

38. A data delivery method according to claim 37, wherein the recording step records an allowed reproduction period during which data corresponding to the key stored on the storage medium is allowed to be reproduced; and the judgment step detects unauthorized use of the data, on the basis of the allowed reproduction period recorded on the storage medium.

39. A data delivery method according to claim 37, further comprising: a settling step for performing settlement corresponding to data reproduced in the reproducing step; and a settlement information recording step for recording settlement information on the storage medium in response to the settlement, wherein the judgment step detects unauthorized use of the data, on the basis of the settlement information stored on the storage medium.

40. A data delivery method according to claim 37, wherein the recording step records an allowed reproduction period during which data corresponding to the key stored on the storage medium is allowed to be reproduced; and the control step enables or disables the reproduction of the data in the reproducing step, in accordance with the allowed reproduction period recorded on the storage medium.

41. A data delivery method according to claim 37, wherein the recording step records a number-of-times value indicating the number of times data corresponding to the key stored on the storage medium is allowed to be reproduced; and the control means enables or disables the reproduction of the data in the reproducing step in accordance with the number-of-times value recorded on the storage medium.

42. A data delivery method according to claim 41, further comprising an embedding step for embedding an electronic watermark indicating the allowance of reproduction into the data, wherein the control step reduces the number-of-times value each time the reproducing step reproduces the data, and the control step rewrites the electronic watermark embedded in the data so as to indicate inhibition of reproduction when the number-of-times value becomes equal to zero.

43. A data delivery method according to claim 37, further comprising: a transfer step in which the encrypted data received in the receiving step may be transferred by transfer means to another electronic apparatus; a detecting step for detecting transferring, in the transfer step, of the encrypted data received in the receiving step to another electronic apparatus; and an ID recording step for, when the detecting step detects transferring of the encrypted data, recording an ID corresponding to the transfer means on the storage medium.

44. A data delivery method according to claim 37, further comprising: a mounting step for mounting the storage medium into a mounting part; a memorizing step for storing, into memory means, information recorded on the storage medium when the storage medium is mounted in the mounting part; and a rewriting step for rewriting the information recorded on the storage medium, wherein the control step controls the reproduction of the data performed in the reproducing step in accordance with the information stored in the memory means.

45. A data delivery method according to claim 38, further comprising a rewriting step in which the allowed reproduction period, during which the data corresponding to the key stored on the storage medium is allowed to be reproduced, may be rewritten so as to extend the allowed reproduction period.

46. A data delivery method according to claim 37, further comprising an updating step for updating the information recorded on the storage medium if the judgment step determines, from the information recorded on the storage medium, that the use of the data is valid.

47. A data delivery method according to claim 46, wherein the recording step records, on the storage medium, an identifier of the data, an allowed reproduction period assigned to the data, and a key used to decrypt the data; and the updating step updates the information recorded on the storage medium, if the judgment step determines, from the information recorded on the storage medium, that the use of the data is valid.

48. A data delivery method according to claim 41, further comprising a settling step for performing settlement in accordance with the number-of-times value recorded on the storage medium in the recording step, the number-of-times value indicating the number of times the data is allowed to be reproduced.

49. A data delivery method according to claim 37, further comprising: a counting step for counting the number of times the data is reproduced in the reproducing step; and a settlement step for performing settlement in accordance with a count value counted in the counting step.

50. A data delivery method according to claim 37, further comprising: a payment amount recording step for recording payment amount information on the storage medium in response to paying a fee; and a payment amount updating step for updating the payment amount information recorded on the storage medium in such a manner as to reduce the payment amount in accordance with the information recorded on the storage medium in the recording step.

51. A method of controlling a server apparatus so as to deliver data from the server apparatus to a reproducing apparatus located at a reproducing site, comprising:
an encrypting step for encrypting data and outputting the resultant encrypted data;
a transmitting step for transmitting the encrypted data to the reproducing apparatus;
a medium recording step for recording, on a physically transportable physical storage medium, a key used to decrypt the encrypted data; and
a judgment step for detecting unauthorized use of the data transmitted in the transmitting step, on the basis of information stored on the physical storage medium returned from the reproducing site, said information relating to the permitted use of said data,
wherein the judgment step detects unauthorized use of the data by judging whether a delete flag, which indicates that the data transmitted in the transmitting step has been deleted, is recorded on the physical storage medium returned from the reproducing apparatus.

52. A method of controlling a server apparatus, according to claim 51, wherein the recording step records an allowed reproduction period during which data corresponding to the key stored on the storage medium is allowed to be reproduced.

53. A method of controlling a server apparatus, according to claim 52, wherein the judgment step detects unauthorized use of the data, on the basis of the allowed reproduction period recorded on the storage medium.

54. A method of controlling a server apparatus, according to claim 51, wherein the judgment step detects unauthorized use of the data, on the basis of the settlement information recorded on the storage medium by the reproducing apparatus.

55. A method of controlling a server apparatus, according to claim 51, wherein the recording step records a number-of-times value indicating the number of times data corresponding to the key stored on the storage medium is allowed to be reproduced.

56. A method of controlling a server apparatus, according to claim 51, further comprising an embedding step for embedding an electronic watermark indicating the allowance of reproduction into the data.

57. A method of controlling a server apparatus, according to claim 51, wherein the judgment step detects unauthorized use of the data by judging whether information indicating that the data transmitted in the transmitting step has been transferred is recorded on a storage medium returned from the reproducing apparatus.

58. A method of controlling a server apparatus, according to claim 52, further comprising a rewriting step in which the allowed reproduction period, during which the data corresponding to the key stored on the storage medium is allowed to be reproduced, may be rewritten so as to extend the allowed reproduction period.

59. A method of controlling a server apparatus, according to claim 51, further comprising an updating step for updating the information recorded on the storage medium if the judgment step determines, from the information recorded on the storage medium, that the use of the data is valid.

60. A method of controlling a server apparatus, according to claim 59, wherein the recording step records, on the storage medium, an identifier of the data, an allowed reproduction period assigned to the data, and a key used to decrypt the data; and the updating step updates the information recorded on the storage medium, if the judgment step determines, from the information recorded on the storage medium, that the use of the data is valid.

61. A method of controlling a server apparatus, according to claim 51, further comprising a payment amount updating step for, when payment amount information is recorded on the storage medium in response to payment of a fee performed by the reproducing apparatus, updating the payment amount information recorded on the storage medium in such a manner as to reduce the payment amount in accordance with the information recorded on the storage medium in the recording step.

62. A method of controlling a reproducing apparatus to which encrypted data is transmitted from a predetermined server apparatus and to which a physical storage medium including a key stored thereon for use in decrypting the encrypted data is physically delivered, the method comprising:
- a receiving step for receiving the encrypted data transmitted from the predetermined server apparatus;
- a medium reading step for reading the key stored on the delivered physical storage medium;
- a decrypting step for decrypting the encrypted data received in the receiving step, using the key read in the reading step;
- a reproducing step for reproducing the data decrypted in the decrypting step;
- a control step for controlling the reproduction of the data performed in the reproducing step in accordance with information stored on the physical storage medium and relating to the permitted use of said data;
- a storing step for storing the received encrypted data into a storage means; and
- a delete flag recording step for, when the encrypted data stored in the storage means is deleted, recording a delete flag on the physical storage medium.

63. A method of controlling a reproducing apparatus, according to claim 62, wherein the reading step reads an allowed reproduction period during which data corresponding to the key stored on the physical storage medium is allowed to be reproduced; and the control step enables or disables the reproduction of the data in the reproducing step, in accordance with the allowed reproduction period recorded on the storage means.

64. A method of controlling a reproducing apparatus, according to claim 62, further comprising: a settling step for performing settlement corresponding to data reproduced in the reproducing step; and a settlement information recording step for recording settlement information on the storage medium in response to the settlement.

65. A method of controlling a reproducing apparatus, according to claim 62, wherein a number-of-times value, indicating the number of times data corresponding to the key stored on the storage medium is allowed to be reproduced, is stored on the storage medium; and the control step enables or disables the reproduction of the data in the reproducing step, in accordance with the number-of-times value recorded on the storage medium.

66. A method of controlling a reproducing apparatus, according to claim 65, wherein data received in the receiving step includes an electronic watermark embedded in the data, the watermark indicating that the data is permitted to be reproduced; and the control step reduces the number-of-times value each time the reproducing step reproduces the data, and the control step rewrites the electronic watermark embedded in the data so as to indicate inhibition of reproduction when the number-of-times value becomes equal to zero.

67. A method of controlling a reproducing apparatus, according to claim 62, further comprising: a transfer step in which the encrypted data received in the receiving step may be transferred by transfer means to another electronic apparatus; a detecting step for detecting transferring, in the transfer step, of the encrypted data received in the receiving step to another electronic apparatus; and an ID recording step for, when the detecting step detects transferring of the encrypted data, recording an ID corresponding to the transfer means on the storage medium.

68. A method of controlling a reproducing apparatus, according to claim 62, further comprising: a mounting step for mounting the storage medium into a mounting part; a memorizing step for storing, into memory means, information recorded on the storage medium when the storage medium is mounted in the mounting part; and a rewriting step for rewriting the information recorded on the storage medium, wherein the control step controls the reproduction of the data performed in the reproducing step in accordance with the information stored in the memory means.

69. A method of controlling a reproducing apparatus, according to claim 63, further comprising a rewriting step in which the allowed reproduction period, during which the data corresponding to the key stored on the storage medium is allowed to be reproduced, may be rewritten so as to extend the allowed reproduction period.

70. A method of controlling a reproducing apparatus, according to claim 65, further comprising a settling step for performing settlement in accordance with the number-of-times value recorded on the storage medium, the number-of-times value indicating the number of times the data is allowed to be reproduced.

71. A method of controlling a reproducing apparatus, according to claim 62, further comprising: a counting step for counting the number of times the data is reproduced in the reproducing step; and a settlement step for performing settlement in accordance with a count value counted in the counting step.

72. A method of controlling a reproducing apparatus, according to claim 62, further comprising a payment amount recording step for recording payment amount information on the storage medium in response to paying a fee.

73. A program storage medium including a processing program, stored thereon, for controlling a server apparatus to perform a process of delivering data from the server apparatus to a reproducing apparatus located at a reproducing site, the process comprising:
- an encrypting step for encrypting data and outputting the resultant encrypted data;
- a transmitting step for transmitting the encrypted data to the reproducing apparatus;
- a medium recording step for recording, on a physically transportable physical storage medium, a key used to decrypt the encrypted data; and
- a judgment step for detecting unauthorized use of the data transmitted in the transmitting step, on the basis of information stored on the physical storage medium returned from the reproducing site, said information relating to the permitted use of said data,
- wherein the judgment step detects unauthorized use of the data by judging whether a delete flag, which indicates that the data transmitted in the transmitting step has been deleted, is recorded on the physical storage medium returned from the reproducing apparatus.

74. A program storage medium according to claim 73, wherein the recording step records an allowed reproduction period during which data corresponding to the key stored on the information storage medium is allowed to be reproduced.

75. A program storage medium according to claim 74, wherein the judgment step detects unauthorized use of the data, on the basis of the allowed reproduction period recorded on the information storage medium.

76. A program storage medium according to claim 73, wherein the judgment step detects unauthorized use of the data, on the basis of the settlement information recorded on the information storage medium by the reproducing apparatus.

77. A program storage medium according to claim 73, wherein the recording step records a number-of-times value indicating the number of times data corresponding to the key stored on the information storage medium is allowed to be reproduced.

78. A program storage medium according to claim 73, wherein the process further comprises an embedding step for embedding an electronic watermark indicating the allowance of reproduction into the data.

79. A program storage medium according to claim 73, wherein the judgment step detects unauthorized use of the data by judging whether information indicating that the data transmitted in the transmitting step has been transferred is recorded on an information storage medium returned from the reproducing apparatus.

80. A program storage medium according to claim 74, wherein the process further comprises a rewriting step in which the allowed reproduction period, during which the data corresponding to the key stored on the storage medium is allowed to be reproduced, may be rewritten so as to extend the allowed reproduction period.

81. A program storage medium according to claim 73, wherein the process further comprises an updating step for updating the information recorded on the storage medium if the judgment step determines, from the information recorded on the storage medium, that the use of the data is valid.

82. A program storage medium according to claim 81, wherein the recording step records, on the information storage medium, an identifier of the data, an allowed reproduction period assigned to the data, and a key used to decrypt the data; and the updating step updates the information recorded on the information storage medium, if the judgment step determines, from the information recorded on the information storage medium, that the use of the data is valid.

83. A program storage medium according to claim 73, wherein the process further comprises a payment amount updating step for, when payment amount information is recorded on the information storage medium in response to payment of a fee performed by the reproducing apparatus, updating the payment amount information recorded on the information storage medium in such a manner as to reduce the payment amount in accordance with the information recorded on the information storage medium in the recording step.

84. A program storage medium including a processing program, stored thereon, for controlling a reproducing apparatus, to which encrypted data is transmitted from a predetermined server apparatus and to which a physical storage medium including a key stored thereon for use in decrypting the encrypted data is physically delivered, so as to perform a process comprising:

a receiving step for receiving the encrypted data transmitted from the predetermined server apparatus;

a medium reading step for reading the key stored on the delivered physical storage medium;

a decrypting step for decrypting the encrypted data received in the receiving step, using the key read in the reading step;

a reproducing step for reproducing the data decrypted in the decrypting step;

a control step for controlling the reproduction of the data performed in the reproducing step in accordance with information stored on the physical storage medium and relating to the permitted use of said data;

a storing step for storing the received encrypted data into a storage means; and a delete flag recording step for, when the encrypted data stored in the storage means is deleted, recording a delete flag on the physical storage medium.

85. A program storage medium according to claim 84, wherein the reading step reads an allowed reproduction period during which data corresponding to the key stored on the physical storage medium is allowed to be reproduced; and the control step enables or disables the reproduction of the data in the reproducing step, in accordance with the allowed reproduction period recorded on the physical storage means.

86. A program storage medium according to claim 84, wherein the process further comprises: a settling step for performing settlement corresponding to data reproduced in the reproducing step; and a settlement information recording step for recording settlement information on the information storage medium in response to the settlement.

87. A program storage medium according to claim 84, wherein the process further comprises: a number-of-times value, indicating the number of times data corresponding to the key stored on the information storage medium is allowed to be reproduced, is stored on the information storage medium; and the control step enables or disables the reproduction of the data in the reproducing step, in accordance with the number-of-times value recorded on the information storage medium.

88. A program storage medium according to claim 87, wherein data received in the receiving step includes an electronic watermark embedded in the data, the watermark indicating that the data is permitted to be reproduced; and the control step reduces the number-of-times value each time the reproducing step reproduces the data, and the control step rewrites the electronic watermark embedded in the data so as to indicate inhibition of reproduction when the number-of-times value becomes equal to zero.

89. A program storage medium according to claim 84, wherein the process further comprises: a transfer step in which the encrypted data received in the receiving step may be transferred by transfer means to another electronic apparatus; a detecting step for detecting transferring, in the transfer step, of the encrypted data received in the receiving step to another electronic apparatus; and an ID recording step for, when the detecting step detects transferring of the encrypted data, recording an ID corresponding to the transfer means on the information storage medium.

90. A program storage medium according to claim 84, wherein the process further comprises: a mounting step for mounting the information storage medium into a mounting part; a memorizing step for storing, into memory means, information recorded on the information storage medium when the information storage medium is mounted in the mounting part; and a rewriting step for rewriting the information recorded on the information storage medium, wherein the control step controls the reproduction of the data performed in the reproducing step in accordance with the information stored in the memory means.

91. A program storage medium according to claim 85, wherein the process further comprises a rewriting step in which the allowed reproduction period, during which the data corresponding to the key stored on the information storage medium is allowed to be reproduced, may be rewritten so as to extend the allowed reproduction period.

92. A program storage medium according to claim 87, wherein the process further comprises a settling step for performing settlement in accordance with the number-of-times value recorded on the information storage medium, the number-of-times value indicating the number of times the data is allowed to be reproduced.

93. A program storage medium according to claim 84, wherein the process further comprises: a counting step for counting the number of times the data is reproduced in the reproducing step; and a settlement step for performing settlement in accordance with a count value counted in the counting step.

94. A program storage medium according to claim 84, wherein the process further comprises a payment amount recording step for recording payment amount information on the information storage medium in response to paying a fee.

95. A data delivery method comprising:
   an encrypting step for encrypting data and outputting the resultant encrypted data;
   a transmitting step for transmitting the encrypted data;
   a medium recording step for recording, on a physical storage medium, a key used to decrypt the encrypted data;
   a transporting step for physically transporting the physical storage medium;
   a receiving step for receiving the encrypted data transmitted from the predetermined server apparatus;
   a medium reading step for reading the key stored on the transported physical storage medium;
   a decrypting step for decrypting the encrypted data received in the receiving step, using the key read in the reading step;
   a controlling step for enabling or disabling reproduction of the data decrypted in the decrypting step, in accordance with information recorded on the storage medium and relating to the permitted use of the data;
   a reproducing step for reproducing the decrypted data, in accordance with the control in the controlling step;
   a judging step for detecting unauthorized use of the data, on the basis of said information stored on the storage medium,
   a storing step for storing the received encrypted data in a storage means; and
   a delete flag recording step for, when the encrypted data stored in the storage means is deleted, recording a delete flag on the physical storage medium,
   wherein the judgment step detects unauthorized use of the data by judging whether the delete flag is recorded on the physical storage medium.

96. A method of delivering data to a reproducing apparatus located at a reproducing site, comprising:
   an encrypting step for encrypting data and outputting the resultant encrypted data;
   a transmitting step for transmitting the encrypted data;
   a medium recording step for recording, on a physically transportable physical storage medium, a key used to decrypt the encrypted data; and
   a judging step for detecting unauthorized use of the data, on the basis of information stored on said physical storage medium returned from the reproducing site, said information relating to the permitted use of the data,
   wherein the judgment step detects unauthorized use of the data by judging whether a delete flag, which indicates that the data transmitted in the transmitting step has been deleted, is recorded on the physical storage medium returned from the reproducing apparatus.

97. A method of reproducing data by a reproducing apparatus to which encrypted data is transmitted from a predetermined server apparatus and to which a transportable physical storage medium including a key stored thereon for use in decrypting the encrypted data is physically delivered, the method comprising:
   a receiving step for receiving the encrypted data transmitted from the predetermined server apparatus;
   a medium reading step for reading the key stored on the delivered physical storage medium;
   a decrypting step for decrypting the encrypted data received in the receiving step, using the key read in the reading step;
   a controlling step for enabling or disabling reproduction of the data decrypted in the decrypting step, in accordance with information recorded on the transported physical storage medium and related to the permitted use of the data;
   a reproducing step for reproducing the decrypted data, in accordance with the control in the controlling step;
   a storing step for storing the received encrypted data in a storage means;
   a delete flag recording step for, when the encrypted data stored in the storage means is deleted, recording a delete flag on the physical storage medium; and
   a judgment step for detecting unauthorized use of the data by judging whether the delete flag is recorded on the physical storage medium.

98. A program storage medium including a processing program, stored thereon, for controlling a reproducing apparatus to which encrypted data is transmitted from a predetermined server apparatus and to which a transportable physical storage medium including a key stored thereon for use in decrypting the encrypted data is physically delivered, the processing program serving to control the reproducing apparatus to perform a process of reproducing the data, the process comprising:
   a receiving step for receiving the encrypted data transmitted from the predetermined server apparatus;
   a medium reading step for reading the key stored on the delivered physical storage medium;
   a decrypting step for decrypting the encrypted data received in the receiving step, using the key read in the reading step;
   a controlling step for enabling or disabling reproduction of the data decrypted in the decrypting step, in accordance with information recorded on the transported physical storage medium and relating to the permitted use of the data;
   a reproducing step for reproducing the decrypted data, in accordance with the control in the controlling step;
   a storing step for storing the received encrypted data in a storage means;
   a delete flag recording step for, when the encrypted data stored in the storage means is deleted, recording a delete flag on the physical storage medium; and
   a judgment step for detecting unauthorized use of the data by judging whether the delete flag is recorded on the physical storage medium.

99. A transportable physical storage medium which is physically deliVered between a server apparatus and a reproducing apparatus in a data delivery system for delivering encrypted data from the server apparatus to the reproducing apparatus,
   wherein at least information indicating an identifier of the data, a key used to decrypt the data, a reproduction condition of the data, and a delete flag representing a deletion of the data from the reproducing apparatus, is stored on the transportable physical storage medium.

100. A storage medium according to claim 99, wherein the information indicating the reproduction condition is information indicating a period during which the data is allowed to be reproduced.

101. A storage medium according to claim 99, wherein the information indicating the reproduction condition is information indicating the number of times the data is allowed to be reproduced.

102. A storage medium according to claim 99, wherein settlement information is stored on the storage medium in response to settlement associated with the data reproduced by the reproducing apparatus.

103. A storage medium according to claim 99, wherein information indicating that the data is transferred or output from the reproducing apparatus is stored on the storage medium.

104. A storage medium according to claim 99, wherein payment amount information is stored on the storage medium in response to payment of a fee performed by the reproducing apparatus.

105. A data delivery system according to claim 4, further comprising rewriting means capable of rewriting the allowed reproduction period during which the data corresponding to the key stored on the storage medium is allowed to be reproduced, so as to extend the allowed reproduction period.

106. A data delivery method according to claim 40, further comprising a rewriting step in which the allowed reproduction period, during which the data corresponding to the key stored on the storage medium is allowed to be reproduced, may be rewritten so as to extend the allowed reproduction period.

* * * * *